United States Patent [19]
Sands et al.

[11] Patent Number: 5,864,710
[45] Date of Patent: Jan. 26, 1999

[54] CONTROLLERLESS MODEM

[75] Inventors: G. Byron Sands, Spring; Peter J. Brown; Don A. Dykes, both of Houston; Andrew L. Love, Spring; Kevin W. Eyres, Tomball, all of Tex.

[73] Assignee: Compaq Computer Corporation, Houston, Tex.

[21] Appl. No.: 685,310

[22] Filed: Jul. 22, 1996

Related U.S. Application Data

[60] Provisional application No. 60/010,909 Jan. 31, 1996.

[51] Int. Cl.⁶ .................................................. G06F 13/00
[52] U.S. Cl. ...................... 395/825; 395/500; 395/275; 395/280; 395/222
[58] Field of Search ...................... 395/275, 280, 395/200.1, 2.1, 621, 500, 821; 375/220, 222; 345/222; 358/85

[56] References Cited

U.S. PATENT DOCUMENTS

| | | | |
|---|---|---|---|
| 4,991,169 | 2/1991 | Davis et al. | 370/77 |
| 5,170,470 | 12/1992 | Pindar et al. | 395/275 |
| 5,192,999 | 3/1993 | Gracyzk et al. | 358/85 |
| 5,200,981 | 4/1993 | Carmon | 375/106 |
| 5,250,940 | 10/1993 | Valentaten | 345/189 |
| 5,515,474 | 5/1996 | Deacon et al. | 395/2.1 |
| 5,604,870 | 2/1997 | Moss et al. | 395/280 |
| 5,701,474 | 12/1997 | Harper | 395/621 |
| 5,787,305 | 7/1998 | Chen | 395/500 |
| 5,790,895 | 8/1998 | Krontz et al. | 395/821 |
| 5,812,820 | 9/1998 | Loram | 395/500 |

OTHER PUBLICATIONS

Communications, Chapters 1, 2, & 3, Windows 95, Technical Reference Document, pp. i–xviii, and pp. 19–71.
AT&T Advance Data Sheet, WE® DSP16A–V32, v. 32 Data Pump Chip Set, Jun. 6, 1991.
Texas Instruments, Telecommunications Applications with the TMS320C5x DSPs, Application Book, pp. 111–146, 1994.

*Primary Examiner*—Thomas C. Lee
*Assistant Examiner*—Michael G. Smith
*Attorney, Agent, or Firm*—Pravel, Hewitt & Kimball

[57] ABSTRACT

A computer system implements a standard modem without the use of a microcontroller. Instead, a digital signal processor is provided on an expansion card, but with direct links to the computer system itself. The code usually implemented in the microcontroller is instead implemented as a virtual modem controller to be called by the operating system of the computer itself. Further, this virtual modem controller includes a virtualized UART, that appears to the operating system software as a hardware UART, with entry points for calls to replace input/output instructions. In this way, standard device driver code written to execute input/output operations is easily converted to operate with the "virtualized" UART.

7 Claims, 19 Drawing Sheets

CONTROLLERLESS MODEM

RELATED APPLICATIONS

This application claims priority to U.S. application Ser. No. 60/010,909, filed Jan. 31, 1996.

BACKGROUND OF THE INVENTION

1. Field of the Invention

The invention relates to modems used in personal computers, and more particularly to a modem wherein the controller and UART functions are performed by the host CPU using software organized as virtualized driver and modem modules, with the modules communicating via a virtualized UART interface.

2. Description of the Related Art

Most of today's personal computers include some form of modem functionality. High speed modem systems are typically incorporated onto an option card, and usually include a "data pump" for supporting the various protocols of modem communication, such as the V.22, V.22bis, V.32, V.32bis, and V.34 (28.8 Kbps) protocols recommended by the International Telegraph and Telephone Consultative Committee (CCITT). The data pump itself typically includes a DSP (digital signal processor) for performing modulation, demodulation and echo cancellation and a coder-decoder (CODEC) for performing analog to digital (A/D) and digital to analog (D/A) conversion. Analog signals from the phone line are digitized by the CODEC and then demodulated by the DSP to extract the original digital data sent by an external device. This procedure is reversed for data transmitted by the modem to the external device.

In prior modems, support logic to interface the modem to the computer system has typically included a microcontroller for establishing a communications link, controlling the sequence of events to originate or answer a call, and to transmit or receive digital data from the computer system through a universal asynchronous receiver transmitter (UART) across the I/O bus. The microcontroller also typically performs error correction procedures, such as those according to the V.42 protocol, as well as compression/decompression procedures, such as those according to the V.42bis protocol recommended by the CCITT.

The UART was originally designed as an intelligent microchip for serial interfacing, typically serializing data presented over a bus (or serial transmission such as over an RS-232 communications link) and receiving such data, converting it to parallel form, and sending it over a bus. Access to a UART chip is typically gained through a personal computer system's I/O ports (typically COM1 and COM2). Typical representatives include the UART 8250 and 16450 chips by National Semiconductor Corporation.

The hardware portions of modem devices contributes substantially to the ultimate cost of such modems. Further, they contribute to the size of such modems. Any reduction in the component count of such modems is desirable because it results in lower costs.

Further, ease of upgradability and portability across different operating system platforms is important to modem makers in today's age of rapidly changing technology and quick obsolescence. Manufacturers are faced with the pressure of trying to recover the cost of hardware development in the face of shortened product lifecycles. Therefore, any reduction in such hardware development is similarly desirable.

SUMMARY OF THE INVENTION

In a modem according to the preferred embodiment, the UART and microcontroller functions are virtualized and implemented in software (the "modem module") run on the host processor. The modem module interfaces with a second layer (the "virtual device driver layer") that includes an operating system-specific virtual port driver that interacts with the operating system. This dichotomized architecture is advantageous in that the modem module software remains virtually unchanged when the modem is used in conjunction with different operating systems (OSs). Most operating systems already incorporate the ability to communicate with a UART. Hence, modifying only the virtual device driver layer is much simpler and more cost effective than attempting to modify both layers.

Implementing portions of the modem hardware as software modules has additional advantages. By leveraging the capabilities of today's powerful microprocessors, high speed modem performance is actually improved over that of "standard" modems by eliminating bottlenecks associated with physical UARTs. Thus, a modem according to the present invention can be cheaper, faster, and easier to upgrade than traditional modem cards.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
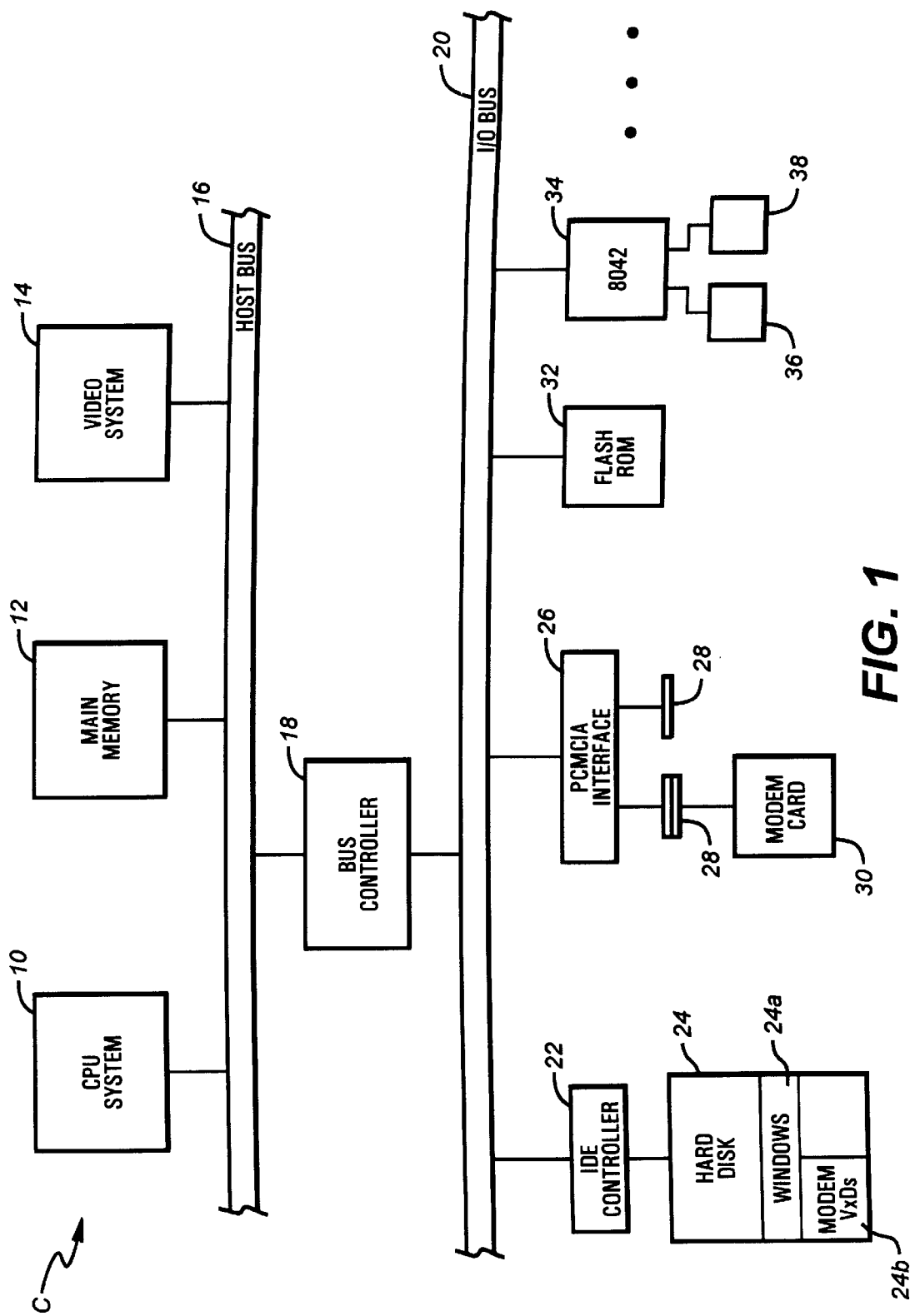
FIG. 1 is a simplified block diagram of a computer system with an optional modem card according to the present invention.

Referring to FIG. 1, a simplified block diagram of a computer system C is shown, including a modem card 30. The computer system C incorporates a central processing unit (CPU) system 10 coupled to a host bus 16. The host bus functions to interface the CPU system 10 to the rest of the computer system C, including a memory array otherwise referred to as the main memory 12. The CPU system 10 may simply be a microprocessor, such as Intel Corporation's 486 or PENTIUM™, or a more complete CPU system including a microprocessor, a cache controller and other components. A video system 14 is also connected to the host bus 16.

The host bus 16 is coupled to the I/O bus 20 through a bus controller 18, which is preferably compatible with the Industry Standard Architecture (ISA) or the Extended Industry Standard Architecture (EISA) bus. The exact architecture of the I/O bus 20 is not critical to the invention.

Connected to the I/O bus 20 are various components conventionally located on the system board of the computer system C. These include the read only memory (ROM) 32, which provides the BIOS and other system level instructions, and an 8042 keyboard controller 34. A keyboard port 36 and an auxiliary or pointing device port 38 are connected to the 8042 keyboard controller 34. A hard disk drive 24 is connected to the I/O bus 20 via an IDE controller 22. The IDE controller 22 contains buffer control logic and generates chip selects for IDE drives during data reads and data writes to IDE devices.

Of interest in this description, a modem card 30 is connected to a Personal Computer Memory Card International Association (PCMCIA) interface 26 through a slot connector 28. The PCMCIA interface 26 provides connectivity to the I/O bus 20. Although originally intended as a memory expansion (standard 1.0) interface, PCMCIA specification 2.0 allows credit card-sized cards to be used for various I/O devices, such as fax modems, SCSI adapters or Global Positioning System (GPS) receivers with a PCMCIA interface. For sake of simplification, modem functions discussed hereinafter are assumed to include the capability to handle facsimile, data, and voice information, since the communication protocols for each are related.

The computer system of FIG. 1 is exemplary, and numerous other computer system designs could be used. Further, the modem card 30 can be located directly on the I/0 bus 20 or any other bus utilized by the computer system C, including the host bus 16. The exact location of the modem is not critical to the invention.

Figure 2:
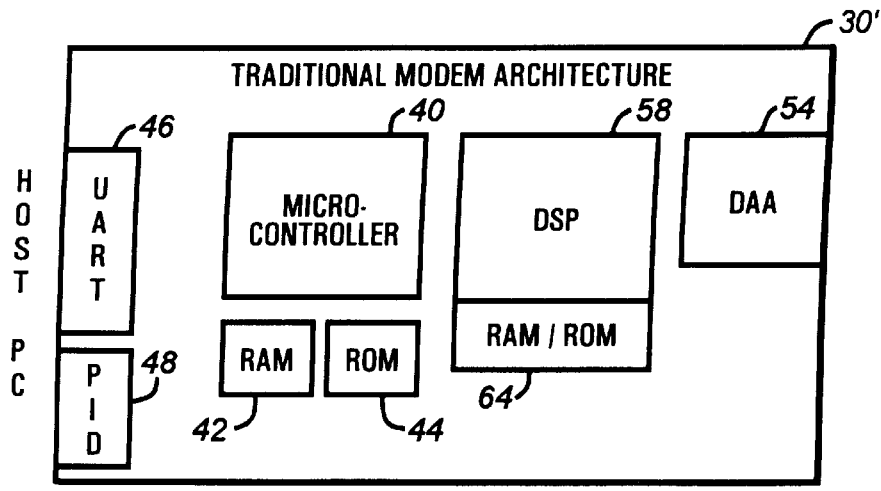
FIG. 2 is a block diagram showing traditional modem hardware in a PCMCIA card.

Referring briefly to FIG. 2, a block diagram of traditional modem hardware is shown. A prior art modem is coupled to a phone line (not shown) through a data access arrangement (DAA) 54, which electrically isolates the modem 30 from the phone line to control emissions of electromagnetic interference/radio frequency interference (EMI/RFI) as required by the Federal Communications Commission (FCC). The DAA 54 also typically isolates the received data from the transmitted analog signals, and develops a digital ring signal to inform the computer system to answer. The DAA 54 is preferably compatible with the public switched telephone network (PSTN) interface. The DAA 54 receives signals from the phone line through a telephone jack, such as an RJ11C used for standard telephones.

Traditional modems also include: a DSP 58 and support memory 64, a microcontroller 40 requiring RAM 42 and ROM 44, a physical UART 46, and a peripheral interface device (PID) 48. In such prior art modems, the microcontroller 40 would typically communicate with the CPU system 10 through the UART 46. The CPU system 10 would send and receive data, using a separate UART, to the UART 46, which would in turn provide the data to the microcontroller 40, as well as send data from the microcontroller 40 to the CPU system 10.

The microcontroller 40, however, could not simply receive data from the CPU 10 and send it over the telephone line, nor could it simply receive data from the telephone line and send it to the CPU 10. Instead, it would typically include the software necessary to implement a modem command set, such as the standard Hayes AT command set. The microcontroller 40 would include software for receiving ASCII commands according to the AT command set over the UART 46, and performing various functions based on those commands. For example, the "ATH" command would cause the microcontroller 40 to "hang up" the DAA 54, disconnecting the modem link. The other commands are well known according to the AT command set. Further, the microcontroller 40 would implement various error correction and data compression protocols. All of these functions are well known to those of ordinary skill in the art. When the software is in the communications mode rather than the command mode, of course, the microcontroller 40 would pass data to and from the UART 46 and to and from the DSP 58. The DSP 58 would then convert that data into appropriate digitized signal levels, and pass that data on to a CODEC 56 (see FIG. 4). To exit the data communications mode and into the command mode, the microcontroller 40 would preferably operate according to the AT command set, and respond to a sequence of three plus signs "+++" by switching to the command mode, allowing the host PC to provide AT commands through the microcontroller 40. One typical microcontroller used for the microcontroller 40 would be the Motorola MC68302 embedded controller.

Figure 3:
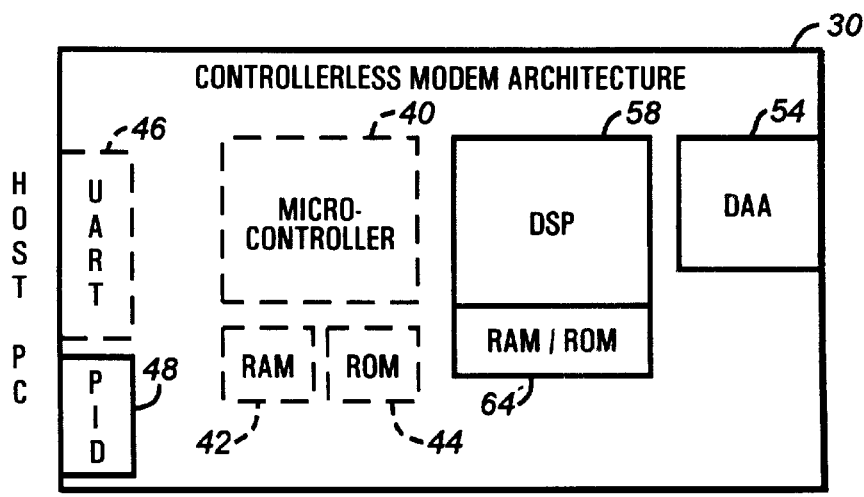
FIG. 3 is a block diagram of modem hardware according to the disclosed embodiment of the invention illustrating eliminated hardware portions.
Figure 5:
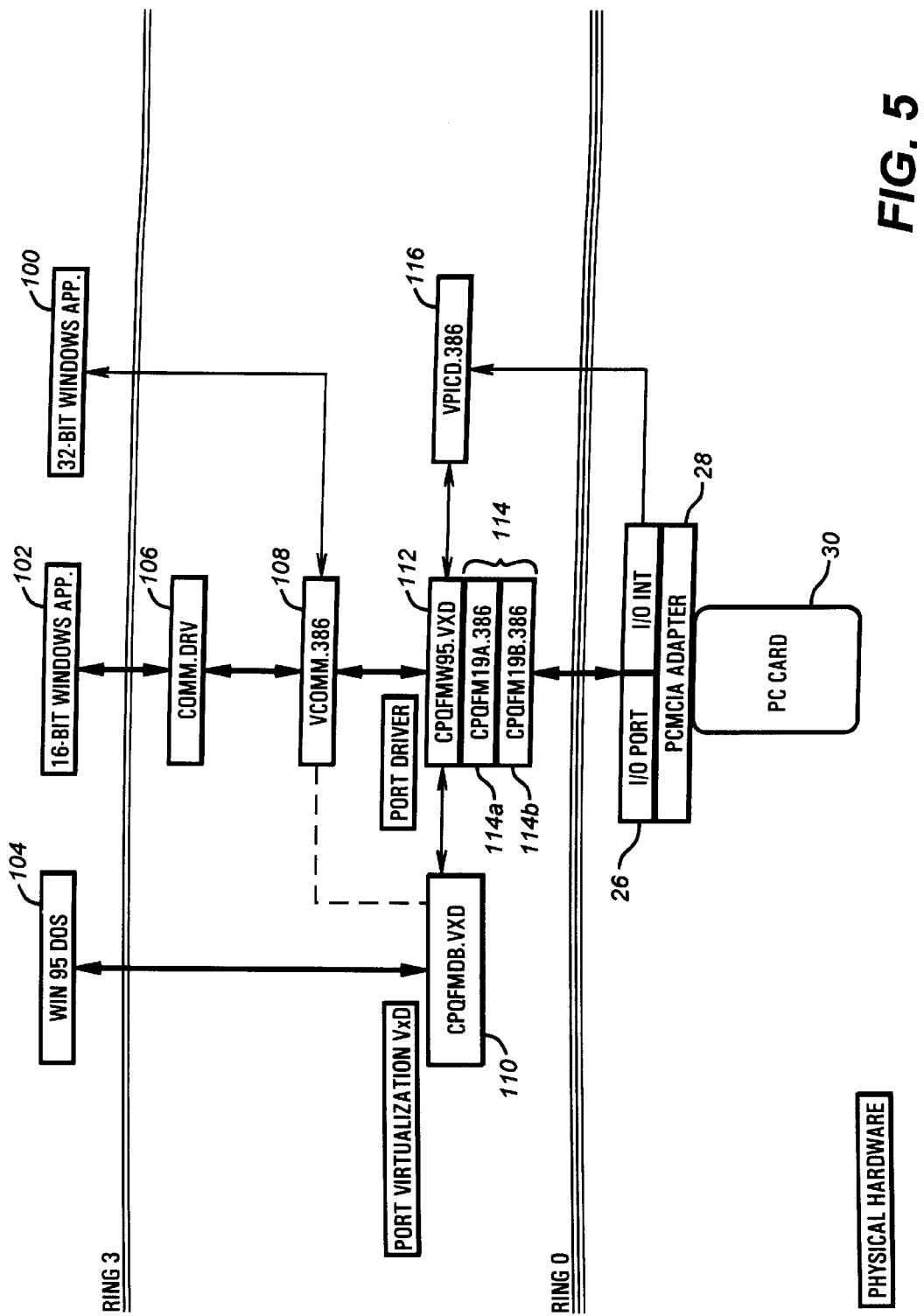
FIG. 5 is a block diagram depicting various software components in a Windows® 95 environment as used with a modem implemented according to the present invention.
Figure 6:
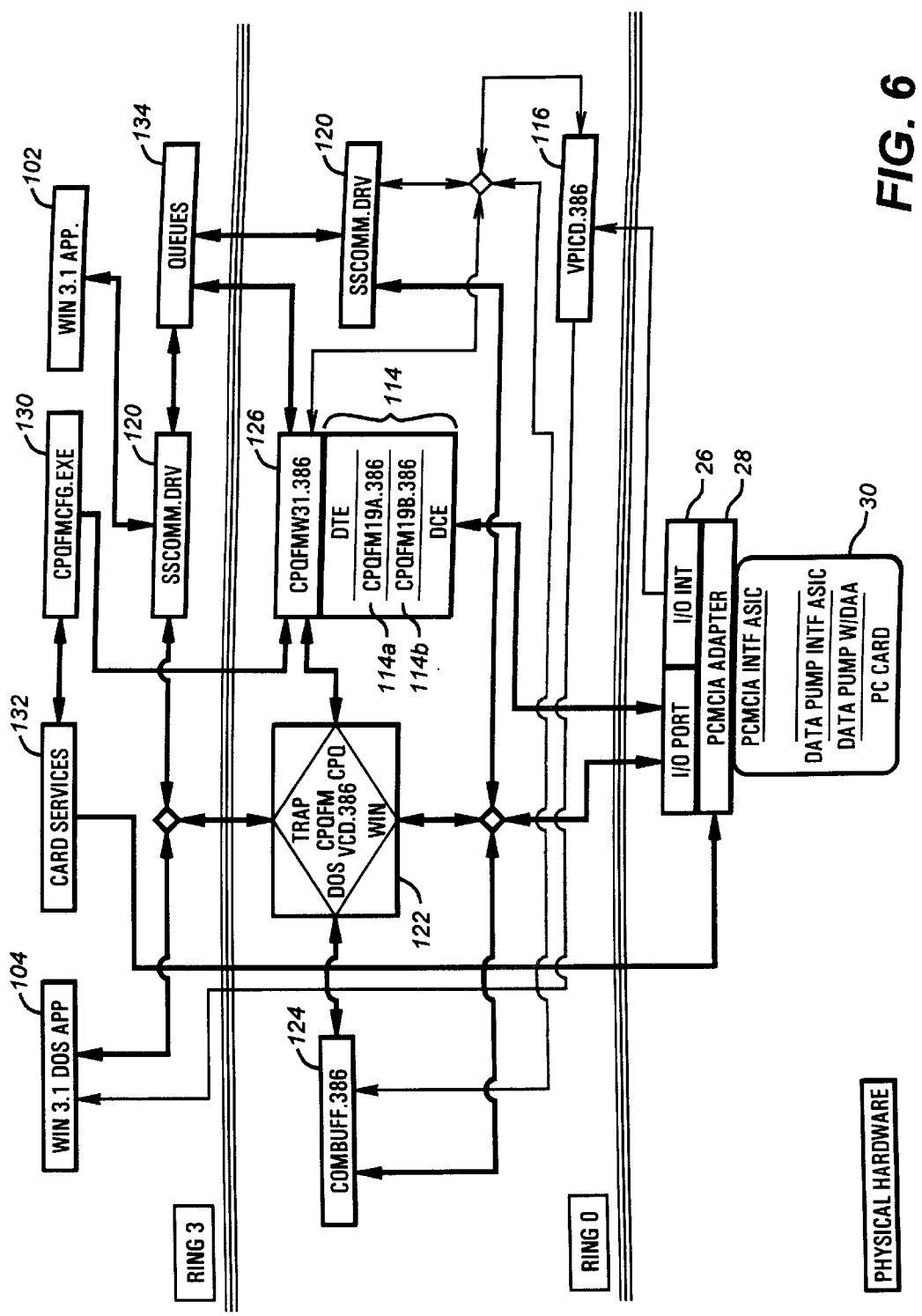
FIG. 6 is a block diagram depicting various software components in a Windows® 3.1 environment as used with a modem implemented according to the present invention.

Referring now to FIG. 3, a block diagram of modem hardware according to the disclosed embodiment of the invention is shown. Physical components that are implemented in software or no longer required are represented by dashed lines. As mentioned, prior art modem systems usually included a microcontroller 40 (FIG. 2) that provided data to the DSP 58, and which also controls the DAA 54, taking it on or off-hook as necessary. To establish a communication link, the microcontroller 40 directs the proper sequence of signals to either originate or answer a telephone call. In a modem according to the preferred embodiment, however, the various microcontroller 40 and UART 46 functions are implemented in a virtualized modem module 114 (FIGS. 5 and 6). This software implementation results in substantial monetary savings and increased data rates. Further, the microcontroller 40 and the UART 46 are preferably implemented as a module independent from other operating system software, so that the virtualized versions of the microcontroller 40 and the UART 46 can be easily moved to other operating systems.

Figure 4:
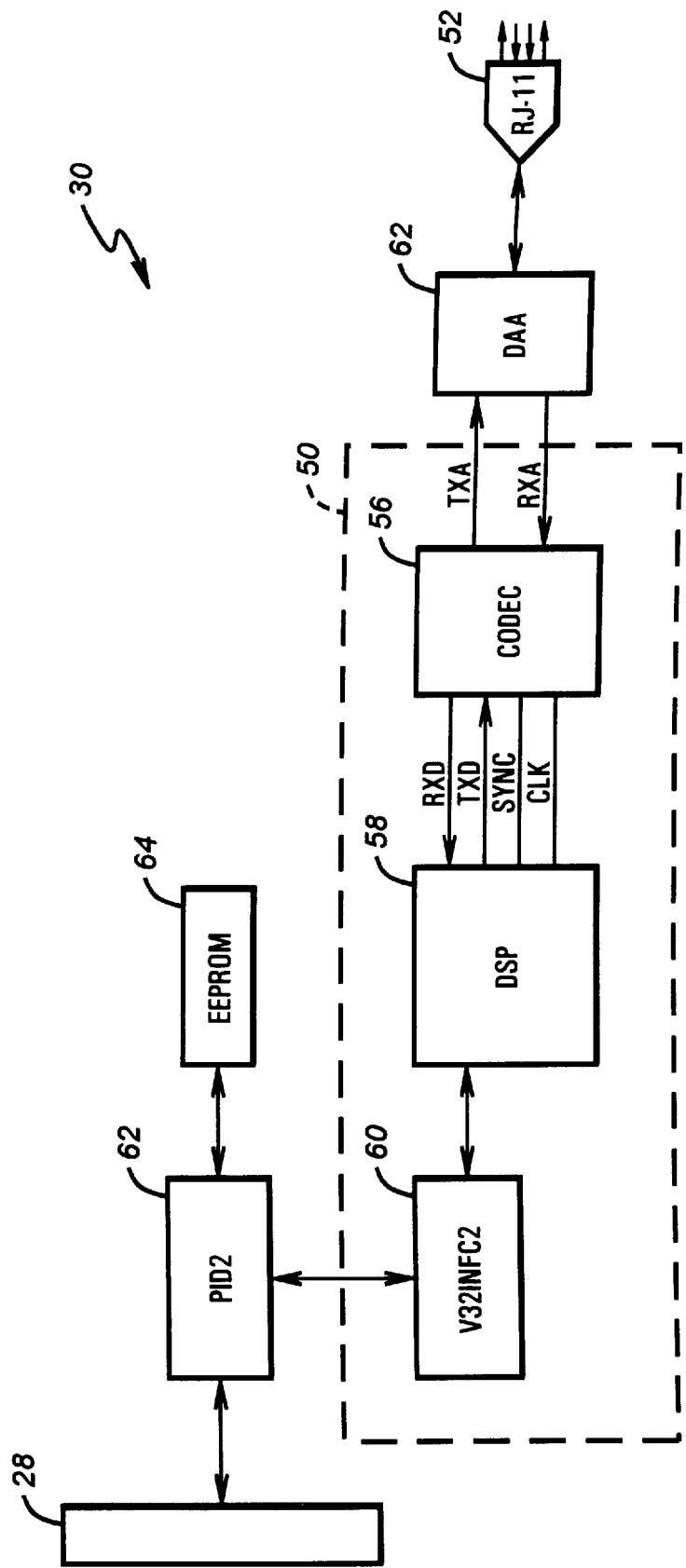
FIG. 4 is a detailed block diagram of a modem card according to the present invention.

Proceeding now to FIG. 4, a modem card 30 according to the present invention is shown in greater detail. A PCMCIA host interface application specific integrated circuit (ASIC) PID2 62 is used to connect the modem card 30 to the computer system C through the PCMCIA slot connector 28. PID2 62 is also connected to an EEPROM 64, which contains the Card Information Structure (CIS) that is loaded into the PID2 62. In the preferred embodiment, the EEPROM 64 is manufactured by National Semiconductor Corporation. The PID2 62 is further connected to an interface ASIC V32INFC2, which in turn provides an interface for a DSP chip 58. The DSP 58 performs calculations to provide desired modem functions. In the preferred embodiment, the DSP 58 is a conventional DSP16A manufactured by AT&T Microelectronics.

The DSP 58 generally converts the digital data from the computer system C into a digitized analog waveform that provides to the CODEC 56. The CODEC 56 then provides a true analog waveform to the DAA54. The DSP 58 also receives a digitized analog waveform from the CODEC 56. The CODEC 56 receives a true analog waveform from the DAA 54 and converts that analog data into digital data for the computer system C. The DSP 58 also preferably performs echo cancellation to cancel signals echoed back to the modem 30 due to the transmitted signal.

The CODEC 56 is connected to the DSP 58 by four signals referred to as RXD, TXD, SYNC and CLK. The RXD and TXD signals are the receive and transmit digital signals, while the SYNC and CLK signals are conventional signals as utilized between a DSP 58 and a CODEC 56. Together, the V32INFC2 60, DSP 58 and CODEC 56 form what is commonly referred to as a "data pump" 50. The data pump 50 is typically a modem data pump chip set supporting the various protocols of modem communication. In the preferred embodiment, the data pump 50 is a DSP16A-V32INFC2-LT V.32bis plus FAX Data Pump Chip Set sold by AT&T Microelectronics.

The CODEC 56 receives an RXA or receive analog signal from the DAA 54, and provides a TXA or transmit analog signal to the DAA 54. The CODEC 56 digitizes analog data from the RXA signal for processing by the DSP 58. Likewise, digital data TXD received from the DSP 58 is converted to analog format onto the TXA signal.

As mentioned, the DAA 54 serves to isolate the modem 30 from the telephone line to meet FCC or national regulations for the control of EMI/RFI interference. Data being received by the DAA 54 from an external device is filtered and provided in analog form to the CODEC 56 on the RXA signal. Similarly, data being transmitted by the modem 30 is provided from the CODEC 56 to the DAA 54 on the TXA signal, which is then asserted by the DAA 54 on the phone line. Data is preferably transferred serially between the DSP 58 and the CODEC 56. Further details of exemplary DAA circuitry can be found in copending U.S. patent application Ser. No. 08/304,262, entitled "Modem Having Separate Modem Engine and Data Access Arrangement" and hereby incorporated by reference.

The DAA 54 is connected to a standard telephone line through an RJ-11 phone jack 52. The phonejack 52 is provided to provide and receive certain telephone signals as known to those skilled in the art. Many different kinds of phone line or other transmission media are contemplated, so that the phone jack 52 and DAA 54 would be configured to be compatible with whatever phone line means or transmission media is being used. The present invention is not limited by any particular type of transmission media, phone jack or DAA, so that those shown are used merely for purposes of illustration.

A modem 30 according to the preferred embodiment is ideally able to identify itself according to the method described in the Plug and Play External COM Device Specification. In addition, to qualify for a Windows® 95 logo, the modem 30 must support at least 9600 bits per second (bps) V.32 with V.42/V.42bis protocol for data modems; support the TIA-602 (Hayes®-compatible) AT command set, with extensions for flow control, V.42/V.42bis; support fax capabilities of at least 9600 bps V.29 with class 1 (TIA-578A); and support the 16450A/16550 compatible UART interface. Windows® 95 does support the older 8250 UART chips.

Windows® 95 Background

At the core of Windows® 95 is a 32-bit protected-mode operating system called the virtual machine manager (VMM). The VMM provides services that manage memory, processes, interrupts, and exceptions such as general protection faults. The VMM works with virtual devices (VxDs) to allow the virtual devices to intercept interrupts and faults to control the access that an application has to hardware devices and installed software. Both the VMM and VxDs run in a single, 32-bit, flat model address space at privilege level 0 (also called ring 0). Code running in ring 0 can perform any task the processor is capable of handling, and it can manipulate any memory address in the computer system. Ring 1 has more privilege than ring 2, which in turn has more than ring 3. Windows® 95 uses only ring 0 and ring 3.

In Windows® 95, the VxDs are 32-bit protected mode modules that support the device-independent VMM by managing the computer's hardware devices and supporting software. VxDs support all hardware devices in a typical computer system C, including the direct memory access (DMA) devices, IDE controllers, serial ports, parallel ports, keyboards, and video card adapters. A VxD is required for any hardware device that has programmable operating modes or retains data over any period of time. In short, if the state of a hardware device can be changed by switching between multiple virtual machines or applications, the device usually must have a corresponding VxD.

Windows® 95 allows the user to install custom VxDs to support add-on hardware devices. It is also permissible for a VxD to support software, but no corresponding hardware device.

Modem Software

Referring now to FIG. 5, a block diagram is shown depicting various software components of a controllerless modem implemented Windows® 95 operating system in a according to the present invention. The modem software is organized as software layers interposed between the application that wants to use the modem and the modem itself. Windows® 95 is upwards compatible with both Windows® 3.x and DOS. In a modem according to the disclosed embodiment, therefore, Windows® 95 32-bit applications 100, Windows® 3.x 16-bit applications 102, and Windows® 95 DOS applications 104 are all supported. All of these applications run in ring 3, and each interfaces with the modem module 114 in a slightly different manner.

For 32-bit applications 100, service requests are processed by VCOMM.386 108, the virtual communications driver. VCOMM.386 108 provides protected-mode support for high-speed data ports, as well as conventional RS-232 serial ports (COM ports). VCOMM.386 108 manages all accesses to communications devices, and can support up to 128 serial ports.

VCOMM.386 108 is a standard module implemented in the Windows® 95 operating system, and remains unchanged according to the invention. Its various interface protocols are well known to those of ordinary skill in the art.

In the case of Windows® 3.x 16-bit applications 102, a slightly different execution path is necessary because such applications are unable to use the Windows® 95 architecture. Communications software written for Windows® 3.x relies on being able to use the Win16 Comm API (not shown) to request services, and also expects to interface with the communications driver COMM.DRV 106, another standard module in Windows® 95. COMM.DRV 106 provides a set of exported functions that an application calls to implement the Windows® communications API. In Windows® 95, COMM.DRV 106 is not tied to any specific communications hardware, and is not replaced as was done in previous versions of Windows®. COMM.DRV 106 accesses communications resources by communicating directly with VCOMM.386 108 as if it were a physical port.

For Windows® 3.x applications 102 and 32-bit applications 100, VCOMM.386 108 interfaces with CPQFMW95.VXD 112. CPQFMW95.VXD 112 is a virtual port driver that can call VCOMM.386 108 services directly, or can be used by VCOMM.386 to access communication ports. In Windows® 95, VCOMM.386 requires a virtual port device driver to communicate with the physical hardware. CPQFMW95.VXD 112 provides this virtual device driver. Instead of directly communicating with the UART, however, as described below CPQFMW95.VXD 112 instead communicates with a modem module 114 via a virtual UART represented by a darkened line. In the preferred embodiment, the virtual UART is contained within the modem module 114. In prior art systems, UART chips are the hardware portion of the computer system's COM port that actually communicate between the CPU system 10 and any device attached to the COM port. As mentioned, a UART typically serializes and transmits parallel data, inserting start, parity, and stop bits, and receives serial data that it converts to parallel data. A physical UART provides a variety of other options, including clock controls and configurable registers. Required UART functions are implemented in software in a modem according to the preferred embodiment. Details of the interface between CPQFMW95.VXD and modem module 114 are provided below in conjunction with FIG. 7, and its source code, written in assembly language, is provided in Appendix A.

The modem module 114 also contains the modem code that is typically programmed into a physical microcontroller. For reasons of compatibility with Windows® 3.x, the modem module 114 is separated into two parts, CPQFM19A.386 114*a* and CPQFM19B.386 114*b*, but could be unified in the Windows® 95 implementation. As mentioned above, the modem module 114 is not operating system dependent. A Data Terminal Equipment(DTE) portion of modem module 114 emulates a device located at the end of a transmission line which provides or receives data (i.e. computer, telephone, fax, etc.). Further, a Data Communication Equipment (DCE) portion of modem module 114 emulates a device for transmitting data, generally a modem. In the preferred embodiment, the serial data exchange interface between the DTE and DCE portions of module 114 follows the RS-232C standard of the EIA (Electronic Industries Association).

Referring briefly to Windows® 95 DOS applications 104, data again follows a different path to the modem module 114. Data first travels to CPQFMDB.VXD 110, which is a port virtualization VxD that simulates communications hardware for applications running in a Windows® 95 DOS interface, or "DOS box." This source code is found in Appendix B. After registering with VCOMM.386, CPQFM-DB.VXD 110 is allowed to redirect data to the virtual port driver CPQFMW95.VXD 112. The interface between CPQFMDB.VXD 110 and CPQFMW95.VXD 112 is shown in more detail in FIG. 7.

The modem module 114 communicates to hardware (particularly the DSP 58) on the modem card 30 through PCMCIA interface 26 and a PCMCIA slot connector 28. For data transmissions, information sent to the DSP 58 by the modem module 114 includes carrier start and stop commands and the data to be sent. Modem AT commands known to those skilled in the art are used by the modem module to decide how to send data to the DSP 58. After receiving the data, the DSP 58 generates the carrier signal and modulates data across the telephone line.

The software for implementing the modem module 114 is in general the same as the software used to program the microcontroller 40 in prior art systems. It could be written in a high level code, such as C, allowing portability between a variety of processors. Further, if the modem module 114 was originally written in C for the microcontroller 40, it can simply be recompiled for use as the modem module 114 according to the invention.

Code for the microcontroller 40 is generally well known to the art. It is available from a number of sources, such as R. Scott & Associates. It is generally written in a high level language, so it can be used with a variety of microcontrollers 40. Referring to the microcontroller 40 of FIG. 2, however, it must be understood that code used in the microcontroller 40 typically expects to communicate with a UART 46 as well as with a DSP 58. According to the invention, the UART 46 is instead implemented as "virtual" code, included in Appendix C. Therefore, a "glue" interface is necessary for the microcontroller 40, so that rather than communicating with a hardware UART 46, it instead communicates with software routines to virtualize the UART 46 as well as the UART normally present within the computer system itself. These "glue" routines are also found in Appendix C. These routines are also used to communicate over the PCMCIA interface with the PCMCIA modem card 30.

Hardware interrupts generated by the DSP 58 are communicated to the virtual port driver CPQFMW95.VXD 112 via an interrupt handler VPICD.386 116. The VPICD.386 116 is a standard Microsoft VxD that is installed as soon as the system is booted. Port drivers must install such interrupt handlers if they are to perform input and output operations using queues.

A block diagram depicting various software components of a Windows) 3.1 modem implemented according to the present invention is shown in FIG. 6. The modem software is organized as software layers interposed between the Windows® 3.1 and Windows® 3.1 DOS applications 102 and 104 and the installed modem card 30.

In DOS applications 104, reads and writes are trapped by the CPU system 10 in a port dependent manner and fault into CPQFMVCD.386 122. The CPQFMVCD.386 122 is a lower level virtual communications driver (VxD) which handles both DOS and Windows® 3.1 applications. The CPQFMVCD.386 122 performs some of the same function as the port virtualization VxD CPQFMDB.VXD 110 (FIG. 5), but Windows® 3.1 typically further includes the software for actually communicating with the physical port. Windows® 95, as shown in FIG. 5, instead separates the virtual interfaces provided by VCOMM.386 108 and CPQFMDB-.VDX 110 from the actual physical interface provided by CPQFMW95.VXD 112 together with the modem software 114. Therefore, CPQFMVCD.386 is preferably modified to allow the datastream to be directed to a prior art modem or other serial port device. For DOS applications 104 that do not use the controllerless modem 30, CPQFMVCD.386 122 acquires the datastream and buffers it through use of COM-BUFF.386 124 (a standard Microsoft VxD).

For applications that require the controllerless modem 30, the data is buffered through CPQFMW31.386 126, which actually implements portions of the COMBUFF.386 124 code CPQFMW31.386 126 is included as Appendix D. The data is then provided to the modem module 114, and is subsequently sent to the modem hardware. All serial port data passes through the CPQFMVCD.386 122, which has routine calls that enable it to communicate with CPQFMW31.386 126 registers. In the disclosed embodiment, CPQFMVCD.386 122 is a Microsoft VxD that has been modified slightly to recognize CPQFMW31.386 126. Communication between CPQFMVCD.386 122 and CPQFMW31.386 126 is illustrated more fully by FIGS. 8A and 8B.

The modem module 114, however, is identical in both the Windows® 3.1 implementation of FIG. 6 and the Windows® 95 implementation of FIG. 5. That is, only the virtual device driver which communicates with a virtual UART within the modem module 114 changes. In Windows® 95, CPQFMW95.VXD 112 (Appendix A) is used to communicate with the virtual UART code of the modem module 114. In the Windows® 3.1 version, the module CPQFMW31.386 126 assumes this role.

For Windows® 3.1 applications 102, communications are handled by a Windows® protected-mode API SSComm.drv 120. SSComm.drv 120 passes data to CPQFMVCD.386 122 through use of software hooks. Data then follows the same path as that as that used for DOS applications.

CPQFMCFG.EXE 130 is a hidden Windows® application that is started along with Windows® 3.1. CPQFMCFG.EXE 130 registers with Card Services 132, which is a high level interface to Socket Services (a manufacturer dependent method of talking to PCMCIA cards). When a PCMCIA card 30 is inserted, Card Services 132 checks to see if the card is a controllerless modem card 30 according to the present invention. If so, a call is made to CPQFMW31.386 126 to let it know that a conforming card has been installed. CPQFMW31.386 126 then instructs CPQFMVCD.386 122 to direct subsequent modem data to the modem module 114. QUEUES 134 is used to buffer data communicated between SSComm.drv 120 and CPQFMW31.386 126.

Again, a virtualized UART is represented by the darkened line between CPQFMW31.386 126 and modem module 114. The VPICD.386 116, modem module 114, and other system components perform essentially the same functions as those discussed in conjunction with FIG. 5.

Figure 7:
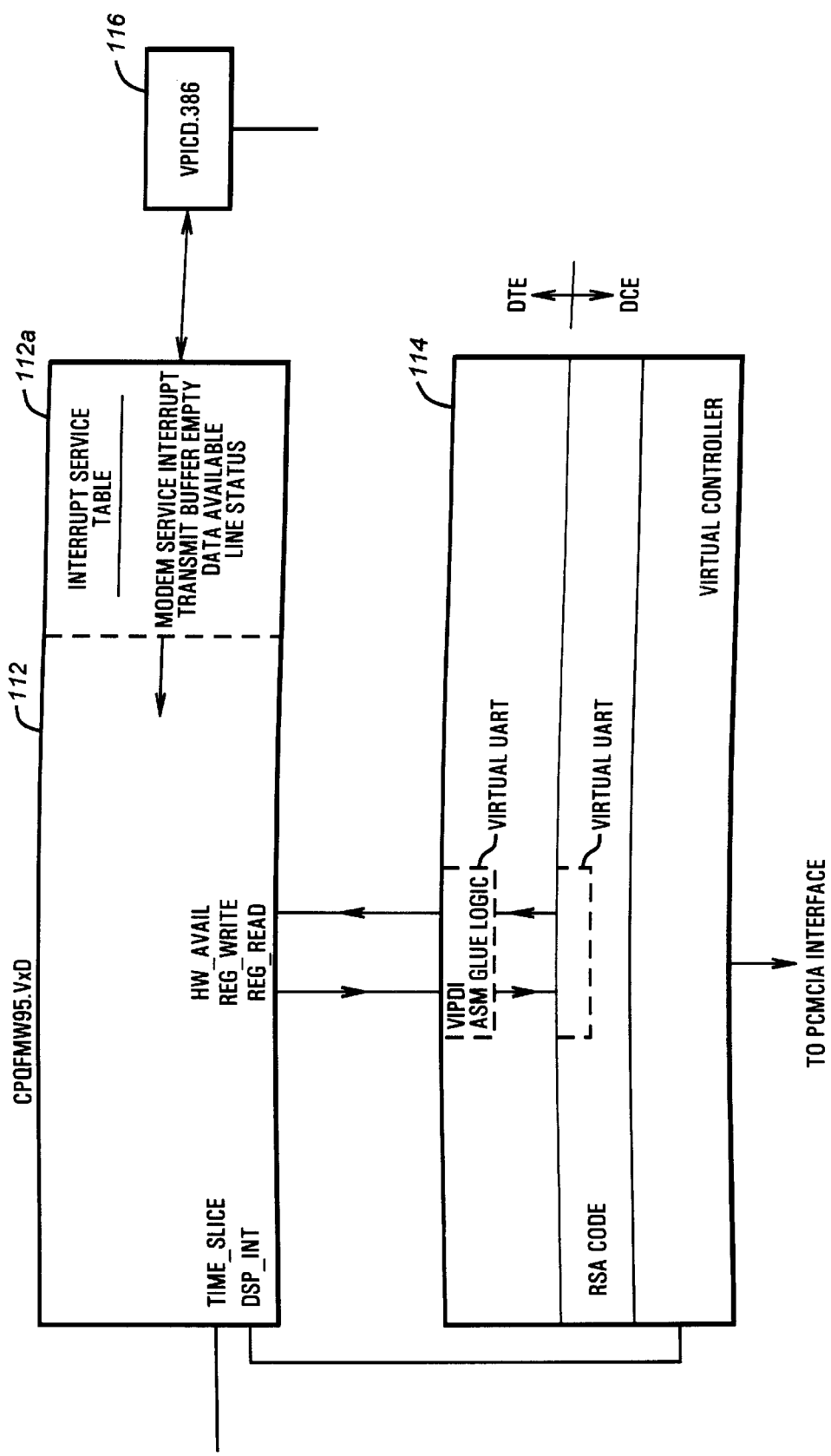
FIG. 7 is a block diagram showing the CPQFMW95.VXD and modem module interface in greater detail.

Referring now to FIG. 7, the CPQFMW95.VXD 112 and modem module 114 interface is shown in greater detail. As mentioned above, the interrupt handler VPICD.386 116 communicates hardware interrupts from the DSP 58 to the CPQFMW95.VXD 112. Further, "virtual" interrupts from the virtual UARTs are ultimately passed through the interrupt handler VPICD.386 116. Illustrated is the case of receive data becoming present in the receive data register of the virtual UART in the modem module 114 coupled to the CPQFMW95.VXD. In that case, an "interrupt" causes a serial interrupt service routine in the CPQFMW95.VXD 112 to examine the interrupt source, found in another register of the same virtual UART of the modem module 114. Based on that source, the interrupt routine jumps, based on an interrupt service jump table 112a to a data available routine. That routine must read data from the virtual UART in the modem module 114.

One must appreciate how standard UART service drivers would read this data from a physical UART. Typically, a x86 assembly language "IN" operation would be performed from the appropriate input/output location. This could be done at ring zero, at which the code of FIG. 7 operates, but in this case, the UART to be read from is a virtual UART. Therefore, instead of performing an "IN" operation, the source code of CPQFMW95.VXD 112 replaces each "IN" instruction with a macro. This macro causes in-line code to be compiled that, instead of performing an "IN" operation, calls the appropriate routine in the virtual UART coupled to CPQFMW95.VXD 112. For write operations to the UART, the corresponding "OUT" input/output operation is replaced with a similar macro.

In this way, standard physical UART virtual device driver code can be used for CPQFMW95.VXD 112, with the "IN" and "OUT" input/output instructions replaced with corresponding macros. Further details of the software interaction of FIG. 7 are found in the flowcharts of FIGS. 9A through 15.

But further, the modem module 114 can remain virtually unchanged between operating systems. It simply presents the "virtual" UART interface to a operating system device driver, with the device driver being slightly modified to call that interface rather than doing a physical input or output. But because of the virtualized interface, the device driver need not be otherwise changed—if it can talk to a UART, it can talk to the virtualized UART.

The interface of the modem controller 114 to the PCMCIA card 30 is done through a standard PCMCIA interface. This portion of the modem module 114 is also preferably isolated from the remainder of the modem module 114, so that changes in the hardware interface can be localized. This interface source code is found in Appendix E.

The modem module 114 is also preferably isolated from the actual system interrupts, specifically interrupts from the DSP 58 on the PCMCIA card 30 itself, by the VPICD.386 116. In this way, the modem module 114 is not dependant on the hardware configuration of the interrupt sources. Further, the modem module 114 is preferably called every 10 ms so that it can perform whatever data processing is necessary to maintain communications with the DSP 58.

Figure 8A:
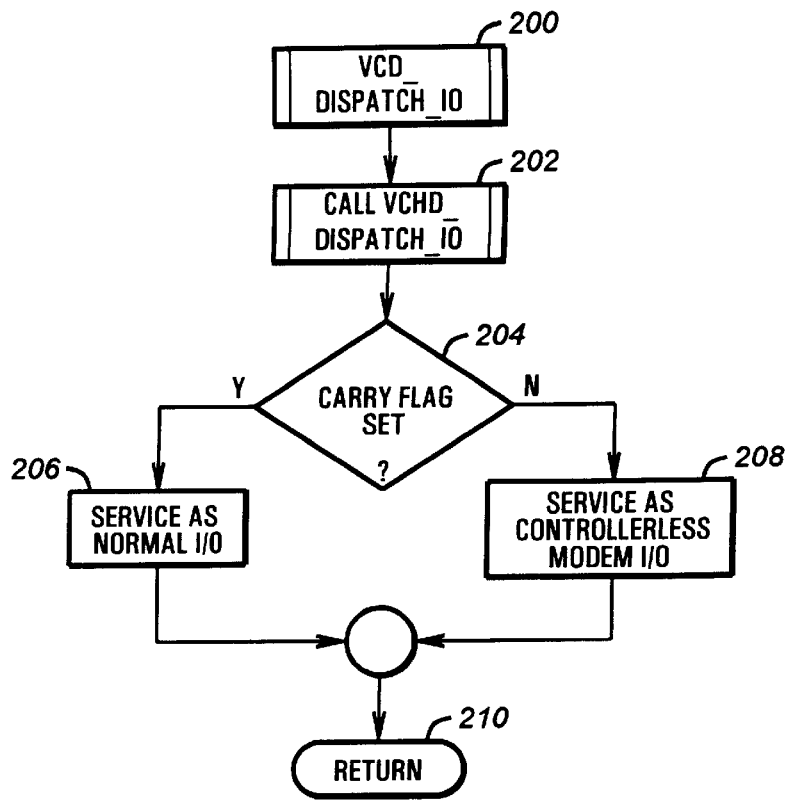
FIGS. 8A and 8B are flowchart diagrams of the routines used by CPQFMVCD.386 to determine if a modem according to the present invention is installed in the computer system.
Figure 8B:
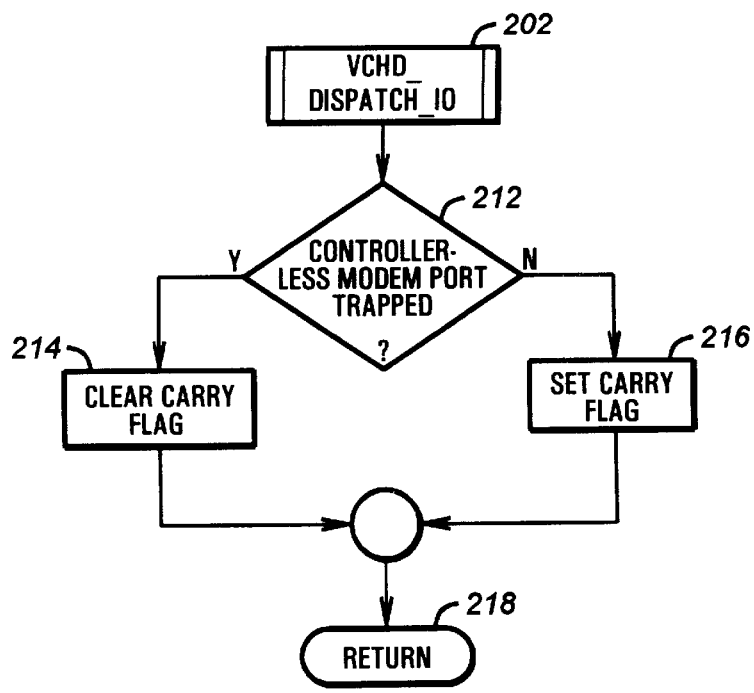

FIGS. 8A and 8B illustrate the routines used by CPQFMVCD.386 122 to determine if a modem according to the present invention is installed in the computer system. Referring first to FIG. 8A, control commences with a routine VCD_DISPATCH_IO 200 following a trapped I/O. This routine is contained within the CPQFMVCD.386 122 software. Control next proceeds to step 202 and a call is made to VCHD_DISPATCH_IO, which is contained within the CPQFMW31.386 126 module. This routine (FIG. 8B) first determines if a controllerless modem port has been trapped. If so, control proceeds step 214 and the carry flag is cleared. Otherwise, control proceeds to step 216 and the carry flag is cleared. In either case, control next proceeds to step 218 and a return is made to VCD_DISPATCH_IO 200.

Following this return, control proceeds to step 204 where the status of the carry flag is examined. If the carry flag is set, control passes to step 206 and the I/O call is service in a traditional manner. If the carry flag was not set by VCHD_DISPATCH_IO 200, the data call is serviced as a controllerless modem I/O. Following either of steps 206 or 208, control next proceeds to step 210 for a return.

It is contemplated that the arrangement of software modules could be used to support modems operating over conventional RS-232 COM ports or ISDN lines, as well as next-generation parallel port modems.

It can now be appreciated that a modem implemented according to the disclosed embodiment includes various microcontroller and UART functions are implemented in a virtualized modem module. This software implementation results in substantial monetary savings and increased data rates. Further, the microcontroller and the UART functions are preferably implemented as a module independent from other operating system software, so that the virtualized versions of the microcontroller and the UART can be easily ported to other operating systems.

The Modularity of the Controllerless Modem

Referring again to FIGS. 5, 6, and 7, one appreciates the distribution of the controllerless modem functionality according to the invention. The CPQFMW31.386 126 module and the CPQFMW95.VXD 112 module in FIGS. 5 and 6 are different manifestations of a virtual device driver, the former compatible with the Windows® 3.1 operating system and the other compatible with the Windows® 95 operating system, respectively. The interfaces that these device drivers must present to their associated operating systems are different, but in general they are written to form a software layer between the various system components that must access a UART and the UART itself. To that end, these virtual device drivers, when called by other system software, typically access a physical UART through a series of input/output operations directed to that UART's I/O ports. The writing of device drivers for various operating systems is well known, but once standard device drivers have been written for a new operating system, it is desirable to leave that code unchanged.

But in the controllerless modem according to the invention, the physical UART is of course not present. For each operating system, extensive device drivers for such UARTs, however, do exist. According to the invention, rather than discard this extensive amount of code, or greatly modify it to integrate it into the modem module 114 itself, the interface between the modem module 114 and the virtual device driver is in the form of a "virtual" UART. In this way, one can use standard virtual device drivers with only minor modifications to communicate with the new system implemented modem module 114. Because the modem module 114 includes a "virtual UART," the only real modification necessary to these virtual device drivers is that they replace their input and output operating with corresponding "virtual" operations in the form of calls to the "virtual UART" rather than actual input/output operations to a physical UART itself.

Thus, for changes in operating systems, one only has to slightly revise the appropriate virtual device driver corresponding to the CPQFMW95.VXD 112 module or the CPQFMW31.386 126 module. If the modem hardware 30 remains unchanged, however, the same modem module 114 can be used with little modification. Conversely, if the modem hardware, such as the DSP 58, is changed, then different code for the "virtual" microcontroller in the modem module 114 can be used to access that new DSP.

Using this modular software approach, porting to new operating systems becomes rather simple. Standard modem or UART software for that new operating system can be used—software which should be readily available—and the virtual modem controller in the form of the modem module 114 is simply ported to the new operating system, even being recompiled to a different CPU system 10 if necessary presenting a "virtual UART" interface to the virtual device driver.

UART Basics

In IBM PC compatible computers, UARTs present a standard series of ports at input/output addresses starting at a base port. These input/output addresses are typically accessed using input and output instructions in the x86 instruction set. Specifically, a typical instruction used to input from one of these ports is "IN AL, DX", which inputs into the AL register the data located at the I/O address specified by the DX register. Similarly, data in the AL register is output to the port specified in the DX register by execution of an "OUT DX, AL" instruction.

The standard UART used in the IBM PC is the 8250, or one of its compatible successors, the 16450 or 16550. The standard ports in such UARTs are:

| Register | Offset | DLAB |
|---|---|---|
| Receiver Buffer Register (DAT) | 00h | 0 |
| Transmitter Hold Register (DAT) | 00h | 0 |
| Interrupt Enable Register (IER) | 01h | — |
| Interrupt Identification Register (IIR) | 02h | — |
| Data Format Register (Line Control Register) (LCR) | 03h | — |
| Modem Control Register (MCR) | 04h | — |
| Serialization Status Register (Line Status Register) (LSR) | 05h | — |
| Modem Status Register (MSR) | 06h | — |
| Scratchpad Register (SCR) | 07h | — |
| Divisor Latch Register, Low Byte (DLL) | 00h | 1 |
| Divisor Latch Register, High Byte (DLH) | 01h | 1 |
| DLAB = Divisor Latch Access Bit (Found in LCR) | | |

Data written to or read from each of these registers has a standard meaning, which is well known to the art. For example, a write to the transmitter hold register DAT will place a data byte in the transmitter hold register for later transmission over the serial line. As another example, the line status register LSR provides data bits such as a transmit hold register empty bit THRE, a transmit shift register empty bit TSRE, a break detection bit BRKI, a framing error bit FRMR, a parity error bit PARE, an overrun error bit ORRE, and receive data available bit RDRI.

A standard device driver similar to the CPQFMW31.386 126 module and the CPQFMW95.VXD 112 module would typically directly access these hardware registers at these I/O ports using input/output instructions. According to the invention, virtually the sole change to these virtual device drivers is that each "IN AL, DX" and "OUT DX,AL" instruction is replaced with a corresponding macro instruction "INALDX" and "OUTDXAL." These macros, when compiled, create a call to glue logic which simulates the register accesses to a 16450 UART. This logic is found in the SIM 450.C routine located in Appendix C, and is further described in detail below in conjunction with FIGS. 12A through 15. This glue logic accepts the identical parameters of the standard input and output instructions to a standard, physical UART and returns corresponding identical data. Therefore, a standard device driver that would normally access a hardware UART can be used, but instead through the SIM450.C virtual UART interface of the modem module 114.

Before turning to the operation of this virtual UART interface, a few other minor adaptations to the virtual device software modules 112 and 126 and the modem module 114 should be recognized. First, when the modem module 114 was previously implemented in its own dedicated microcontroller 40 of FIG. 2, it could essentially run continuously because the microcontroller 40 would have no have other functions. Because the modem module 114 is now implemented for execution by a CPU system that has other duties, however, the modem module 114 must instead relinquish control after it has carried out its necessary functions. This essentially requires little, other than to ensure that rather than going to a holding loop, the modem module 114 returns to the operating system.

Just as the modem module 114 must periodically return to the operating system, it must also periodically be called by the operating system to execute its desired functions. This is generally done through timer software within the operating system itself. That is, a standard timer device is requested to call the modem module 114 periodically so that it may carry out its desired functions. This is accomplished in two ways. First, the modem module 114 is periodically called by the timer. Second, because the DSP 58 will periodically request servicing by the modem module 114, it provides an interrupt to the VPICD.386 116 module, which in turn will cause both the modem module 114 and the virtual device module 112 or 126 to be serviced.

Modification to Standard UART Virtual Devices

Figure 9A:
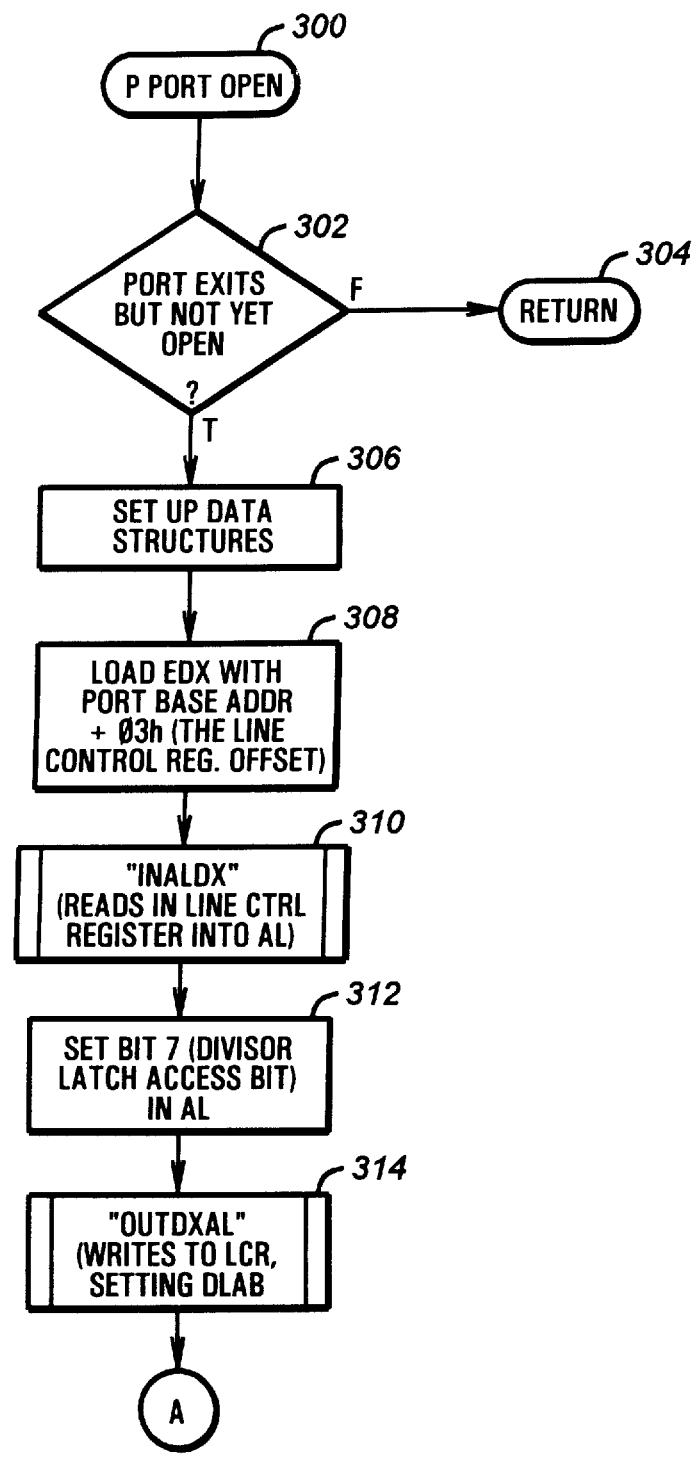
FIGS. 9A and 9B are a flowchart illustration of a PPOR-TOPEN routine that performs the "virtualized" input and output operations to a virtual UART according to the invention.
Figure 9B:
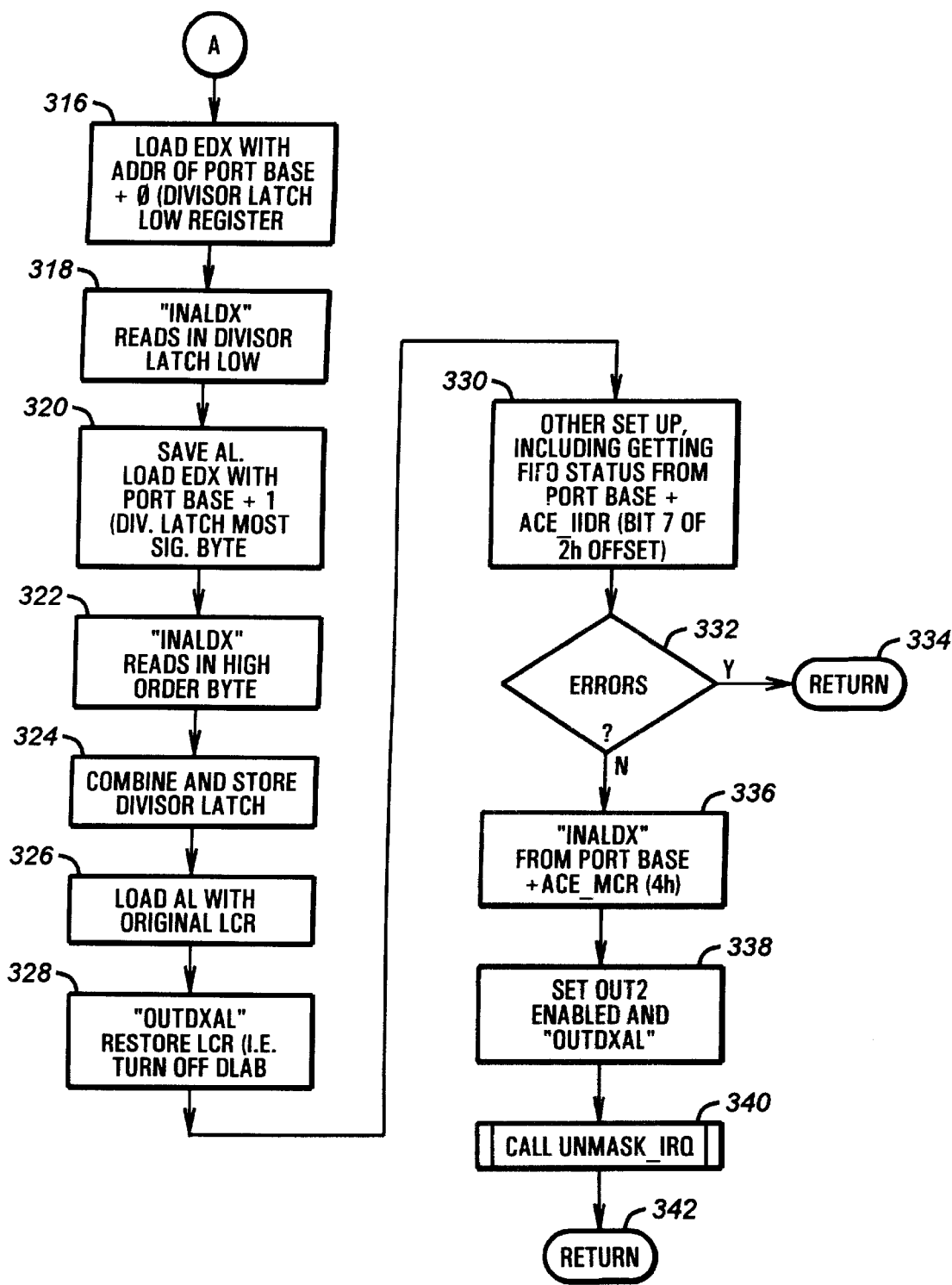

Turning to FIGS. 9A and 9B, these figures present an illustrative flowchart of how standard routines within the CPQFMW95.VXD 112 module go about accessing the modem module 114. A PPORTOPEN routine 300 is presented for illustration. This routine 300 would generally be called by other routines within the operating system software, such as the VCOMM.386 108 module and the CPQFMDB.VXD 110 module. Of course, numerous other routines exist within the CPQFMW95.VXD 112 module which are called by other routines in the operating system. These various modules access the UART to both send and receive data to and from a serial device and to control the UART. But this illustrative routine 300 is shown to illustrate how these physical calls are easily replaced with virtual calls.

Beginning at step 302, the routine 300 determines whether a port exists but has not yet been opened. If untrue, control proceeds to step 304, where the routine returns either because the port does not exist or because it is already opened. Otherwise, control proceeds from step 302 to step 306, where the data structures for the port are established. Then proceeding to step 308, the EDX register is loaded with the port base address of the serial port desired to be opened plus an offset of 03h. This offset corresponds to the line control register LCR port offset for a standard 8250, 16450, or 16550 UART. Thus, the EDX register now has the appropriate port address for an input from the LCR port.

Proceeding to step 310, an "INALDX" routine 350 is executed. As is discussed below in conjunction with FIG. 10, this routine 350 is actually preferably a macro that forms expanded in-line code to call the appropriate glue logic in the virtual UART interface, which in turn calls the modem module 114. In step 310, the "INALDX" macro performs the precisely same function as if the line control register LCR of a physical UART had been read from using an "IN AL,DX" instruction of an x86 processor. More specifically, the AL register now contains the data input from the "virtual" line control register LCR. Proceeding to step 312, the high order bit of the AL register is set, which corresponds to the divisor latch access bit DLAB of the line control register LCR, and then proceeding to step 314, a corresponding "OUTDXAL" macro is executed, which sets the DLAB within the line control register LCR of the "virtual" UART according to the invention. Control then proceeds to step 316, where the EDX register is loaded with the base port address plus 00h, which corresponds to the divisor latch low byte register DLL. At step 318, the INALDX macro is executed, reading in the divisor latch low order byte DLL from the virtual UART. At step 320, the AL register is saved, and the EDX register is loaded with the base port address plus 01h, which corresponds to the divisor latch high byte DLH. Proceeding to step 322, this byte is read in using the INALDX macro. Then proceeding to step 324, the low and high order bytes of the divisor latch are combined and stored. At step 326, AL is loaded with the original line control register LCR input value. Then proceeding to step 328, the OUTDXAL macro is executed, restoring the line control register LCR to its original value—i.e., the DLAB is disabled if originally disabled. Then proceeding to step 330, other setup is executed.

The point of this sequence of instructions is that the virtual UART located within the modem module 114 is accessed identically as though it were a real UART. The preceding sequence has been executed to set the divisor latch to an appropriate value, which effectively sets the baud rate. It must be appreciated that there is effectively no "baud rate" in the virtual UART because data is virtually instantaneously transferred between the modem module 114 and whatever device driver is calling that software through the virtual UART. But standard UART device drivers expect to be able to set and access the baud rate, so the virtual UART provides access to virtual divisor latch bytes, even if they really do not do anything. In this way, existing hardware UART device drivers are easily modified for use with the virtual UART of the modem module 114.

To complete the routine, control then proceeds to step 332, where if errors are detected, control proceeds to step 334 where the routine returns. If there were no errors, control instead proceeds from 332 to step 336, where the port base address plus the appropriate offset for the modem control register MCR is input. Then the OUTZ bit of that data is enabled and is output using the OUTDXAL macro at step 338. Control then proceeds to step 340, where a call is made to unmask the interrupt request line IRQ. As discussed below, the virtual UART also causes "virtual" interrupts to invoke an appropriate operating system interrupt service routine. Proceeding from step 340, control then returns at step 342.

Figure 10:
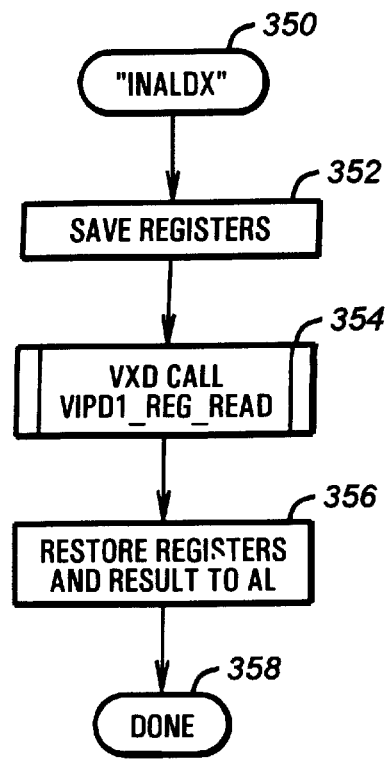
FIG. 10 is a flowchart illustration of macro in-line code to be generated for "virtual" input and output operations.
Figure 10:
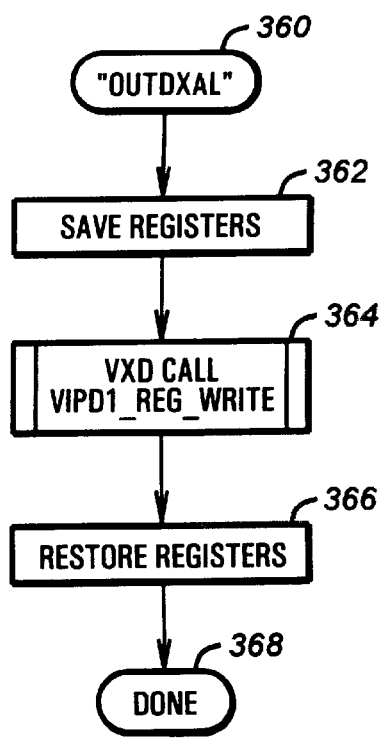

Turning to FIG. 10, the two macro routines INALDX 350 and OUTDXAL 360 are shown. The INALDX routine 350 substitutes for the standard IN AL,DX instruction on the x86 series of microprocessors, while the OUTDXAL routine 360 correspondingly substitutes for the OUT DX,AL instruction. These are not callable routines, but are instead macros, which are assembled in-line in the CPQFMW95.VXD 112 module, the CPQFMDB.VXD 110 module, and the corresponding routines in FIG. 6. The INALDX routine 350 and the OUTDXAL routine 360 in effect substitute a call to glue logic for the standard input/output instructions.

The INALDX routine 350 begins at step 352, where it saves any registers that will be changed. Proceeding to step 354, a virtual device driver call is made to a glue routine VIPD1_REG_READ. This routine, further discussed below in conjunction with FIG. 11, strips the physical address off of the DX register, leaving an offset, and then calls the virtual UART routines discussed below in conjunction with FIGS. 12A–15.

Proceeding to step 356, the registers are restored and the result of the call at step 354 is stored in the AL register. Then, at step 358, the in-line macro is done so other code continues to execute.

The OUTDXAL routine 360 works in a similar way, beginning at step 362, where it stores the registers. Control then proceeds to step 364, where a glue logic routine (see FIG. 11) is called, specifically VIPD1_REG_WRITE. Control next proceeds to step 366, where the register is restored, with the routine completing at step 368.

It will be appreciated that if the INALDX routine 350 and the OUTDXAL routine 360 were simply replaced with the appropriate I/O operation, then the various device drivers would operate normally in conjunction with a hardware UART with virtually no changes.

Figure 11:
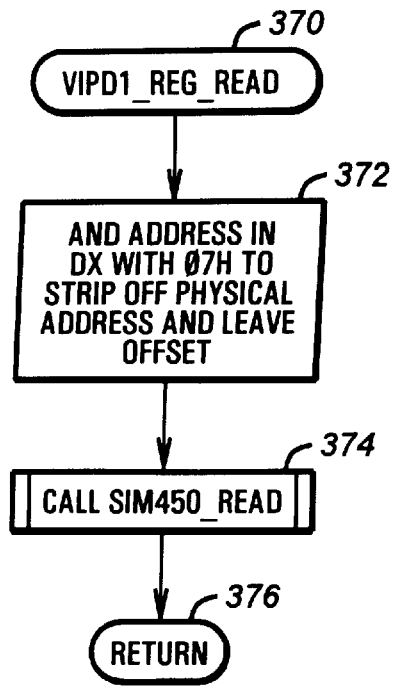
FIG. 11 is a flowchart illustration of code called by the macros of FIG. 10.
Figure 11:
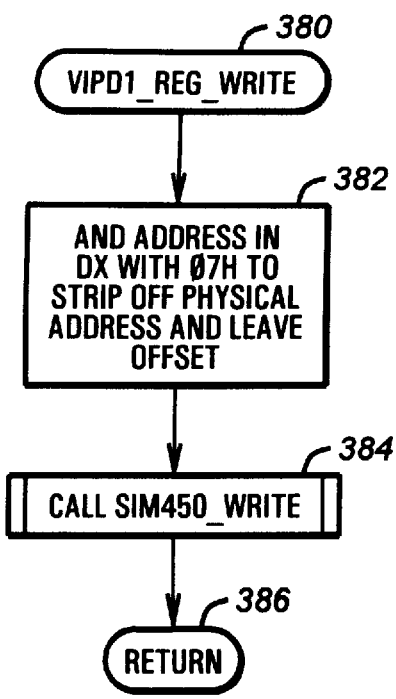

Turning to FIG. 11, shown are the VIPD1_REG_READ routine 370 and the VIPD1_REG_WRITE routine 380. These routines, called at steps 354 and 364 of FIG. 10, are in effect glue logic for bridging between the virtual UART of the modem module 114 and the remainder of the operating system. The VIPD1_REG_READ routine 370 begins at step 372, where it performs a binary AND operation of the address in the DX register with 07h, stripping off the physical address and leaving an offset to the appropriate port of a standard UART.

Proceeding to step 374, the VIPD1_REG_READ routine 370 calls a routine SIM450_READ 400. The SIM450_READ routine 400 of the virtual UART simulates a read from a port of a 16450 UART. This routine 400 performs a "read" from the appropriate "port" of the virtual UART. Proceeding to step 376, the VIPD1_REG_READ routine 370 returns to the macro in-line code of the INALDX routine 350 FIG. 10) that called it.

The VIPD1_REG_WRITE routine 380 operates in a similar manner. Beginning at step 382, the address is stripped off the DX register by a binary AND operation with 07h. Then, proceeding to step 384, a SIM450_WRITE routine 500 is called, which performs a "write" to the virtual UART's "ports." Then proceeding to step 386, the VIPD1_REG_WRITE routine 380 returns to the OUTDXAL routine 360 in-line code (FIG. 10) that called it.

The VIPD1_REG_READ routine 370 and VIPD1_REG_WRITE routine 380 are found in the source code of Appendix C. The INALDX routine 350 and the OUTDXAL routine 360 are found as a macro in, for example, the source code of Appendix A. All of these flowcharts are illustrative, and further details can be found within the source code appendices.

The Virtual UART Read and Write Routines

Figure 12A:
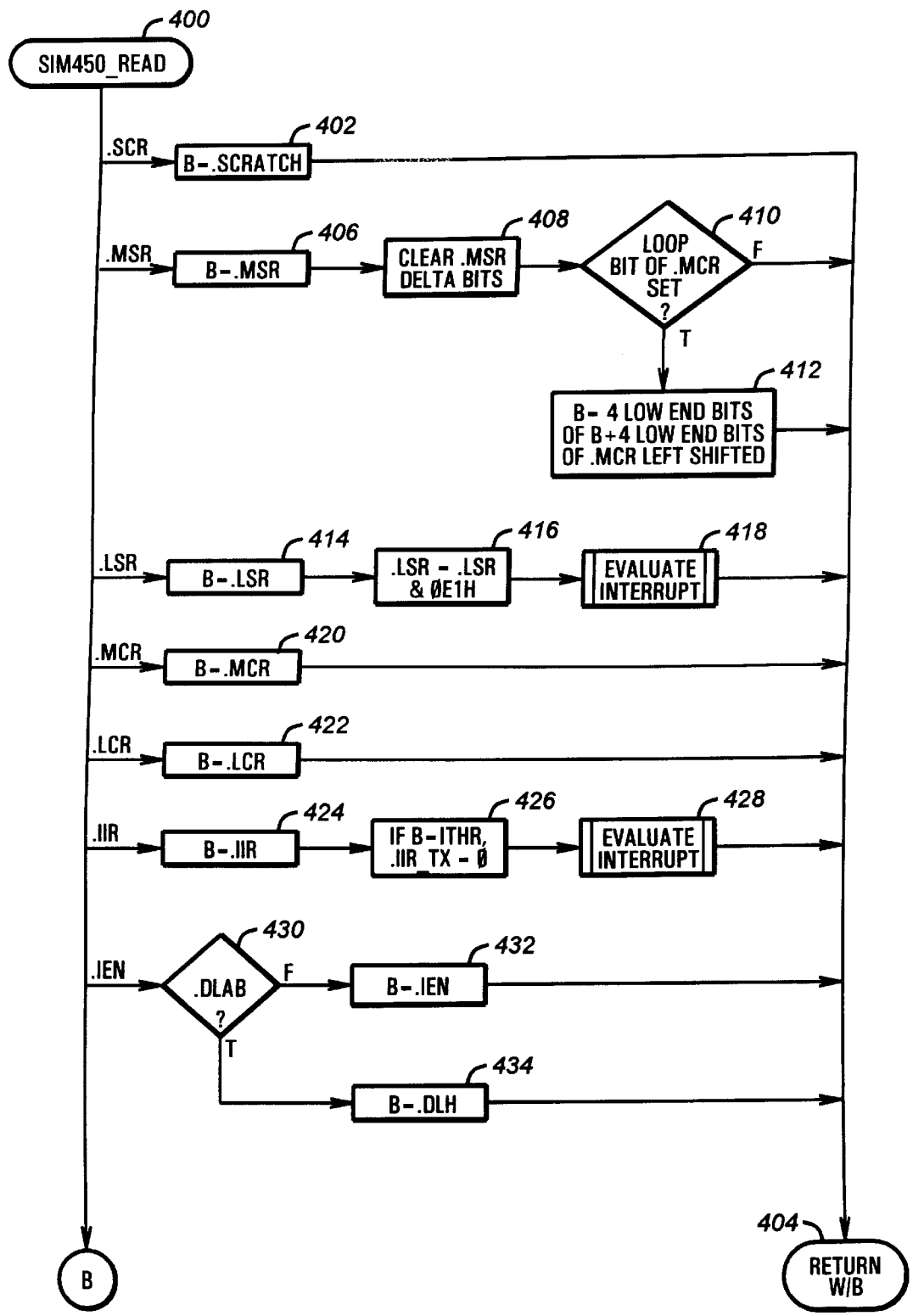
FIGS. 12A and 12B are a flowchart illustration of a SIM450_READ routine to be executed on calls to the virtual UART.
Figure 12B:
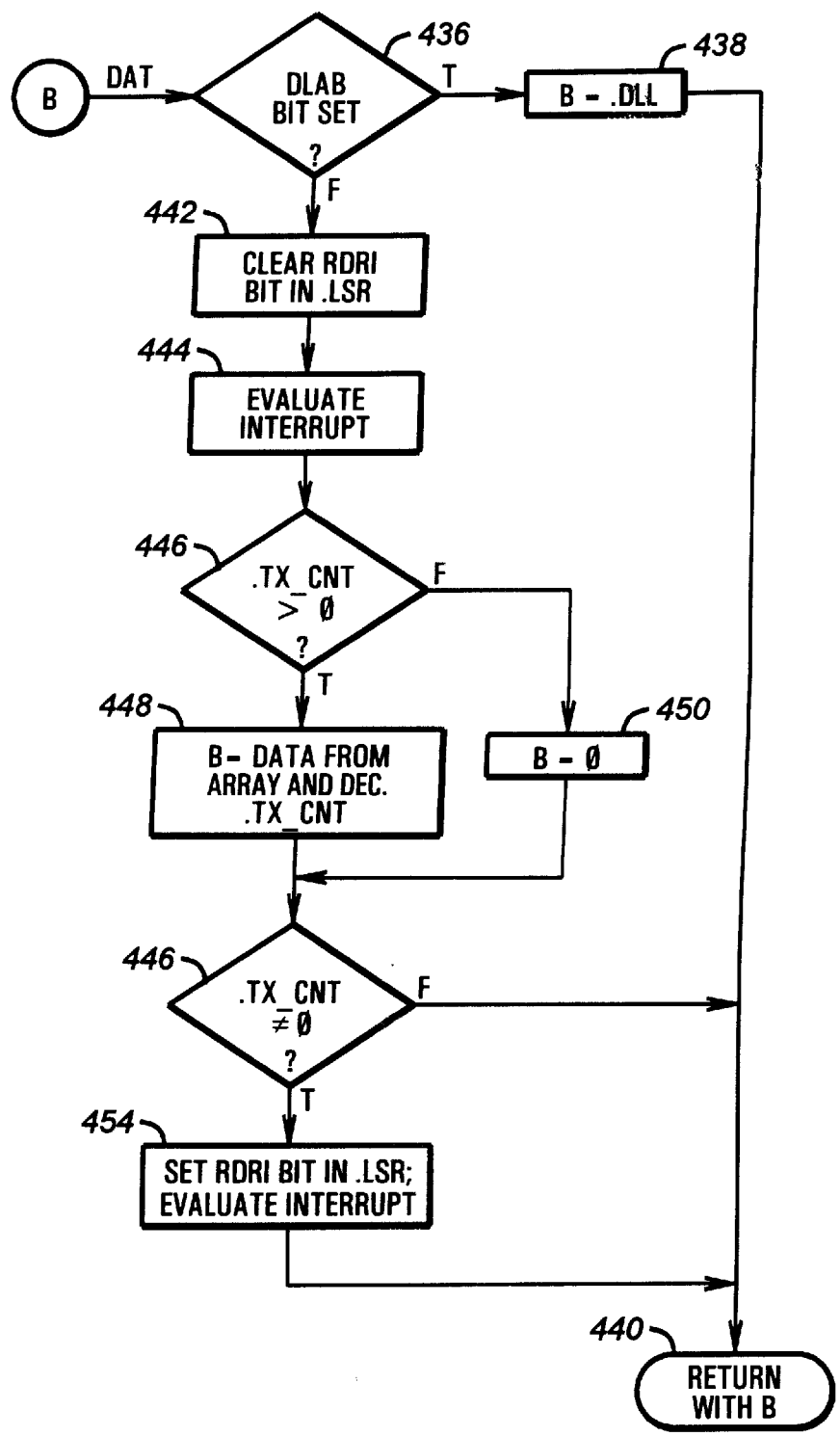

Turning to FIGS. 12A and 12B, shown is the SIM450_READ routine 400, called at step 374 of the VIPD1_REG_READ routine 370 (FIG. 11). Before turning to the details of the SIM450_READ routine 400, a few notational conventions. Data local to the SIM450_READ routine 400 is generally stored in a structure, which can be found within the source code of that routine, located in the SIM450.C and SIM450.H modules attached as source code listings attached as Appendix C. The primary data structure is the SIM450_DATA structure, in which variables are stored in a structure using conventional C-programming notation. For example, the contents of the "virtual" scratchpad register are found in the SIM450_DATA.SCRATCH variable. Rather than list "SIM450_DATA" as the preface to each reference to that data structure, a shorthand notation is used so the SIM450_DATA.SCRATCH variable becomes simply the .SCRATCH variable.

Further, for clarity, certain details have been omitted from the flowchart of the SIM450_READ routine 400. Specifically, the SIM450_READ routine 400 communicates with the modem module 114 through a series of calls that are implemented within the modem module 114 itself. The modem module 114 includes a number of "hooks" which allow it to communicate in a variety of ways with different types of software interfaces. In this way, referring back to FIG. 2, the modem module 114 can be implemented in the microcontroller 40 and communicate with a UART 46, or instead communicate with a variety of other types of devices through its glue routines. The "hooks" for the modem module 114 include a number of software calls that both set up a variety of control parameters and send and receive data. In general, the data is sent to and received from the data arrays maintained by the SIM450.C module itself.

Rather than discussing each of these routines in detail, a few of these routines will generally be discussed to describe how they interface with the SIM450.C module.

As would be appreciated by one skilled in the modem arts, the modem module 114 will typically include code for both communicating data received and transmitted over the phone line to and from the SIM450 code, but will also include control software that implements the standard Hayes "AT" command set. That is, when the modem module 114 is in a transmit and receive mode, actual data will be transmitted over and received from the telephone line. That mode is typically exited by a user entering three "+++" characters in a row, the standard "AT" escape sequence, which causes the modem module 114 to enter a control mode. In that mode, the modem module 114 responds to "AT" commands from the computer itself, but does not communicate data over the telecommunications link.

One type of communication mode implemented by the modem module 114 is a flow control mode, in which either software codes are used to start and stop the transmission of data to the modem module 114, or a hardware flow control model is used. In the latter case, the clear to send bit CTS and ready to send bit RTS are used to indicate whether data can be sent or received. This code is not illustrated in the flowcharts of the SIM450.C code, but is found within the SIM450.C code attached in Appendix C. One would readily appreciate how this code is incorporated.

The SIM450_READ routine 400 is executed as a series of case statements. The first case starts at step 402, to which control passes when the called value corresponds to the offset of the scratchpad register SCR. In standard UARTs, this corresponds to a port offset of 07h. If so, a temporary variable B is loaded with the contents of the .SCRATCH variable. Control then proceeds to step 404, where the routine returns with the contents of the B variable as a parameter.

So that the operation of the simulated UART can be better understood, briefly consider FIGS. 9A, 9B, 10, 11, and 12 in conjunction with a read of the scratchpad register. Suppose that the INALDX routine 350 is executed with the DX register containing the address of the desired port base plus the offset of 07h corresponding to the scratchpad register SCR. The INALDX routine 350 then calls the VIPD1_REG_READ routine 370 at step 354, which in turn strips off all but the offset of 07h and calls the SIM450_READ routine 400 at step 374. Then, the data in the .SCRATCH variable is loaded into the variable at step 402, which is returned at step 404. This data is then stored in the AL register in step 356 of the INALDX routine 350. Thus, the "virtual" scratchpad register SCR has been "read."

The remainder of the standard registers can be similarly read. The SIM450_READ routine 400 proceeds to step 406 when the offset corresponds to the modem status register MSR. In that case, at step 406, the B variable is loaded with the contents of the modem status register variable .MSR, which contains the contents of the virtual UART's MSR register. Proceeding to step 408, the delta bits of the .MSR variable are cleared. These bits are the lower four bits of the .MSR variable, which correspond to bits used in a standard UART to detect whether the data carrier detect (DCD), ring indicator (RI), data set ready (DSR), or clear to send (CTS) bits (all found in the four high order bits of the .MSR variable) have changed since the last time the .MSR variable has been read. It will be appreciated that this simulates the functioning of a standard UART.

Proceeding to step 410, the LOOP bit of a modem control register variable .MCR is tested. If this bit is true, then the virtual UART is in a loop back mode, a standard form of operation for a 16450 UART. If not set, control proceeds to step 404, where the SIM450_READ routine 400 returns with the contents of the .MSR variable. If the LOOP bit of the .MCR variable is true at step 410, control instead proceeds to step 412, where the four low order bits of the .MSR variable, contained in the B variable, and the four low order bits of the .MCR variable, left shifted, are stored in B. When the LOOP bit of the .MCR variable is set, this is the appropriate value to be returned on a read of the modem status register MSR in a standard UART, so that value is then returned at step 404.

Control proceeds from step 400 to step 414 on a read from the line status register LSR, the B variable is loaded with the contents of the line status register variable .LSR at step 414, and control proceeds to step 416, where the .LSR variable is loaded with the contents of the .LSR variable AND'd with 0E1h, masking appropriate bits to clear parity error, overrun error, and frame error bits. Control then proceeds to step 418 where an EVALUATE_INTERRUPT routine 600 is called (FIGS. 14A and 14B), and then the routine 400 returns at step 400.

The EVALUATE_INTERRUPT routine 418 evaluates whether a virtual "interrupt" should be executed. A virtual interrupt is initiated by a call to an interrupt service routine located within the various device drivers of FIGS. 5 and 6. There will of course be a standard interrupt service routine for use by a true hardware interrupt from a UART, and this same service routine is therefore called should a "virtual" interrupt be necessary. The EVALUATE_INTERRUPT routine 600 is called at appropriate times when it may be necessary to initiate such a virtual interrupt. For example, when the line status register LSR of a standard UART is read, if additional data is available and interrupts are enabled, an interrupt will be executed indicating that the additional data is in fact available. This is an instance when interrupts should at least be evaluated to determine if one should be executed, which the EVALUATE_INTERRUPT routine 600 does.

Control proceeds from step 400 to step 420 if the modem control register MCR is to be read. At step 420, the B variable is loaded with the contents of the modem control variable .MCR, and control returns at step 404. Similarly, control proceeds from step 400 to step 422 if the line control register LCR is to be read. At step 422, the B variable loaded with the contents of the line control variable .LCR. Control then returns the contents of B at step 404.

Step 424 is entered from step 420 if the interrupt identification register IIR is to be read. At step 424, the B variable is loaded with the contents of an interrupt identification variable .IIR. Control then proceeds to step 426, where if the B variable (now containing the contents of the .IIR variable) is compared to a constant ITHR, which corresponds to a pending interrupt caused by the transmit hold register being empty. If equal, then this interrupt should be cleared because a read from the interrupt identification register IIR should clear this type of interrupt. To do this, a pending transmit empty interrupt variable .IIR_TX is loaded with zero, which will clear this interrupt in the EVALUATE_INTERRUPT routine 600, which is then called at step 428. Control then returns at step 404.

Step 430 is entered from step 400 if the interrupt enable register IEN is to be read. At step 430, it is first determined whether the divisor latch access bit DLAB is set by examining a divisor latch access bit variable .DLAB, which represents the contents of the DLAB bit of the line control register LCR. If it is not set, then control proceeds to step 432, where the B variable is loaded with the contents of interrupt enable variable .IEN. This is because when the divisor latch access bit DLAB is not set, a read from the IEN register is to return the normal interrupt enable values of that register. Control then proceeds to step 404 where that value is returned.

If at step 430 the DLAB is set, control instead proceeds to step 434, where the B variable is loaded with the contents of a divisor latch high variable .DLH. This variable is used for baud rate determination, and in the disclosed embodiment, is strictly maintained so that the virtual UART appears the operating system to be a standard hardware UART. Again, this is because the "baud rate" of the virtual UART is effectively however fast the processor can run—the virtual UART is not artificially "slowed down" to the baud rate of a normal UART (although it could be). Control then proceeds to step 404 where the high byte of the divisor latch is returned.

Turning to FIG. 12B, the last option to be entertained from step 400 is a read from the DAT port, which indicates data should be read from the receive buffer of the virtual UART or from the divisor latch, depending on the setting of the DLAB. This aspect is handled at step 436, where it is determined whether the DLAB is set. If so, control proceeds to step 438, where the B variable is loaded with a divisor latch low variable .DLL. Because the divisor latch access bit is true, this is the appropriate action. Control then proceeds to step 440, where the SIM450_READ routine 400 returns with the value loaded in the B variable.

From step 436, if the DLAB is not set, control instead proceeds to step 442, which is the beginning of a sequence in which receive data, if available, will be read from the virtual UART as implemented in the SIM450.C code. At step 442, a receive data ready bit RDRI is cleared in line status register variable .LSR. This is done because the data will be read from the receiver buffer in the following steps. If there is more receive data available, the RDRI register will be subsequently set, but this read initially clears that RDRI bit. Proceeding to step 444, the EVALUATE_INTERRUPT routine 600 is called to determine whether an interrupt should be initiated to the operating system. An interrupt would occur, for example, if more data is available.

Proceeding to step 446, it is determined whether the amount of data in the transmit buffer from the modem module 114 is greater than zero. If so, this indicates data is present from the modem module 114 to read; if not, this indicates that no data is available from the modem module 114. If a modem transmit buffer count variable .TX_CNT is greater than zero, control proceeds to step 448, where the B variable is loaded with data from the modem's transmit array, where the transmit array contains data transmitted from the modem module 114. Further, the .TX_CNT variable is decremented to indicate that the data has been read from the transmitter from the modem module 114.

From step 446, if the transmit count variable .TX_CNT is not greater than zero, this indicates that no data is available from the modem module 114, so control proceeds to step 450, where the B variable is loaded with the NULL character, or zero. From both steps 448 and 450, control then proceeds to step 452.

At step 452, if the .TX_CNT variable is not equal to zero, indicating that more data is available from the modem module 114, control proceeds to step 454, where the receive data ready indicator bit RDRI in the line status register variable .LSR is set, and interrupts are evaluated by a call to the EVALUATE_INTERRUPT routine 600. From step 452 if the .TX_CNT variable is equal to zero, and from step 454 in any case, control proceeds to step 440.

Figure 13A:
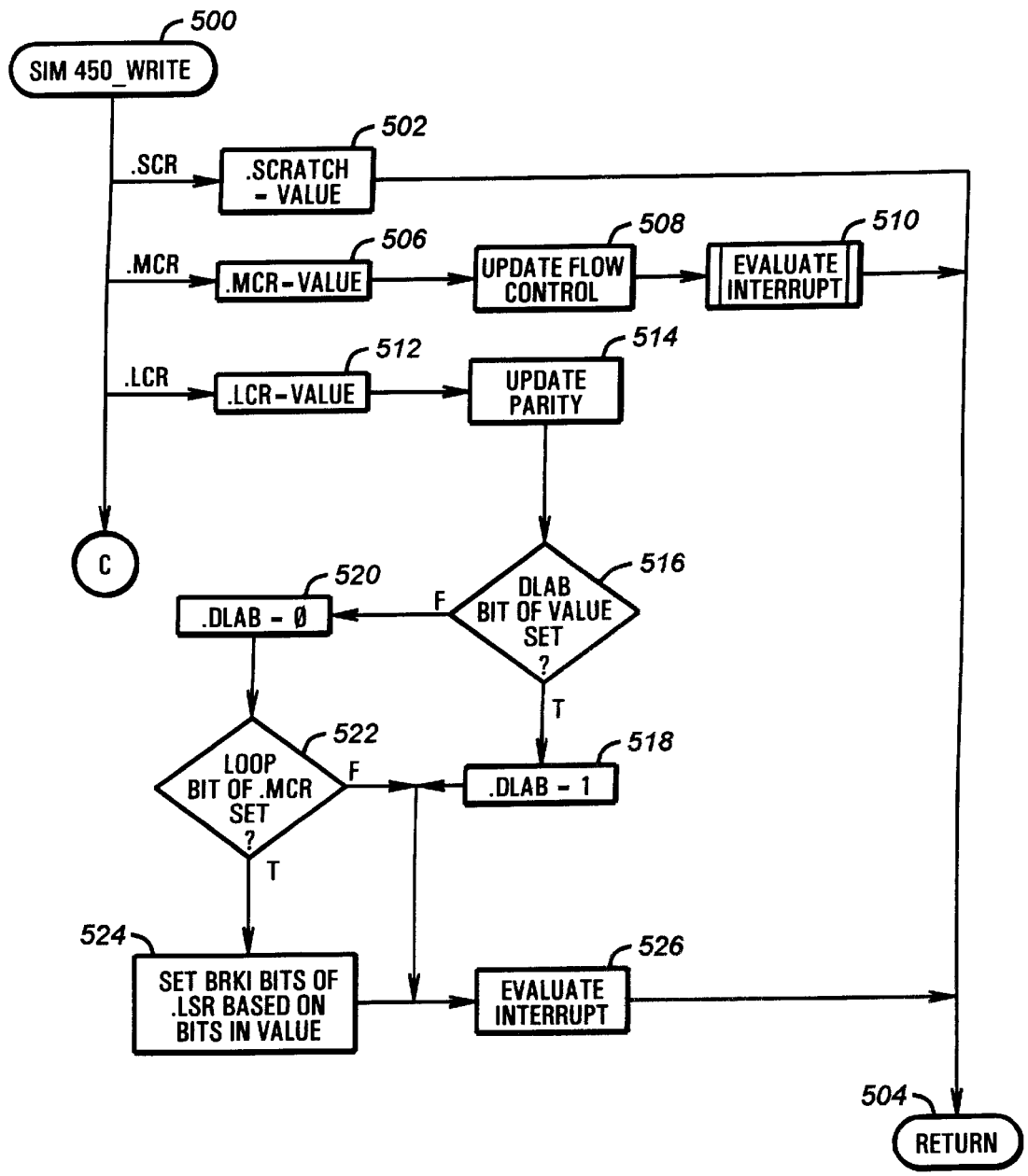
FIGS. 13A–13C are a flowchart illustration of a SIM450_WRITE routine to be executed on calls to the virtual UART.
Figure 13B:
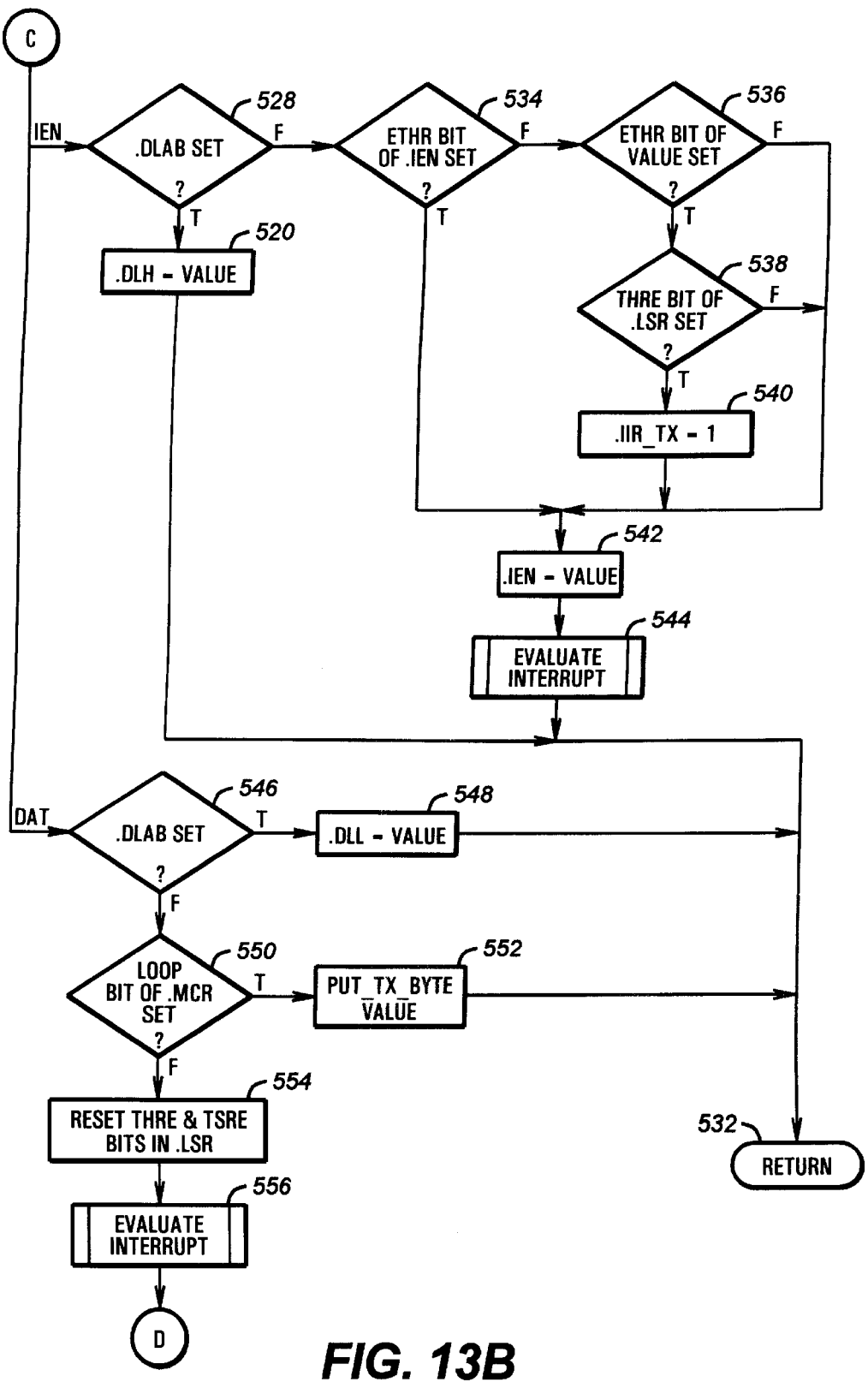
Figure 13C:
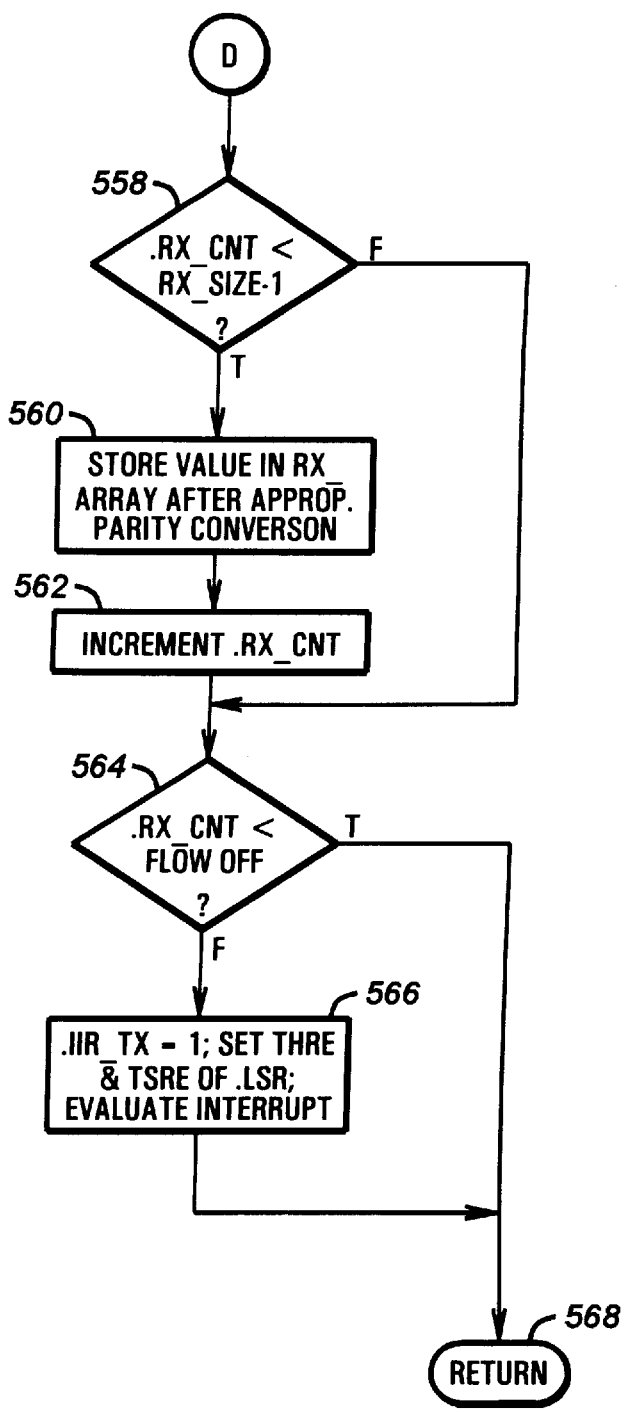

Turning to FIGS. 13A–13C, the flowchart of the SIM450_WRITE routine 500 is shown. The source code for this routine is also found in the SIM450.C source code listing in Appendix C. Again, certain details regarding flow control have been omitted for clarity. Generally, however, whenever a virtual device driver would execute an output to a hardware port on a corresponding hardware UART, the SIM450_WRITE routine 500 is instead called.

This routine 500 is also shown in the form of a case statement. If the selected port offset corresponds to the scratchpad register SCR, control proceeds to step 502, where the .SCRATCH variable is set equal to a VALUE variable, a parameter passed in the AL register as illustrated in the OUTDXAL macro 360 of FIG. 10. Control proceeds from step 502 to step 504, where the SIM450_WRITE routine 500 returns to its calling routine, here shown to be the VIPD1_REG_WRITE routine 380.

On a write directed to the modem control register MCR, control proceeds from step 500 to step 506, where the modem control register variable .MCR is set equal to the VALUE parameter. Control then proceeds to step 508, where flow control is updated. This is necessary because the modem control register variable MCR includes a number of bits, such as OUT2*, OUT1*, RTS*, DIR* and other modem controls that could affect flow control.

Proceeding to step 510, the SIM450_WRITE routine 500 calls the EVALUATE_INTERRUPT routine 600. This is done because it may be necessary to initiate an interrupt to the operating system driver code because of changes in the value of the .MCR variable. Control then returns at step 504.

If the I/O write was intended for the line control register LCR, control proceeds from step 500 to step 512. At step 512, the .LCR variable is loaded with the VALUE parameter, and control then proceeds to step 514, where any parity processing tables are updated. This is because three bits within the .LCR variable are directed to parity settings of no parity, odd parity, even parity, mark parity, or space parity.

From step 514, control proceeds to step 516, where it is determined whether the DLAB bit located in the VALUE variable is set. If true, then the .DLAB variable is set equal to one at step 518. If false, control proceeds to 520, where the .DLAB variable is set to zero. Thus, the .DLAB variable reflects the current value of the DLAB bit within the .LCR variable. From step 520, control proceeds to step 522, where it is determined whether the LOOP bit of the .MCR variable is set. If so, we are in loop back mode, so control proceeds to step 524, where the BRKI bit of the .LSR register is set to true if the SBRK bit of VALUE is true, and otherwise, the BRKI bit of the .LSR register is left unchanged. That is, if the virtual UART is in loop back mode, then the break input bit of the virtual UART is set to correspond with the break output bit of the virtual UART.

From steps 518, 522, and 524, control then proceeds to step 526, where the EVALUATE_INTERRUPT routine 600 is called to determine if a UART interrupt should be executed by the operating system.

Continuing in FIG. 13B, other conditions are shown. If the write corresponds to a write to the UART interrupt enable register IEN, control proceeds from step 500 to step 528, where it is first determined if the .DLAB variable is set to true. If so, control proceeds to 530, where the divisor latch high byte variable .DLH is set equal to the VALUE parameter. This is done because when the DLAB bit is set, the divisor latch is accessed by reads from and writes to the IEN register and the DAT register. Control then proceeds from step 530 to step 532, where control returns to the calling routine.

From step 528, if the .DLAB variable is not true, control proceeds to step 534, where the empty transmit hold register bit ETHR of the interrupt enabler register .IEN is tested. This bit, when true, indicates an interrupt should occur when the transmit hold register (i.e., DAT) is empty. If this bit is not set, control proceeds to step 536, where the ETHR bit of the VALUE parameter is tested, and if true, control proceeds to step 538. At step 538, the transmit hold register empty bit THRE is tested in the line status register variable .LSR. If set, this indicates that a transmitter interrupt should occur, because the interrupts based on the transmit hold register being empty have just been turned on, and the transmit hold register is in fact empty. So, control proceeds from step 538 to step 540, where the interrupt pending interrupt identification register transmit variable .IRR_TX is set to one, or true.

On all other conditions from steps 534 to 538 and from step 540, control proceeds to step 542, where the interrupt identification register variable .IEN is set equal to the VALUE parameter. Control then proceeds to step 544 where the EVALUATE_INTERRUPT routine 600 is called. If step 540 was reached, indicating an interrupt should occur based on the transmit hold register being empty and interrupts on transmit hold register empty having been turned on, then this will cause an interrupt to the operating system software in the EVALUATE_INTERRUPT routine 600. From steps 530 and 544, control proceeds to step 532, where a return is executed.

If the UART register to be written is the transmit data register DAT, control proceeds from step 500 to step 546, where the divisor latch access bit variable .DLAB is tested. If true, then the divisor latch low byte variable .DLL is loaded with the VALUE parameter at step 548, and then control returns at step 532.

If the .DLAB variable is not set at step 546, control proceeds to step 550, where the LOOP bit of the modem control register variable .MCR is tested. If it is set, indicating we are in loop back mode, control proceeds to step 552 where a put byte into modem module transmit buffer routine PUT_TX_BYTE 700 is executed, discussed further below in conjunction with FIG. 15. It must be understood that the PUT_TX_BYTE routine 700 corresponds to a byte being placed into the transmit buffer from the modem module 114 to the virtual UART. Thus, when a byte is placed in that transmit buffer, it is actually received by the virtual UART. This is appropriate at step 552, because the data to be written should actually be read by the UART in loop back mode. Control proceeds from step 552 to step 532, where it returns to the calling routine.

From step 550, if we are not in loop back mode, control proceeds to step 554, where the transmit hold register empty bit THRE and the transmit shift register empty TSRE in the line status register variable .LSR are reset, because we are presently providing a byte of data to be written in those registers. Control then proceeds to step 556, where the EVALUATE_INTERRUPT routine 600 is called. From step 556, control proceeds to step 558 (FIG. 13C), where it is determined whether a modem module receiver buffer counter .RX_CNT is less than a maximum value. If so, this indicates that receiver buffer of the modem module 114 still has room to receive another byte from the virtual UART—that byte having been output by the OUTDXAL macro that has resulted in the routine reaching step 558. Therefore, control proceeds to step 560, where the VALUE parameter is stored in the modem module 114 receiver array RX_ARRAY after an appropriate parity conversion based on the present parity settings of the virtual UART.

Control then proceeds to step 562 where the .RX_CNT variable is incremented, reflecting the addition of data to the receiver array. From step 558, if the .RX_CNT variable has exceeded the maximum buffer size, or from step 562 in any case, control proceeds to step 564, where it is determined whether the .RX_CNT variable is less than a flow-off condition. If false, this means that the virtual devices of the operating system should be stopped from sending any more data until the modem module 114 has processed that data. Referring above to step 554, there the transmit hold register empty bit THRE and transmit shift register empty bit TSRE were reset within the line status register variable .LSR at step 554. Therefore, until those bits are set, the virtual device drivers in the operating system should not write to the UART, because when they read the LSR variable through the SIM450_READ routine 40, these bits will indicate full transmit buffers. Therefore, if the modem module 114 receive array is full, these bits are left unchanged, as control proceeds from step 564 to step 568, where a return is executed.

Otherwise, control proceeds from step 564 to step 566, where appropriate action is taken to allow additional data to be written through the virtual UART into the modem module 114 receive buffer. First, the interrupt identification register transmit variable .IRR_TX is set to true, indicating that an interrupt should occur, if necessary, showing the transmit buffers are clear for more data. The transmit hold register empty bit THRE and the transmit status register empty bit TSRE of the line status register variable .LSR are set to true, indicating these registers are empty and available for accepting data from the operating system. Then the EVALUATE_INTERRUPT routine 600 is called so that an appropriate interrupt can be triggered to the operating system. From step 566, control proceeds to step 568, where it returns to the calling routine.

Virtual Interrupts

Figure 14A:
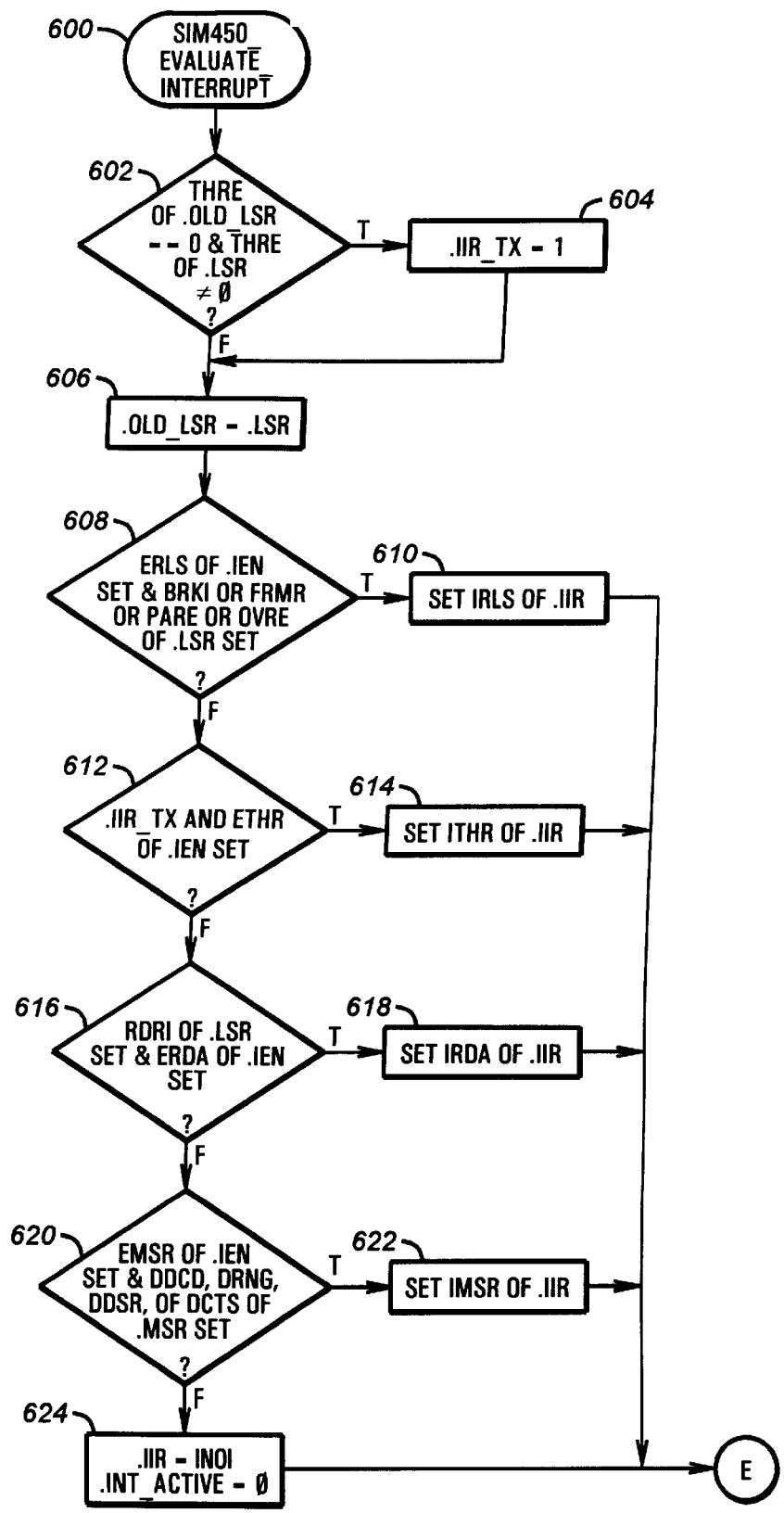
FIGS. 14A and 14B are a flowchart illustration of a SIM450_EVALUATE_INTERRUPT routine that determines when interrupts should be provided by the virtual UART.
Figure 14B:
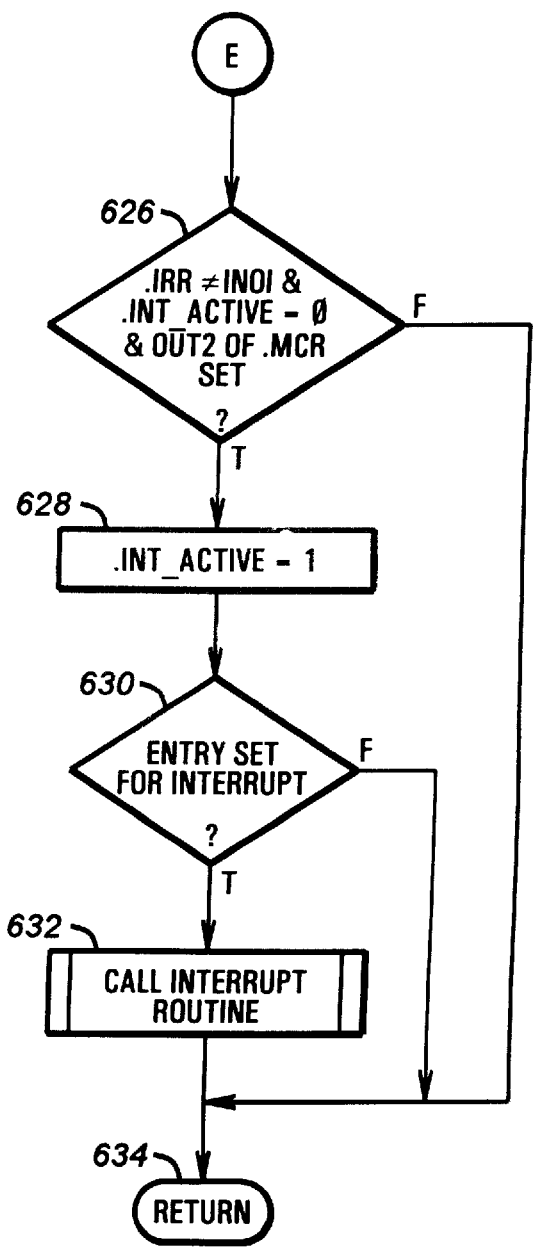

Turning to FIGS. 14A and 14B, the SIM450_EVALUATE_INTERRUPT routine 600, or simply the EVALUATE_INTERRUPT routine 600, is shown. This routine 600 is called when it must be determined whether the virtual UART should cause a soft interrupt to the virtual devices of the operating system. As previously discussed, the operating system will have an interrupt entry point that would be called on a hardware interrupt by a UART, typically the entry point for an interrupt from the IRQ3 or IRQ4 interrupt request line. As part of their initial housekeeping, the virtual device drivers must set up an entry point for such an interrupt. The SIM450.C module includes an entry point that is called with the address to be vectored to on an interrupt from the UART. It sets this entry point as the routine to be called by the SIM450_EVALUATE_INTERRUPT routine 600 when it is appropriate for the virtual UART to execute an interrupt.

Before turning to the specific code of the SIM450_EVALUATE_INTERRUPT routine 600, as a general overview the routine 600 tests to determine whether the various settings of the data variables within the virtual UART indicate that it is appropriate to cause a call to the interrupt service routine within the virtual device drivers of the operating system. Such conditions would be, for example, if the transmit hold register has become empty and the corresponding interrupt is enabled in the interrupt enable register variable IEN. Other conditions, of course, will also cause interrupts.

Beginning at step 602, the transmit hold register empty bit THRE of the previously stored line status register variable .OLD_LSR is tested, along with the transmit hold register bit THRE of the current line status register variable .LSR. If the THRE is set in the .LSR variable, but is cleared in the .OLD_LSR variable, this means that the transmit hold register has become empty since the previous call to the SIM450_EVALUATE_INTERRUPT routine 600. In that case, control proceeds from step 602 to step 604, where the transmit empty interrupt variable .IRR_TX is set to one, indicating an interrupt condition exists. Otherwise, from step 604, and on a false condition from step 602, control proceeds to step 606, where the old line status register variable .OLD_LSR is loaded with the value of the present line status register variable .LSR.

Proceeding to step 608, various conditions of the interrupt enable register variable .IEN are tested. At step 608, an error in line status register ERLS bit in the interrupt enable variable .IEN is tested, along with the break bit BRKI, frame error bit FRMR, parity error bit PARE, and overrun error bit OVRE of the line status register variable .LSR. The ERLS bit, if true, indicates an interrupt should be initiated on any of these error conditions in the line status register variable .LSR. So if this condition is true, control proceeds from step 608 to step 610, where the interrupt identification register variable .IRR is set with a value corresponding to an interrupt base on the line status register (this value is 06h).

From step 608, on a false condition, control proceeds to step 612 where the transmit empty interrupt variable .IRR_TX is tested along with the enable transmit hold register interrupt bit ETHR of the interrupt enable register variable .IEN. If both are true, this indicates that interrupts on transmit hold register empty are enabled, and that the transmit hold register has in fact become empty as indicated at step 604 above, or this interrupt has just been enabled, as indicated at step 540 of FIG. 13B. In either case, an interrupt should be executed notifying the operating system that the transmit hold register is empty. So at step 614, the interrupt identification register variable .IRR is set to a value corresponding to such an interrupt (a value of 02h).

Otherwise, from step 612 control proceeds to step 616, where the receive data ready interrupt bit RDRI of the line status register variable .LSR is tested, along with the enable receive data available interrupt bit ERDA of the interrupt enable register variable .IEN. If both are true, this indicates that data is available from the modem module 114, and interrupts are set to occur when such data is available, so control proceeds to step 618, where the interrupt identification register variable .IRR is again set to an appropriate value (here 04h).

From step 616, control otherwise proceeds to step 620, where the enable modem status register interrupt bit EMSR of the interrupt enable register variable .IEN is tested, along with the delta bits within the modem status register variable .MSR. The delta bits, when true, indicate the corresponding upper bits of the modem status register variable .MSR have changed since the last read of the .MSR variable. If one of these bits has changed, and the corresponding interrupt is enabled, control proceeds to step 622, where the interrupt identification register variable .IIR is set to a value corresponding to an interrupt based on the modem status register (a value of 0h).

Otherwise, control falls through from step 620 to step 624, where the interrupt identification register variable .IIR is set to a no interrupt value, which is a value of 01h. Further, an interrupt active variable .INT_ACTIVE is set false, indicating no interrupt is presently occurring.

At steps 610, 614, 618, and 622 the zero bit of the interrupt identification register variable .IRR is set low, which is its active state, indicating an interrupt is pending, as according to standard UARTs. Therefore, from these steps, an interrupt is set to be pending and the interrupt identification register variable .IRR contains the identification of that type of interrupt. From steps 610, 614, 618, 622, and 624, control proceeds to step 626 (FIG. 14B).

At step 626, the .IIR variable is compared to the no interrupt value INOI, the interrupt active variable .INT_ACTIVE is tested, and the OUT2 bit of the modem control register variable .MCR is tested. If the .IIR variable is not equal to the no interrupt condition, the .INT_ACTIVE variable is false, indicating there is not a current interrupt being handled; and the output OUT2 is enabled, then this indicates that an interrupt should occur, so control proceeds to step 628, where the interrupt active variable .INT_ACTIVE is set to one, indicating than an interrupt is presently occurring, and then to step 630 where it is determined whether an entry has been set for interrupts (which should have occurred on proper initialization of the SIM_450 code). From step 630, if an entry has been set for an interrupt, that interrupt entry is called at step 632. Then otherwise from steps 626 and 630, and always from step 632, control proceeds to step 634, where a return is executed to the calling code.

Regarding the interrupt active variable .INT_ACTIVE, its operation is understood in referring to FIGS. 14A and 14B. If an interrupt is active, the .INT_ACTIVE variable is not reset to false until no interrupts remain pending in the test of steps 608, 612, 616, and 620. This prevents multiple spurious interrupts.

The Modem Module

The above routines illustrate the virtual UART's interface as appears to the various virtual device drivers within the system software. The virtual UART also has an interface to the modem module 114. As previously noted, appropriate code to the modem module 114 is generally offered by a number of modem software developers, such as R. Scott & Associates. These providers generally write controller code that is non-controller specific and in a high level language, so that it can be compiled for execution on a variety of platforms. For example, the controller code as illustrated would be high level code compiled for execution on a 68302 microcontroller, but is now instead compiled for execution on an x86 series of processor as used according to the invention.

Figure 15:
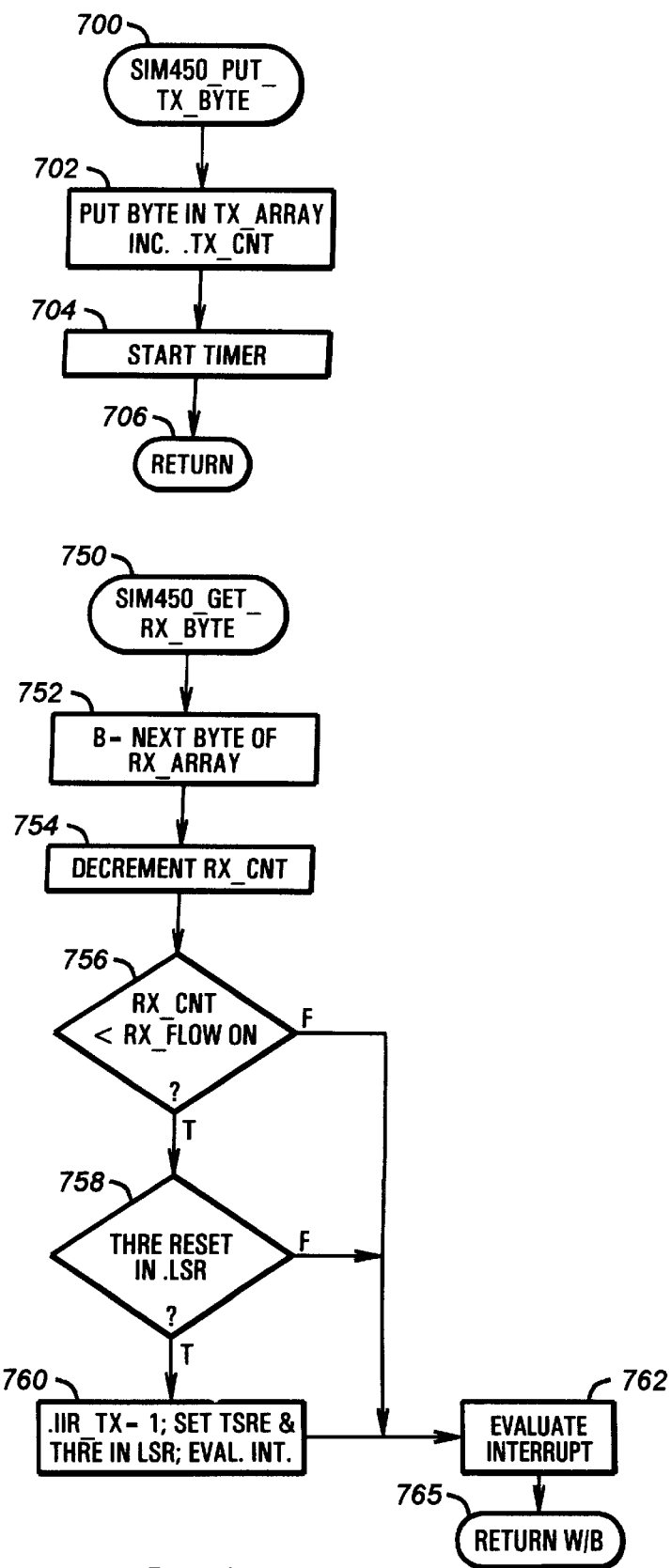
FIG. 15 is a flowchart illustration of two routines used by modem controller code to send data to and receive data from the virtual UART according to the invention.

This controller code will have various "hooks" through which it receives and transmits external data from the computer. Principal examples are illustrated in FIG. 15, SIM450_PUT_TX_BYTE routine 700 and the SIM450_GET_RX_BYTE routine 750.

Beginning at 702, the SIM450_PUT_TX_BYTE routine 700 places a byte in the transmit array TX_ARRAY. Again, the transmit array is from the modem module 114 to the virtual UART. Proceeding to step 704, a timer is started which causes an interrupt to the modem module 114 after a certain period of time (around 10 milliseconds) if the modem module 114 has not been called in the interim. This delay is to allow the modem module 114 to transmit another byte to the virtual UART. The timer is started so that characters can be "expired" out if there is no application draining the UART. In a real UART the characters would be overwritten, causing an OVERRUN error.

In the SIM450_GET_RX_BYTE routine 750, the modem module 114 reads a byte from its receive buffer, which has been filled by the SIM450 routines. Beginning at step 752, a temporary variable B is loaded with the next byte in the receive buffer RX_ARRAY. Proceeding to step 754, the receive buffer count RX_CNT is decremented indicating one less byte is available in that array. Proceeding to step 756, it is determined whether the receive buffer count RX_CNT is less than a flow-on threshold RX_FLOW_ON. If so, the buffer is empty enough to allow more characters from the virtual UART, so control proceeds to step 758, where the transmit hold register empty bit THRE in the line status register variable .LSR is tested. If it is true, control proceeds to step 760, where the transmit empty interrupt variable IIR_TX is set to one, or true, indicating an interrupt should be provided notifying the virtual device drivers that the virtual UART's transmit hold register is empty. Also, the transmit shift register empty bit TSRE and the transmit hold register bit THRE in the line status register variable .LSR are set to true, indicating these registers are empty and available for accepting data from the virtual device drivers of the operating system. Finally, the EVALUATE_INTERRUPT routine 600 is called to determine whether an interrupt should be provided to the virtual device drivers of the operating system. From steps 756, 758, and 760, control proceeds to step 762, where the EVALUATE_INTERRUPT routine 600 is again called. Finally, proceeding to step 765, the routine returns to the modem module 114 with the value in the temporary B variable as a parameter.

Conclusion

From the foregoing description, it can be understood how the virtual UART is provided as an addition to the modem module 114 such that the modem module 114 can communicate data to and from that virtual UART, yet the virtual UART appears to the operating system software as effectively a physical UART. The only major changes that need to be made in the virtual device drivers that would normally access a physical UART is that device drivers have their input and output instructions replaced with an appropriate macro that redirects these input and output instructions as calls into the virtual UART code.

This software division provides for a very clean path to new operating systems as well as to different modem modules. Because of the virtual UART interface provided on the front of the modem module 114, to move this modem controller to a new operating system simply entails modifying the operating system virtual device drivers to execute calls rather than input/output instructions. No other data structures or parameters need be changed, because the virtual UART for all intents and purposes appears to be a physical UART.

Similarly, if the modem module itself is changed, all that needs to be changed is the interface with the virtual UART. No modifications of existing virtual device drivers are necessary, because the virtual UART interface stays standardized.

The physical link between the computer system C and the DSP 58 can be implemented in a variety of ways, such as with a number of input/output ports. The modem module 114 also includes hooks for appropriate communications with the DSP, these can be easily modified for whatever type of hardware interface the DSP presents to the modem module 114. Preferably, this is in the form of a PCMCIA card with a standard interface through a number of mailbox registers. The modem module code for implementation of this interface is shown in the source code Appendix E, but again, this is not critical as there can be a wide variety of interfaces.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the scope and spirit of the invention.

APPENDIX A

U.S. EXPRESS MAIL NO. TB855044421US page 60, 132

```
;*****************************************************************************
*
    title  CPQFMW95 - Crazy Horse WIN95 port driver
;*****************************************************************************
*
;
;   (C) Copyright Compaq Computer Corp, 1995
;   (C) Copyright MICROSOFT CORP. 1992-1995
;   Title:  CPQFMW95 - Crazy Horse WIN95 port driver
;
;   Module:   CPQFMW95.ASM - Core code
;
;   $Revision:$
;
;   Author:   Peter J. Brown
;
;$Header:$
;
;$Log:$
;
;*****************************************************************************
*

.386p

;================================================================================
=
;                    I N C L U D E S   &   E Q U A T E S
;================================================================================
=

.XLIST
        INCLUDE opttest.inc
        INCLUDE vmm.inc
        INCLUDE debug.inc
        INCLUDE vpicd.inc
        INCLUDE vcomm.inc
        INCLUDE vtd.inc
        INCLUDE ins8250.inc
        INCLUDE vipdlp.inc
        INCLUDE vcd.inc
        INCLUDE configmg.inc
        Create_CPQFMW95_Service_Table equ 1
        INCLUDE cpqfmw95.inc
        INCLUDE pccard.inc
IFDEF DEBUG
        INCLUDE shell.inc
ENDIF
        .LIST CPQFMW95_Major_Ver        equ     02h
CPQFMW95_Minor_Ver        equ     00h
RQSIZE                    equ     10240
TQSIZE                    equ     10240
MANUTUPLE                 equ     015h ;================================================================================
=
;                         L O C A L   D A T A
;================================================================================
=

VxD_IDATA_SEG

; Card Services register client structure
rcRegClient RegisterClient_s < CLTA_MEM_DRIVER OR CLTA_INSERT_SHARED OR
CLTA_INSERT_EXCLUSIVE, \
        (EVTM_EJECT_REQUEST OR EVTM_INSERT_REQUEST OR EVTM_CARD_DETECT_CHG OR
EVTM_RESET_EVENTS), \
        <>, 0201h>  ; version required
```

1

```
Size_Register_Client_s    EQU     SIZEOF rcRegClient

VxD_IDATA_ENDS

VxD_DATA_SEG

IFDEF DEBUG
IFNDEF DYNAMIC
        PUBLIC  CPQFMW95_Sys_Critical_Init
        PUBLIC  CPQFMW95_Device_Init
ENDIF
        PUBLIC  CPQFMW95_Control_Proc
;       PUBLIC  CPQFMW95_Sys_VM_Terminate
        PUBLIC  CPQFMW95_DriverControl
        PUBLIC  InitFunction
        PUBLIC  PortOpen
        PUBLIC  PortClose
        PUBLIC  PortRead
        PUBLIC  PortWrite
        PUBLIC  PortGetState
        PUBLIC  PortSetModemStatusShadow
        PUBLIC  PortGetProperties
        PUBLIC  PortSetEventMask
        PUBLIC  PortEnableNotification
        PUBLIC  PortSetReadCallBack
        PUBLIC  PortSetWriteCallBack
        PUBLIC  PortGetModemStatus
        PUBLIC  PortGetCommConfig
        PUBLIC  PortSetCommConfig
        PUBLIC  PortGetWin32Error
        PUBLIC  PortGetQueueStatus
        PUBLIC  PortSetState
        PUBLIC  PortSetup
        PUBLIC  PortTransmitChar
        PUBLIC  PortClearError
        PUBLIC  PortEscapeFunction
        PUBLIC  PortGetEventMask
        PUBLIC  PortPurge
        PUBLIC  rq
        PUBLIC  tq
        PUBLIC  PortDat
        PUBLIC  PortFun
        Public  CH_Com_Port
        Public  CH_Com_IRQ
        Public  data_pump_int_handle
        Public  VIPD_Port
        Public  VIPD_Init
        Public  Time_Slice
        PUBLIC  CH_IN
        PUBLIC  CH_SOCKET

ENDIF

PUBLIC  Serial_Name
        PUBLIC  SysVMHandle
        PUBLIC  TimeOutHandle align 4
    Compaq                   db    'COMPAQ',0
    CHId                     db    '192 FX/MDM',0
    Serial_Name              db    'CPQFMW95',0
    VXDNAME                  db    'CPQFMW95',0
      COMNAME                              db    'COM2',0
      ; Registry stuff
      RegName                              db
'PCMCIA\COMPAQ-192_FX/MDM-C047\0',0
      RegValue               db    'PORTNAME',0
      RegBufSize             dd    0
    RegData                  db 256 DUP (0)
      hKey                   dd    0               ; Registry Key align 4
```

```
        PortDat                 PortInformation <>
        PortFun                 _PortFunctions <>
        rq                      db  RQSIZE DUP (0)
        tq                      db  TQSIZE DUP (0)
        VCommPortHandle         dd  0           ; Acquire/Release port handle
        SysVMHandle             dd  0
        TimeOutHandle           dd  0
        wClientHandle           dw  0           ; PCCARD handle
           RegComplete              dw  0           ; has registration completed?
        PNP_DEVNODE             dd  0           ; devnode
        PNP_BASE_PORT           dw  0           ; assigned port
        PNP_IRQ                 dw  0           ; assigned irq
        CH_Com_Port             dw  0           ; crazy horse com port
        CH_Com_IRQ              dw  0           ; crazyhorse com irq
           ComNumber                db  0           ; com number 1-4+
        data_pump_int_handle    dd  0           ; interrupt handle
        VIPD_Port               dw  0           ; Data Pump Hardware IO Port
        VIPD_Init               dw  0           ; VIPD initialized indicator
        Time_Slice              dd  0           ; time slice handle
        VCHD_INT_BUSY           dd  0           ; prevent reenter
        CH_IN                   db  0           ; is CH inserted in machine?
        CH_SOCKET               db  0ffh        ; CH in socket 0 or 1?
        align 4

SrvTab  label   dword
        dd      OFFSET32    ModemStatus ; [0] modem status interrupt
        dd      OFFSET32    XmitEmpty   ; [4] Tx holding reg. interrupt
        dd      OFFSET32    DataAvail   ; [8] Rx data avail or
                                        ; [18] if 16550/16550A
        dd      OFFSET32    LineStat    ; [C] receiver line status int BaudRateByIndexTable label word
        dw  1047        ; CBR_110
        dw  384         ; CBR_300
        dw  192         ; CBR_600
        dw  96          ; CBR_1200
        dw  48          ; CBR_2400
        dw  24          ; CBR_4800
        dw  12          ; CBR_9600
        dw  8           ; CBR_14400
        dw  6           ; CBR_19200
        dw  0           ;       0FF19h  (reserved)
        dw  0           ;       0FF1Ah  (reserved)
        dw  3           ; CBR_38400
        dw  0           ;       0FF1Ch  (reserved)
        dw  0           ;       0FF1Dh  (reserved)
        dw  0           ;       0FF1Eh  (reserved)
        dw  2           ; CBR_56000

EXTRN   WriteCommString:NEAR
        EXTRN   ReadCommString:NEAR
        EXTRN   KickTx:NEAR
        EXTRN   UnMaskIRQ:NEAR
        EXTRN   Notify_Owner:NEAR
        EXTRN   StealPort:NEAR
        EXTRN   TXI:NEAR
        EXTRN   Flush:NEAR
        EXTRN   ExtnFcn:NEAR
        EXTRN   StaCom:NEAR
        EXTRN   TrmCom:NEAR VxD_DATA_ENDS ;===============================================================================
;           V I R T U A L   D E V I C E   D E C L A R A T I O N
;===============================================================================

Declare_Virtual_Device  CPQFMW95, CPQFMW95_Major_Ver, CPQFMW95_Minor_Ver,\
```

3

```
                             CPQFMW95_Control_Proc, CPQFMW95_DEVICE_ID,\
                             Undefined_Init_Order,, VxD_LOCKED_CODE_SEG ;================================================================================
;                    N O N P A G E A B L E   C O D E
;================================================================================

;--------------------------------------------------------------------------------
;
;    CPQFMW95_Control_Proc
;
;    DESCRIPTION:
;        Dispatches VMM control messages to the appropriate handlers.
;
;    ENTRY:
;        EAX = Message
;        EBX = VM associated with message
;
;    EXIT:
;        Carry clear if no error (or if not handled by the VxD)
;        or set to indicate failure if the message can be failed.
;
;    USES:
;        All registers.
;
;--------------------------------------------------------------------------------

BeginProc CPQFMW95_Control_Proc

;     Control_Dispatch Sys_VM_Terminate, CPQFMW95_Sys_VM_Terminate
      Control_Dispatch Sys_Dynamic_Device_Init, CPQFMW95_dyninit
      Control_Dispatch Sys_Dynamic_Device_Exit, CPQFMW95_dynexit
      clc
      ret
EndProc CPQFMW95_Control_Proc ;--------------------------------------------------------------------------------
; CPQFMW95_dyninit
;--------------------------------------------------------------------------------
BeginProc CPQFMW95_dyninit
        VxDCall         VCOMM_Get_Version          ; Q: VCOMM present ?
        jc              dyinit_noload              ;    N: fail to load.
        Trace_Out       "CPQFMW95: VCOMM present!!!"

; what port is it in the registry?

mov             eax,OFFSET32 hKey
        push            eax
        mov             eax,REGKEY_OPEN
        push            eax
        mov             eax,OFFSET32 RegName
        push            eax
        mov             eax,REGTYPE_ENUM
        push            eax
        VxDCall         _GetRegistryKey
        add             esp,16
        or              eax,eax
        jnz             dyinit_noload mov             eax,0ffh                   ; size of value
buffer
        mov             [RegBufSize],eax           ; set it
        mov             eax,OFFSET32 RegBufSize    ;
        push            eax
```

```
        mov             eax,OFFSET32 RegData      ; place to put the
returned value
        push            eax
        mov             eax,REG_SZ                ; a string please
        push            eax
        xor             eax,eax                             ; reserved
        push            eax
        mov             eax,OFFSET32 RegValue     ; name of value
        push            eax
        mov             eax,[hKey]                ; Reg Key
        push            eax
        VxDCall         _RegQueryValueEx          ; get the value
        add             esp,24
        or              eax,eax
        jz              @F
        mov             eax,[hKey]                ; close Key
        push            eax
        VxDCall         _RegCloseKey
        add             esp,4
        jmp             dyinit_noload             ; don't know com
port number @@:
        mov             eax,OFFSET32 RegData      ; point at returned
string
        add             eax,3                     ; skip COM part
        mov             ch,[eax]                  ; digit after COM
        inc             eax
        mov             cl,[eax]                  ; next digit or
null
        or              cl,cl                     ; if its not null,
its > COM9, bug
        jz              @F
        mov             eax,[hKey]                ; close Key
        push            eax
        VxDCall         _RegCloseKey
        add             esp,4
        jmp             dyinit_noload             ; don't know com
port number @@:
        sub             ch,030h                   ; ascii to
decimal
        cmp             ch,4
        ja              ComPlus                   ; COM5+ mov             [ComNumber],ch            ; save it
        cmp             ch,1
        jne             COM234
        mov             [CH_Com_Port],03f8h       ; COM1
        mov             [CH_Com_Irq],4
        jmp             COMSET COM234:
        cmp             ch,2
        jne             COM34
        mov             [CH_Com_Port],02f8h       ; COM2
        mov             [CH_Com_Irq],3
        jmp             COMSET COM34:
        cmp             ch,3
        jne             COM4
        mov             [CH_Com_Port],03e8h       ; COM3
        mov             [CH_Com_Irq],4
        jmp             COMSET COM4:
        mov             [CH_Com_Port],02e8h       ; COM4
        mov             [CH_Com_Irq],3
        jmp             COMSET
```

```
COMPLUS:
        mov             [CH_Com_Port],0h                ; COM5+
        mov             [CH_Com_Irq],4                  ; well, what
should it be?
        jmp             COMSET COMSET:
        mov             eax,[hKey]                      ; close Key
        push    eax
        VxDCall         _RegCloseKey
        add             esp,4

VxDCall         _VCOMM_Register_Port_Driver,<OFFSET32
_CPQFMW95_DriverControl>
        or              eax,eax
        jnz             @F
        stc
        Trace_Out   "CPQFMW95: _VCOMM_Register_Port_Driver failed"
        jmp             dyinit_noload
@@:
        Trace_Out "CPQFMW95: Registered as a port driver"

mov          eax,1
           VxDCall      CPQFMDB_PDSTATE                 ; tell
dos box we're loaded
           clc
dyinit_noload:
           ret
EndProc CPQFMW95_dyninit ;-----------------------------------------------------------------------
;
; CPQFMW95_dyninit
;-----------------------------------------------------------------------
;
BeginProc CPQFMW95_dynexit
           Trace_Out "Help me, I'm meltin....."
             xor        eax,eax
             VxDCall    CPQFMDB_PDSTATE                 ; tell dos
box we're out of here.
           clc
           ret EndProc CPQFMW95_dynexit ;-----------------------------------------------------------------------
;
;
; void _CPQFMW95_DriverControl(DWORD fCode, DWORD DevNode, DWORD
DCRefData,...)
;
; Description:
;
;   Called by VCOMM to perform various actions.
;
; Entry:
;   fCode   = code of function to perform
;   DevNode -> devnode in plug and play scheme
;   DCRefData = reference data to refer to while calling VCOMM back.
;
; Exit:
;   None
; Uses:
;   C style
;=======================================================================
=
BeginProc CPQFMW95_DriverControl, CCALL, esp, PUBLIC ArgVar  fCode,DWORD
ArgVar  MyDevNode,DWORD
ArgVar  DCRefData,DWORD
```

```
    EnterProc

Trace_Out "CPQFMW95: CPQFMW95_DriverControl"
    mov eax,fCode
    or  eax,eax
    .errnz DC_Initialize
    jz  _InitFunction TRAP
    LeaveProc
    return EndProc CPQFMW95_DriverControl ;****************************************************************************
*
;
; void InitFunction(DWORD fCode, DWORD DevNode, DWORD DCRefData,
;           DWORD AllocBase,DWORD AllocIrq, char *oldname);
;
; Description:
;
;   Called by VCOMM to initialize a port.
;
; Entry:
;   fCode   = code of function to perform
;   DevNode -> devnode in plug and play scheme
;   DCRefData = reference data to refer to while calling VCOMM back.
;   AllocBase = allocated base
;   AllocIrq  = allocated irq
;   oldname -> name of port.
;
; Exit:
;   None
; Uses:
;   C style
;============================================================================
=

BeginProc InitFunction,CCALL,esp,PUBLIC

ArgVar  fCode,DWORD
ArgVar  MyDevNode,DWORD
ArgVar  DCRefData,DWORD
ArgVar  AllocBase,DWORD
ArgVar  AllocIrq,DWORD
ArgVar  oldname,DWORD EnterProc
    SaveReg <esi,edi,ebx> cmp AllocIrq, 0
    je  IF_Done mov ebx,MyDevNode
    mov PNP_Devnode,ebx
    Trace_Out "CPQFMW95: InitFunction #EBX"
    mov ebx,AllocBase
    mov PNP_Base_Port,bx
    Trace_Out "CPQFMW95: Base #EBX"
    mov ebx,AllocIrq
    mov PNP_IRQ,bx
    Trace_Out "CPQFMW95: Irq #EBX"

;   mov eax,oldname
      mov   al,ComNumber
      add al,030h
      mov [COMNAME+3],al
      VxDCall _VCOMM_Add_Port,<DCRefData, OFFSET32 _PortOpen,OFFSET32 COMNAME>
;   VxDCall _VCOMM_Add_Port,<DCRefData, OFFSET32 _PortOpen,eax>
    or  eax,eax
    jnz IF_Done
```

```
        Trace_Out  "CPQFMW95: _VCOMM_Add_Port failed"
IF_Done:
        Trace_Out  "CPQFMW95: InitFunction done"
        RestoreReg  <ebx,edi,esi>

LeaveProc
        return

EndProc InitFunction

;----------------------------------------------------------------------
; TITLE:        CPQFMW95_CardServicesClient
;
; DESCRIPTION:  This routine is the callback function for Card Services
;               notification for events such as CARD_INSERTION and
;               CARD_REMOVAL.  PCCARD.VxD (Win95 Card Services) will
;               call this function to complete the event notification
;               process.
;
; ENTRY:        AL=Function
;               CX=Socket
;               DX=Info
;               DI=First word of RegisterClient arg packet ClientData field
;               ESI=Third and Fourth word of RegisterClient arg packet
;               EBP=MTD request
;               EBX=Buffer or BX=Misc when no buffer is supplied
;
; RETURNS:      AX=Status on return to Card Services
;               CF=clear success, or set to indicate failure
;
;----------------------------------------------------------------------
;IFDEF USECS
;BeginProc CPQFMW95_CardServicesClient, PUBLIC
;
;       Trace_Out  "CPQFMW95: CS Callback!"
;
;       mov     [EventSocket],cx            ; save the socket number
;       movzx   ecx,cx                      ; ECX=Socket number
;
;       cmp     AL,EV_CARD_INSERTION        ; Card insertion event?
;       jne     CSCRemoval                  ; No--Check for Card removal
;
;       Trace_Out  "Card Insertion! #EAX"
;
;       cmp     [CH_IN],1                   ; already have a CH?
;       je      CSCDone                     ; yup, ignore the second one
;
;       mov     AL,F_GET_FIRST_TUPLE        ; function
;       xor     edx,edx                     ; handle
;       xor     esi,esi
;       mov     ebx, OFFSET32 GetCHTuple    ; arg pointer
;       mov     [ebx.GetTupleData_s.Socket],cx ; fillin structure
;       mov     cx,SIZEOF GetTuple_s        ; arg length
;       VxDCall PCCARD_Card_Services
;       jc      CSCDone                     ; failed
;
;       mov     AL,F_GET_TUPLE_DATA         ; function
;       mov     [ebx.GetTupleData_s.TupleDataMax],0ffh
;       mov     cx,SIZEOF GetTupleData_s    ; arg length
;       VxDCall PCCARD_Card_Services
;       jc      CSCDone                     ; failed
;
;       mov     esi, OFFSET32 TupleData
;       inc     esi
;       inc     esi                         ; point at COMPAQ
;       mov     edx, OFFSET32 Compaq        ; ref string
;       call    MyStrCmp
;       jc      CSCDone                     ; its not our modem
;
;       inc     esi                         ; point at 192 FX/MDM
;       mov     edx, OFFSET32 CHId          ; ref string
;       call    MyStrCmp
```

```
;       jc      CSCDone                         ; its not our modem
;
;       movzx   ecx,[EventSocket]               ; restore socket number
;       Trace_Out "CPQFMW95: CH inserted socket #ECX"
;
;       mov     [CH_IN],1                       ; save state
;       mov     [CH_SOCKET],cl                  ; save socket
;
;       movzx   eax,PNP_BASE_PORT
;       mov             [CH_Com_Port],ax
;       movzx   eax,PNP_IRQ
;       mov             [CH_Com_Irq],ax
;       jmp     CSCDone
;
;CSCRemoval:
;       cmp     AL,EV_CARD_REMOVAL              ; Card insertion event?
;       jne     CSCDone
;
;       Trace_Out "Card Removal! #EAX socket #ECX"
;
;       cmp     [CH_IN],1                       ; if there's no CH, we don't care
;       jne     CSCDone                         ; out of here
;       cmp     [CH_SOCKET],cl                  ; CH socket?
;       jne     CSCDone                         ; nope, ignore
;       mov     [CH_IN],0
;       mov     [CH_SOCKET],0ffh                ; save state
;;      xor     eax,eax                         ; comport=0 CH removed, shutdown
;;      call    SET_CH_COMPORT
;       jmp             CSCDone
;
;CSCRegComp:
;       cmp             AL,EV_REGISTRATION_COMPLETE
;       jne             CSCDone
;       mov             [RegComplete],1         ; flag it
;
;CSCDone:
;       clc                                     ; Success
;       ret
;
;EndProc CPQFMW95_CardServicesClient
;
;****************************************************************************
*
; MyStrCmp
;
; ENTRY:    ESI -> string1
;           EDX -> string2
;
; EXIT:     CF clear strings equal
;           CF set, strings differ
;           esi,edx point at diff char, or null
;****************************************************************************
*
;BeginProc MyStrCmp
;       push ecx
;SCLOOP:
;       mov cl,[esi]    ; get the chars
;       mov ch,[edx]
;       or  cx,cx       ; if both 0, the strings are equal, and we're done
;       jz SCEQUAL
;       cmp cl,ch       ; are the chars equal
;       jne SCDIFF      ; nope, strings different
;       inc esi         ; next char
;       inc edx
;       jmp SCLOOP
;
;SCEQUAL:
;       clc             ; signal equal
;       jmp SCDONE
;SCDIFF:
;       stc             ; signal different
;SCDONE:
```

```
;       pop ecx
;       ret
;EndProc MyStrCmp
;ENDIF
;*****************************************************************************
*
;
; PPortInformation
; PortOpen (char *PortName, ulong Mode, ulong VMId, ulong *lpError);
;
; Open a port. This assumes that VCOMM called here only
; when it knows that we can support the port. It does not validate
; parameters because of this assumption.
;
; Parameters:
;       PortName        -> Non-null if open port using name
;       VMId            -> Id of the caller
;       lpError         -> location to update error in
;
; Returns:
;       PortHandle if successful, else 0
;       Updates to *lpError are
;       IE_OPEN         port already open
;       IE_HARDWARE     hardware error
;       IE_DEFAULT      generic error
;=============================================================================
=
BeginProc PortOpen, CCALL, PUBLIC ArgVar  PortName,DWORD
ArgVar  VMId,DWORD
ArgVar  lpError,DWORD EnterProc
        SaveReg <esi,edi,ebx>
IFDEF TRACEALL
        Trace_Out "Yippee, PortOpen!"
ENDIF
        mov esi,OFFSET32 PortDat           ; esi->PortDat mov ax,[CH_Com_IRQ]
        mov [esi.IRQn],al                  ;
        movzx eax,[CH_Com_Port]
        mov [esi.Port],eax                 ;

cmp [esi.Port],-1                  ; Q: Does port exist ?
        jne @F
        mov eax,IE_HARDWARE                ; report lack of hardware
        xor esi,esi                        ; flag of failure
        jmp PO_Done @@:
        cmp [esi.pData.ValidPortData],'SMTF'  ; Q: Is port already open ?
        jne @F                             ;   Y: say so
        mov eax,IE_OPEN
        xor esi,esi                        ; flag of failure
        jmp PO_Done @@:
;IFDEF COM14
;       mov ecx,4                          ; hack ask for COM5
;       VxDCall _VCOMM_Acquire_Port,<<OFFSET32 VXDNAME>,ecx,VMId,0>
;       or  eax,eax                        ; did we get it?
;       jnz @F                             ; yup
;       mov eax,IE_OPEN                    ; nope
;       xor esi,esi                        ; flag of failure
;       jmp PO_Done
;@@:
;ENDIF
        mov [VCommPortHandle],eax          ; save handle mov esi,OFFSET32 PortFun           ; setup functions struct
```

```
        mov     [esi.pData.pPortClose],OFFSET32 PortClose
        mov     [esi.pData.pPortWrite],OFFSET32 PortWrite
        mov     [esi.pData.pPortRead],OFFSET32 PortRead
        mov     [esi.pData.pPortGetCommState],OFFSET32 PortGetState
        mov     [esi.pData.pPortSetModemStatusShadow],OFFSET32
PortSetModemStatusShadow
        mov     [esi.pData.pPortGetProperties],OFFSET32 PortGetProperties
        mov     [esi.pData.pPortSetEventMask],OFFSET32 PortSetEventMask
        mov     [esi.pData.pPortEnableNotification],OFFSET32 PortEnableNotification
        mov     [esi.pData.pPortSetReadCallBack],OFFSET32 PortSetReadCallBack
        mov     [esi.pData.pPortSetWriteCallBack],OFFSET32 PortSetWriteCallBack
        mov     [esi.pData.pPortGetModemStatus],OFFSET32 PortGetModemStatus
        mov     [esi.pData.pPortGetCommConfig],OFFSET32 PortGetCommConfig
        mov     [esi.pData.pPortSetCommConfig],OFFSET32 PortSetCommConfig
        mov     [esi.pData.pPortGetError],OFFSET32 PortGetWin32Error
        mov     [esi.pData.pPortGetQueueStatus],OFFSET32 PortGetQueueStatus
        mov     [esi.pData.pPortSetCommState],OFFSET32 PortSetState
        mov     [esi.pData.pPortSetup],OFFSET32 PortSetup
        mov     [esi.pData.pPortTransmitChar],OFFSET32 PortTransmitChar
        mov     [esi.pData.pPortClearError],OFFSET32 PortClearError
        mov     [esi.pData.pPortEscapeFunction],OFFSET32 PortEscapeFunction
        mov     [esi.pData.pPortGetEventMask],OFFSET32 PortGetEventMask
        mov     [esi.pData.pPortPurge],OFFSET32 PortPurge mov     esi,OFFSET32 PortDat                    ; setup portdat struct
        mov     [esi.pData.PDfunctions],OFFSET32 PortFun    ; ptr to functions struct
        mov     ax,SIZE _PortData                       ; size
        mov     [esi.pData.PDLength],ax                 ; stow it
        mov     ax,2                                    ; version ?!
        mov     [esi.pData.PDVersion],ax                ; stuff it
        mov     eax,22                                  ; num supported functions ?!
        mov     [esi.pData.PDNumFunctions],eax          ; cram it
        mov     eax,OFFSET32 rq                         ; receive queue
        mov     [esi.pData.QInAddr],eax                 ; leave it
        mov     eax,RQSIZE                              ; rq size
        mov     [esi.pData.QInSize],eax                 ; place it
        mov     [esi.pData.QOutAddr],OFFSET32 tq        ; transmit queue
        mov     [esi.pData.QOutSize],TQSIZE             ; tq size
        mov     [esi.TxFifoTrigger],16                  ; blast 16 bytes at a time
        xor     eax,eax                                 ; zero the queue counts, etc.
        mov     [esi.pData.QInCount],eax
        mov     [esi.pData.QInGet],eax
        mov     [esi.pData.QInPut],eax
        mov     [esi.pData.QOutCount],eax
        mov     [esi.pData.QOutGet],eax
        mov     [esi.pData.QOutPut],eax mov     [vchd_int_busy],eax                     ; clear reenter flag mov     [esi.HSFlag],al                         ; show no handshaking yet
        mov     [esi.MiscFlags],al                      ; show no discarding
        mov     [esi.pData.LossByte],al                 ; reset who owns the port
        mov     [esi.SendTrigger],eax
        mov     [esi.NotifyFlags],eax                   ; reset all flags
        dec     eax
        mov     [esi.RecvTrigger],eax
        mov     [esi.ComDCB.XonLim],eax
        mov     [esi.ComDCB.XoffLim],eax
        mov     [esi.ComDCB.BitMask],fBinary mov     edx,[esi.Port]                          ; point at port base
        add     dl,ACE_LCR      ; EDX -> LCR            ; LCR
        INALDX                                          ; read it
        mov     ah,al                                   ; save it
        or      al,80h                                  ; set DLAB on
        OUTDXAL                                         ; write it
        sub     dl,ACE_LCR-ACE_DLL                      ; DLR LO
        INALDX                                          ; read
        movzx   ecx,al                                  ; save
        inc     dl                                      ; DLR HI
        INALDX                                          ; read
        mov     ch,al                                   ; combine
```

11

```
        mov al,ah                               ; restore LCR
        add dl,ACE_LCR-ACE_DLM                  ; point at LCR
        OUTDXAL                                 ; write it
        push    edx
        xor edx,edx
        xor eax,eax                             ; assume baud rate of 0
        jecxz   @F                              ; if already 0, jmp
        mov eax,01C200h
        div ecx
@@:
        pop edx                                 ; EDX -> LCR
        mov [esi.ComDCB.BaudRate],eax
        mov [esi.ComDCB.ByteSize],8 dec dl                                  ; EDX -> FCR
        .errnz  ACE_LCR-ACE_FCR-1
        INALDX
        test    al,ACE_FIFO_E2                  ; Q: FIFO already on ?
        jz  @F                                  ;    N:
        or  [esi.EFlags],fFIFOpre               ;    Y: flag it
@@:
        lea edi,[esi.pData.dwLastReceiveTime]
        mov [esi.RxTimeAddr],edi
        lea edi,[esi.pData.dwDetectedEvents]    ; initial AddrEvtDWord
        mov [esi.AddrEvtDword],edi              ; set it
        lea edi,[esi.pData.bMSRShadow]          ; initial AddrMSRShadow
        mov [esi.AddrMSRShadow],edi             ; set it and [esi.EFlags],fEFlagsMask            ; clear internal state
        or  [esi.EFlags], fFIFOForcedOff xor eax,eax         ; no errors
        mov [esi.pData.dwCommError],eax         ; reset pending bogus error codes PO_Done:
    mov ebx,lpError
    mov [ebx],eax                               ; save error for caller
    or  esi,esi
    jz  PO_Failure
    mov ebx,VMId                                ; get owner of VM
    mov [esi.OwnerVM],ebx                       ; save it
    mov [esi.pData.dwLastError],eax             ; save error code
    or  eax,eax                                 ; is everything ok ?
    jnz PO_Failure
    mov edx, [esi.Port]
    add dl, ACE_MCR                             ; edx->MCR
    INALDX                                      ; read
    or  al, ACE_OUT2                            ; set OUT2 - master interrupt
    OUTDXAL                                     ; write it
    call    UnMaskIRQ                           ; vrooom
    and [esi.pData.dwCommError], 0
    mov eax,esi                                 ; move handle to eax for return
    jmp PO_Success PO_Failure:
    xor eax,eax             ; FALSE PO_Success:
    RestoreReg <ebx,edi,esi>
    LeaveProc
    return EndProc PortOpen ;**************************************************************************
*
;
; BOOL
; PortClose(HPORT hPort);
;
```

12

```
; Parameters:
;       hPort   = port handle
; Returns:
;       TRUE if OK, else FALSE.
;=============================================================================

BeginProc PortClose, CCALL, PUBLIC

ArgVar  hPort,DWORD

EnterProc
;IFDEF TRACEALL
    Trace_Out "Yippee, PortClose!"
;ENDIF
    push    esi
    push    edi
    push    ebx mov esi,hPort       ; esi -> port information
    call    TrmCom mov     eax,[esi.OwnerVM]       ; VMId
    VxDCall _VCOMM_Release_Port, <hPort,eax>

PClose_Done:
    mov [esi.pData.dwLastError],eax test    [esi.MiscFlags],RxQInternal ; N: free if we alloced them
    jz  PClose_RxFree
    VMMCall _HeapFree,<[esi.pData.QInAddr],0>

PClose_RxFree:
    test    [esi.MiscFlags],TxQInternal
    jz  PClose_TxFree
    VMMCall _HeapFree,<[esi.pData.QOutAddr],0>

PClose_TxFree:

mov ebx,esi         ; save PortInformation struct.
    SetFlag [esi.MiscFlags], ClrTimer ; remove this port from consideration
    call    ManageTimer     ; ManageTimer SAVES EBX.

or  al,1            ; success pop ebx
    pop edi
    pop esi

LeaveProc
    return

EndProc PortClose

;*****************************************************************************
*
;
; BOOL
; PortRead(HPORT hPort, char *lpBuf, ulong NumBToRead, ulong *lpNumBRead);
;
; Parameters:
;       hPort   = port handle
;       lpBuf   -> buffer to read into
;       NumBToRead = number of bytes to read
;       lpNumBRead -> update location for number of bytes read.
;
; Returns:
;       TRUE if OK, else FALSE.
;=============================================================================

BeginProc PortRead, CCALL, PUBLIC
```

```
    ArgVar  hPort,DWORD
    ArgVar  lpBuf,DWORD
    ArgVar  NumBToRead,DWORD
    ArgVar  lpNumBRead,DWORD EnterProc
    IFDEF TRACEALL
        Trace_Out "Yippee, PortRead!"
    ENDIF
        push    esi
        push    edi
        push    ebx mov esi,hPort          ; esi -> portinformation
        mov edi,lpBuf          ; edi -> buffer
        mov ecx,NumBToRead     ; ecx = max bytes to read
        call    ReadCommString
        mov ecx,0              ; assume no error
        jnz PR_DataRead
        mov ecx,eax            ; save error/no data here
        xor eax,eax
    PR_DataRead:
        mov edx,lpNumBRead
        mov dword ptr [edx],eax
        mov [esi.pData.dwLastError],ecx ; set error
        mov eax,VMM_TRUE       ; assume success
        jecxz   PR_Done
        xor eax,eax
    PR_Done:
        pop ebx
        pop edi
        pop esi
        LeaveProc
        return
    EndProc PortRead ;*********************************************************************
*
;
; BOOL
; PortWrite(HPORT hPort, char *lpBuf, ulong NumBWrite, ulong *lpNumBWritten);
;
; Parameters:
;       hPort   = port handle
;       lpBuf   -> buffer to write from
;       NumBWrite = number of bytes to write
;       lpNumBWritten -> update location for number of bytes written
;
; Returns:
;       TRUE if OK, else FALSE.
;============================================================================
=
BeginProc PortWrite, CCALL, PUBLIC ArgVar  hPort,DWORD
    ArgVar  lpBuf,DWORD
    ArgVar  NumBWrite,DWORD
    ArgVar  lpNumBWritten,DWORD EnterProc
    IFDEF TRACEALL
        Trace_Out "Yippee, PortWrite!"
    ENDIF
        push    esi
        push    edi
        push    ebx mov esi,hPort                      ; port info
        mov ecx,NumBWrite                  ; num bytes
        mov edi,lpBuf                      ; from here
        TestMem [esi.MiscFlags],TxQSet
        jnz PW_QueueData
```

```
        mov [esi.pData.QOutAddr],edi
        mov [esi.pData.QOutSize],ecx
        mov [esi.pData.QOutCount],ecx
        xor eax,eax
        mov [esi.pData.QOutPut],eax
        mov [esi.pData.QOutGet],eax
        cmp ecx,[esi.SendTrigger]    ; Q: have we overshot the trigger ?
        jb  PW_StillBelowTrigger     ;    N: don't start looking
        and [esi.NotifyFlagsHI], NOT CN_TRANSMIT ; start looking now PW_StillBelowTrigger:
        SaveReg <ecx>          ; save the #bytes written
        cli
        call    KickTx
        sti
        RestoreReg <eax>       ; get back #bytes written
        jmp PW_BytesQueued PW_QueueData:
        push    esi
        call    WriteCommString
        pop esi PW_BytesQueued:
        mov edx,lpNumBWritten
        mov dword ptr [edx],eax ; # bytes written
        xor eax,eax             ; access to 0
        mov [esi.pData.dwLastError],eax
        inc eax                 ; success pop ebx
        pop edi
        pop esi
        LeaveProc
        return
EndProc PortWrite ;***************************************************************************
*
;
; BOOL
; PortGetState(HPORT hPort, DCB *pDcb);
;
; Parameters:
;       hPort   = port handle
;       pDcb    -> DCB to fill in
; Returns:
;       TRUE if OK, else false.
;==========================================================================
=
BeginProc PortGetState, CCALL, PUBLIC ArgVar  hPort,DWORD
ArgVar  pDcb,DWORD EnterProc
IFDEF TRACEALL
        Trace_Out "Yippee, PortGetState!"
ENDIF
        push    esi
        push    edi
        push    ebx xor eax,eax             ; access to 0
        mov esi,hPort
        mov [esi.pData.dwLastError],eax ; no error
        lea esi,[esi.ComDCB]
        mov edi,pDcb
        mov ecx,(SIZE _DCB)/4
        rep movsd inc eax                 ; success
```

```
        pop ebx
        pop edi
        pop esi

LeaveProc
        return

EndProc PortGetState

;*************************************************************************
*
;
; BOOL
; PortSetModemStatusShadow(HPORT hPort, ulong EventMask, BYTE *MSRShadow);
;
; Parameters:
;       hPort    = port handle
;       EventMask = event mask
;       MSRShadow = Addr to update WIN 3.1 style MSRShadow.
;
; Returns:
;       TRUE if OK, else FALSE.
;===========================================================================
=

BeginProc PortSetModemStatusShadow, esp, CCALL, PUBLIC

ArgVar  hPort,DWORD
ArgVar  MSRShadow,DWORD

EnterProc
IFDEF TRACEALL
    Trace_Out "Yippee, PortSetModemStatusShadow!"
ENDIF
    mov edx,hPort
    mov ecx,MSRShadow
    mov [edx.AddrMSRShadow],ecx
    xor eax,eax             ; access to 0
    mov [edx.pData.dwLastError],eax
    inc eax
    LeaveProc
    return EndProc PortSetModemStatusShadow ;*************************************************************************
*
;
; BOOL
; PortGetProperties(HPORT hPort, COMMPROP *pCommprop);
;
; Parameters:
;       hPort    = port handle
;       pCommprop -> property structure to fill in
;
; Returns:
;       TRUE if OK, else FALSE.
;===========================================================================
=

BeginProc PortGetProperties, esp, CCALL, PUBLIC

ArgVar  hPort,DWORD
ArgVar  pCommprop,DWORD

EnterProc
    Trace_Out "Yippee, PortGetProperties!"
    ;int 1
    or  al,1
    LeaveProc
```

```
        return

EndProc PortGetProperties

;*****************************************************************************
*
;
; BOOL
; PortSetEventMask(HPORT hPort, long EventMask, WORD *EventMaskLocation);
;
; Parameters:
;       hPort            = port handle
;       EventMask        = event mask to set
;       EventMaskLocation = location of event mask DWORD.
; Returns:
;       TRUE if OK, else FALSE.
;=============================================================================
=

BeginProc PortSetEventMask, CCALL, PUBLIC

ArgVar  hPort,DWORD
ArgVar  MyEventMask,DWORD
ArgVar  EventMaskLoc,DWORD

EnterProc
IFDEF TRACEALL
    Trace_Out "Yippee, PortSetEventMask!"
ENDIF
    mov edx,hPort
    mov eax,MyEventMask        ; get event mask to set
    mov [edx.EvtMask],eax      ; set it
    mov ecx,EventMaskLoc       ; get new location of event dword
    jecxz   PSEM_NoNewLoc      ; set it only if non-zero
    mov [edx.AddrEvtDWord],ecx
PSEM_NoNewLoc:
    xor eax,eax                ; access to 0
    mov [edx.pData.dwLastError],eax ; no error
    inc eax LeaveProc
    return EndProc PortSetEventMask ;*****************************************************************************
*
;
; BOOL
; PortEnableNotification(HPORT hPort, PFN lpFunc, ulong RefData);
;
; Parameters:
;       hPort   = port handle
;       lpFunc  -> pointer to function to call
;       RefData = pass in this data while calling
;
; Returns:
;       TRUE if OK, else FALSE.
;=============================================================================
=

BeginProc PortEnableNotification, CCALL, esp, PUBLIC

ArgVar  hPort,DWORD
ArgVar  lpFunc,DWORD
ArgVar  RefData,DWORD

EnterProc
IFDEF TRACEALL
    Trace_Out "Yippee, PortEnableNotification!"
ENDIF
```

```
    mov edx,hPort
    mov ecx,lpFunc
    mov eax,RefData
    and [edx.NotifyFlagsHI], NOT CN_Notify ; assume turning off notify
    mov [edx.RData],eax ; save reference data here
    mov [edx.NotifyHandle],ecx ; save proc to call
    jecxz   @F          ; Q: Is assumption correct ?
    cli
    or  [edx.NotifyFlagsHI], CN_Notify ;    N: say so
    mov ecx,[edx.AddrEvtDword]  ; get accumulated events address
    mov eax,[edx.EvtMask]   ; detected events client is
    and eax,[ecx]       ; is interested in
    sti
    or  eax,eax         ; Q: Any events seen yet ?
    jz  @F          ;   N:
    SaveReg <esi>
    mov esi,edx
    mov eax,CN_EVENT
    call    Notify_Owner
    RestoreReg <esi>
@@:
    xor eax,eax         ; access to 0
    mov [edx.pData.dwLastError],eax ; no error for this function
    inc eax LeaveProc
    return EndProc PortEnableNotification ;****************************************************************************
*
;
; BOOL
; PortSetReadCallBack(HPORT hPort, ulong RxTrigger, ulong RxCallBack,
;               ulong RxRefData);
;
; Parameters:
;       hPort       = port handle of an open port
;       RxTrigger   = high watermask for receive queue
;       RxCallBack  = when receive population becomes greater than
;                   the RxTrigger this procedure is called.
;       RxRefData   = RxCallBack is called with this reference data
;
; Returns:
;       TRUE if OK, else FALSE.
;
;==========================================================================
=

BeginProc PortSetReadCallBack,CCALL,PUBLIC

ArgVar  hPort,DWORD
ArgVar  RxTrigger,DWORD
ArgVar  RxCallBack,DWORD
ArgVar  RxRefData,DWORD EnterProc
IFDEF TRACEALL
    Trace_Out "Yippee, PortSetReadCallBack!"
ENDIF
    push    esi
    push    ebx mov ecx,RxTrigger
    mov esi,hPort mov eax,ecx
    inc eax
    jz  psr_recv_ok
    cmp ecx,[esi.pData.QInSize] ; Q: receive threshold reasonable ?
    jb  psr_recv_ok     ;   Y:
```

```
        mov ecx,[esi.pData.QInSize] ;    N:
psr_recv_ok:
    mov ebx,RxCallBack
    or  ebx,ebx           ; Q: null read callback
    jnz psr_save_read_threshold
    or  ecx,-1 psr_save_read_threshold:
    mov [esi.ReadNotifyHandle],ebx
    mov [esi.RecvTrigger],ecx
    mov ecx,RxRefData
    mov [esi.ReadNotifyRefData],ecx
    cmp [esi.pData.QInCount],0  ; Q: Does input queue contain data ?
    jne @F              ;    Y: keep dwLastReceiveTime.
    mov esi,[esi.RxTimeAddr]
    mov DWORD PTR [esi],0
@@:
    call    ManageTimer or   al,1           ; success pop ebx
    pop esi LeaveProc
    return EndProc PortSetReadCallBack ;*****************************************************************************
*
;
; BOOL
; PortSetWriteCallBack(HPORT hPort, ulong TxTrigger, ulong TxCallBack,
;               ulong TxRefData);
;
; Parameters:
;       hPort      = port handle of an open port
;       TxTrigger  = low watermask for xmit queue
;       TxCallBack = when xmit population becomes less than
;                    the TxTrigger this procedure is called.
;       TxRefData  = TxCallBack is called with this reference data
;
; Returns:
;       TRUE if OK, else FALSE.
;
;=============================================================================
=

BeginProc PortSetWriteCallBack,CCALL,PUBLIC

ArgVar hPort,DWORD
ArgVar TxTrigger,DWORD
ArgVar TxCallBack,DWORD
ArgVar TxRefData,DWORD EnterProc
IFDEF TRACEALL
    Trace_Out "Yippee, PortSetWriteCallBack!"
ENDIF
    push    esi
    push    ebx mov edx,TxTrigger
    mov esi,hPort inc edx             ; TxTrigger = -1 => no notify
    jz  psw_send_ok
    dec edx
```

```
        TestMem [esi.MiscFlags],TxQSet   ; Q: output buffer set ?
        jz   psw_send_ok       ; N:
        cmp  edx,[esi.pData.QOutSize]    ; Q: send threshold reasonable?
        jbe  psw_send_ok
        mov  edx,[esi.pData.QOutSize]

psw_send_ok:
        mov  ebx,TxCallBack
        or   ebx,ebx
        jnz  psw_save_write_threshold
        xor  edx,edx psw_save_write_threshold:
        cli
        mov  [esi.SendTrigger],edx
        mov  [esi.WriteNotifyHandle],ebx
        mov  ebx,TxRefData
        mov  [esi.WriteNotifyRefData],ebx
        cmp  [esi.pData.QOutCount],edx   ; Q: Is QOutCount >= trigger ?
        jae  psw_sendXmitWhenWMHit       ;   Y: send notification when
                                 ;       we fall below the trigger
        or   [esi.NotifyFlagsHI],CN_TRANSMIT ;   N: we are below the trigger
                           ;         at this point, don't
                           ;         generate notification
                           ;         till we reach above it.
psw_sendXmitWhenWMHit:
        sti
        or   al,1              ; success pop  ebx
        pop  esi LeaveProc
        return EndProc PortSetWriteCallBack ;***************************************************************************
*
;
; BOOL PortGetModemStatus(HPORT hPort, DWORD *pModemStatus);
;
; Parameters:
;       hPort -> port handle
;       pModemStatus -> return current modem status
;
; Exit:
;    if True, *pModemStatus contains the status
;
;==========================================================================
=
BeginProc PortGetModemStatus, CCALL, esp, PUBLIC ArgVar  hPort,DWORD
ArgVar  pModemStatus,DWORD EnterProc
        Trace_Out "Yippee, PortGetModemStatus!"
        ;int 1
        or   al,1
        LeaveProc
        return EndProc PortGetModemStatus ;***************************************************************************
*
;
; BOOL
; PortGetCommConfig(HPORT hPort, LPCOMMCONFIG lpCC, LPDWORD lpSize);
;
; Description:
```

```
;
;   If (*lpSize >= SIZE _COMM_CONFIG) then return the config
;     else fail it and return SIZE _COMM_CONFIG in *lpSize.
;
;   NOTE: The _COMM_CONFIG structure includes a Win32 style DCB
;         and NOT a ring0 DCB. So we need to call VCOMM to convert
;         our DCB into Win32 style one.
;
; Parameters:
;       hPort = port handle
;       lpCC  -> LPCOMMCONFIG
;       lpSize -> fill it with size of DCB
; Returns:
;       TRUE if OK, else FALSE.
;==========================================================================
BeginProc PortGetCommConfig,CCALL,esp,PUBLIC ArgVar   hPort,DWORD
ArgVar   lpCC,DWORD
ArgVar   lpSize,DWORD EnterProc
    Trace_Out "Yippee, PortGetCommConfig!"
    ;int 1
    or   al,1
    LeaveProc
    return EndProc PortGetCommConfig ;****************************************************************************
*
;
; BOOL
; PortSetCommConfig(HPORT hPort, LPCOMMCONFIG lpCC, DWORD dwSize);
;
;   NOTE: The _COMM_CONFIG structure includes a Win32 style DCB
;         and NOT a ring0 DCB. So we need to call VCOMM to convert
;         it to Ring0 style DCB.
;
; Parameters:
;       hPort = port handle
;       lpCC  -> LPCOMMCONFIG
;       dwSize -> size to copy
; Returns:
;       TRUE if OK, else FALSE.
;==========================================================================
BeginProc PortSetCommConfig,CCALL,esp,PUBLIC ArgVar   hPort,DWORD
ArgVar   lpCC,DWORD
ArgVar   dwSize,DWORD EnterProc
    Trace_Out "Yippee, PortSetCommConfig!"
    ;int 1
    or   al,1
    LeaveProc
    return EndProc PortSetCommConfig ;****************************************************************************
*
;
; BOOL
; PortGetWin32Error(HPORT hPort, ulong *dwError);
;
; Parameters:
;    hPort -> Port handle
```

```
;       dwError -> SERIAL.386 fills this with Win32 style error
;
; Returns: TRUE
; Uses: C style
;===============================================================================
BeginProc PortGetWin32Error,CCALL,esp,PUBLIC ArgVar  hPort,DWORD
ArgVar  dwError,DWORD EnterProc
    Trace_Out "Yippee, PortGetWin32Error!"
    ;int 1
    or   al,1
    LeaveProc
    return EndProc PortGetWin32Error ;*******************************************************************************
*
;
; BOOL
; PortGetQueueStatus(HPORT hPort, COMSTAT *pComstat);
;
; Parameters:
;       hPort    = port handle
;       pComstat -> status structure of queue to fill in.
; Returns:
;       TRUE if OK, else FALSE.
;===============================================================================
BeginProc PortGetQueueStatus, CCALL, PUBLIC ArgVar  hPort,DWORD
ArgVar  pComstat,DWORD EnterProc
IFDEF TRACEALL
    Trace_Out "Yippee, PortGetQueueStatus!"
ENDIF
    push    esi
    push    ebx
    mov esi,hPort
    mov ebx,pComstat
    call    StaCom xor eax,eax
    mov [esi.pData.dwLastError],eax
    inc eax pop ebx
    pop esi LeaveProc
    return EndProc PortGetQueueStatus ;*******************************************************************************
*
;
; BOOL
; PortSetState(HPORT hPort, DCB *pDcb, long ActionMask);
;
; Parameters:
;       hPort       -> Port handle
;       pDcb        -> DCB to set from
```

22

```
;       ActionMask  = dword specifying relevant DCB fields.
; Returns:
;       TRUE if OK, else false.
;===========================================================================
=

BeginProc PortSetState, CCALL, PUBLIC

ArgVar  hPort,DWORD
ArgVar  pDcb,DWORD
ArgVar  ActionMask,DWORD

EnterProc
    push    esi
    push    edi
    push    ebx cld
    mov esi,hPort                       ; ESI -> PortInformation test    [esi.pData.LossByte],1      ; Q: Do we own the port
    jz  PSS_SerialOwnsPort              ;    Y: continue
    call    StealPort                   ;    N: try to steal it
    mov eax,IE_Default                  ; assume failure to steal
    jz  PSS_Done                        ; jump if failed PSS_SerialOwnsPort:
    mov ebx,pDcb            ; EBX -> DCB
    TestMem ActionMask,fBaudRate    ; is client interested in setting baud?
    jz  PSS_NoBaudCheck
    call    SetCom300       ; Baud rate valid ?
    jecxz   PSS_D0          ; No, return error PSS_NoBaudCheck:
    TestMem ActionMask,<fByteSize OR fbParity OR fStopBits>
    jz  PSS_NoLCRCheck
    call    SetCom400       ; validate Byte size/parity/stop bits
    jnc PSS_NoLCRCheck PSS_D0:
    jmp PSS_Done PSS_NoLCRCheck:
;
; Parameters seem correct. Copy relevant DCB fields into our
; space and initialize ACE with relevant parameters.
;
    mov edx,[esi.Port]      ; disable interrupts first
    inc edx
    .errnz ACE_IER-1
    xor eax,eax

OUTDXAL mov ecx,ActionMask
    call    SetCom100       ; Copy DCB selectively!
    lea ebx,[esi.ComDCB]    ; set EBX -> DCB TestMem ActionMask,fTimeout ; is caller interested in timeouts ?
    jz  PSS_NoTimeoutSet
    call    SetCom200       ; get timeout masks, ah = check, al=inf
    xchg    al,ah           ; get them in correct registers
    mov word ptr [esi.MSRMask],ax
    .errnz  MSRInfinite-MSRMask-1

PSS_NoTimeoutSet:

add dl,2                ; --> LCR
    TestMem ActionMask, <fByteSize OR fbParity OR fStopBits>
    jz  PSS_NoLCRSet
    call    SetCom400       ; get line control byte
    push    eax             ; and save LCR value
```

```
        .errnz  ACE_LCR-ACE_IER-2
        or      al,ACE_DLAB      ; access divisor latch
        OUTDXAL
        mov     [esi.RxMask],ah  ; save Receive char mask
        mov     eax,edi          ; get flag mask, error mask
        and     byte ptr [esi.ComDCB.BitMask],ah ; disable parity checking
                                 ; if no parity
        mov     [esi.ErrorMask],al ; save line status error mask
        pop     eax PSS_NoLCRSet:
        TestMem ActionMask,fBaudRate
        jz      PSS_NoBaudSet push    eax
        call    SetCom300        ; get baud rate
        sub     dl,ACE_LCR-ACE_DLL  ; --> LSB of divisor latch
        mov     al,cl
        OUTDXAL
        mov     al,ch
        inc     edx              ; --> MSB of divisor latch
        .errnz ACE_DLM-ACE_DLL-1
        IO_Delay
        OUTDXAL
        add     dl,2             ; --> LCR and clear divisor bits
        .errnz ACE_LCR-ACE_DLM-2
        pop     eax
        OUTDXAL PSS_NoBaudSet:
        inc     dl               ; --> MCR
        .errnz  ACE_MCR-ACE_LCR-1

TestMem ActionMask,fBitMask ; is caller interested in this ?
        jz      PSS_NoBitmaskWork ;
; Compute initial state of DTR and RTS. If they have been disabled,
; then do not raise them, and disallow being used as a handshaking
; line. Also compute the bits to use as hardware handshake bits
; (DTR and/or RTS as indicated, qualified with the disabled flags).
;
        mov     al,byte ptr [esi.ComDCB.Bitmask] ; align DTR/RTS disable
                                 ; flags for 8250
        and     al,fRTSDisable+fDTRDisable
        rol     al,1             ;d0 = DTR, d2 = RTS  (1 = disabled)
        shr     al,1             ;'C'= DTR, d1 = RTS
        adc     al,0             ;d0 = DTR, d1 = RTS
        .errnz  fRTSDisable-00000010b
        .errnz  fDTRDisable-10000000b
        .errnz  ACE_DTR-00000001b
        .errnz  ACE_RTS-00000010b mov     ah,al            ;Save disable mask
        xor     al,ACE_DTR+ACE_RTS+ACE_OUT2
        OUTDXAL                  ;Set Modem Control Register mov     al,byte ptr [esi.ComDCB.BitMask+1] ;Get hardware
                                 ;handshake flags
        rol     al,1             ;Align flags as needed
        rol     al,1
        rol     al,1
        and     al,ACE_DTR+ACE_RTS  ;Mask bits of interest
        not     ah               ;Want inverse of disable mask
        and     al,ah            ;al = bits to handshake with
        mov     [esi.HHSLines],al  ;Save for interrupt code .errnz  fDTRFlow-2000h
        .errnz  fRTSFlow-4000h
        .errnz  ACE_DTR-00000001b
        .errnz  ACE_RTS-00000010b
```

```
        mov al,byte ptr [esi.ComDCB.BitMask] ;Compute the mask
                           ;   for the output
        shl al,1              ;  hardware handshake lines
        and al,ACE_DSR+ACE_CTS
        mov [esi.OutHHSLines],al .errnz  fOutXCTSFlow-00001000b
        .errnz  fOutXDSRFlow-00010000b
        .errnz  ACE_CTS-00010000b
        .errnz  ACE_DSR-00100000b PSS_NoBitmaskWork:

; Compute the queue count where XOff should be issued (or hardware
; lines dropped).  This will prevent having to do it at interrupt
; time.

mov eax,[esi.pData.QInSize] ; get where they want it
        sub eax,[esi.ComDCB.XoffLim];  and compute queue count
        mov [esi.XoffPoint],eax
;
; Try to drain data from the UART.
;

sub dl,ACE_MCR-ACE_FCR  ; EDX = FCR
        xor al,al
        OUTDXAL                 ; disable FIFO if present.
        mov ah,16               ; a max of 16 times
        add dl,ACE_LSR-ACE_FCR  ; EDX = LSR PSS_Try_Drain_Data:
        INALDX
        test    al,ACE_DR       ; Q: Is data in the buffer
        jz  PSS_Data_Drained    ;    N:
        sub dl,ACE_LSR-ACE_RBR  ; EDX = data register
        INALDX                  ; read in one byte
        add dl,ACE_LSR-ACE_RBR  ; EDX = LSR
        dec ah
        jnz PSS_Try_Drain_Data PSS_Data_Drained:

;
; Enable FIFO if possible
;
        and [esi.EFlags], NOT fFifoForcedOff
        sub dl,ACE_LSR - ACE_FCR   ; EDX = FCR
        test    [esi.EFlags], fNoFIFO  ; Q: Can FIFO be enabled ?
        jnz sc_nofifo           ;   N:
        mov eax, [esi.ComDCB.BaudRate]
        cmp eax, 4800
        jb  sc_nofifo
        cmp ah, -1              ; Q: Baudrate index ?
        jne sc_fifo             ;    N: baudrate >= 4800, enable it
        cmp eax, CBR_4800
        jb  sc_nofifo sc_fifo:
        mov al,ACE_EFIFO OR ACE_CRFIFO OR ACE_CTFIFO
        or  al,[esi.RxFifoTrigger]
        OUTDXAL                 ; attempt to enable it
        test    [esi.EFlags], fFIFOchkd ; Q: FIFO detect been done ?
        jnz sc_fifodone         ;  Y: enabled FIFO
        IO_Delay
        .errnz  ACE_IIDR-ACE_FCR
        INALDX
        or  [esi.EFlags],fFIFOchkd
        test    al,ACE_FIFO_E2  ; Q: FIFO enabled ?
        jz  @F
        test    al,ACE_FIFO_E1  ; Q: 16550A detected?
        jnz sc_fifodone         ; Y: enabled FIFO
@@:
```

```
        IO_Delay
        or  [esi.Eflags], fNoFIFO sc_nofifo:
        or  [esi.Eflags], fFifoForcedOff
        xor al,al
        OUTDXAL
sc_fifodone:
        sub dl,ACE_FCR-ACE_RBR   ; dx -> RBR ;
; Delay for things to settle
;
        VMMCall Get_System_Time
        mov ecx,eax
delay_loop:
        INALDX                  ; read it once
        mov eax,DELAY_TIME/2
        VMMCall Time_Slice_Sleep
        VMMCall Get_System_Time
        sub eax,ecx
        cmp eax,DELAY_TIME      ; Q: timeout reached ?
        jb  delay_loop          ;  N:

add dl,ACE_MSR          ;--> modem status reg
        INALDX                  ; Throw away 1st status read
        IO_Delay
        INALDX                  ; save 2nd for MSRWait (clear MSR int)
        push    esi
        mov esi,[esi.AddrMSRShadow]
        mov byte ptr [esi],al   ; save it
        pop esi mov [esi.HSFlag],0
;
; Win 3.0 didn't check hardware handshaking until the line status changed.
; Allow some apps to keep that behavior.
;
        TestMem [esi.ComDCB.BitMask], fWin30Compat
        jnz sc_HHSup ;
; HACK FOR SOME MODEMS:  apparently some modems set CTS, but don't set DSR
; which means that COMM.DRV won't send if the app specifies that hardware
; handshaking is based on CTS & DSR being set.
;
        mov eax,[esi.AddrMSRShadow]
        mov al,[eax]            ; get the shadow
        mov ah,[esi.OutHHSLines]
        and al,ah               ;Only leave bits of interest
        cmp al, ah              ;Q: handshaking lines ok?
        je  sc_HHSup            ;   Y:
        cmp ah, ACE_CTS OR ACE_DSR  ;Q: app looking for both high?
        jne sc_HHSdown          ;   N: skip hack
        test    [esi.EFlags], fUseDSR   ;Q: DSR is always significant?
        jnz sc_HHSdown          ;   Y: skip hack
        cmp al, ACE_CTS         ;Q: DSR low & CTS high
        jne sc_HHSdown          ;   N: skip hack
        and ah, NOT ACE_DSR     ;   Y: ignore DSR line
        mov [esi.OutHHSLines], ah
        jmp sc_HHSup sc_HHSdown:
        or  [esi.HSFlag], HHSDown OR HHSAlwaysDown ; flag handshaking down
sc_HHSup:

;
; Now, at last, interrupts can be enabled.  Don't enable the
; transmitter empty interrupt.  It will be enabled by the first
; call to KickTx.
;
```

```
        sub dl,ACE_MSR-ACE_IER   ;--> Interrupt Enable Register mov al,ACE_ERBFI+ACE_ELSI+ACE_EDSSI
        cli
        OUTDXAL              ;Enable interrupts.
        add dl,ACE_LSR-ACE_IER   ;--> Line Status Register
        IO_Delay
        INALDX               ;Clear any Line Status interrupt
        sub dl,ACE_LSR       ;--> Receiver Buffer Register
        IO_Delay
        INALDX                ;Clear any Received Data interrupt
        sti
        xor eax,eax          ;All done PSS_Done:
        mov [esi.pData.dwLastError],eax ; save error
        or  eax,eax        ; any errors ?
        jnz PSS_Failed PSS_IRQUnmasked:
        or  al,1
        jmp PSS_Success PSS_Failed:
        xor eax,eax PSS_Success:
        pop ebx
        pop edi
        pop esi
        LeaveProc
        return EndProc PortSetState ;****************************************************************************
*
;
; BOOL
; PortSetup(HPORT hPort, BYTE *RxBase, ulong RxLength, BYTE *TxBase,
;        ulong TxLength);
;
; Parameters:
;        hPort   = port handle
;        RxBase  = receive queue base
;        RxLength = receive queue's length
;        TxBase  = base of transmit queue
;        TxLength = transmit queue length
;
; Returns:
;        TRUE if OK, else false.
;============================================================================
=

BeginProc PortSetup, CCALL, esp, PUBLIC

ArgVar  hPort,DWORD
ArgVar  RxBase,DWORD
ArgVar  RxLength,DWORD
ArgVar  TxBase,DWORD
ArgVar  TxLength,DWORD EnterProc
IFDEF TRACEALL
    Trace_Out "Yippee, PortSetup!"
ENDIF
    SaveReg <edi> mov edx,hPort       ; esi -> PortInformation struct
    lea edi,[edx.pData.QInCount]
    mov ecx, (_PortData.ValidPortData - _PortData.QInCount)/4
```

```
        xor   eax,eax
        mov   [edx.pData.dwLastError],eax ; no error rep stosd              ; reset all counts .errnz  _PortData.QInGet-_PortData.QInCount-4
        .errnz  _PortData.QInPut-_PortData.QInGet-4
        .errnz  _PortData.QOutCount-_PortData.QInPut-4
        .errnz  _PortData.QOutGet - _PortData.QOutCount -4
        .errnz  _PortData.QOutPut - _PortData.QOutGet - 4
        .errnz  _PortData.ValidPortData - _PortData.QOutPut - 4 mov   edi,edx          ; EDI -> port information structure mov   eax,RxBase       ; get base of receive queue
        or    eax,eax          ; Q: external buffer ?
        jnz   PS_NoAllocRxBuffer ;   Y:
        test    [edi.MiscFlags],RxQInternal ; Q: already alloced internal buf ?
        jz    PS_AllocRxBuffer
        VMMCall _HeapReallocate,<[edi.pData.QInAddr],RxLength,0>
        or    eax,eax
        jz    PS_Done
        jnz   PS_NoAllocRxBuffer PS_AllocRxBuffer:
        VMMCall _HeapAllocate,<RxLength,0>
        or    eax,eax
        jz    PS_Fail
        or    [edi.MiscFlags],RxQInternal PS_NoAllocRxBuffer:
        mov   [edi.pData.QInAddr],eax
        mov   eax,RxLength        ; get length
        mov   [edi.pData.QInSize],eax mov   eax,TxBase       ; get base of transmit q
        or    eax,eax          ; Q: external buffer ?
        jnz   PS_NoAllocTxBuffer ;   Y:
        cmp   TxLength,0       ; N: Q: Is desired length 0 ?
        jz    PS_XmitBufferEmpty ;     Y: No buffer.....

test    [edi.MiscFlags],TxQInternal
        jz    PS_AllocTxBuffer
        VMMCall _HeapReallocate,<[edi.pData.QOutAddr],TxLength,0>
        or    eax,eax
        jz    PS_Done
        jnz   PS_NoAllocTxBuffer PS_AllocTxBuffer:
        VMMCall _HeapAllocate,<TxLength,0>  ; try allocation
        or    eax,eax                  ; Q: success ?
        jnz   PS_SetTxInternalFlag     ;    Y: set flag and continue PS_Fail:
        test    [edi.MiscFlags],RxQInternal
        jz    PS_Fail1
        and   [edi.MiscFlags],NOT RxQInternal
        VMMCall _HeapFree,<[edi.pData.QInAddr],0>

PS_Fail1:
        xor   eax,eax
        jmp   PS_Done

PS_SetTxInternalFlag:
        or    [edi.MiscFlags],TxQInternal

PS_NoAllocTxBuffer:
        SetFlag [edi.MiscFlags],TxQSet

PS_XmitBufferEmpty:
        mov   [edi.pData.QOutAddr],eax
        mov   eax,TxLength        ; get length
```

```
        mov [edi.pData.QOutSize],eax or   al,1

PS_Done:
        RestoreReg <edi>
        LeaveProc
        return

EndProc PortSetup

;****************************************************************************
*
;
; BOOL
; PortTransmitChar(HPORT hPort, char cbyte);
;
; Parameters:
;       hPort   = port handle
;       cbyte   = char to transmit
; Returns:
;       TRUE if OK, else FALSE.
;===========================================================================
=

BeginProc PortTransmitChar, CCALL, PUBLIC

ArgVar   hPort,DWORD
ArgVar   cbyte,BYTE

EnterProc
IFDEF TRACEALL
        Trace_Out "Yippee, PortTransmitChar!"
ENDIF
        push    esi
        push    ebx mov esi,hPort        ; ESI -> Portinformation
        mov eax,4000h        ; in case we cannot send
        TestMem [esi.EFlags],fTxImmed   ; is another "Immediate" char waiting?
        jnz PTC_Done         ; yes, return error
        mov ah,cbyte         ; set char for TXI
        cli
        call    TXI          ; set char to tx immediately
        sti
        xor eax,eax          ; ALL OK
PTC_Done:
        mov [esi.pData.dwLastError],eax
        or  eax,eax          ; all OK ?
        mov eax,VMM_TRUE         ; assume OK
        jz  PTC_Success
        xor eax,eax          ; NO PTC_Success:
        pop ebx
        pop esi
        LeaveProc
        return EndProc PortTransmitChar ;****************************************************************************
*
;
; BOOL
; PortClearError(HPORT hPort, COMSTAT *pComstat, ulong *pError);
;
; Parameters:
;       hPort   = port handle
;       pComstat -> status structure to fill in
```

```
;       pError  -> location to fill in error condition (reset)
; Returns:
;       TRUE if OK, else FALSE.
;==========================================================================
=

BeginProc PortClearError, CCALL, PUBLIC

ArgVar  hPort,DWORD
ArgVar  pComstat,DWORD
ArgVar  pError,DWORD

EnterProc
IFDEF TRACEALL
    Trace_Out "Yippee, PortClearError!"
ENDIF
    push    esi
    push    ebx mov esi,hPort
    mov ebx,pComstat
    call    StaCom          ; call worker xor eax,eax
    mov [esi.pData.dwLastError],eax
    xchg    eax,[esi.pData.dwCommError] ; return old error and clear
    mov edx,pError
    mov DWORD PTR [edx],eax     ; return old error here
    or  al,1                ; success pop ebx
    pop esi LeaveProc
    return EndProc PortClearError ;****************************************************************************
*
;
; BOOL
; PortEscapeFunction(HPORT hPort, long function, long Indata, long Outdata);
;
; Parameters:
;       hPort   = port handle
;       function = escape code
;       Indata  = optional data
;       Outdata = optional data
;
; Returns:
;       TRUE if OK, else FALSE.
;==========================================================================
=

BeginProc PortEscapeFunction, CCALL, PUBLIC

ArgVar  hPort,DWORD
ArgVar  funct,DWORD
ArgVar  Indata,DWORD
ArgVar  Outdata,DWORD EnterProc
IFDEF TRACEALL
    Trace_Out "Yippee, PortEscapeFunction!"
ENDIF push    esi
    push    ebx mov ebx,funct
```

```
        mov esi,hPort          ; esi -> portinformation
        xor eax,eax            ; assume error
        mov [esi.pData.dwLastError],IE_EXTINVALID
        cmp bl, PEEKCHAR
        jne @F
        mov [esi.pData.dwLastError],eax
        cmp [esi.pData.QInCount], eax
        je  PEF_Done
        mov eax, [esi.pData.QInAddr]
        add eax, [esi.pData.QInGet]
        mov cl, [eax]
        mov eax, OutData
        mov BYTE PTR [eax], cl
        jmp PEF_NoOutData
@@:
        cmp bl,ENABLETIMERLOGIC
        jnz @F
        ClrFlag [esi.MiscFlags],ClrTimer
        jmp PEF_NoOutData
@@:
        cmp bl,IGNOREERRORONREADS
        jnz @F
        SetFlag [esi.MiscFlags],IgnoreCommError
        jmp PEF_NoOutData
@@:
        cmp bl,CLRTIMERLOGIC
        jnz @F
        SetFlag [esi.MiscFlags],ClrTimer
        jmp PEF_NoOutData
@@:
        cmp bl,SETUPDATETIMEADDR
        jne @F
        mov eax,InData
        mov [esi.RxTimeAddr],eax
        jmp PEF_NoOutData
@@:
        cmp bl,CLEARBREAK
        ja  PEF_Done mov [esi.pData.dwLastError],eax ; reset error
        call    ExtnFcn
        mov ecx,OutData
        jecxz   PEF_NoOutData
        mov [ecx],eax          ; return this information PEF_NoOutData:
        or  al,1               ; success PEF_Done:
        pop ebx
        pop esi
        LeaveProc
        return EndProc PortEscapeFunction ;****************************************************************************
*
;
; BOOL
; PortGetEventMask(HPORT hPort, long EventMask, long *OldEventMask);
;
; Parameters:
;       hPort    = port handle
;       EventMask = mask of events to clear
;       OldEventMask -> location where old mask should be returned.
;
; Returns:
;       TRUE if OK, else FALSE.
;===========================================================================
=
```

```
BeginProc PortGetEventMask, CCALL, PUBLIC

ArgVar   hPort,DWORD
ArgVar   MyEventMask,DWORD
ArgVar   OldEventMask,DWORD

EnterProc
    Trace_Out "Yippee, PortGetEventMask!"
    ;int 1
    or   al,1

LeaveProc
    return

EndProc PortGetEventMask

;*****************************************************************************
*
;
; BOOL
; PortPurge(HPORT hPort, DWORD dwQueue);
;
; Parameters:
;        hPort   = port handle
;        dwQueue = queue type
;
; Returns:
;        TRUE if OK, else FALSE.
;=============================================================================
=

BeginProc PortPurge, CCALL, PUBLIC

ArgVar   hPort,DWORD
ArgVar   dwQueue,DWORD

EnterProc
IFDEF TRACEALL
    Trace_Out "Yippee, PortPurge!"
ENDIF
    push    esi
    push    ebx mov esi,hPort
    mov ebx,dwQueue
    call    Flush
PP_Done:
    xor eax,eax              ; access to 0
    mov [esi.pData.dwLastError],eax
    inc eax                  ; success pop ebx
    pop esi
    LeaveProc
    return EndProc PortPurge ;****
;
; ManageTimer
;
; If any COMM port is open and a receive trigger is set, then starts the
; timer is not already active, else stops it
;
; Entry:
;    NONE
; Exit:
;    NONE
; Uses:
```

```
;       Everything except EDI,EBX
;
BeginProc ManageTimer,PUBLIC mov eax,OFFSET32 PortDat
;hack   TestMem [eax.MiscFlags],ClrTimer ; Q: Timer logic to be skipped ?
;hack   jnz MT_Done             ; Y:
        cmp [eax.RecvTrigger],-1    ; Q: Owner wants notification?
        jne MT_SetTimer         ; Y: Check if xor esi,esi
        xchg    esi,TimeOutHandle
        VMMCall Cancel_Time_Out
        jmp MT_Done MT_SetTimer:
        cmp TimeOutHandle,0     ; Q: Have we set a timer already?
        jnz MT_Done             ; Y: get out
        mov eax,100             ; N: set a 100 ms timer
        mov edx,esi             ; List handle is ref data
        mov esi,OFFSET32 TimerProc
        VMMCall Set_Global_Time_Out
        mov TimeOutHandle,esi MT_Done:
        ret
EndProc ManageTimer ;*****************************************************************************
*
;
; TimerProc
;
; Description:
;   Checks if any port is active. If a port owner wants a receive
;   notification and none has been sent and at least one byte is in the
;   queue, then it will call Notify_Owner for that port
;
; Entry:
;   EDX -> PortInfoHandle
; Exit:
;   None
; Uses:
;   ALL
;=============================================================================
=

BeginProc TimerProc, PUBLIC mov [TimeOutHandle],0   ; reset timer handle mov eax,OFFSET32 PortDat TP_Lp:
        jz  TP_Done             ; end of list TestMem [eax.MiscFlags],ClrTimer ; Q: Owner wants timer notifications?
        jnz TP_Done             ; N:
        cmp [eax.RecvTrigger],-1    ; Q: Owner wants notification?
        je  TP_Done             ; N: skip notify
        cmp [eax.pData.QInCount],0 ; Q: anything in input queue ?
        je  TP_Done             ; N: skip notify
        test    [eax.NotifyFlagsHI],CN_RECEIVE ;Q: timeout notify sent ?
        jnz TP_Done             ; N: skip notify
        xor [eax.NotifyFlagsHI],CN_IDLE ; Q: first timer call ?
        js  TP_Done             ; Y: skip notify push    eax
        push    esi
        mov esi,eax             ; ESI -> PortInformation struct
        mov eax,CN_RECEIVE      ; message id.
        call    Notify_Owner
```

```
        pop esi
        pop eax

TP_Done:
        mov eax,100
        mov edx,esi              ; RefData = PortInfoHandle
        mov esi,OFFSET32 TimerProc
        VMMCall Set_Global_Time_Out
        mov [TimeOutHandle],esi  ; save timer handle ret EndProc TimerProc ;---------------------------------------------------------------------------
;****************************************************************************
;
; Serial_PortHandler
;
; Description:  Serial_PortHandler is called with VPICD with
;       EDX = PortInformation structure for the port.
;       Serial_PortHandler checks to see if the interrupt is for
;       us and processes it if so. Else, it lets it go.
;       The interrupts are prioritized in the following order
;
;       1. Line status
;       2. read data avail
;       3. xmit buffer empty
;       4. modem service interrupt
;
;       This handler continues to service till all interrupts have
;       been satisfied
; Entry:
;       EBX = VM handle.
;       Interrupt disabled.
; Exit:
;       CLC if for us, else STC.
; Uses:
;       ALL.
;****************************************************************************

BeginProc Serial_PortHandler, High_Freq, PUBLIC

;Trace_Out "INT!"

mov edx,OFFSET32 PortDat
        mov esi,edx
        test    [esi.pData.LossByte],1   ; Q: Do we own the IRQ ?
        jnz IntReflect                   ;    N: get out mov edx,[esi.Port]               ; get COMM I/O port
        add dl,ACE_IIDR                  ; --> interrupt ID register
        INALDX
        test    al,1                     ; Q: interrupts pending
        jnz IntReflect                   ;    N:
        mov ecx,[esi.AddrEvtDWord]       ; get the address
        mov ecx,[ecx]                    ; get the event dword
        push    ecx
        jmp IntLoop10

InterruptLoop_ChkTx:
        cmp [esi.pData.QOutCount],0      ; output queue empty?
        je  InterruptLoop                ;    Y: Don't chk Tx
        pop edx
        push    edx
        dec edx                          ; to IER
        INALDX
        and al,NOT ACE_ETBEI             ; disable it
```

```
        IO_Delay
        IO_Delay
        OUTDXAL
        or   al,ACE_ETBEI              ; enable it again
        IO_Delay
        IO_Delay
        OUTDXAL
        IO_Delay
        IO_Delay
        IO_Delay
        OUTDXAL InterruptLoop:
        pop edx                        ; Get ID reg I/O address
        INALDX                         ; get interrupt ID
        test    al,1                   ; interrupts need servicing ?
        jnz IntLoop20                  ; NO, all done IntLoop10:
        and eax,07h
        push    edx                    ; save ID register
        jmp [SrvTab+eax*2]             ; service the interrupt IntLoop20:
        mov eax,[esi.EvtMask]          ; mask the event dword to only the
        mov ebx,[esi.AddrEvtDWord]     ; get address
        and eax,[ebx]                  ; get only user specified bits
        mov dword ptr [ebx],eax        ; set the event dword
        pop ebx
        test    [esi.NotifyFlagsHI],CN_Notify
        jz  ci_exit
        not ebx
        and eax,ebx                    ; bits set in ax are new events
        jz  ci_exit                    ; no new event ci_new_events:
        mov eax,CN_EVENT
        call    notify_owner ci_exit:

;
; We acquire the port by number (1-4). So if the port handle returned
; to us by VCOMM_Acquire_Port is > 4, then we assume that it is actually
; a valid VCD COM handle. In that case, we update the VCD_Last_Use for
; contention detection. If this appears dangerous, we must add a service
; to VCD which takes a handle, validates it and then updates the VCD_Last_Use
; entry.
;
%OUT last_use?
;       mov edx,[esi.VCD_Data]
;       or  dh,dh           ; Q: is this a valid handle ?
;       jz  NP_NoVCD        ;    N:
;
;       VMMCall Get_Last_Updated_System_Time
;       mov [edx.VCD_Last_Use],eax ;NP_NoVCD:
;       mov eax,[esi.IRQHandle]
;       VxDCall VPICD_Phys_EOI      ; ack it anyway
;       mov edx,[esi.MyIRQStruc]    ; Get struct for IRQ
;       cmp [edx.OldMask],0    ; Q: Was this unmasked to begin with?
;       je  IntReflect         ;    Y: Reflect it
        clc                    ; we handled it
        ret IntReflect:
        stc
        ret EndProc Serial_PortHandler
```

```
;*****************************************************************************
;
; ModemStatus
;
; Description:      modem status interrupt handler
;
; Entry:        ESI -> DEB
;           EDX = port.IIDR
;
; Returns:      none
; Uses:
;           EAX,EBX,ECX,EDI,FLAGS.
;
;==============================================================================
BeginProc ModemStatus,PUBLIC ; get the modem status value and shadow it for MSRWait add dl,ACE_MSR-ACE_IIDR ; --> modem status register
    INALDX
    mov ebx,[esi.AddrMSRShadow]
    mov byte ptr [ebx],al    ; save MSR data for others
    mov ch,al                ; save a local copy ; Create the event mask for the delta dignals movzx   eax,al
    mov ah,al
    shr eax,2           ; just a lot of shifting
    shr ah,1
    shr eax,3
    and eax,EV_CTS+EV_DSR+EV_RLSD+EV_Ring
    mov ebx,[esi.AddrEvtDWord]
    or  dword ptr [ebx],eax mov ah,ch
    shr ah,2
    and eax,EV_CTSS+EV_DSRS
    or  dword ptr [ebx],eax mov ah,ch
    shr ah,3
    and eax,EV_RLSDS
    or  dword ptr [ebx],eax mov ah,ch
    shl ah,3
    and eax,EV_RingTe
    or  dword ptr [ebx],eax ModemStatus10:
    mov al,[esi.OutHHSLines]     ; get output HW handshake lines
    or  al,al            ; any lines that must be set?
    jz  ModemStatus40        ; no HW handshake or output
    and ch,al            ; mask bits of interest
    cmp ch,al            ; lines set for xmit?
    je  ModemStatus20        ; Yes
    or  [esi.HSFlag],HHSDown     ; show hw lines have dropped ModemStatus30:
    jmp InterruptLoop ModemStatus40:
    jmp InterruptLoop_ChkTx ; lines are set for xmit. Kick an xmit interrupt if needed ModemStatus20:
    and [esi.HSFlag],NOT (HHSDown OR HHSAlwaysDown)
                ; show HW lines back up.
```

```
    mov ecx,[esi.pData.QOutCount] ; output queue empty?
    jecxz   ModemStatus30       ;  Yes, return to interruptloop
    jmp FakeXmitEmpty       ; restart transmit EndProc ModemStatus ;****************************************************************************
*
;
; LineStat
;
; Description:  Line Status Interrupt Handler
;       Break detection is handled and set in the event word if
;       enabled.  Other errors (overrun, parity, framing) are
;       saved for the data available interrupt.
;
;       This routine used to fall into DataAvail for the bulk of
;       its processing. This is no longer the case...
;       A very popular internal modem seems to operate differently
;       than a real 8250 when parity errors occur.  Falling
;       into the DataAvail handler on a parity error caused the
;       same character to be received twice.  Having this routine
;       save the LSR status, and return to InterruptLoop fixes the
;       problem, and still works on real COMM ports.  The extra
;       overhead isn't a big deal since this routine is only
;       entered when there is an exception like a parity error.
;
;       This routine is JUMPED to, and will perform a JUMP back into
;       the dispatch loop.
;
; Entry:
;       ESI --> DEB
;       EDX =  Port.IIDR
; Exit:
;       None
; Uses:
;       EAX,EBX,FLAGS
;===========================================================================
=

BeginProc LineStat,PUBLIC mov ebx,[esi.AddrEvtDWord]
    or  BYTE PTR [ebx],EV_Err   ;Show line status error add dl,ACE_LSR-ACE_IIDR ;--> Line Status Register
    INALDX
    test    al,ACE_PE+ACE_FE+ACE_OR ;Parity, Framing, Overrun error?
    jz  @f mov [esi.LSRShadow],al  ;yes, save status for DataAvail
@@:
    test    al,ACE_BI       ;Break detect?
    jz  InterruptLoop_ChkTx ;Not break detect interrupt or  BYTE PTR [ebx],EV_Break ;Show break jmp InterruptLoop_ChkTx LineStat    endp ;****************************************************************************
*
;
; DataAvail
;
; Description:
;       The available character is read and stored in the input queue.
;       If the queue has reached the point that a handshake is needed,
;       one is issued (if enabled).  EOF detection, Line Status errors,
;       and lots of other stuff is checked.
;
```

```
;    This routine is jumped to, and will perform a jump back into
;    the dispatch loop.
; Entry:
;          ESI -> DEB
;          EDX = Port.IIDR
; Exit:
;          None.
; Uses:
;          EAX,EBX,ECX,EDI,FLAGS
;
;================================================================================
=

BeginProc DataAvail,PUBLIC

VMMCall Get_Last_Updated_System_Time    ; update this for VCOMM
     mov ecx,[esi.RxTimeAddr]
     mov DWORD PTR [ecx],eax sub dl,ACE_IIDR-ACE_RBR ;--> receiver buffer register
     INALDX            ;Read received character IFDEF TRACEALL
     Trace_Out "Data Avail #EAX"
ENDIF
     and [esi.NotifyFlagsHI], NOT CN_Idle ; flag as not idle IFDEF   DEBUG
     inc [esi.NumDataInts]
ENDIF
     mov ah,[esi.LSRShadow]   ;what did the last Line Status intrpt
     mov bh,ah          ; have to say?
     or  ah,ah
     jz  DataAvailNoLSRErr IFDEF   DEBUG
     test    ah,ACE_OR
     jz  @F
     inc [esi.OverrunErrors]
@@:
     test    ah,ACE_PE
     jz  @F
     inc [esi.ParityErrors]
@@:
     test    ah,ACE_FE
     jz  @F
     inc [esi.FramingErrors]
@@:
ENDIF
     and ah,[esi.ErrorMask]   ;there was an error, record it
     or  byte ptr [esi.pData.dwCommError],ah
     mov [esi.LSRShadow],0
     .errnz  ACE_OR-CE_OVERRUN    ;Must be the same bits
     .errnz  ACE_PE-CE_RXPARITY
     .errnz  ACE_FE-CE_FRAME
     .errnz  ACE_BI-CE_BREAK DataAvailNoLSRErr:
;
; Regardless of the character received, flag the event in case
; the user wants to see it.
;
     mov ecx,[esi.AddrEvtDWord]
     or  byte ptr [ecx],EV_RxChar ;Show a character received
     .errnz HIGH EV_RxChar
;
; Check the input queue, and see if there is room for another
; character.  If not, or if the end of file character has already
; been received, then go declare overflow.
;
DataAvail00:
```

```
    mov ecx,[esi.pData.QInCount]  ;Get queue count (used later too)
    cmp ecx,[esi.pData.QInSize]   ;Is queue full?
    jge DataAvail20       ;  Yes, comm overrun
    test    [esi.EFlags],fEOF     ;Has end of file been received?
    jnz DataAvail20       ;  Yes - treat as overflow
;
; Test to see if there was a parity error, and replace
; the character with the parity character if so
;
    test    bh,ACE_PE         ;Parity error
    jz  DataAvail25       ;  No
    TestMem [esi.ComDCB.BitMask],fPErrChar ;Parity error
                  ;  replacement character?
    jz  DataAvail25       ;  No
    mov al,[esi.ComDCB.ErrorChar] ;  Yes, get parity replacement char
;
; Skip all other processing except event checking and the queing
; of the parity error replacement character
;
    jmp DataAvail80       ;Skip all but event check, queing DataAvail20:
IFDEF   DEBUG
    inc [esi.ArtificialErr] ; Due to queue overrun
ENDIF
    or  [esi.pData.dwCommError],CE_RXOVER ;Show queue overrun
    jmp DataAvail50
;
; See if we need to strip null characters, and skip
; queueing if this is one.  Also remove any parity bits.
;
DataAvail25:
    and al,[esi.RxMask]       ;Remove any parity bits
    jnz DataAvail30       ;Not a Null character
    TestMem [esi.ComDCB.BitMask],fNullStrip   ;Are we stripping
                  ;  received nulls?
    jnz DataAvail50       ;  Yes, put char in the bit bucket
;
; Check to see if we need to check for EOF characters, and if so
; see if this character is it.
;
DataAvail30:
    TestMem [esi.ComDCB.BitMask],fBinary ;Is this binary stuff?
    jnz DataAvail60       ;  Yes, skip EOF check
    cmp al,[esi.ComDCB.EOFChar]   ;Is this the EOF character?
    jnz DataAvail60       ;  No, see about queing the charcter
    or  [esi.EFlags],fEOF     ;Set end of file flag
DataAvail50:
    jmp DataAvail140          ;Skip the queing process
;
; If output XOn/XOff is enabled, see if the character just received
; is either an XOn or XOff character.  If it is, then set or
; clear the XOffReceived flag as appropriate.
;
DataAvail60:
    TestMem [esi.ComDCB.BitMask],fOutX ;Output handshaking?
    jz  DataAvail80       ;  No
    cmp al,[esi.ComDCB.XoffChar] ;Is this an X-Off character?
    jnz DataAvail70       ;  No, see about XOn or Ack
    or  [esi.HSFlag],XOffReceived ;Show XOff received, ENQ or ETX [rkh]
    TestMem [esi.ComDCB.BitMask],<fEnqAck+fEtxAck> ;Enq or Etx Ack?
    jz  DataAvail50       ;  No
    cmp ecx,[esi.ComDCB.XonLim] ;See if at XOn limit
    ja  DataAvail50       ;  No
    and [esi.HSFlag],NOT XOffReceived ;Show ENQ or ETX not received
    and [esi.HSFlag], NOT XOnPending+XOffSent
    mov al, [esi.ComDCB.XonChar]
    call    OutHandshakingChar
    jmp DataAvail50       ;Done DataAvail70:
    cmp al,[esi.ComDCB.XonChar] ;Is this an XOn character?
```

```
        jnz   DataAvail80      ;  No, just a normal character
        and   [esi.HSFlag],NOT XOffReceived
        TestMem [esi.ComDCB.BitMask],<fEnqAck+fEtxAck> ;Enq or Etx Ack?
        jz    DataAvail75      ;  No - jump to FakeXmitEmpty to get
                               ;    transmitting going again
        and   [esi.HSFlag],NOT EnqSent DataAvail75:
        jmp   FakeXmitEmpty    ;Restart transmit
;
; Now see if this is a character for which we need to set an event as
; having occured. If it is, then set the appropriate event flag
;
DataAvail80:
        cmp   al,[esi.ComDCB.EvtChar1] ;Is it the event generating character?
        jne   DataAvail90      ;  No
        mov   ebx,[esi.AddrEvtDWord]
        or    byte ptr [ebx],EV_RxFlag   ;Show received specific character
;
; Finally, a valid character that we want to keep, and we have
; room in the queue. Place the character in the queue.
; If the discard flag is set, then discard the character
;
DataAvail90:
        test  [esi.MiscFlags],Discard ;Discarding characters ?
        jnz   DataAvail50      ;  Yes mov   edi,[esi.pData.QInAddr]  ;Get queue base pointer mov   ebx,[esi.pData.QInPut]   ;Get index into queue
        mov   BYTE PTR [ebx+edi],al    ;Store the character
        inc   ebx              ;Update queue index
        cmp   ebx,[esi.pData.QInSize]  ;See if time for wrap-around
        jc    DataAvail100             ;Not time to wrap
        xor   ebx,ebx                  ;Wrap-around is a new zero pointer DataAvail100:
        mov   [esi.pData.QInPut],ebx   ;Store updated pointer
        inc   ecx              ;And update queue population
        mov   [esi.pData.QInCount],ecx
;
; If flow control has been enabled, see if we are within the
; limit that requires us to halt the host's transmissions
;
        cmp   ecx,[esi.XOffPoint] ;Time to see about XOff?
        jc    DataAvail120     ;  Not yet
        test  [esi.HSFlag],HSSent ;Handshake already sent?
        jnz   DataAvail120     ;  Yes, don't send it again mov   ah,[esi.HHSLines]    ;Should hardware lines be dropped?
        or    ah,ah            ;  (i.e. do we have HW HS enabled?)
        jz    DataAvail110     ;  No
        add   dl,ACE_MCR       ;  Yes
        INALDX                 ;Clear the necessary bits
        not   ah
        and   al,ah
        or    [esi.HSFlag],HHSDropped ;Show lines have been dropped
        OUTDXAL                ;  and drop the lines
        sub   dl,ACE_MCR DataAvail110:
        TestMem [esi.ComDCB.BitMask],fInX  ;Input Xon/XOff handshaking
        jz    DataAvail120     ;  No
        or    [esi.HSFlag], XOffSent
        mov   al, [esi.ComDCB.XoffChar]
        call  OutHandshakingChar DataAvail120:
        cmp   ecx, [esi.RecvTrigger]  ;Q: time to call owner's callback?
        jb    short DataAvail130  ;  N:

test  [esi.NotifyFlagsHI], CN_RECEIVE
```

```
        jnz short DataAvail140  ; jump if notify already sent and
                                ;   data in buffer hasn't dropped
                                ;   below threshold
        push    OFFSET32 DataAvail140
        mov eax, CN_RECEIVE
%OUT probably should just set a flag and notify after EOI
        jmp notify_owner DataAvail130:
        and [esi.NotifyFlagsHI], NOT CN_RECEIVE DataAvail140:
        pop edx
        push    edx
        add dl, ACE_LSR-ACE_IIDR
        INALDX
        test    al, ACE_DR      ;Q: more data available?
        jz  @F                  ;   N:
        sub dl, ACE_LSR         ;   Y: go read it
        IO_Delay
        IO_Delay
        INALDX                  ;Read available character
        jmp DataAvail00
@@:
        jmp InterruptLoop_ChkTx EndProc DataAvail
BeginProc OutHandshakingChar, NO_PROLOG add dl, ACE_LSR
        mov ah, al
@@:
        INALDX
        test    al, ACE_THRE
        jz  @B
        sub dl, ACE_LSR
        mov al, ah
        OUTDXAL
        ret EndProc OutHandshakingChar ;****
;
; FakeXmitEmpty
;
; Description:
;       Is JUMPED to from various places AND JUMPS out to
;       variuos places!!!
; Entry:
;       ESI -> DEB
;       EDX = Port.IIDR
; Exit:     None
; Uses:     EAX,EBX,ECX,EDI
;
BeginProc FakeXmitEmpty,PUBLIC pop edx
    push    edx ; "KICK" the xmitter empty interrupt routine into operation.

dec dl
        .errnz  ACE_IIDR-ACE_IER-1
        INALDX              ; get current IER state
        test    al,ACE_ETBEI    ; interrupt enabled?
        jnz @F              ;   Yes, don't reenable it
        or  al,ACE_ETBEI        ;   No, enable it
        OUTDXAL
        IO_Delay
        IO_Delay
        OUTDXAL             ; 8250,8250-B bug requires 2 outs
```

```
@@:
    add  dl,ACE_LSR-ACE_IER  ; --> line status reg
    IO_Delay
    IO_Delay
    INALDX              ; is Xmit really empty?
    sub  dl,ACE_LSR-ACE_THR  ; --> xmitter holding reg
    test al,ACE_THRE
    jnz  XmitEmpty5     ;  Y: send next char
    jmp  InterruptLoop  ;  N: return to processing loop
EndProc FakeXmitEmpty ;*********************************************************************
*
;
; XmitEmpty
;
; Description:
;       handles the case whne transmitter empty interrupt occurs.
;       This is JUMPED TO AND OUT OF!!!!
;
; Entry:    EDX = Port.IIDR
;           ESI -> DEB
; Exit:     None
; Uses:     EAX,EBX,ECX,EDI,FLAGS
;
;=====================================================================
=
BeginProc XmitEmpty,PUBLIC add  dl,ACE_LSR-ACE_IIDR              ;--> Line Status Register
    IO_Delay
    INALDX                                ;Is xmit really empty?
    sub  dl,ACE_LSR-ACE_THR               ;--> Transmitter Holding Register
    test al,ACE_THRE
    jz   XmitEmpty90                      ;Transmitter not empty, cannot
send
;
; If the hardware handshake lines are down, then XOff/XOn cannot
; be sent.  If they are up and XOff/XOn has been received, still
; allow us to transmit an XOff/XOn character.  It will make
; a dead lock situation less possible (even though there are
; some which could happen that cannot be handled).
;
XmitEmpty5:
    mov  ah,[esi.HSFlag]                  ;Get handshaking flag
    test ah,HHSDown+BreakSet              ;Hardware lines down or break set?
    jnz  XmitEmpty100                     ;  Yes, cannot transmit ; Give priority to any handshake character waiting to be
; sent.  If there are none, then check to see if there is
; an "immediate" character to be sent.  If not, try the queue.

XmitEmpty10:
    TestMem [esi.ComDCB.BitMask],<fEnqAck+fEtxAck>  ;Enq or Etx Ack?
    jnz  XmitEmpty40                                ;  Yes XmitEmpty15:
    test ah,HSPending                     ;XOff or XOn pending
    jz   XmitEmpty40                      ;  No XmitEmpty20:
    and  ah,NOT XOnPending+XOffSent
    mov  al,[esi.ComDCB.XonChar]          ;Get XOn character XmitEmpty30:
    mov  [esi.HSFlag],ah                  ;Save updated handshake flag
    jmp  XmitEmpty110                     ;Go output the character ; If any of the lines which were specified for a timeout are low, then
; don't send any characters.  Note that by putting the check here,
; XOff and Xon can still be sent even though the lines might be low.
```

```
; Also test to see if a software handshake was received.  If so,
; then transmission cannot continue.  By delaying the software check
; to here, XOn/XOff can still be issued even though the host told
; us to stop transmission.

XmitEmpty40:
    test    ah,CannotXmit                      ;Anything preventing transmission?
    jnz XmitEmpty100                           ; Yes, disarm and exit ; If a character has been placed in the single character "transmit
; immediately" buffer, clear that flag and pick up that character
; without affecting the transmitt queue.

XmitEmpty45:
    test    [esi.EFlags],fTxImmed              ;Character to xmit immediately?
    jz  XmitEmpty515                           ; No, try the queue
    and [esi.EFlags],NOT fTxImmed              ;Clear xmit immediate flag
    mov al,[esi.ImmedChar]                     ;Get char to xmit
    jmp XmitEmpty110                           ;Transmit the character XmitEmpty515:
    mov ecx,[esi.pData.QOutCount]              ;Output queue empty?
    jecxz   XmitEmpty90                        ; Yes, go set an event test [esi.EFlags],fNOFifo OR fNoTxFifo OR fFIFOForcedOff    ; Q: Is FIFO present ?
    jnz XmitEmptyNoOptimize                                     ; N: no optimization TestMem [esi.ComDCB.BitMask],<fEtxAck OR fEnqAck>           ; Q: is Etx/Enq in use?
    jz  XmitEmptyOptimize                                       ; N: try to optimize XmitEmptyNoOptimize:
    TestMem [esi.ComDCB.BitMask],fEtxAck    ;Etx Ack?
    jz  XmitEmpty55    ;  No
    mov ecx,[esi.QOutMod]    ;Get number bytes sent since last ETX
    cmp ecx,[esi.ComDCB.XonLim] ;At Etx limit yet?
    jne XmitEmpty51     ;  No, inc counter
    mov [esi.QOutMod],0     ;  Yes, zero counter
    or  [esi.HSFlag],EtxSent     ;Show ETX sent
    jmp XE_sendXOFF ; no more characters to transmit.  Flag this as an event.

XmitEmpty90:
    mov ebx,[esi.AddrEvtDWord]
    or  byte ptr [ebx],EV_TxEmpty
;
; Cannot continue transmitting (for any of a number of reasons).
; Disable the transmit interrupt.  When it's time resume, the
; transmit interrupt will be reenabled, which will generate an
; interrupt.
;
XmitEmpty100:
    inc edx           ;--> Interrupt Enable Register
    .errnz  ACE_IER-ACE_THR-1
    INALDX            ;I don't know why it has to be read
    and al,NOT ACE_ETBEI    ;  first, but it works this way
XmitEmpty110:
    IO_Delay
    IO_Delay
    OUTDXAL
    jmp InterruptLoop XmitEmpty51:
    inc ecx             ; Update counter
    mov [esi.QOutMod],ecx   ; Save counter
    jmp XmitEmpty59       ; Send queue character XmitEmpty55:
```

```
        TestMem [esi.ComDCB.BitMask],fEnqAck    ;Enq Ack?
        jz XmitEmpty59     ;  No, send queue character
        mov ecx,[esi.QOutMod]   ;Get number bytes sent since last ENQ
        or  ecx,ecx          ;At the front again?
        jnz XmitEmpty56      ;  No, inc counter
        mov [esi.QOutMod],1   ;  Yes, send ENQ
        or  [esi.HSFlag],EnqSent    ;Show ENQ sent
XE_sendXOFF:
        mov al,[esi.ComDCB.XoffChar]
        jmp XmitEmpty110           ;Go output the character XmitEmpty56:
        inc ecx             ;Update counter
        cmp ecx,[esi.ComDCB.XonLim] ;At end of our out buffer len?
        jne XmitEmpty58      ;  No
        xor ecx,ecx          ;Show at front again.

XmitEmpty58:
        mov [esi.QOutMod],ecx    ;Save counter

XmitEmpty59:
        mov edi,[esi.pData.QOutAddr] ; get queue base pointer
        mov ebx,[esi.pData.QOutGet] ; get ptr into queue
        mov al,[ebx+edi]         ; get char inc ebx           ; update q pointer
        cmp ebx,[esi.pData.QOutSize] ; time for wrap-around?
        jc  XmitEmpty60     ;  Nope
        xor ebx,ebx          ; wrap by zeroing index XmitEmpty60:
        mov [esi.pData.QOutGet],ebx ; save queue index
        mov ecx,[esi.pData.QOutCount] ; output queue empty?
        dec ecx          ; dec # of bytes in queue
        mov [esi.pData.QOutCount],ecx ;  and save new population OUTDXAL             ; send char XmitEmptyMerge:

mov ebx,[esi.AddrEvtDWord]
        or  dword ptr [ebx],EV_TXCHAR ; set the flag so that user can see cmp ecx,[esi.SendTrigger]   ; Q: time to call owners' callback?
        jae InterruptLoop        ;  N:

test    [esi.NotifyFlagsHI],CN_TRANSMIT
        jnz InterruptLoop      ; jump if notify has been sent and
                              ; data in buffer hasn't raised above
                              ; threshold
        push    OFFSET32 InterruptLoop
        mov eax,CN_TRANSMIT
        jmp notify_owner EndProc XmitEmpty PUBLIC XmitEmptyOptimize
XmitEmptyOptimize:

movzx   ecx,[esi.pData.TxFifoTrigger]     ; Max # of chars to write
        cmp ecx,[esi.pData.QOutCount]             ; Q: below # chars avail ?
        jbe XEO_LessThanSizeOfFIFO                ;    Y: go write them
        mov ecx,[esi.pData.QOutCount]             ;    N: write only so many.

XEO_LessThanSizeOfFIFO:

sub [esi.pData.QOutCount],ecx             ; final count of chars left
        mov edi,[esi.pData.QOutAddr]              ; Base of Xmit Queue
        mov ebx,[esi.pData.QOutGet]               ; offset into q to get data
from XEO_CharBlastLoop:
```

```
        mov     al,[ebx+edi]
        OUTDXAL inc     ebx
        cmp     ebx,[esi.pData.QOutSize]
        jc      XEO_NoWrapYet
        xor     ebx,ebx XEO_NoWrapYet:

loop    XEO_CharBlastLoop mov     [esi.pData.QOutGet],ebx
        mov     ecx,[esi.pData.QOutCount]
        jmp     XmitEmptyMerge ;***
; SetCom100
;
; Description:
;   Copy a given DCB into the appropriate DEB.
;   This does it selectively.
;
; Entry:
;       EBX -> DCB
;       ESI -> PortInformation
;       ECX = mask of relevant fields.
;
; Exit:    ESI -> PortInformation
;
; Uses:
;       EAX,ECX,FLAGS
;
BeginProc SetCom100, PUBLIC push    esi             ; save ESI
        lea     esi,[esi.ComDCB]   ; to reduce code size mov     [esi._DCB.DCBLength], SIZE _DCB
        test    ecx,fBaudRate       ; is caller interested in baud rate?
        jz      @F
        mov     eax,[ebx._DCB.BaudRate]
        mov     [esi._DCB.BaudRate],eax
@@:
        test    ecx,fBitMask
        jz      @F
        mov     eax,[ebx._DCB.Bitmask]
        mov     [esi._DCB.Bitmask],eax
@@:
        test    ecx,fXonLim
        jz      @F
        mov     eax,[ebx._DCB.XonLim]
        mov     [esi._DCB.XonLim],eax
@@:
        test    ecx,fXoffLim
        jz      @F
        mov     eax,[ebx._DCB.XoffLim]
        mov     [esi._DCB.XoffLim],eax
@@:
        test    ecx,fLCR
        jz      @F
        mov     al,[ebx._DCB.ByteSize]
        mov     [esi._DCB.ByteSize],al
        mov     al,[ebx._DCB.Parity]
        mov     [esi._DCB.Parity],al
        mov     al,[ebx._DCB.StopBits]
        mov     [esi._DCB.StopBits],al
@@:
        test    ecx,fXonChar
        jz      @F
        mov     al,[ebx._DCB.XonChar]
        mov     [esi._DCB.XonChar],al
```

```
@@:
        test    ecx,fXoffChar
        jz      @F
        mov     al,[ebx._DCB.XoffChar]
        mov     [esi._DCB.XoffChar],al
@@:
        test    ecx,fErrorChar
        jz      @F
        mov     al,[ebx._DCB.ErrorChar]
        mov     [esi._DCB.ErrorChar],al
@@:
        test    ecx,fEofChar
        jz      @F
        mov     al,[ebx._DCB.EofChar]
        mov     [esi._DCB.EofChar],al
@@:
        test    ecx,fEvtChar1
        jz      @F
        mov     al,[ebx._DCB.EvtChar1]
        mov     [esi._DCB.EvtChar1],al
@@:
        test    ecx,fEvtChar2
        jz      @F
        mov     al,[ebx._DCB.EvtChar2]
        mov     [esi._DCB.EvtChar2],al
@@:
        test    ecx,fRlsTimeout
        jz      @F
        mov     eax,[ebx._DCB.RlsTimeout]
        mov     [esi._DCB.RlsTimeout],eax
@@:
        test    ecx,fDsrTimeout
        jz      @F
        mov     eax,[ebx._DCB.DsrTimeout]
        mov     [esi._DCB.DsrTimeout],eax
@@:
        test    ecx,fCtsTimeout
        jz      @F
        mov     eax,[ebx._DCB.CtsTimeout]
        mov     [esi._DCB.CtsTimeout],eax
@@:
        test    ecx,fTxDelay
        jz      @F
        mov     eax,[ebx._DCB.TxDelay]
        mov     [esi._DCB.TxDelay],eax
@@:
        mov     ax,[ebx._DCB.wReserved]
        mov     [esi._DCB.wReserved],ax pop     esi
        ret EndProc SetCom100

;***
; SetCom200
;
; Description:  Based on whether or not a timeout has been specified for
;               each signal, set up a mask byte which is used to mask off
;               lines for which we wish to detect timeouts. 0 indicates that
;               the line is to be ignored.
;
;               Also set up mask to indicate those lines which are set for
;               infinite timeout. -1 indicated that.
;
; Entry:    EBX -> DCB
;           ESI -> PortInformation
; Exit:
;           EBX -> DCB32
;           AH = lines to check
;           AL = lines with infinite timeout
;
```

```
; Uses:
;       EAX,ECX,FLAGS
;*********************************************************************
BeginProc SetCom200, PUBLIC
    xor eax,eax     ; get mask of lines with timeout = 0
    xor ecx,ecx
    call    SetCom210
    not al          ; invert result to get lines to check
    and al,ACE_CTS+ACE_DSR+ACE_RLSD
    xchg    ah,al
    dec ecx         ; get mask of infinite timeouts SetCom210:
    cmp [ebx._DCB.RlsTimeout],ecx ; timeout set to passed value ?
    jne SetCom220       ; No
    or  al,ACE_RLSD     ; Yes, show checking line SetCom220:
    cmp [ebx._DCB.CtsTimeOut],ecx ; Timeout set to passed value ?
    jne SetCom230       ; No
    or  al,ACE_CTS      ; Yes, show checking line SetCom230:
    cmp [ebx._DCB.DsrTimeOut],ecx ; Timeout set to passed value ?
    jne SetCom240       ; No
    or  al,ACE_DSR      ; Yes, show checking line SetCom240:
    ret EndProc SetCom200

;***
; SetCom300
;
; Description:
;   Calculate the correct BAUDRATE divisor for the COMM chip
;
;   Note that the baudrate is allowed to be any integer in the
;   range 2-19200. The divisor is computed as 115,200/baudrate.
;
; Entry:
;   EBX -> DCB32
; Exit:
;   EBX -> DCB32
;   ECX = baudrate (0 if error AX = error code if invalid baud rate)
; Uses:
;   EAX,ECX, flags
;
BeginProc SetCom300, PUBLIC push    edx
    mov ecx,[ebx._DCB.BaudRate] ; get requested baud rate
    xor eax,eax         ; assume error
    cmp ecx,1C200h
    je  SetCom115200
    cmp ecx,CBR_110     ; Q: baudrate specified as an index?
    jae by_index        ; Y:
    cmp ecx,2           ; N: by value (range check it)
    jnae    SetCom310   ;   Below range SetCom115200:
    xor edx,edx         ; EDX:EAX = 115,200
    mov eax,01C200h
    div ecx             ; (EAX) = 115,200/baud SetCom310:
    mov ecx,eax         ; (ECX) = baud rate, or error code (0)
    mov eax,IE_BAUDRATE ; set error code incase bad baud
    pop edx
    ret
```

```
by_index:
    cmp ecx,CBR_56000       ; Q: above supported?
    ja  SetCom310           ; Y: return error
    push    ebx
    mov ebx,ecx
    sub ebx,CBR_110
    shl ebx,1
    movzx   eax,WORD PTR [ebx+BaudRateByIndexTable] ; get divisor
    pop ebx
    jmp SetCom310           ; Y: return error EndProc SetCom300

;***
; SetCom400
;
; Description:  Check the line config. (parity,stop,byte size)
;
; Entry:    EBX -> DCB32
; Exit:
;       EBX -> DCB32
;       NC -> OK, else error (AX = error code)
;       AL = LCR, AH = RxMask
;       EDI (Bits 15:8) = flags mask (to remove parity checking)
;       EDI (Bits 7:0) = Error mask (to remove parity error)
; Uses:
;       EAX,ECX,EDI,FLAGS
;
BeginProc SetCom400, PUBLIC movzx   eax,WORD PTR [ebx._DCB.ByteSize] ; al = byte size, ah = parity
    cmp ah,SpaceParity      ; parity out of range >
    ja  SetCom470           ; Yes, return error
    mov edi,0FF00h+ACE_OR+ACE_PE+ACE_FE+ACE_BI
    or  ah,ah               ; is parity 'NONE'?
    jnz SetCom410           ;  No, something is there for parity
    xor edi,(fParity*256)+ACE_PE ; disable parity checking SetCom410:
    cmp al,8                ; Byte size out of range?
    ja  SetCom460           ; Yes, return error SetCom420:
    sub al,5                ; Shift byte size to bits 0,1
    .errnz  ACE_WLS-00000011b   ; Word length must be these bits
    jc  SetCom460           ; Byte size is illegal, return error
    add ah,ah               ; map parity to ACE bits
    jz  SetCom430           ; 0=>0,1=>1,2+.3,3=>5,4=>7
    dec ah SetCom430:
    shl ah,3                ; align with 8250 parity bits
    or  al,ah               ; add to byte size .errnz  NoParity-0
    .errnz  OddParity-1
    .errnz  EvenParity-2
    .errnz  MarkParity-3
    .errnz  SpaceParity-4
    .errnz  ACE_PEN-00001000b
    .errnz  ACE_PSB-00110000b
    .errnz  ACE_EPS-00010000b
    .errnz  ACE_SP-00100000b or  al,ACE_2SB          ; Assume 2 stop bits
    mov ah,[ebx._DCB.StopBits] ; get # of stop bits 0=1,1/2= .GT. 1
    or  ah,ah               ; out of range ?
    js  SetCom470           ; Yes, return error
    jz  SetCom440           ; One stop bit
    sub ah,2
    jz  SetCom450           ; 2 stop bits
    jns SetCom470           ; Not 1.5, return error
```

```
        test    al,ACE_WLS      ; 1.5 stop bits, 5 bit words?
        jnz     SetCom470       ; No, illegal .errnz  OneStopBit-0
        .errnz  One5StopBits-1
        .errnz  TwoStopBits-2
        .errnz  ACE_5BW SetCom440:
        and     al,NOT ACE_2SB    ;Show 1 (or 1.5) stop bit(s)

;
; From the byte size, get a mask to be used for stripping
; off unused bits as the characters are received.
;
SetCom450:
        push    edx
        mov     cl,[ebx._DCB.ByteSize]   ;Get data byte size
        mov     edx,00FFh       ;Turn into mask by shifting bits
        shl     edx,cl
        mov     ah,dh           ;Return mask in ah
        pop     edx
        clc                     ;Show all is fine
        ret SetCom460:
        mov     eax,IE_ByteSize    ;Show byte size is wrong
        stc                     ;Show error
        ret SetCom470:
        mov     eax,IE_Default     ;Show something is wrong
        stc                     ;Show error
        ret EndProc SetCom400

;-------------------------------------------------------------------
; VIPD interface code starts here
;-------------------------------------------------------------------

;-------------------------------------------------------------------
;
;   CH_IP_INT
;
;   ENTRY:
;
;   EXIT:
;
;   Description:
;
;-------------------------------------------------------------------

BeginProc CH_IP_INT, ASYNC_SERVICE, High_Freq

Trace_Out "CPQFMW95: CH_IP_INT"

cmp     [VCHD_Int_Busy], 0                  ; Q: already in interrupt routine?
        je      short @F                            ;    N: Service Interrpt
        inc     [VCHD_Int_Busy]                     ;    Y: we'll get it after this one
        ret                                         ;
@@:                                                 ;
        inc     VCHD_Int_Busy                       ; indicate we are in interrupt routine
doitagain:
        push    ebx                                 ; save callers registers
```

```
        push    esi                             ;
        push    edi                             ;
        push    edx                             ;

call    Serial_PortHandler pop     edx                             ; restore callers edx
        pop     edi                             ; restore callers edi
        pop     esi                             ; restore callers esi
        pop     ebx                             ; restore callers ebx
        dec     [VCHD_Int_Busy]                 ;
        jnz     doitagain
        ret                                     ;
                                                ;
EndProc CH_IP_INT VxD_LOCKED_CODE_ENDS
END
;-----------------------------------------------------------------------------
;   End of File: CPQFMW95.asm
;-----------------------------------------------------------------------------
```

```
Begin_Service_Table CPQFMW95
CPQFMW95_SERVICE   CH_IP_INT, Local
End_Service_Table CPQFMW95

CPQFMW95_DEVICE_ID      EQU    4327h

CPQFMDB_DEVICE_ID   EQU 4322h
Begin_Service_Table CPQFMDB
CPQFMDB_SERVICE     Dummy1, Local
CPQFMDB_SERVICE     Dummy2, Local
CPQFMDB_SERVICE     VCHD_IP_INT, Local
CPQFMDB_SERVICE     CPQFMDB_PDSTATE, Local
End_Service_Table   CPQFMDB ;***
;
; PortInformation - Port specific data structure.
;
;

PortInformation    struc pData          _PortData <>          ; port data: has to be first
  ComDCB    _DCB   <>         ; DCB : device control block Port           dd     0            ;Base I/O Address
  NotifyHandle    dd    0
  NotifyFlags     dd    0
  ReadNotifyHandle     dd    0
  ReadNotifyRefData    dd    0
  WriteNotifyHandle    dd    0
  WriteNotifyRefData   dd    0
  RecvTrigger    dd     -1           ; char count threshold for calling
  SendTrigger    dd     0            ; char count threshold for calling ; The following fields are specific to com ports only XOffPoint      dd     0            ;Q count where XOff is sent
  EvtMask        dd     0            ;Mask of events to check for
  AddrEvtDWord   dd     0            ;address of Event flags
  AddrMSRShadow  dd     0            ;addr of Modem Status Register Shadow
  EFlags         db     0            ;Extended flags
  ErrorMask      db     0            ;Default error-checking mask
  RxMask         db     0            ;Character mask
  ImmedChar      db     0            ;Char to be transmitted immediately
  HSFlag         db     0            ;Handshake flag
  HHSLines       db     0            ;8250 DTR/RTS bits for handshaking
  OutHHSLines    db     0            ;Lines that must be high to output
  MSRMask        db     0            ;Mask of Modem Lines to check
  MSRInfinite    db     0            ;Mask of MSR lines that must be high
  IntVecNum      db     0            ;Interrupt vector number
  LSRShadow db    0             ;Line Status Register shadow
  QOutMod    dd    0             ;characters sent mod xOnLim ENQ/ETX
  VCD_data   dd   0
  VCDflags   db   0
  IRQHandle dd    0             ; irq's handle
  RData      dd   0             ; reference data of enablenotification
  MiscFlags db    0             ;still more flags
  IRQn           db    0        ; Which irq
  MyIRQStruc     dd    0        ; IRQ struc for me
  OwnerVM        dd    0        ; Owner for this port
  MyName         dd    0        ; name of port
  RxFifoTrigger  db    0        ; what is the RxTrigger ?
  TxFifoTrigger  db    0        ; How many bytes to blast
  ContentionHnd  dd    0        ; Who handles contention?
  ContentionRes  dd    0        ; resource to contend for
  RxTimeAddr     dd    0        ; When was the last char received.
IFDEF DEBUG
  ArtificialErr  dd    0        ; How many Due to Buffer full ETC.
  ParityErrors   dd    0        ; parity error
  OverrunErrors  dd    0        ; overrun errors
  FramingErrors  dd    0        ; framing errors
```

1

```
    NumDataInts       dd    0           ; How many data avail interrupts
ENDIF PortInformation    ends .errnz      (SIZE _DCB) and 3
.errnz      (SIZE _PortData) and 3
.errnz      (SIZE PortInformation) and 3

MAXCOM            EQU   3              ; COM 0,1,2,3

; flag equates in EFlags
fUseDSR        equ 00000001b           ; set, if DSR is significant
fNoFIFO        equ 00000010b           ; set, if no FIFO on port
fFIFOchkd      equ 00000100b           ; set, if FIFO has been checked
fFIFOpre       equ 00001000b           ; FIFO enabled when port opened
fNoTxFifo      equ 00010000b           ; Tx FIFO should not be used fEFlagsMask equ fUseDSR OR fFIFOpre OR fFIFOchkd OR fNoFIFO  OR fNoTxFifo
                                       ; flags which shouldn't be cleared fDontUse1      equ   00100000b         ; Read next comments
fDontUse2      equ   01000000b         ; read next comments...

.errnz fEFlagsMask AND (fEOF OR fTxImmed) ; can't overlap with either of the
                                       ; bits that are folded into
                                       ; COMS32_BitMask1 fFifoForcedOff  equ     10000000b

;
; Values for NotifyFlags
;
CN_RecvSent equ CN_RECEIVE SHL 8
CN_TransSent     equ CN_TRANSMIT SHL 8

CN_Idle       equ 10000000b
CN_Notify     equ 01000000b
CN_CharReceived   equ 00100000b ; CN_EventSent    equ 00000100b
; CN_TransSent    equ 00000010b
; CN_RecvSent     equ 00000001b NotifyFlagsLO     equ byte ptr NotifyFlags
NotifyFlagsHI     equ byte ptr NotifyFlags+1

;
; Values for the handshake flag
;
; BreakSet       - True if break was set - stops transmission
; XOffSent       - True if we have sent the XOff character
; XOffPending    - True if XOff character needs to be sent
; XOnPending     - True if XOn  character needs to be sent
; HHSDown        - True if host dropped required hardware lines
; HHSDropped     - True if we dropped our hardware handshake lines
; XOffReceived   - True if XOff received from host
; HSPending      - Mask to return non-zero if XOn or Xoff must be sent
; HSReceived     - Mask to return non-zero if handshake has been
;                  received from host stopping transmission
; CannotXmit     - Mask to return non-zero if any condition
;                  exists which prevents us from tranmitting.
; HSSent         - Mask to return non-zero if we sent a handshake XOffPending       equ     00000001b     ;XOff needs to be sent
EnqPending        equ     00000001b     ;Enq needs to be sent [rkh]
EtxPending        equ     00000001b     ;Etx needs to be sent HHSDropped        equ     00000010b     ;Our hardware handshake lines are down
```

```
XOnPending      equ     00000100b       ;XOn needs to be sent
AckPending      equ     00000100b       ;Ack needs to be sent (ENQ/ACK &
ETX/ACK)

XOffReceived    equ     00001000b       ;XOff character received
EnqSent         equ     00001000b       ;Enq has been sent
EtxSent         equ     00001000b       ;Etx has been sent XOffSent        equ     00010000b       ;XOff has been sent
EnqReceived     equ     00010000b       ;Enq character received (ENQ/ACK)
EtxReceived     equ     00010000b       ;Etx character received (ETX/ACK)

HHSDown         equ     00100000b       ;Host hardware handshake lines are
down

BreakSet        equ     01000000b       ;Break has been set

HHSAlwaysDown   equ     10000000b   ;set if host handshake lines were never
                                ;  detected high HSPending       equ     XOffPending+XOnPending
HSReceived      equ     XOffReceived+HHSDown
HSSent          equ     XOffSent+HHSDropped
CannotXmit  equ    HSPending+HSReceived+BreakSet ; values for MiscFlags Discard         equ     00000001b    ;Discard recevied data
Unmasked_IRQ    equ     00000010b    ;have we unmasked IRQ
TxQInternal equ     00000100b    ;have we allocated internal Txbuffer ?
RxQInternal equ     00001000b    ;have we allocated internal RxBuffer ?
TxQSet          equ     00010000b    ;have we set a transmit queue ?
ClrTimer    equ     00100000b    ;don't use timer logic
IgnoreCommError equ     01000000b    ;ignore pending comm error (PortRead).

DiscardBit      equ     00000000b
Unmasked_IRQBit equ     00000001b
TxQInternalBit  equ     00000010b
RxQInternalBit  equ     00000011b
TxQSetBit   equ     00000100b
ClrTimerBit equ     00000101b
IgnoreCommErrorBit equ  00000110b DELAY_TIME      equ     200       ;Delay at least 200 milliseconds IRQStruc        STRUC IRQNumber db    0         ; Which IRQ does this struct belong to?
  VirtCnt   db    0         ; how many times virtualized
  OldMask   db    0         ; what was old mask ?
  FillerIS  db    0

IRQStruc        ENDS

; macros for in/out to vipd or uart

;IFDEF DEBUGUART
;INALDX MACRO
;       in      al,dx
;ENDM
;OUTDXAL MACRO
;       out     dx,al
;ENDM
;ELSE
INALDX MACRO
        push ebx
        push ecx
        push edx
        push eax
        VxDCall VIPD1_Reg_Read
        mov cl,al
        pop eax
```

```
        mov al,cl
        pop edx
        pop ecx
        pop ebx
ENDM
OUTDXAL MACRO
        Trace_Out "OUT #EDX #EAX"
        pushad
        VxDCall VIPD1_Reg_Write
        popad
ENDM
;ENDIF ;CLICH MACRO
;       cli
;       mov [VCHD_INT_MASK],1
;ENDM
;
;STICH MACRO
;       mov [VCHD_Int_Mask],0
;       sti
;       cmp [VCHD_Pending_Int],0
;       je  @F
;       call VCHD_IP_INT
;@@:
;ENDM
```

```
; INS8250 ACE Register Offsets And Bit Definitions

ACE_RBR         equ     0                   ;Receiver Buffer
ACE_THR         equ     0                   ;Transmit Holding Register ACE_IER         equ     1                   ;Interrupt Enable
  ACE_ERBFI     equ     00000001b           ;   Received Data Available
  ACE_ETBEI     equ     00000010b           ;   Transmitter Holding Register Empty
  ACE_ELSI      equ     00000100b           ;   Receiver Line Status
  ACE_EDSSI equ         00001000b       ;   Modem Status ACE_FCR     equ     2                   ;FIFO control register
  ACE_EFIFO equ     00000001b       ;   Enable FIFO
  ACE_CRFIFO      equ     00000010b   ;   Clear receive FIFO queue
  ACE_CTFIFO      equ     00000100b   ;   Clear transmit FIFO queue
  ACE_TRIG01      equ     00000000b   ;   Trigger receive int on every char
  ACE_TRIG04      equ     01000000b   ;   Trigger receive int on every 4th char
  ACE_TRIG08      equ     10000000b   ;   Trigger receive int on every 8th char
  ACE_TRIG14      equ     11000000b   ;   Trigger receive int on every 14th char ACE_IIDR        equ     2                   ;Interrupt Identification
  ACE_IIP       equ     00000001b           ;   Inverted Interrupt Pending (0=int)
  ACE_IID       equ     00000110b           ;   Interrupt ID
  ACE_MSI       equ     00000000b           ;   Modem Status
  ACE_THREI     equ     00000010b           ;   Transmitter Holding Register Empty
  ACE_RDAI      equ     00000100b           ;   Received Data Available
  ACE_RLSI      equ     00000110b           ;   Receiver Line Status
  ACE_FIFO_E1     equ     01000000b         ;set, if FIFO enabled on 16550A
  ACE_FIFO_E2     equ     10000000b         ;set, if FIFO enabled on 16550 or 16550A ACE_LCR         equ     3                   ;Line Control
  ACE_WLS       equ     00000011b           ;   Word Length Select Bits
  ACE_WLS0      equ     00000001b           ;   Word Length Select Bit 0
  ACE_WLS1      equ     00000010b           ;   Word Length Select Bit 1
  ACE_5BW       equ     00000000b           ;   5 Bit Words
  ACE_6BW       equ     00000001b           ;   6 Bit Words
  ACE_7BW       equ     00000010b           ;   7 Bit Words
  ACE_8BW       equ     00000011b           ;   8 Bit Words
  ACE_STB       equ     00000100b           ;   Stop Bits
  ACE_1SB       equ     00000000b           ;   1 Stop Bits (1.5 for 5 bit words)
  ACE_2SB       equ     00000100b           ;   2 Stop Bits
  ACE_PEN       equ     00001000b           ;   Parity Enable
  ACE_PSB       equ     00110000b           ;   Parity select bits
  ACE_EPS       equ     00010000b           ;   Even Parity Select
  ACE_SP        equ     00100000b           ;   Stick Parity
  ACE_SB        equ     01000000b           ;   Set Break
  ACE_DLAB      equ     10000000b           ;   Divisor Latch Access Bit ACE_MCR         equ     4                   ;Modem Control
  ACE_DTR       equ     00000001b           ;   Data Terminal ready
  ACE_RTS       equ     00000010b           ;   Request To Send
  ACE_OUT1      equ     00000100b           ;   Output Line 1
  ACE_OUT2      equ     00001000b           ;   Output Line 2
  ACE_LOOP      equ     00010000b           ;   Loopback ACE_LSR         equ     5                   ;Line Status
  ACE_DR        equ     00000001b           ;   Data Ready
  ACE_OR        equ     00000010b           ;   Overrun Error
  ACE_PE        equ     00000100b           ;   Parity Error
  ACE_FE        equ     00001000b           ;   Framing Error
  ACE_BI        equ     00010000b           ;   Break Interrupt
  ACE_THRE      equ     00100000b           ;   Transmitter Holding Register Empty
  ACE_TSRE      equ     01000000b           ;   Transmitter Shift Register Empty ACE_MSR         equ     6                   ;Modem Status
  ACE_DCTS      equ     00000001b           ;   Delta Clear to Send
  ACE_DDSR      equ     00000010b           ;   Delta Data Set Ready
  ACE_TERI      equ     00000100b           ;   Trailing Edge Ring Indicator
  ACE_DRLSD     equ     00001000b           ;   Delta Receive Line Signal Detect
  ACE_CTS       equ     00010000b           ;   Clear To Send
  ACE_DSR       equ     00100000b           ;   Data Set ready
```

```
    ACE_RI          equ     01000000b       ;   Ring Indicator
    ACE_RLSD        equ     10000000b       ;   Receive Line Signal Detect ACE_DLL         equ     0               ;LSB Baud Rate Divisor ACE_DLM         equ     1               ;MSB Baud Rate Divisor TimeoutError    equ     -2      ;Timeout error code for $TRMCOM
    Timeout         equ     250     ;1/4 second timeout
```

```
    PAGE 58,132
;***********************************************************************
*
;
; (C) Copyright MICROSOFT CORP. 1992-1995
;
; Title:    SERUTIL.ASM
;
; Version:  1.0
;
; Date:     11/20/92
;
; Author:   sandeeps
;
;==============================================================================
; Change log:
;
;***********************************************************************
*

.386p

.xlist
    include VMM.INC
    include VPICD.INC
    include VCOMM.INC
    include DEBUG.INC
    include OPTTEST.INC
    include CPQFMW95.INC
    include INS8250.INC
       include vipdlp.inc
    .list VxD_Locked_Data_Seg EXTRN   SysVMHandle:DWORD
    EXTRN   TimeOutHandle:DWORD
;   EXTRN   VCHD_Int_Mask:DWORD
    EXTRN   VCHD_Pending_Int:DWORD
;   EXTRN   VCHD_IP_INT:NEAR ExtTab      label dword
    dd      OFFSET32 ExtComDummy    ; function 0: never mind
    dd      OFFSET32 ExtCom_FN1     ; Set X-Off
    dd      OFFSET32 ExtCom_FN2     ; clear X-Off
    dd      OFFSET32 ExtCom_FN3     ; Set RTS
    dd      OFFSET32 ExtCom_FN4     ; Clear RTS
    dd      OFFSET32 ExtCom_FN5     ; Set DSR
    dd      OFFSET32 ExtCom_FN6     ; Clear DSR
    dd      OFFSET32 ExtCom_FN7     ; Reset Printer
    dd      OFFSET32 ExtComDummy    ; Get Max LPT port
    dd      OFFSET32 ExtComDummy    ; Get Max COM Port
    dd      OFFSET32 ExtCom_FN10    ; Get COM port base and IRQ
    dd      OFFSET32 ExtCom_FN10    ; Get COM port base & IRQ
    dd      OFFSET32 ExtCom_FN12    ; set break
    dd      OFFSET32 ExtCom_FN13    ; clear break
VxD_Locked_Data_Ends VxD_My_Pageable_Code_Seg
;***********************************************************************
*
;
; RecCom:
;
; Description:
;           Receive a byte from channel (if available).
;
; Entry:
;     ESI -> PortInformation struct
; Exit:
;     'Z' clear if data available
```

```
;       AL = byte
;       Else if 'Z' set, no data/ error, AX = error code AX = 0 => no data
;
; Uses:
;       C standard
;
;================================================================================
EndDoc
BeginProc RecCom, Public push    esi
        push    edi
;
; Before removing any characters from the input queue, check to see
; if XON needs to be issued. If it needs to be issued, set the
; flag that will force it and arm transmit interrupts.
;
        TestMem [esi.ComDCB.BitMask],<fEnqAck+fEtxAck>     ; Enq ot Etx ack?
        jz      RecCom32            ; No
        test    [esi.HSFlag],EnqReceived+HHSDropped ; Enq recvd/lines dropped?
        jz      RecCom60            ; No
        jmp     RecCom34

RecCom32:
        test    [esi.HSFlag],HSSent     ; handshake sent?
        jz      RecCom60                ;  No XOFF sent & no lines dropped RecCom34:
        mov     eax,[esi.pData.QInCount] ; get current count of input chars
        cmp     eax,[esi.ComDCB.XonLim] ; see if at Xon limit
        ja      RecCom60                ; Not yest ;
; If any hardware lines are down, then raise them. Then see
; about sending XON.
;
        mov     edx,[esi.Port]          ; get the port
        mov     ah,[esi.HHSLines] ; get hardware lines mask
        cli                         ; handle this as a critical section
        mov     cl,[esi.HSFlag]         ; get handshaking flags
        or      ah,ah               ; any hw lines to play with ?
        jz      RecCom40            ;  NO
        add     dl,ACE_MCR          ;  --> modem control register
        in      al,dx
        or      al,ah               ; Turn on the hardware bits
        IO_Delay
        IO_Delay
        out     dx,al
        and     cl,NOT HHSDropped ; show hardware lines back up RecCom40:
        TestMem [esi.ComDCB.BitMask],<fEnqAck+fEtxAck> ; enq or Etx Ack?
        jz      RecCom47            ; No
        test    cl,EnqReceived          ; did we receive Enq?
        jz      RecCom55            ; No
        and     cl,NOT EnqReceived
        jmp     RecCom50

RecCom47:
        test    cl,XOffSent     ; Did we send XOFF?
        jz      RecCom55        ;  No
        and     cl,NOT XoffSent         ; remove XOFF sent flag RecCom50:
        or      cl,XONPending           ; show XON or ACK must be sent
        call    KickTx                  ; kick xmit if needed RecCom55:
        mov     [esi.HSFlag],cl         ; store handshaking flag
        sti                         ; can allow interrupts now
```

```
;
; Now we can get down to the business at hand, and remove a character
; from the receive queue. If a communications error exists, we return
; that and nothing else.
;
RecCom60:
        xor     eax,eax
        or      eax,[esi.pData.dwCommError] ; any errors ?
        jnz     RecCom100           ;   Yes, return error code
        or      eax,[esi.pData.QInCount] ; get current input char count
        jz      RecCom90            ; No chars in q
        mov     edi,[esi.pData.QInAddr] ; get q pointer mov     ebx,[esi.pData.QInGet]  ; also get the index to head
        mov     al,[ebx+edi]            ; finally get the byte from queue
        inc     ebx                     ; update q index
        cmp     ebx,[esi.pData.QInSize] ; wrap-around ?
        jc      RecCom70            ;  No wrap
        xor     ebx,ebx                 ; wrap by zeroing the index RecCom70:
        mov     [esi.pData.QInGet],ebx  ; save new head pointer
        dec     [esi.pData.QInCount]    ; dec # of bytes in queue mov     ecx,[esi.pData.QInCount]; Q: have we read below trigger
        jae     RecCom80            ;  N:
        and     [esi.NotifyFlagsHI], NOT CN_RECEIVE ;allow timeout notify again RecCom80:
        or      esp,esp             ; reset PSW.Z
        pop     edi
        pop     esi
        ret ;
; No characters in the input queue. Check to see if EOF was received, and
; return it if it was. Otherwise show no characters.
;
RecCom90:
        TestMem [esi.ComDCB.BitMask],fBinary  ; are we doing binary stuff?
        jnz     RecCom95            ;  Yes, show no characters
        mov     al,[esi.ComDCB.EofChar] ; assume eof
        test    [esi.EFlags],fEOF ; has end of file char been received?
        jnz     RecCom80            ; show no more characters RecCom95:
        xor     eax,eax                 ; Show no more characters ; Return with 'Z' to show error or no characters RecCom100:
        xor     ecx,ecx                 ; set PSW.Z
        pop     edi
        pop     esi
        ret EndProc RecCom ;**********************************************************************
*
;
; TrmCom:
;
; Description:
;           terminates (closes) a channel.
;           Waits for any outbound data to be transmitted, drop the
;           hardware handshaking lines, and disable interrupts. If the
;           output queue contained data when it was closed, an error
;           will be returned.
; Entry:
;           ESI -> PortInformation struct
; Exit:
```

```
;               EAX = 0       => no error
;               EAX = 8000h   => invalid device ID
;               EAX = -2      => output queue timed out.
; Uses:
;               Everything
;
;================================================================================
BeginProc TrmCom, Public or      [esi.MiscFlags],Discard ; Show discarding serial data
        xor     ecx, ecx
        mov     [esi.pData.dwCommError],ecx   ; Clear error flaggs.
        mov     [esi.pData.QInCount],ecx ; show no chars in input queue
        call    RecCom                  ; send XON if needed.

;
; We have to wait for the output queue to empty.  To do this,
; a timer will be created.  If no character has been transmitted
; when the timeout occurs, then an error will be indicated and
; the port closed anyway.  If the timer cannot be created, then
; just loop until the queue empties, which will be better than
; discarding charatcers if there are any
;
        test    [esi.HSFlag],HHSAlwaysDown ; Q: handshaking ever up ?
        jnz     TermCom17               ;    N: skip wait loop TermCom10:
        mov     ecx,[esi.pData.QOutCount] ; get current queue count
        jecxz   TermCom30               ; no chars in queue VMMCall Get_System_Time
        mov     edi,eax TermCom15:
        cmp     [esi.pData.QOutCount],ecx ; queue count changed ?
        jne     TermCom10               ; yes, restart timeout VMMCall Get_System_Time
        sub     eax,edi
        cmp     eax, Timeout            ; Q: timeout reached ?
        jb      TermCom15

TermCom17:
        mov     ecx,TimeoutError        ; Yes, show timeout error

TermCom30:
        mov     edx,[esi.Port]          ; get port base address
        call    Terminate               ; the real work is done here
        mov     eax,ecx                 ; set return code ret
EndProc TrmCom ;********************************************************************************
*
;
; GetCOMPort
;
; Description:
;       Calls VCOMM to acquire the port
; Entry:
;   ESI -> PortInformation struct
; Exit:
;   NC iff successful
; Uses:
;   Flags,EAX,ECX
;
;********************************************************************************
*
BeginProc GetCOMPort, PUBLIC
```

```
        push    edx mov ecx,[esi.ContentionHnd]  ; get the contention handler
    test    ecx,ecx
    jz  GCP_Done
    mov eax,[esi.ContentionRes]  ; get the resource
    test    eax,eax
    jz  GCP_Failed
    cCall   ecx,<ACQUIRE_RESOURCE,eax,OFFSET32 _Notify_Loss,esi,1>
    mov [esi.VCD_Data],eax   ; save handle GCP_Failed:
    cmp eax,1           ; CY if 0, else NC.
GCP_Done:
    pop edx
    ret
EndProc GetCOMPort ;*******************************************************************************
*
;
; ReleaseCOMPort
;
; Description:
;       Calls VCOMM to release a com port
;
; Entry:
;   ESI -> PortInformation struct
; Exit:
;   NONE
; Uses:
;   C style
;
;*******************************************************************************
*
BeginProc ReleaseCOMPort,PUBLIC mov ecx,[esi.VCD_Data]
    jecxz   RCP_Done RCP_OwnerShipSet:
    cCall   [esi.ContentionHnd],<RELEASE_RESOURCE, ecx, \
            OFFSET32 _Notify_Loss>

RCP_Done:
    ret

EndProc ReleaseCOMPort

;*******************************************************************************
*
;
; StealPort
;
; Description:
;   Calls VCOMM to see if we can get the port.
; Entry:
;   ESI -> DEB
; Exit:
;   NZ if success, else failure
; Uses:
;   C style - ECX
;*******************************************************************************
*
BeginProc StealPort,PUBLIC push    ecx TestMem [esi.pData.LossByte],1  ; Q: Have we lost the port ?
    jz  SP_Success      ;   N:

cCall   [esi.ContentionHnd],<STEAL_RESOURCE,[esi.VCD_Data], \
```

5

```
                OFFSET32 _Notify_Loss>
    test    eax,eax         ; Q: Did it succeed ?
    jz  SP_Done             ;    N:
    ClrFlag [esi.pData.LossByte],1  ;   Y: say we own the port SP_Success:
    test    esi,esi         ; esi -> Port handle SP_Done:
    pop ecx
    ret EndProc StealPort ;*****************************************************************************
*
;
; Terminate
;
; Description:  terminate device
;       Restore the port I/O address and make sure that interrupts
;       are off.
;
; Entry:
;       EDX = device port address
;       ESI -> PortInformation struct
;
; Exit:
;       EAX = 0 => success
;       EAX = -1 => error
; Uses:
;       EAX,EBX,EDX,EDI,FLAGS.
;=============================================================================
=
BeginProc Terminate, NO_PROLOG, PUBLIC test    [esi.pData.LossByte],1  ; Q: Do we have the port ?
    jz  Terminate_SerialOwnsPort    ;    Y: Continue
    call    StealPort               ;    N: Try to steal it
    jz  Terminate_LostPort          ;       Couldn't steal it Terminate_SerialOwnsPort:
    inc edx         ; disable chip interrupts
    .errnz  ACE_IER-ACE_RBR-1
    xor al,al
    OUTDXAL
    add dl,ACE_LSR-ACE_IER  ; --> line status register
    IO_Delay VMMCall Get_Last_Updated_System_Time
    mov edi, eax Terminate20:
    INALDX              ; wait until xmit empty
    and al, ACE_THRE+ACE_TSRE
    cmp al, ACE_THRE+ACE_TSRE   ; Q: xmit empty ?
    je  @F              ;    Y:
    VMMCall Get_Last_Updated_System_Time
    sub eax, edi
    cmp eax, 50         ; Q: time out ?
    jbe Terminate20     ;    Y:
@@:
    xor al,al
    test    [esi.EFlags],fFIFOpre   ; Q: leave FIFO enable?
    jz  @F
    mov al,ACE_TRIG08 OR ACE_EFIFO OR ACE_CRFIFO OR ACE_CTFIFO
@@:
    sub dl,ACE_LSR-ACE_FCR
    OUTDXAL
    IO_Delay
    call    MaskIRQ
    add dl,ACE_MCR-ACE_FCR  ; --> Modem control reg
```

```
        INALDX
        IO_Delay
        and al,ACE_DTR+ACE_RTS   ; leave DTR,RTS high if already so
        OUTDXAL                  ; but tri-state IRQ line
        sub dl,ACE_MCR-ACE_RBR   ; EDX = device port address again.

call    MaskIRQ

Terminate_LostPort:

push    ecx             ; save these
        push    ebx mov eax,[esi.MyIRQStruc]     ; get our IRQ struct
        dec [eax.VirtCnt]       ; Q: Have we virtualized it > once
        jnz TerminateUnmask     ;  Y: unmask it now movzx   eax,[esi.IRQn]
        VxDCall VPICD_Get_Virtualization_Count
        cmp eax,1               ; Me + default ?
        jbe TerminateSkipUnmask TerminateUnmask:
        call    UnMaskIRQ       ; Unmask it TerminateSkipUnmask:
        xor eax,eax
        xchg    eax,[esi.IRQHandle]
        VxDCall VPICD_Force_Default_Behavior Terminate47:
        pop ebx                 ; original EBX
        call    ReleaseCOMPort
        pop ecx                 ; original ECX Terminate50:                    ; also called from IniCom ???
        xor eax,eax             ; port closed and deallocated.
        ret EndProc Terminate ;******************************************************************************
*
;
; StrCmp
;
; Entry:
;   EAX -> PortInformation struct
;   ESI -> PortInfoHandle
;   EDI -> Name to look for
; Exit:
;   Z if found, else NZ
; Uses:
;   Everything except EAX,ESI,EDI
;==============================================================================
=
BeginProc StrCmp, PUBLIC push    edi
        mov edx,[eax.MyName]    ; EDX -> Name in the PortInfo struct
        xor ecx,ecx sc_lp:
        mov cl,[edx]
        mov ch,[edi]
        or  ecx,ecx
        jz  sc_success
        call    MyLower
        xchg    cl,ch
        call    MyLower
        inc edx
        inc edi
```

```
        cmp  cl,ch
        jz   sc_lp sc_failed:
        or   esi,esi       ; ESI won't be zero......

sc_success:
        pop  edi
        ret

EndProc StrCmp

;***
;
; MyLower
;
; Description:
;     converts an upper case letter into a lower case one.
; Entry:
;     CL = char
; Exit:
;     CL = lower cased char
; Uses:
;     CL
;
BeginProc MyLower,NO_PROLOG cmp  cl,'A'
        jb   ml_done
        cmp  cl,'Z'
        ja   ml_done
        or   cl,20h
ml_done:
        ret EndProc MyLower VxD_My_Pageable_Code_Ends VxD_Locked_Code_Seg BeginProc Notify_Loss,CCALL,esp ArgVar   refData,DWORD
ArgVar   fAction,DWORD EnterProc mov  eax,RefData
        mov  ecx,fAction
        or   [eax.pData.LossByte],1   ; assume loss of port
        jecxz   NL_Losing
        and  [eax.pData.LossByte],NOT 1

NL_Losing:

LeaveProc
        return

EndProc Notify_Loss

;***
;
; MaskIRQ
;
; Description:    masks irq for the com port.
;
; Entry:       ESI -> Portinformation struct
; Exit:
;              AL = 0, if was unmasked, else -1 if already masked.
; Uses:
BeginProc MaskIRQ, NO_PROLOG, PUBLIC
```

```
        push    ebx
        push    ecx mov eax,[esi.IRQHandle]
    or  eax,eax
    jz  MaskIRQ_Done            ; handle doesn't exist
    mov ebx,[SysVMHandle]
    VxDCall VPICD_Get_Complete_Status   ; get the status
    mov al,-1                   ; assume masked
    test    cl,0100b            ; is IRQ physically masked ?
    jnz MaskIRQ_Done            ; yes, get out
    mov eax,[esi.IRQHandle]
    VxDCall VPICD_Physically_Mask
    xor al,al                   ; was not masked.
MaskIRQ_Done:
        pop     ecx
        pop     ebx
        ret EndProc MaskIRQ ;***
;
; UnMaskIRQ
;
; Description:      Unmasks the irq of the port.
;
; Entry:        ESI -> PortInformation struct
; Exit:     None.
; Uses:
;
BeginProc UnMaskIRQ, NO_PROLOG, PUBLIC push    eax
    mov eax,[esi.IRQHandle]
    or  eax,eax
    jz  UnMaskIRQ_Done
    VxDCall VPICD_Physically_Unmask
UnMaskIRQ_Done:
    pop eax
    ret EndProc UnMaskIRQ ;***
; TXI - xmit a char immediately.
;     Places the char in a location that guarantees it to be the next
;     char transmitted.
; Entry:
;     AH = char
;     ESI -> DEB
; Exit:
;     None
; Uses:
;     C standard
;
BeginProc TXI, PUBLIC, NO_PROLOG or      [esi.EFlags],fTxImmed   ; show char to xmit
        mov     [esi.ImmedChar],ah      ; set char
        jmp     KickTx                  ; kick transmit interrupt just in case EndProc TXI ;***
;
; KickTx
;
; Descirption:  "Kick" the xmitter interrupt routine into operation.
;       If the transmitter holding register isn't empty, then
;       nothing needs to be done. If it is empty, then the xmit
;       interrupt needs to be enabled in the IER.
```

```
;
; Entry:    ESI-> PortInformation struct,
;         interrupts are disabled.
;
; Exit:     None.
;
; Uses:     EAX,EDX,flags
;
BeginProc KickTx, Public
;
    test    [esi.pData.LossByte],1  ; Q: Do we still own the port ?
    jnz can_we_steal        ;    N:

enable_int:
    mov edx,[esi.Port]      ; get device I/O address
    add dl,ACE_IER          ; --> interrupt enable register
    INALDX                  ; get current IER state
    test    al,ACE_ETBEI    ; interrupts already enabled?
    jnz KickTx10            ; yes, don't re-enable it
    or  al,ACE_ETBEI        ; No, enable it
    OUTDXAL                 ; 8250, 8250-B requires
    IO_Delay
    OUTDXAL                 ; writing register twice.

KickTx10:
    ret can_we_steal:
    call    StealPort       ; call VCOMM to see if we can steal
                            ; the port back
    jnz enable_int          ; jump, if we got it
    TRAP
;
; flush out the queue
;
    xor eax,eax
    mov [esi.pData.QOutCount],eax
    mov [esi.pData.QOutMod],eax
    mov eax,[esi.pData.QOutGet]
    mov [esi.pData.QOutPut],eax
    ret EndProc KickTx ;***
;
; MSRWait
;
; Description:  This routine checks the modem status register for CTS,DSR,
;         and/or RLSD signals. If a timeout occurs while checking,
;         the appropriate error code will be returned.
;
;         This routine will not check for any signal with a corresponding
;         time out value of 0 (ignore line).
; Entry:
;         ESI -> PortInformation struct
; Exit:
;         AL = error code, [esi.pData.dwCommError] updated,
;         'Z' set if no timeout
; Uses:
;         EAX,ECX,EDX,Flags.
;
BeginProc MSRWait, PUBLIC push    edi MSRRestart:
    xor edi,edi             ; init timer MSRWait10:
    mov ecx,11              ; init delay counter (used on non-ATs)
```

```
MSRWait20:
    xor  dh,dh              ; init error accumulator
    mov  eax,[esi.AddrMsrShadow] ; get address of MSR shadow
    mov  al,[eax]           ; get modem status
    and  al,[esi.MSRMask]   ; only leave bits of interest.
    xor  al,[esi.MSRMask]   ; 0 = line high
    jz   MSRWait90          ; All lines of interest are high
    mov  ah,al              ; AH has 1 bits for down lines shl  ah,1               ; line signal detect low?
    jnc  MSRWait30          ; No, it is high
    .errnz ACE_RLSD-10000000b
    cmp  edi,[esi.ComDCB.RlsTimeout]; RLSD timeout yet?
    jb   MSRWait30          ; NO
    or   dh,CE_RLSDTO       ; show modem status timeout MSRWait30:
    shl  ah,1               ; data set ready low
    shl  ah,1
    .errnz ACE_DSR-00100000b
    jnc  MSRWait40          ; No, it's high
    cmp  edi,[esi.ComDCB.DsrTimeOut]; DSR timout yet ?
    jb   MSRWait40          ; NO
    or   dh,CE_DSRTO        ; show data set ready timeout MSRWait40:
    shl  ah,1               ; CTS low?
    jnc  MSRWait50          ; No, it's high
    .errnz ACE_CTS-00010000b
    cmp  edi,[esi.ComDCB.CtsTimeout] ; cts timeout yet?
    jb   MSRWait50          ; NO
    or   dh,CE_CTSTO        ; show clear to send timeout MSRWait50:
    or   dh,dh              ; any timeout yet?
    jnz  MSRWait80          ;   Yes loop MSRWait20          ; continue until timeout
                            ; should have taken about 1ms.
    inc  edi                ; timer+1
    jmp  MSRWait10          ; until timeout or good status MSRWait80:
    xor  ah,ah
    mov  al,dh
    or   BYTE PTR [esi.pData.dwCommError],al ; return updated status
    .errnz HIGH CE_CTSTO
    .errnz HIGH CE_DSRTO
    .errnz HIGH CE_RLSDTO MSRWait90:
    or   al,al              ; set 'Z' if no timeout
    pop  edi
    ret EndProc MSRWait ;****************************************************************************
*
;
; Notify_Owner:
;
; Description:  notifies owner of events
;
; Entry:    EAX = message ID
;           ESI -> PortInformation
; Exit:
;           None
; Uses:
;           None.
;===========================================================================
=
```

```
BeginProc Notify_Owner, PUBLIC
    pushad
    or      [esi.NotifyFlagsHI],al   ; AL has notifications to send
    mov     ebx,[esi.AddrEvtDWord]
    push    dword ptr [ebx]          ; sub-event
    push    eax              ; event
    cmp     eax,CN_EVENT
    jne     NO_NotEvent
    push    [esi.RData]      ; reference data
    push    esi              ; hPort
    call    [esi.NotifyHandle]
    jmp     NO_Done NO_NotEvent:
    cmp     eax,CN_RECEIVE
    jne     NO_NotReceive
    push    [esi.ReadNotifyRefData]  ; reference data
    push    esi              ; hPort
    call    [esi.ReadNotifyHandle]
    jmp     NO_Done NO_NotReceive:
    cmp     eax,CN_TRANSMIT
    jne     NO_Done
    push    [esi.WriteNotifyRefData]; reference data
    push    esi              ; hPort
    call    [esi.WriteNotifyHandle]

NO_Done:
    add     esp,16           ; clear stack
    popad
    ret
EndProc Notify_Owner ;****************************************************************************
*
;
; ReadCommString
;
; Description:
;   Return immediately, read a max of n bytes.
;
; Entry:
;       ESI -> port information struct
;       EDI -> receive buffer
;       ECX = max bytes to read.
; Exit:
;       'Z' clear if data is available, AX = # bytes read.
;       'Z' set => error/no data. AX = 0 => no data.
; Uses:
;       C standard
;
;===========================================================================
=
BeginProc ReadCommString, Public push    esi
    push    edi xor     eax,eax
    TestMem [esi.pData.MiscFlags],IgnoreCommError   ; Q: ignore comm error?
    jnz     @F               ; Y: no need to do this stuff.
    or      eax,[esi.pData.dwCommError] ; any errors?
    jnz     RecStr100        ; Yes, return error code
@@:
    or      eax,[esi.pData.QInCount] ; any chars in input queue
    jz      RecStr90         ; no chars in queue cmp     ecx,eax          ; Q:more chars available than can read?
    jbe     RecStr30         ;   N:
    mov     ecx,eax          ;   Y: adjust # of chars to read
```

```
RecStr30:
    push    ecx
    mov edx,[esi.pData.QInSize]
    mov eax,[esi.pData.QInGet]
    sub edx,eax         ; EDX = # of bytes before end of buf
    cmp edx,ecx         ; Q: more avail than can read?
    jbe RecStr40        ;   N:
    mov edx,ecx         ;   Y: adjust avail count
RecStr40:
    xchg    ecx,edx     ; ECX = # bytes for 1st copy
    sub edx,ecx         ; EDX = # bytes for 2nd copy push    esi
    mov ebx,[esi.pData.QInAddr]
    mov esi,ebx
    add esi,eax         ; esi-> first char in buffer
    cld
    rep movsb           ; do first copy
    mov ecx,edx
    jecxz   RecStr50    ; jump if no 2nd copy needed
    mov esi,ebx         ; ESI -> start of buffer
    rep movsb
RecStr50:
    sub esi,ebx         ; esi -> new QInGet
    mov ebx,esi
    pop esi
    pop ecx
    cli
    mov [esi.pData.QInGet],ebx  ; update QInGet
    sub [esi.pData.QInCount],ecx ; update count
    mov eax,[esi.pData.QInCount]

and [esi.NotifyFlagsHI],NOT CN_RECEIVE ; allow TO notify again sti
;
; Check to see if XON needs to be issued. If it needs to be issued, set the
; flag that will force it and arm transmit interrupts.
;
    TestMem [esi.ComDCB.BitMask],<fEnqAck+fEtxAck> ; Enq or Etx ack?
    jz  @F
    test    [esi.HSFlag],EnqReceived+HHSDropped ; Enq recvd or lines dropped?
    jz  RecStr80        ; No enq recvd or no lines dropped
    jmp RecStr60
@@:
    test    [esi.HSFlag],HSSent ; handshake sent?
    jz  RecStr80        ; NO XOFF sent & no lines dropped RecStr60:
                        ; eax = current count of input chars.
    cmp eax,[esi.ComDCB.XonLim] ; see if at XON limit
    ja  RecStr80        ; No yet
;
; If any HW lines are down, raise them. Then see about sending XON.
;
    mov edx,[esi.Port]      ;Get the port
    mov ah,[esi.HHSLines]   ;Get hardware lines mask
    push    ecx
    cli                 ;Handle this as a critical section
    mov cl,[esi.HSFlag]     ;Get handshaking flags
    or  ah,ah           ;Any hardware lines to play with?
    jz  @F              ; No
    add dl,ACE_MCR      ;--> Modem control register
    INALDX
    or  al,ah           ;Turn on the hardware bits
    IO_Delay
    IO_Delay
    OUTDXAL
    and cl,NOT HHSDropped   ;Show hardware lines back up @@:
    TestMem [esi.ComDCB.BitMask],<fEnqAck+fEtxAck> ;Enq or Etx Ack?
```

13

```
        jz      @F              ; No
        test    cl,EnqReceived      ;Did we receive Enq?
        jz      RecStr70        ;  No
        and     cl,NOT EnqReceived
        jmp     RecStr65

@@:
        test    cl,XOffSent         ;Did we send XOFF?
        jz      RecStr70        ;  No
        and     cl,NOT XOffSent     ;Remove XOFF sent flag RecStr65:
        or      cl,XOnPending       ;Show XON or ACK must be sent
        call    KickTx              ;Kick xmit if needed RecStr70:
        mov     [esi.HSFlag],cl     ;Store handshake flag
        sti                         ;Can allow interrupts now
        pop     ecx RecStr80:
        mov     eax, ecx
        or      esp,esp         ;Reset PSW.Z
        pop     edi
        pop     esi
        ret
;
; No characters in the input queue.  Check to see if EOF
; was received, and return it if it was.  Otherwise show
; no characters.
;
RecStr90:
        TestMem [esi.ComDCB.BitMask],fBinary     ;Are we doing binary stuff?
        jnz     RecStr95        ;  Yes, show no characters
        mov     al,[esi.ComDCB.EofChar]  ;Assume EOF
        test    [esi.EFlags],fEOF    ;Has end of file char been received?
        jnz     RecStr80        ;  Yes, show end of file RecStr95:
        xor     eax,eax             ;Show no more characters ; Return with 'Z' to show error or no characters RecStr100:
        xor     ecx,ecx             ;Set PSW.Z
        pop     edi
        pop     esi
        ret EndProc ReadCommString ;************************************************************************
;*
;
; WriteCommString
;
; Description:
;       The given buffer is sent to the passed port if possible.
;    Once the output queue is detected as being full, a CE_TXFULL error
;    will be indicated and AX will be returned as the # of chars actually
;    queued.
;
; Entry:
;    ESI -> Portinformation struct
;    ECX = # bytes to write
;    EDI -> buffer.
; Exit:
;    EAX = # bytes queued.
; Uses:
;    ALL
;
;========================================================================
```

14

```
=
BeginProc WriteCommString, Public
        push    ecx             ; save count
        call    MSRWait         ; see if lines are correct for output
        pop ecx
        push    ecx
        jnz cws_error           ; timeout occured, return error
        mov edx,[esi.pData.QOutSize] ; see if queue is full
        sub edx,[esi.pData.QOutCount] ; edx = # of chars free in queue
        jle scs_full            ; There is no room in the queue scs_loop:
        push    ecx             ; save count left to send
        cmp ecx,edx             ; Q: room for buffer in queue
        jbe @F          ;       Y:
        mov ecx,edx             ;   N: adjust size to send
@@:
        push    ecx             ; save # of chars which will be copied
        push    esi
        push    edi
        mov ebx,[esi.pData.QOutAddr] ; --> output queue
        mov edx,[esi.pData.QOutSize]
        mov edi,[esi.pData.QOutPut] ; get index into queue
        sub edx,edi             ; EDX = # of free chars befor end of q
        cmp edx,ecx
        jbe @F
        mov edx,ecx
@@:
        xchg    edx,ecx         ; ECX = # of chars for 1st copy
        sub edx,ecx             ; EDX = # of chars for 2nd copy
        pop esi         ; ESI -> SRC buffer
        add edi,ebx             ; EDI -> current pos in q
        cld
        rep movsb               ; copy fist section
        mov ecx,edx
        jecxz   @F
        mov edi,ebx             ; circle back to start of queue
        rep movsb
@@:
        sub edi,ebx             ; EDI = last index into queue
        mov edx,edi
        mov edi,esi             ; last location in src buffer
        pop esi         ; ESI --> COMDEB
        pop ebx         ; # of chars copied
        cli
;       CLICH
        mov [esi.pData.QOutPut],edx ; new index into queue
        add [esi.pData.QOutCount],ebx
        mov edx,[esi.pData.QOutCount] ; get new count
        cmp edx,[esi.SendTrigger]   ; Q: Have we overshot the trigger ?
        jb  scs_stillbelowtrigger ;     N: do not start looking
        and [esi.NotifyFlagsHI], NOT CN_TRANSMIT ; start looking now scs_stillbelowtrigger:
        call    KickTx
        sti
;       STICH
        pop ecx
        sub ecx,ebx             ; # of chars left to send
        jnz scs_full_2          ;   jump if none
scs_exit:
        pop eax
        sub eax,ecx             ; EAX = # transfered
        ret scs_full:
        cli
        call    KickTx
        sti
scs_full_2:
        or  [esi.pData.dwCommError],CE_TXFULL
```

15

```
; Uses:
;           Flags
;================================================================================
BeginProc ExtCom_FN1, PUBLIC or      [esi.HSFlag],XOffReceived
PUBLIC          ExtComDummy
ExtComDummy:
        clc
        ret
EndProc ExtCom_FN1

;*******************************************************************************
*
;
; ExtCom_FN2
;
; Description:
;           Similar to receiving X-Off char. Buffered xmission is
;           restarted.
; Entry:
;           ESI -> PortInformation struct
;           EDX = port base, interrupts disabled.
; Exit:
;           CLC
; Uses:
;           Same as KickTx + flags.
;================================================================================
BeginProc ExtCom_FN2, PUBLIC and     [esi.HSFlag],NOT XoffReceived
        call    KickTx                  ; kick transmitter interrupts on
        clc
        ret
EndProc ExtCom_FN2

;*******************************************************************************
*
;
; ExtCom_FN3
;
; Description:
;           Set the RTS signal active
; Entry:
;           ESI --> PortInformation struct
;           EDX = port base, interrupts OFF
; Exit:
;           CLC
; Uses:
;           EAX,EDX
;================================================================================
BeginProc ExtCom_FN3, PUBLIC add     dl,ACE_MCR      ; --> modem control reg
        in      al,dx           ; get current settings
        or      al,ACE_RTS      ; set RTS
        IO_Delay
        out     dx,al           ; and update
        clc
        ret
EndProc ExtCom_FN3

;*******************************************************************************
*
;
; ExtCom_FN4
;
; Description:
;           Set the RTS signal INACTIVE.
```

```
        jmp scs_exit cws_error:
    pop eax
    sub eax,ecx         ; EAX = # transfered
cws_exit:
    ret EndProc WriteCommString
;******************************************************************************
*
;
; ExtnFcn:
;
; Description:
;           some extended functions.
;           Functions currently implemented:
;
;       0: Dummy     - Ignored
;       1: SETXOFF   - Exactly as if X-OFF character has been received.
;       2: SETXON    - Exactly as if X-ON character has been received.
;       3: SETRTS    - Set the RTS signal
;       4: CLRRTS    - Clear the RTS signal
;       5: SETDTR    - Set the DTR signal
;       6: CLRDTR    - Clear the DTR signal
;       7: RESETDEV- Yank on reset line if available (LPT devices)
;       8: GETLPTMAX - ignored
;       9: GETCOMMAX - ignored
;       10: GETCOMBASEIRQ - return base and IRQ of COMM port
;       11: GETCOMBASEIRQ1 - -do-
;       12: SETBREAK - set break condition
;       13: CLEARBREAK - clear break condition
;
; Entry:
;     ESI -> Port information EBX = function code.
; Exit:
;     EAX = Comm error word or return value of subfunction
; Uses:
;     C standard
;
;==============================================================================
=

BeginProc ExtnFcn, Public push  edi
    mov   edx,[esi.Port]      ; get base address
    shl   ebx,2
    cli                       ; exclusive access.
    call  DWORD PTR [ebx+ExtTab]  ; call function
    sti
    jc    ExtCom40            ; jump if sub returns data in EAX
    mov   eax,[esi.pData.dwCommError]
ExtCom40:
    pop   edi
    ret EndProc ExtnFcn
;******************************************************************************
*
;
; ExtCom_FN1
;
; Description:
;           similar to receiving an X-OFF char. Buffered xmission of
;           chars is halted until and X-ON char is received, or until
;           we fake that with a clear X-Off call.
; Entry:
;           ESI -> PortInformation struct
;           EDX = port base, interrupts off.
; Exit:
;           CLC.
```

```
; Entry:
;          ESI --> PortInformation struct
;          EDX = port base, interrupts off
; Exit:
;          CLC
; Uses:
;          EDX,EAX
;================================================================
BeginProc ExtCom_FN4, PUBLIC add   dl,ACE_MCR        ; --> modem control reg
        in    al,dx             ; get current settings
        and   al,NOT ACE_RTS        ; clear RTS
        IO_Delay
        out   dx,al             ; update
        clc
        ret
EndProc ExtCom_FN4

;****************************************************************************
;
; ExtCom_FN5
;
; Description:
;          Set DTR
; Entry:
;          ESI -> PortInformation struct
;          EDX = port base, interrupts off
; Exit:
;          CLC
; Uses:
;          EAX,EDX
;================================================================
BeginProc ExtCom_FN5, PUBLIC add   dl,ACE_MCR        ; --> modem control reg
        in    al,dx             ; current settings
        or    al,ACE_DTR        ; set DTR
        IO_Delay
        out   dx,al             ; update
        clc
        ret
EndProc ExtCom_FN5

;****************************************************************************
;
; ExtCom_FN6
;
; Description:
;          Clear DTR signal
; Entry:
;          ESI -> PortInformation struct
;          EDX = port base, interrupts off
; Exit:
;          CLC
; Uses:
;          EAX,EDX
;================================================================
BeginProc ExtCom_FN6, PUBLIC add   dl,ACE_MCR        ; --> Modem control reg
        in    al,dx             ; current settings
        and   al,NOT ACE_DTR        ; turn it off
        IO_delay
        out   dx,al             ; update
        clc
        ret
```

```
EndProc ExtCom_FN6

;*****************************************************************************
;
; ExtCom_FN7
;
; Description:
;           Assert the RESET line on an LPT port, useless for us.
; Entry:
;           ESI -> PortInformation struct
;           EDX = port base, interrupts off
; Exit:
;           CLC
; Uses:
;           None.
;==============================================================================
BeginProc ExtCom_FN7, PUBLIC
      sti
      clc
      ret
EndProc ExtCom_FN7

;*****************************************************************************
;
; ExtCom_FN10
;
; Description:
;           Get COM port base and IRQ
; Entry:
;           EDX = port base
;           ESI -> PortInformation struct
; Exit:
;           EAX = (IRQ,base)
; Uses:
;           FLAGS,eax,edx
;==============================================================================
BeginProc ExtCom_FN10, PUBLIC movzx eax,[esi.IRQn]
      shl   eax,16
      mov   ax,WORD PTR [esi.Port]
      stc
      ret
EndProc ExtCom_FN10

;*****************************************************************************
;
; ExtCom_FN12
;
; Description:
;           Sets break condition. Suspends character transmission,
;           and places the transmission line in a break state until
;           Clear break is called.
;           Clamps transmit data line low. Doesn't wait for the
;           transmitter holding register and shift registers to empty.
; Entry:
;           ESI -> Port data
;           EDX = port base
; Exit:
;           CLC
; Uses:
;           C standard.
;
;==============================================================================
```

```
BeginProc ExtCom_FN12, Public mov    ecx,0FF00h+ACE_SB  ; will be setting break
        jmp    ClrBrk10
        .errnz       BreakSet-ACE_SB        ; must be same EndProc ExtCom_FN12

;******************************************************************************
*
;
; ExtCom_FN13
;
; Description:
;             Clears break condition.
;             Releases any BREAK clamp on Tx data line
; Entry:
;             ESI -> port data
;             EDX -> Port base
; Exit:
;             CLC
; Uses:
;             C standard.
;
;==============================================================================
=

BeginProc ExtCom_FN13, Public mov    ecx,(NOT ACE_SB) SHL 8
        .errnz       BreakSet-ACE_SB        ; must be same bits ClrBrk10:
        and    [esi.HSFlag],ch     ; Set or clear the BreakSet Bit
        or     [esi.HSFlag],cl
;
; CH = mask to remove bits in the line Control reg
; CL = mask to turn on the bits in the line control reg
;
        add    dl,ACE_LCR          ; --> LCR
        in     al,dx               ; old control value
        and    al,ch               ; turn off undesired bits
        or     al,cl               ; turn on desired bits
        IO_Delay
        out    dx,al               ; new LCR value
        clc                        ; caller gets error dword
        ret EndProc ExtCom_FN13

;******************************************************************************
*
;
; Flush
;
; Description:
;             Flush pending reads/writes. It does so before returning
;             to the caller.
;
; Entry:
;             ESI = PortInformation
;             EBX = 0 => transmit queue, 1=> receive queue
; Exit:
;             none.
; Uses:
;             C standard.
;
;==============================================================================
=
BeginProc Flush, Public
```

```
            push    edi mov     ecx,_PortData.QOutCount-_PortData.QInCount ; # of bytes to zero
            lea     edi,[esi.pData.QInCount] ; --> receive Queue data
            or      bl,bl                   ; xmit q ?
            jnz     Flush10                 ; No, input Q
            add     edi,ecx                 ; YES, --> xmit Q data
            mov     edx,[esi.pData.QOutCount] ; save for determining whether to
                                            ; send Xmit notification.....
    Flush10:
            cld
            shr     ecx,2                   ; convert to DWORDS.
            xor     eax,eax
            cli
            rep     stosd
            sti
            .errnz      _PortData.QInGet-_PortData.QInCount-4
            .errnz      _PortData.QInPut-_PortData.QInGet-4
            .errnz      _PortData.QOutCount-_PortData.QInPut-4
            .errnz      _PortData.QOutGet-_PortData.QOutCount-4
            .errnz      _Portdata.QOutPut-_PortData.QOutGet-4 or      bl,bl                   ; Rx queue?
            jz      Flush30                 ; No, xmit queue ;
    ; If the queue to be cleared is the receive queue, any
    ; hardware handshake must be cleared to prevent a possible
    ; deadlock situation.  Since we just zeroed the queue count,
    ; a quick call to $RecCom should do wonders to clear any
    ; receive handshake (i.e. send XON if needed).
    ;
    Flush20:
            call    RecCom                  ;Take care of handshakes here
            and     [esi.pData.NotifyFlagsHI], NOT CN_RECEIVE
            jmp     Flush40

Flush30:
            or      edx,edx                 ; Q: Was there any data ?
            jz      Flush40                 ;   N: no need to inform anyone
            cmp     [esi.SendTrigger],0
            je      Flush40                 ; no need to call
            mov     eax, CN_TRANSMIT        ; we have fallen below the trigger
            call    Notify_Owner            ; notify the owner of the port Flush40:
            pop     edi
            ret
    EndProc Flush ;****************************************************************************
    ;*
    ;
    ; StaCom:
    ;
    ; Description:
    ;           returns status of open channel.
    ;           Returns the number of bytes in both queues.
    ; Entry:
    ;           ESI = Portinformation struct
    ;           EBX -> Ptr to status structure to be updated.
    ; Exit:
    ;           AX = error word
    ;           status structure is updated.
    ; Uses:
    ;           C standard
    ;
    ;===========================================================================
    =
    BeginProc StaCom, Public or      ebx,ebx                 ; Null pointer ?
```

21

```
        jz      StaCom25           ; yes, return error code
;
; Need to get the status for a com port.  Since not all the
; status is contained within EFlags, it has to be assembled.
; Also note that currently there is no way to specify RLSD
; as a handshaking line, so fRLSDHold is always returned false.
;
        mov     edx,[esi.AddrMSRShadow]
        mov     al,[edx]              ;Get state of hardware lines
        and     al,[esi.OutHHSLines]  ;Mask off required bits
        xor     al,[esi.OutHHSLines]  ;1 = line low
        shr     al,4                  ;align bits, al = fCTSHold + fDSRHold
        .errnz      ACE_CTS-00010000b
        .errnz      ACE_DSR-00100000b
        .errnz      fCTSHold-00000001b
        .errnz      fDSRHold-00000010b mov     ah,[esi.HSFlag]       ;Get fXOffHold+fXOffSent
        and     ah,XOffReceived+XOffSent
        or      al,ah .errnz      XOffReceived-fXOFFHold
        .errnz      XOffSent-fXOFFSent mov     ah,[esi.EFlags]       ;Get fEOF+fTxImmed
        and     ah,fEOF+fTxImmed
        or      al,ah mov     ecx,[esi.pData.QInCount] ;Get input queue count
        mov     edx,[esi.pData.QOutCount] ;Get tx queue count movzx   eax,al
        mov     [ebx._COMSTAT.BitMask],eax
        mov     [ebx._COMSTAT.cbInQue],ecx
        mov     [ebx._COMSTAT.cbOutQue],edx StaCom25:
        ret EndProc StaCom VxD_Locked_Code_Ends end
```

```
; VIPD1P.INC -- Include file for VIPD1 Public serivces
;
; Version 9501111242
;

VIPD1_DEVICE_ID   EQU 4343h

Begin_Service_Table VIPD1

VIPD1_SERVICE       VIPD1_HW_Avail
VIPD1_SERVICE       VIPD1_Reg_Write
VIPD1_SERVICE       VIPD1_Reg_Read
VIPD1_SERVICE       VIPD1_HW_Int
VIPD1_SERVICE       VIPD1_Tick ; The following are for resolution with other VIPD VxDs. Unless YOU are a VIPD
; VxD, don't call them.

VIPD1_SERVICE       VIPD1_line_to_char
VIPD1_SERVICE       VIPD1_Modem_adjust_power_level
VIPD1_SERVICE       VIPD1_line_to_clear
VIPD1_SERVICE       VIPD1_Dptone_set_frequency
VIPD1_SERVICE       VIPD1_line_to_break
VIPD1_SERVICE       VIPD1_Available_option
VIPD1_SERVICE       VIPD1_Dpcar_get_mse
VIPD1_SERVICE       VIPD1_Dpcar_end_now
VIPD1_SERVICE       VIPD1_dpsig_status
VIPD1_SERVICE       VIPD1_line_disable_interrupts
VIPD1_SERVICE       VIPD1_Task_tcb_init
VIPD1_SERVICE       VIPD1_Dptone_detect_off
VIPD1_SERVICE       VIPD1_Timer_expired
VIPD1_SERVICE       VIPD1_Dpcar_set_mute
VIPD1_SERVICE       VIPD1_Dpcar_get_current
VIPD1_SERVICE       VIPD1_line_from_clear
VIPD1_SERVICE       VIPD1_dte_to_char
VIPD1_SERVICE       VIPD1_dte_to_clear
VIPD1_SERVICE       VIPD1_Task_insert
VIPD1_SERVICE       VIPD1_dte_to_break
VIPD1_SERVICE       VIPD1_Assume_fail
VIPD1_SERVICE       VIPD1_line_to_free
VIPD1_SERVICE       VIPD1_Dpcar_begin
VIPD1_SERVICE       VIPD1_Dpcar_is_v32
VIPD1_SERVICE       VIPD1_Dpcar_clear
VIPD1_SERVICE       VIPD1_Signal_test
VIPD1_SERVICE       VIPD1_Dptone_on
VIPD1_SERVICE       VIPD1_idle_flag
VIPD1_SERVICE       VIPD1_line_reset
VIPD1_SERVICE       VIPD1_Dpconv_get_snr_table
VIPD1_SERVICE       VIPD1_Dptone_detect_on
VIPD1_SERVICE       VIPD1_dpsig_tones
VIPD1_SERVICE       VIPD1_Confreg_read
VIPD1_SERVICE       VIPD1_Timer_start
VIPD1_SERVICE       VIPD1_line_detection
VIPD1_SERVICE       VIPD1_line_from_num
VIPD1_SERVICE       VIPD1_line_rx_block
VIPD1_SERVICE       VIPD1_Level_transmit_query
VIPD1_SERVICE       VIPD1_dte_from_num
VIPD1_SERVICE       VIPD1_line_tx_block
VIPD1_SERVICE       VIPD1_Signal_notify_insert
VIPD1_SERVICE       VIPD1_dte_from_clear
VIPD1_SERVICE       VIPD1_Daa_set_alternate_compensation
VIPD1_SERVICE       VIPD1_Dpcar_set_transmit_level
VIPD1_SERVICE       VIPD1_Dptone_set_duration
VIPD1_SERVICE       VIPD1_Dpconv_get_mse
VIPD1_SERVICE       VIPD1_Task_remove
VIPD1_SERVICE       VIPD1_Dptone_set_detect_threshold
VIPD1_SERVICE       VIPD1_line_init
VIPD1_SERVICE       VIPD1_Dpcar_set
VIPD1_SERVICE       VIPD1_Dpcar_renegotiate
VIPD1_SERVICE       VIPD1_line_from_char
VIPD1_SERVICE       VIPD1_dte_from_char
```

1

```
VIPD1_SERVICE      VIPD1_line_autoreliable_fallback
VIPD1_SERVICE      VIPD1_Dptone_set_power
VIPD1_SERVICE      VIPD1_Notify_init_ncb
VIPD1_SERVICE      VIPD1_line_setup_speed
VIPD1_SERVICE      VIPD1_Dptone_off
VIPD1_SERVICE      VIPD1_Dpcar_retrain
VIPD1_SERVICE      VIPD1_dte_to_free
VIPD1_SERVICE      VIPD1_line_enable_interrupts
VIPD1_SERVICE      VIPD1_Dptone_set_detect_frequency End_Service_Table VIPD1
```

APPENDIX B

U.S. EXPRESS MAIL NO. TB855044421US

```
        page    60, 132
;*****************************************************************************
*
    title   CPQFMDB - Crazy Horse WIN95 port driver
;*****************************************************************************
*
;
;   (C) Copyright Compaq Computer Corp, 1995
;
;   Title:  CPQFMDB - Crazy Horse WIN95 port driver, DOSBOX
;
;   Module:   CPQFMDB.ASM - Core code
;
;   $Revision:$
;
;   Author:   Peter J. Brown
;
;$Header:$
;
;$Log:$
;
;*****************************************************************************
*

.386p

;==============================================================================
;                     I N C L U D E S   &   E Q U A T E S
;==============================================================================

.XLIST
    INCLUDE opttest.inc
    INCLUDE vmm.inc
    INCLUDE debug.inc
    INCLUDE vpicd.inc
    INCLUDE vcomm.inc
    INCLUDE vtd.inc
    INCLUDE vipdlp.inc
    INCLUDE vcd.inc
    INCLUDE configmg.inc
    Create_CPQFMDB_Service_Table equ 1
    INCLUDE cpqfmdb.inc
    INCLUDE pccard.inc
       INCLUDE ins8250.inc
    .LIST CPQFMDB_Major_Ver           equ     00h
CPQFMDB_Minor_Ver           equ     01h
MANUTUPLE                   equ     015h XOFF_Char                   EQU     13h
CB_XOFF_PROTO               EQU     1
TRUE                        EQU     1

;==============================================================================
;                          L O C A L   D A T A
;==============================================================================

VxD_DATA_SEG

; Card Services register client structure
rcRegClient RegisterClient_s < CLTA_MEM_DRIVER OR CLTA_INSERT_SHARED OR
CLTA_INSERT_EXCLUSIVE, \
        (EVTM_EJECT_REQUEST OR EVTM_INSERT_REQUEST OR EVTM_CARD_DETECT_CHG OR
EVTM_RESET_EVENTS), \
        <>, 0201h>   ; version required
Size_Register_Client_s EQU    SIZEOF rcRegClient
```

```
IFDEF DEBUG
    PUBLIC CPQFMDB_Sys_Critical_Init
    PUBLIC CPQFMDB_Device_Init
    PUBLIC CPQFMDB_Control_Proc
    PUBLIC CPQFMDB_Sys_VM_Terminate
    Public CH_Com_Port
    Public CH_Com_IRQ
    Public data_pump_int_handle
    Public VIPD_Port
    Public VIPD_Init
    Public Time_Slice
    PUBLIC CH_IN
    PUBLIC CH_SOCKET
    PUBLIC Control_Proc
    PUBLIC Hw_Int_Proc
    PUBLIC Virt_Int_Proc
    PUBLIC EOI_Proc
    PUBLIC Mask_Change_Proc
    PUBLIC IRET_Proc
    PUBLIC VCHD_Virt_In_RxTx
    PUBLIC VCHD_Virt_Out_RxTx
    PUBLIC VCHD_Virt_In_IER
    PUBLIC VCHD_Virt_Out_IER
    PUBLIC VCHD_Virt_In_IIR
    PUBLIC VCHD_Virt_Out_IIR
    PUBLIC VCHD_Virt_In_LCR
    PUBLIC VCHD_Virt_Out_LCR
    PUBLIC VCHD_Virt_In_MCR
    PUBLIC VCHD_Virt_Out_MCR
    PUBLIC VCHD_Virt_In_LSR
    PUBLIC VCHD_Virt_Out_LSR
    PUBLIC VCHD_Virt_In_MSR
    PUBLIC VCHD_Virt_Out_MSR
        PUBLIC Compaq
        PUBLIC CHId
        PUBLIC RegName
        PUBLIC RegValue
        PUBLIC RegBufSize
        PUBLIC PNP_BASE_PORT
        PUBLIC PNP_IRQ
        PUBLIC ComNumber
        PUBLIC EventSocket
        PUBLIC ComStructP
        PUBLIC hKey
        PUBLIC FirstTime
    PUBLIC GetCHTuple
        PUBLIC TupleData
        PUBLIC ContHand
ENDIF align 4

; For Tuple compares
    Compaq                  db      'COMPAQ',0
    CHId                    db      '192 FX/MDM',0
        oldn                        db      'COM'           ; COM name for get
        oldnum                      db      '2',0           ; contention
handler
        oldname                     dd      0                               ; pointer to
oldn ; Registry stuff
    RegName                 db
'PCMCIA\COMPAQ-192_FX/MDM-C047\0',0
        RegValue            db      'PORTNAME',0
        RegBufSize          dd      0 virtprocs VCD_ProcList_Struc    <>      ; vcd trapping procs
    wClientHandle           dw  0           ; PCCARD handle
    PNP_BASE_PORT           dw  0           ; assigned port
    PNP_IRQ                 dw  0           ; assigned irq
        ComNumber                   db  0           ; 1-4
```

```
        CH_Com_Port             dw    0            ; crazy horse com port
        CH_Com_IRQ              dw    0            ; crazyhorse com irq
        data_pump_int_handle    dd    0            ; interrupt handle
        VIPD_Port               dw    0            ; Data Pump Hardware IO Port
        VIPD_Init               dw    0            ; VIPD initialized indicator
        Time_Slice              dd    0            ; time slice handle
        VCHD_INT_BUSY           dd    0            ; prevent reenter
        CH_IN                   db    0            ; is CH inserted in machine?
        CH_SOCKET               db    0ffh         ; CH in socket 0 or 1?
        EventSocket             dw    0ffh         ; socket we got the event for
        ComStructP                    dd     0                ; pointer to
VCD_Com_Struct
        hKey                          dd   0             ; Registry Key
        FirstTime                     db    0                    ; has time CH in
since VxD loaded ; GetCHTuple and TupleData must stay together
    GetCHTuple              GetTupleData_s <0,0,MANUTUPLE,0,,,,,>   ; get
tuple structure
    TupleData               db 256 DUP (0)  ; actual tuple data, also used for
registry data GetConfigInfo                 GetConfigurationInfo_s <>
        align 4
        VCD_Vier        db      0                       ; Virtual Interrupt Enable
register
        VCD_Vlcr        db      3                       ; Virtual Line Control
register
        VCD_Vmcr        db      0                       ; Virtual Modem Control
register
        VCD_Viir        db      1                       ; Virtual Interrupt Identity
register
        VCD_Vlsr        db      0                       ; Virtual Line status register
        VCD_Vrxb        db      0                       ; Virtual Rx Buffer
        VCD_Vmsr        db      0                       ; Virtual Modem status
register
        VCD_Virr        db      0                       ; Virtual Interrupt Request
register
        VCD_Protocol    db      ?
        VCD_XOFF_Flag   db      0
        VCD_RxQin       dw      0                       ; First In...
        VCD_RxQout      dw      0                       ; ...First Out
        VCD_RxQcount    dw      0                       ; How many in queue
        VCD_RxQlen      dw      10240                   ; Total size of queue in
        VCD_RxQ         dw      10240 DUP(0)    ; QUEUE STARTS HERE -- Continues
past here
        com_int_handle  dd      0                       ; interrupt handle
        owner           dd      0                       ; VM handle of owner
        cpqfmw95loaded  db      0                            ; has CPQFMW95 told us
its alive?
        ContHand                dd         0                    ; Contention
Handler VxD_DATA_ENDS ;=============================================================================
=
;          V I R T U A L    D E V I C E    D E C L A R A T I O N
;=============================================================================
=

Declare_Virtual_Device  CPQFMDB, CPQFMDB_Major_Ver, CPQFMDB_Minor_Ver,\
                        CPQFMDB_Control_Proc, CPQFMDB_DEVICE_ID,\
                        Undefined_Init_Order,, ;=============================================================================
=
;                              I C O D E
;=============================================================================
=
VxD_ICODE_SEG
```

```
;------------------------------------------------------------------------------
;
;   CPQFMDB_Sys_Critical_Init
;
;   Description:
;
;------------------------------------------------------------------------------

BeginProc CPQFMDB_Sys_Critical_Init

Trace_Out "CPQFMDB: Sys_Critical_Init"
    clc
    ret

EndProc CPQFMDB_Sys_Critical_Init

;------------------------------------------------------------------------------
;
;   CPQFMDB_Device_Init
;
;   Description:
;
;------------------------------------------------------------------------------

BeginProc CPQFMDB_Device_Init

Trace_Out "CPQFMDB: Device_Init"
    VxDCall VCOMM_Get_Version           ; Q: VCOMM present ?
    jc  init_noload                     ;    N: fail to load.
    Trace_Out "CPQFMDB: VCOMM present"

Trace_Out "CPQFMDB: Device_Init Done"
    clc
init_noload:
    ret

EndProc CPQFMDB_Device_Init

VxD_ICODE_ENDS
VxD_LOCKED_CODE_SEG

;==============================================================================
;                       N O N P A G E A B L E    C O D E
;==============================================================================

;------------------------------------------------------------------------------
;
;   CPQFMDB_Control_Proc
;
;   DESCRIPTION:
;       Dispatches VMM control messages to the appropriate handlers.
;
;   ENTRY:
;       EAX = Message
;       EBX = VM associated with message
;
;   EXIT:
;       Carry clear if no error (or if not handled by the VxD)
;       or set to indicate failure if the message can be failed.
;
;   USES:
;       All registers.
;
;------------------------------------------------------------------------------
```

```
BeginProc CPQFMDB_Control_Proc

Control_Dispatch Sys_Critical_Init, CPQFMDB_Sys_Critical_Init
    Control_Dispatch Device_Init, CPQFMDB_Device_Init
    Control_Dispatch Sys_VM_Terminate, CPQFMDB_Sys_VM_Terminate
    Control_Dispatch Init_Complete, CPQFMDB_Init_Complete
    clc
    ret EndProc CPQFMDB_Control_Proc ;-------------------------------------------------------------------------------
; TITLE:        CPQFMDB_Init_Complete
;
; DESCRIPTION:
;
; ENTRY:        EAX=System Control Call Identifier
;               EBX=VM handle
;               EDX=Reference data
;               ESI=Command tail
;               EBP=Pointer to Client Regs structure
;
; RETURNS:      Carry clear to indicate success
;               Carry set to indicate control call failed.
;-------------------------------------------------------------------------------
BeginProc CPQFMDB_Init_Complete Trace_Out "CPQFMDB: Init_Complete"

Trace_Out "CPQFMDB: Starting CS reg"

; Make sure we're using the right version bail if not
    VxDCall PCCARD_Get_Version
    jc ICFAIL                           ; Get configuration of PCMCIA
controller ; Register with Card Services to get the event notification callbacks.
    mov     al,F_REGISTER_CLIENT
    xor     edx,edx                     ; Client Handle
    mov     esi,OFFSET32 CPQFMDB_CardServicesClient
    mov     ecx,Size_Register_Client_s
    mov     ebx,OFFSET32 rcRegClient    ; EBX->Register Client Structure
    VxDCall PCCARD_Card_Services
    jc ICFAIL                           ; Failed
    mov     [wClientHandle],dx          ; Save the Client Handle ICDone:
    Trace_Out "CPQFMDB:  Registered with Card Services Ok!"

clc
ICFAIL:
    ret

EndProc CPQFMDB_Init_Complete

;-------------------------------------------------------------------------------
;
;   CPQFMDB_Sys_VM_Terminate
;
;   Description:
;
;-------------------------------------------------------------------------------

BeginProc CPQFMDB_Sys_VM_Terminate

Trace_Out "CPQFMDB: CPQFMDB_Sys_VM_Terminate"

clc
    ret
```

```
EndProc CPQFMDB_Sys_VM_Terminate
;------------------------------------------------------------------------
; TITLE:         CPQFMDB_CardServicesClient
;
; DESCRIPTION:   This routine is the callback function for Card Services
;                notification for events such as CARD_INSERTION and
;                CARD_REMOVAL.  PCCARD.VxD (Win95 Card Services) will
;                call this function to complete the event notification
;                process.
;
; ENTRY:         AL=Function
;                CX=Socket
;                DX=Info
;                DI=First word of RegisterClient arg packet ClientData field
;                ESI=Third and Fourth word of RegisterClient arg packet
;                EBP=MTD request
;                EBX=Buffer or BX=Misc when no buffer is supplied
;
; RETURNS:       AX=Status on return to Card Services
;                CF=clear success, or set to indicate failure
;
;------------------------------------------------------------------------
BeginProc CPQFMDB_CardServicesClient, PUBLIC Trace_Out "CPQFMDB: CS Callback!"

mov     [EventSocket],cx            ; save the socket number
    movzx   ecx,cx                      ; ECX=Socket number cmp     AL,EV_CARD_INSERTION        ; Card insertion event?
    jne     CSCRemoval                  ; No--Check for Card removal ;--------------------Card Insertion--------------------------------------
    Trace_Out "Card Insertion! #EAX"

cmp     [CH_IN],1                   ; already have a CH?
    je      CSCDone                     ; yup, ignore the second one mov     AL,F_GET_FIRST_TUPLE        ; function
    xor     edx,edx                     ; handle
    xor     esi,esi
    mov     ebx, OFFSET32 GetCHTuple    ; arg pointer
    mov     [ebx.GetTupleData_s.Socket],cx ; fillin structure
    mov     cx,SIZEOF GetTuple_s        ; arg length
    VxDCall PCCARD_Card_Services
    jc      CSCDone                     ; failed mov     AL,F_GET_TUPLE_DATA         ; function
    mov     [ebx.GetTupleData_s.TupleDataMax],0ffh
    mov     cx,SIZEOF GetTupleData_s    ; arg length
    VxDCall PCCARD_Card_Services
    jc      CSCDone                     ; failed mov     esi, OFFSET32 TupleData
    inc     esi
    inc     esi                         ; point at COMPAQ
    mov     edx, OFFSET32 Compaq        ; ref string
    call    MyStrCmp
    jc      CSCDone                     ; its not our modem inc     esi                         ; point at 192 FX/MDM
    mov     edx, OFFSET32 CHId          ; ref string
    call    MyStrCmp
    jc      CSCDone                     ; its not our modem movzx   ecx,[EventSocket]           ; restore socket number
    Trace_Out "CPQFMDB: CH inserted socket #ECX"

mov     [CH_IN],1                   ; save state
    mov     [CH_SOCKET],cl              ; save socket
```

```
                                                ; activate modem code!
        cmp     [VIPD_INIT],1                   ; already inited?
        je      CSCDone                         ; Y: skip mov     AL,F_GET_CONFIGURATION_INFO     ; function
          mov          ebx,OFFSET32 GetConfigInfo
        mov     [ebx.GetConfigurationInfo_s.Socket],cx
        mov     cx,SIZEOF GetConfigurationInfo_s ; arg length
        xor         edx,edx
        xor         esi,esi
        VxDCall PCCARD_Card_Services
        jc      CSCDone                         ; failed add         ebx,25                                    ;
GetConfigurationInfo.AssignedIRQ
        mov         al,[ebx]
        movzx eax,al
        mov     [PNP_IRQ],ax
        Trace_Out "IRQ #EAX"
        add         ebx,3
        mov         ax,[ebx]                                  ;
GetConfigurationInfo.BasePort1
        movzx eax,ax
        mov     [PNP_BASE_PORT],ax
        Trace_Out "Baseport #EAX"

; what port is it in the registry?

mov             eax,OFFSET32 hKey
        push        eax
        mov             eax,REGKEY_OPEN
        push        eax
        mov             eax,OFFSET32 RegName
        push        eax
        mov         eax,REGTYPE_ENUM
        push        eax
        VxDCall     _GetRegistryKey
        add             esp,16
        or              eax,eax
        jnz             CSCDone mov             eax,0ffh                        ; size of value
buffer
        mov             [RegBufSize],eax                ; set it
        mov             eax,OFFSET32 RegBufSize         ;
        push        eax
        mov             eax,OFFSET32 TupleData          ; place to put the
returned value
        push        eax
        mov             eax,REG_SZ                      ; a string please
        push        eax
        xor             eax,eax                                 ; reserved
        push        eax
        mov             eax,OFFSET32 RegValue           ; name of value
        push        eax
        mov             eax,[hKey]                      ; Reg Key
        push        eax
        VxDCall     _RegQueryValueEx                ; get the value
        add             esp,24
        or              eax,eax
        jnz             CSCDone                         ; don't know
com port number mov             eax,OFFSET32 TupleData          ; point at returned
string
        add             eax,3                           ; skip COM part
        mov             ch,[eax]                        ; digit after COM
        inc             eax
        mov             cl,[eax]                        ; next digit or
null
        or              cl,cl                           ; if its not null,
its not COM1-4
```

```
                jnz             CSCDone
                sub             ch,030h                         ; ascii to decimal
                cmp             ch,4
                ja              CSCDone                         ; only COM1-4 mov             [ComNumber],ch                  ; save it
                cmp             ch,1
                jne             COM234
                mov             [CH_Com_Port],03f8h             ; COM1
                mov             [CH_Com_Irq],4
                jmp             COMSET COM234:
                cmp             ch,2
                jne             COM34
                mov             [CH_Com_Port],02f8h             ; COM2
                mov             [CH_Com_Irq],3
                jmp             COMSET COM34:
                cmp             ch,3
                jne             COM4
                mov             [CH_Com_Port],03e8h             ; COM3
                mov             [CH_Com_Irq],4
                jmp             COMSET COM4:
                mov             [CH_Com_Port],02e8h             ; COM4
                mov             [CH_Com_Irq],3

COMSET:
                mov             eax,[hKey]                      ; close Key
                push            eax
                VxDCall         _RegCloseKey
                add             esp,4 mov             ax,[CH_COM_PORT]
                shl             eax,16
                mov             ax,[CH_COM_IRQ]
                mov             esi,eax                         ; base,irq
                xor     eax,eax                 ; extra VCD_Com space
                mov     ecx,08h                 ; extra VM space (hack, both can't be 0)
                movzx           edx,[ComNumber]         ; 1-4
;               dec             edx                     ; convert to 0-3
                xor     ebx,ebx                 ; not shareable
                mov     edi, OFFSET32 virtprocs ; virt procs
                mov     [edi.VPS_Control_Proc],OFFSET32 Control_Proc
                mov     [edi.VPS_Hw_Int_Proc],OFFSET32 Hw_Int_Proc
                mov     [edi.VPS_Virt_Int_Proc],OFFSET32 Virt_Int_Proc
                mov     [edi.VPS_EOI_Proc],OFFSET32 EOI_Proc
                mov     [edi.VPS_Mask_Change_Proc],OFFSET32 Mask_Change_Proc
                mov     [edi.VPS_IRET_Proc],OFFSET32 IRET_Proc
                mov     [edi.VPS_In_RxTxB],OFFSET32 VCHD_Virt_In_RxTx
                mov     [edi.VPS_Out_RxTxB],OFFSET32 VCHD_Virt_Out_RxTx
                mov     [edi.VPS_In_IER],OFFSET32 VCHD_Virt_In_IER
                mov     [edi.VPS_Out_IER],OFFSET32 VCHD_Virt_Out_IER
                mov     [edi.VPS_In_IIR],OFFSET32 VCHD_Virt_In_IIR
                mov     [edi.VPS_Out_IIR],OFFSET32 VCHD_Virt_Out_IIR
                mov     [edi.VPS_In_LCR],OFFSET32 VCHD_Virt_In_LCR
                mov     [edi.VPS_Out_LCR],OFFSET32 VCHD_Virt_Out_LCR
                mov     [edi.VPS_In_MCR],OFFSET32 VCHD_Virt_In_MCR
                mov     [edi.VPS_Out_MCR],OFFSET32 VCHD_Virt_Out_MCR
                mov     [edi.VPS_In_LSR],OFFSET32 VCHD_Virt_In_LSR
                mov     [edi.VPS_Out_LSR],OFFSET32 VCHD_Virt_Out_LSR
                mov     [edi.VPS_In_MSR],OFFSET32 VCHD_Virt_In_MSR
                mov     [edi.VPS_Out_MSR],OFFSET32 VCHD_Virt_Out_MSR
        VxDCall VCD_Virtualize_Port_Dynamic
        jc CSCDone
            mov     [ComStructP],esi
```

```
        Trace_Out  "CPQFMDB: VCD_Virtualize_Port_Dynamic worked!"

movzx   eax,[PNP_BASE_PORT]
        call    Set_CH_Port
        movzx   eax,[PNP_IRQ]
        call    SET_CH_IRQ
        movzx   eax,[CH_Com_Port]
        movzx   ebx,[CH_Com_Irq]
        movzx   ecx,[ComNumber]
        call    SET_CH_COMPORT ;       cmp             [FirstTime],1                   ; if this is first time we're starting
;       je              CSCDone                         ; set Baud rate to something real
        xor             al,al
        mov             [esi].VCD_Def_BAUD_MSB,al       ; 19200
        mov             [esi].VCD_Def_IER,al
        mov             [esi].VCD_Def_MCR,al
        mov             [esi].VCD_Def_MSR,al
        mov             al,6
        mov             [esi].VCD_Def_Baud_LSB,al       ; 19200
        mov             al,3
        mov             [esi].VCD_Def_LCR,al
        mov             al,60h
        mov             [esi].VCD_Def_LSR,al mov             dx,[CH_Com_Port]                ; base
        add     dl,ACE_LCR                              ; EDX -> LCR
        mov     al,83h                                  ; set DLAB on, 8 data bits, no parity
        OUTDXAL                                         ; write it
        sub     dl,ACE_LCR-ACE_DLL                      ; DLR LO
        mov             al,6                            ; default baud rate to 19200
        OUTDXAL                                         ; write
        inc     dl                                      ; DLR HI
        mov             al,0                            ; default baud rate to 19200
        OUTDXAL                                         ; write it
        add     dl,ACE_LCR-ACE_DLM                      ; point at LCR
        mov             al,03h                          ; shut off the DLAB
        OUTDXAL                                         ; write it
        mov             [VCD_Vlsr],al                   ; save it
        sub             dl,ACE_LCR-ACE_RBR              ; point at RBR
        INALDX                                          ; read it
        add             dl,ACE_IER                      ; IER
        mov             al,0                            ; 0
        call    VCHD_Virt_Out_IER                       ; sync sim
        add             dl,ACE_MCR-ACE_IER              ; MCR
        mov             al,0                            ; 0
        call    VCHD_Virt_Out_MCR               ; sync sim
        add             dl,ACE_LSR-ACE_MCR              ; LSR
        mov             al,60h
        call    VCHD_Virt_Out_LSR                       ; 60 cmp             [ContHand],0                    ; use stored if we have it
        jne             CSCDone
        mov             al,[ComNumber]                  ; fix oldname for this port
        add             al,030h                         ; convert to ascii
        mov             [oldnum],al                     ; put it in the string
        mov             eax,OFFSET32 oldn
        mov             [oldname],eax
        VxDCall _VCOMM_Get_Contention_Handler,<oldname>
        mov             [ContHand],eax                  ; save it jmp             CSCDone
```

```
;----------------Card Removal-----------------------------------
CSCRemoval:
    cmp     AL,EV_CARD_REMOVAL          ; Card insertion event?
    jne     CSCDone Trace_Out "Card Removal! #EAX socket #ECX"

cmp     [CH_IN],1                   ; if there's no CH, we don't care
    jne     CSCDone                     ; out of here
    cmp     [CH_SOCKET],cl              ; CH socket?
    jne     CSCDone                     ; nope, ignore Trace_Out "Crazy Horse removed!"

;       mov     al,[ComNumber]                      ; fix oldname for
this port
;       add     al,030h                             ; convert to
ascii
;       mov     [oldnum],al                         ; put it in the
string
;       mov     eax,OFFSET32 oldn
;       mov     [oldname],eax
;       VxDCall _VCOMM_Get_Contention_Handler,<oldname>
        mov     eax,[ContHand]
                                                    ; point eax
at contention handler function
        or      eax,eax                             ; test
result
        jz      CSCDone                             ; problem,
didn't get a function, prevent blue screen
        mov     edx,eax                             ; call VCDs
Port_Departure routine, because
                                                    ;
UnVirtualize_Dynamic doesn't work right.
        xor     ecx,ecx
        push    ecx
        movzx   ecx,[CH_Com_Port]
        push    ecx                     ; parameters to Port_Departure
        mov     ecx,REMOVE_RESOURCE                 ;
UnVirtualize_Dynamic doesn't work right.
        push    ecx                                 ; function code
        call    edx                                 ; Port_Departure
        add     esp,12                              ; fix stack
;       mov     esi,[ComStructP]            ; UnVirt
;       VxDCall VCD_UnVirtualize_Port_Dynamic
        mov     [CH_IN],0
        mov     [CH_SOCKET],0ffh        ; save state
        xor     eax,eax                 ; comport=0 CH removed, shutdown
        call    SET_CH_COMPORT jmp     CSCDone CSCDone:
    clc                                 ; Success
    ret EndProc CPQFMDB_CardServicesClient ;*****************************************************************************
; MyStrCmp
;
; ENTRY:    ESI -> string1
;           EDX -> string2
;
; EXIT:     CF clear strings equal
;           CF set, strings differ
;           esi,edx point at diff char, or null
;*****************************************************************************
BeginProc MyStrCmp
```

10

```
        push ecx
SCLOOP:
    mov  cl,[esi]       ; get the chars
    mov  ch,[edx]
    or   cx,cx          ; if both 0, the strings are equal, and we're done
    jz   SCEQUAL
    cmp  cl,ch          ; are the chars equal
    jne  SCDIFF         ; nope, strings different
    inc  esi            ; next char
    inc  edx
    jmp  SCLOOP SCEQUAL:
    clc                 ; signal equal
    jmp  SCDONE
SCDIFF:
    stc                 ; signal different
SCDONE:
    pop  ecx
    ret
EndProc MyStrCmp ;*****************************************************************************
*
;
;       CPQFMDB_PDSTATE
;
;       Entry:      EAX=0 CPQFMW95 dynamically exiting
;                   EAX=1 CPQFMW95 dynamically loading
;
;       Exit:
;                   EAX=Com Number
;                   EBX=Com Port
;                   ECX=Com IRQ
;
;*****************************************************************************
*

BeginProc CPQFMDB_PDSTATE, ASYNC_SERVICE
    mov         cpqfmw95loaded,al       ; store state
    ret
EndProc CPQFMDB_PDSTATE ;-----------------------------------------------------------------------------
-
;  Simulated register routines start here
;-----------------------------------------------------------------------------
-

BeginProc Control_Proc
    Trace_Out "CPQFMDB: Control_Proc -- new owner #EBX"
    mov      [owner],ebx
        cmp         ebx,0           ; dos box here?
        je          CPBye
    cmp      [CH_IN],1              ; horse here?
        jne         CPBye                           ; if not ....
    mov      cl,[CH_SOCKET]         ; get socket
      movzx ecx,cl mov      AL,F_GET_CONFIGURATION_INFO    ; function
        mov         ebx,OFFSET32 GetConfigInfo
    mov      [ebx.GetConfigurationInfo_s.Socket],cx
    mov      cx,SIZEOF GetConfigurationInfo_s  ; arg length
    xor         edx,edx
    xor         esi,esi
    VxDCall PCCARD_Card_Services
    jc          CPBye                           ; failed add         ebx,25                                                  ;
GetConfigurationInfo.AssignedIRQ
    mov         al,[ebx]
    movzx eax,al
    Trace_Out "IRQ #EAX"
    add         ebx,3
```

```
        mov         ax,[ebx]                                    ;
GetConfigurationInfo.BasePort1
        movzx   eax,ax
        Trace_Out "Baseport #EAX"

CPBye:
    clc
    ret
EndProc Control_Proc

BeginProc Hw_Int_Proc
    Trace_Out "CPQFMDB: EDX #EDX EAX #EAX Hw_Int_Proc"
    clc
    ret
EndProc Hw_Int_Proc BeginProc Virt_Int_Proc
    Trace_Out "CPQFMDB: EDX #EDX EAX #EAX Virt_Int_Proc"
    clc
    ret
EndProc Virt_Int_Proc BeginProc EOI_Proc
    Trace_Out "CPQFMDB: EDX #EDX EAX #EAX EOI_Proc"
    clc
    ret
EndProc EOI_Proc BeginProc Mask_Change_Proc
    Trace_Out "CPQFMDB: EDX #EDX EAX #EAX Mask_Change_Proc"
    clc
    ret
EndProc Mask_Change_Proc BeginProc IRET_Proc
    Trace_Out "CPQFMDB: EDX #EDX EAX #EAX IRET_Proc"
    clc
    ret
EndProc IRET_Proc ;-------------------------------------------------------------------------
;
;   VCHD_Virt_In_RxTx
;
;   Description:
;
;       ENTRY:  ESI -> VCD_COM_Struc
;                       EBX= VM handle
;                       DX = port #
;                       ECX = I/O type
;
;   EXIT:       AL = data from input
;
;-------------------------------------------------------------------------

BeginProc VCHD_Virt_In_RxTx, High_Freq

IFDEF DBUGALL
        Trace_Out "VCHD: VCHD_Virt_In_Rx"
ENDIF cli
    test    [VCD_Vlcr], LCR_DLAB   ; Q: Access is to Divisor latch?
    jnz     SHORT CB_In_Divisor_Latch   ;    Y: Yes, go do it
;
;   Input from data buffer
;
    mov     al, [VCD_Vrxb]         ; Get current character
    and     [VCD_Vlsr], NOT LSR_DR ; Preserve error bits, reset DR
    and     [VCD_Virr], NOT IER_DR ; Clear DR virtual interrupt
    call    COMBuff_Extract_Queue      ; Suck out new status/char
```

12

```
    IFDEF DEBUG_XOFF
        push    eax
        and     al, 7Fh
        cmp     al, XOFF_char
        jne     short D01_not_xoff
        mov     al, [VCD_Number]
        Trace_Out 'XOFF read on COM#al'
D01_not_xoff:
        pop     eax
    ENDIF
    IFDEF DBUGALL
        Trace_Out "VCHD: VCHD_Virt_In_Rx #EAX"
    ENDIF sti
        ret ;
;   Input from divisor latch LSB -- No virtualization
;
CB_In_Divisor_Latch:
        VxDCall VIPD1_REG_READ
IFDEF TRACEALL
        Trace_Out "VCHD: VCHD_Virt_In_Rx Divisor latch #EDX #EAX"
ENDIF
        sti
        ret EndProc VCHD_Virt_In_RxTx ;------------------------------------------------------------------------
;
;   VCHD_Virt_Out_RxTx
;
;   Description:
;
;       ENTRY:
;                   ESI -> VCD_COM_Struc
;                   EBX= VM handle
;                   DX = port #
;                   AL = data to output
;                   ECX = I/O type
;
;       EXIT:
;
;------------------------------------------------------------------------

BeginProc VCHD_Virt_Out_RxTx, High_Freq

IFDEF DBUGALL
        Trace_Out "VCHD: VCHD_Virt_Out_RxTx #EAX"
ENDIF
        cli
        test    [VCD_Vlcr], LCR_DLAB        ; Q: Access is to Divisor latch?
        jnz     SHORT CB_Out_Divisor_Latch  ;    Y: Yes, go do it and     [VCD_Virr], NOT IER_THRE    ; Write to THR clears interrupt
        cmp     al, XOFF_Char               ; Q: Is this a Ctrl-S
        je      SHORT CB_THR_Sent_XOFF      ;    Y: Force delay
        cmp     [VCD_XOFF_Flag], True       ;    N: Q: Delaying now?
        je      SHORT CB_THR_Restart        ;          Y: Stop delay now
                                            ;          N: Just send char
CB_Out_Divisor_Latch:
IFDEF TRACEALL
        Trace_Out "Divisor latch write #EDX #EAX"
ENDIF
        VxDCall VIPD1_REG_WRITE
        sti
        ret
;
```

```
;    Some other character was
;
CB_THR_Restart:
    mov     [VCD_XOFF_Flag], False
    push    eax
    push    edx
    call    COMBuff_Extract_Queue
    call    COMBuff_Test_Int_Req
    pop     edx
    pop     eax
    VxDCall VIPD1_REG_WRITE
    sti
    ret CB_THR_Sent_XOFF:
    cmp     [VCD_Protocol], CB_XOFF_Proto
    jne     SHORT CB_THR_Output_Byte
    mov     [VCD_XOFF_Flag], True
CB_THR_Output_Byte:
    VxDCall VIPD1_REG_WRITE
    sti
    ret EndProc VCHD_Virt_Out_RxTx ;---------------------------------------------------------------------
;
;   VCHD_Virt_In_IER
;
;   Description:
;
;   ENTRY:
;                   ESI -> VCD_COM_Struc
;                   EBX= VM handle
;                   DX = port #
;                   ECX = I/O type
;
;   EXIT:           AL = data from input
;
;---------------------------------------------------------------------

BeginProc VCHD_Virt_In_IER, High_Freq

IFDEF DBUG
    Trace_Out "VCHD: VCHD_Virt_In_IER"
ENDIF
    cli
    test    [VCD_Vlcr], LCR_DLAB    ; Q: Access is to divisor latch
    jnz     CB_In_Divisor_Latch     ;    Y: Do input from port
    mov     al, [VCD_Vier]          ; return virtual reg
    sti
    ret
EndProc VCHD_Virt_In_IER ;---------------------------------------------------------------------
;
;   VCHD_Virt_Out_IER
;
;   Description:
;
;   ENTRY:
;                   ESI -> VCD_COM_Struc
;                   EBX= VM handle
;                   DX = port #
;                   AL = data to output
;                   ECX = I/O type
;
;   EXIT:
;
```

```
;-------------------------------------------------------------------------
BeginProc VCHD_Virt_Out_IER IFDEF DBUG
        Trace_Out "VCHD: VCHD_Virt_Out_IER"
ENDIF
    cli
    test    [VCD_Vlcr], LCR_DLAB    ; Q: Access is to divisor latch
    jnz     CB_Out_Divisor_Latch    ;    Y: Do output to port xchg    al, [VCD_Vier]          ; What the VM thought it was
    push    edx                     ;
    VxDCall VIPD1_REG_WRITE         ;
    pop     edx                     ;
    IO_Delay                        ; Give hardware lots of time
    mov     al, [VCD_Vier]          ; Recover what the VM wants
    or      al, IER_DR              ; Make sure we get Rx ints!
    VxDCall VIPD1_REG_WRITE
    sti
    ret
EndProc VCHD_Virt_Out_IER ;-------------------------------------------------------------------------
;
;   VCHD_Virt_In_IIR
;
;   Description:
;
;   ENTRY:
;                   ESI -> VCD_COM_Struc
;                   EBX= VM handle
;                   DX = port #
;                   ECX = I/O type
;
;   EXIT:           AL = data from input
;
;-------------------------------------------------------------------------
VxD_DATA_SEG
;
; Table to translate enabled active interrupts to IIR value
;        ( see VCD_Trap_IIR )
;
COMBuff_IIR_Table LABEL BYTE
        db      IIR_NONE    ;   0   0   0   0
        db      IIR_DR      ;   0   0   0   1
        db      IIR_THRE    ;   0   0   1   0
        db      IIR_DR      ;   0   0   1   1
        db      IIR_LS      ;   0   1   0   0
        db      IIR_LS      ;   0   1   0   1
        db      IIR_LS      ;   0   1   1   0
        db      IIR_LS      ;   0   1   1   1
        db      IIR_MS      ;   1   0   0   0
        db      IIR_DR      ;   1   0   0   1
        db      IIR_THRE    ;   1   0   1   0
        db      IIR_DR      ;   1   0   1   1
        db      IIR_LS      ;   1   1   0   0
        db      IIR_LS      ;   1   1   0   1
        db      IIR_LS      ;   1   1   1   0
        db      IIR_LS      ;   1   1   1   1

VxD_DATA_ENDS

BeginProc VCHD_Virt_In_IIR

IFDEF DBUG
        Trace_Out "VCHD: VCHD_Virt_In_IIR"
ENDIF
```

```
        cli
        movzx   eax, [VCD_Virr]              ; Interrupts requested
        and     al, [VCD_Vier]               ; Interrupts enabled
        and     al, 1111b                    ; Make sure only low nibble
        mov     al, COMBuff_IIR_Table[eax]   ; Pick up value from table
        cmp     al, IIR_THRE                 ; Q: Strange one?
        je      SHORT CB_In_IIR_Reset_THRE   ;    Y: Must reset THRE
        sti
        ret CB_In_IIR_Reset_THRE:
        and     [VCD_Virr], NOT IER_THRE     ; not pending any more
        sti
        ret
EndProc VCHD_Virt_In_IIR ;-----------------------------------------------------------------------
;
;   VCHD_Virt_Out_IIR
;
;   Description:
;       This routine should not normally be called
;
;   ENTRY:
;                   AL = DATA to WRITE
;                   ESI -> VCD_COM_Struc
;                   EBX= VM handle
;                   DX = port #
;                   ECX = I/O type
;
;   EXIT:
;
;-----------------------------------------------------------------------

BeginProc VCHD_Virt_Out_IIR
        mov     [VCD_Viir], al
        ret
EndProc VCHD_Virt_Out_IIR ;-----------------------------------------------------------------------
;
;   VCHD_Virt_In_LCR
;
;   Description:
;
;   ENTRY:
;                   ESI -> VCD_COM_Struc
;                   EBX= VM handle
;                   DX = port #
;                   ECX = I/O type
;
;   EXIT:           AL = data from input
;
;-----------------------------------------------------------------------

BeginProc VCHD_Virt_In_LCR

IFDEF DBUG
        Trace_Out "VCHD: VCHD_Virt_In_LCR"
ENDIF
        cli
        mov     al, [VCD_Vlcr]               ; no point worrying device
        sti
        ret EndProc VCHD_Virt_In_LCR

;-----------------------------------------------------------------------
;
```

```
;       VCHD_Virt_Out_LCR
;
;       Description:
;
;       ENTRY:
;                       ESI -> VCD_COM_Struc
;                       EBX= VM handle
;                       DX = port #
;                       AL = data to output
;                       ECX = I/O type
;
;       EXIT:
;
;------------------------------------------------------------------------------

BeginProc VCHD_Virt_Out_LCR

IFDEF DBUG
        Trace_Out "VCHD: VCHD_Virt_Out_LCR"
ENDIF
    cli
    mov     [VCD_Vlcr], al          ; Output: save it for DLAB
    sti
    VxDCall VIPD1_REG_WRITE
    ret
EndProc VCHD_Virt_Out_LCR ;------------------------------------------------------------------------------
;
;       VCHD_Virt_In_MCR
;
;       Description:
;
;       ENTRY:
;                       ESI -> VCD_COM_Struc
;                       EBX= VM handle
;                       DX = port #
;                       ECX = I/O type
;
;       EXIT:           AL = data from input
;
;------------------------------------------------------------------------------

BeginProc VCHD_Virt_In_MCR

IFDEF DBUG
        Trace_Out "VCHD: VCHD_Virt_In_MCR"
ENDIF
    cli
    mov     al, [VCD_Vmcr]          ; no point worrying device
    sti
    ret
EndProc VCHD_Virt_In_MCR ;------------------------------------------------------------------------------
;
;       VCHD_Virt_Out_MCR
;
;       Description:
;
;       ENTRY:
;                       ESI -> VCD_COM_Struc
;                       EBX= VM handle
;                       DX = port #
;                       AL = data to output
;                       ECX = I/O type
;
;       EXIT:
;
;------------------------------------------------------------------------------
```

```
BeginProc VCHD_Virt_Out_MCR

IFDEF DBUG
        Trace_Out "VCHD: VCHD_Virt_Out_MCR"
ENDIF
    cli
    xchg    al, [VCD_Vmcr]          ; Get what the VM thought it was
    push    edx                     ;
    VxDCall VIPD1_REG_WRITE         ;
    pop     edx                     ;
    IO_Delay                        ; Give hardware lots of time
    mov     al, [VCD_Vmcr]          ; Get what the VM wants
    or      al, MCR_INTEN           ; Assume we want to enable ints
    push    eax                     ;
    VxDCall VIPD1_REG_WRITE         ;
    pop     eax                     ;
    test    al, MCR_DTR             ; Q: Is DTR is on?
    jz      COMBuff_Clear_Queue     ;   N: Clear queue & return
    sti
    ret                             ;   Y: Done!
EndProc VCHD_Virt_Out_MCR ;--------------------------------------------------------------------------
;
;   VCHD_Virt_In_LSR
;
;   Description:
;
;   ENTRY:
;                   ESI -> VCD_COM_Struc
;                   EBX= VM handle
;                   DX = port #
;                   ECX = I/O type
;
;   EXIT:       AL = data from input
;
;--------------------------------------------------------------------------
BeginProc VCHD_Virt_In_LSR IFDEF DBUG
        Trace_Out "VCHD: VCHD_Virt_In_LSR"
ENDIF
    cli
    VxDCall VIPD1_REG_READ
    test    al, (LSR_DR + LSR_ERRBITS)  ; any Rx status?
    jz      short VCD_Trap_LSR_Got_Status ;   no, nothing to do
    push    eax
    and     al, (LSR_DR + LSR_ERRBITS)  ; junk transmit status
    call    COMBuff_Poll_Status         ; Deal with Rx status
    pop     eax                         ; (ax got splattered!)
    and     al, LSR_TXBITS              ; Real Tx status
VCD_Trap_LSR_Got_Status:
    mov     bl, [VCD_Vlsr]              ; get virtual Rx status
    or      al, bl                      ; plus real Tx status
    and     bl, LSR_DR                  ; preserve DR bit, clear error
    mov     [VCD_Vlsr], bl              ; bits when reading LSR
    and     [VCD_Virr], NOT IER_LS      ; clear interrupt request
    sti
    ret
EndProc VCHD_Virt_In_LSR ;--------------------------------------------------------------------------
;
;   VCHD_Virt_Out_LSR
;
;   Description:
;
;   ENTRY:
```

```
;                       AL = DATA to WRITE
;                       ESI -> VCD_COM_Struc
;                       EBX= VM handle
;                       DX = port #
;                       ECX = I/O type
;
;   EXIT:
;
;------------------------------------------------------------------------
-
BeginProc VCHD_Virt_Out_LSR
    cli
    and     al, (LSR_DR + LSR_ERRBITS)      ; what the chip does!
    mov     [VCD_Vlsr], al                  ; weird!
                                            ; Emulate the H/W....
    and     [VCD_Virr], NOT (IER_LS + IER_DR)
    test    al, LSR_DR
    jz      SHORT CB_LSR_NoDR
    or      [VCD_Virr], IER_DR
CB_LSR_NoDr:
    test    al, LSR_ERRBITS
    jz      SHORT CB_LSR_Exit
    or      [VCD_Virr], IER_LS
CB_LSR_Exit:
    sti
    ret
EndProc VCHD_Virt_Out_LSR ;------------------------------------------------------------------------
-
;
;   VCHD_Virt_In_MSR
;
;   Description:
;
;   ENTRY:
;                       ESI -> VCD_COM_Struc
;                       EBX= VM handle
;                       DX = port #
;                       ECX = I/O type
;
;   EXIT:           AL = data from input
;
;------------------------------------------------------------------------
-
BeginProc VCHD_Virt_In_MSR IFDEF DBUG
        Trace_Out "VCHD: VCHD_Virt_In_MSR"
ENDIF
    cli
    VxDCall VIPD1_REG_READ
    or      al, [VCD_Vmsr]          ; and any saved delta bits
    mov     [VCD_Vmsr], 0
    and     [VCD_Virr], NOT IER_MS  ; clear modem interrupt request
    sti
    ret
EndProc VCHD_Virt_In_MSR ;------------------------------------------------------------------------
-
;
;   VCHD_Virt_Out_MSR
;
;   Description:
;
;   ENTRY:
;                       ESI -> VCD_COM_Struc
;                       EBX= VM handle
;                       DX = port #
;                       ECX = I/O type
;
```

```
;       EXIT:
;
;-------------------------------------------------------------------------------
BeginProc VCHD_Virt_Out_MSR
    cli
    VxDCall VIPD1_REG_WRITE
    mov     [VCD_Vmsr], 0           ; No saved delta bits now!
    sti
    ret
EndProc VCHD_Virt_Out_MSR ;-------------------------------------------------------------------------------
;
;       VCHD_Ignore_IO
;
;       Description:
;
;       ENTRY:
;                       ESI -> VCD_COM_Struc
;                       EBX= VM handle
;                       DX = port #
;                       AL = data to output, if output request
;                       ECX = I/O type
;
;       EXIT:           AL = data from input, if input request
;
;-------------------------------------------------------------------------------
BeginProc VCHD_Ignore_IO IFDEF DBUG
        Trace_Out "VCHD: VCHD_Ignore_IO"
ENDIF clc
        ret
EndProc VCHD_Ignore_IO ;*******************************************************************************
;
;       COMBuff_Test_Int_Req
;
;       DESCRIPTION:
;
;       ENTRY:
;           ESI -> VCD_COM_STRUC
;           EDI -> VCD_COMDEB
;
;       EXIT:
;
;       USES:
;           Flags
;
;===============================================================================

BeginProc COMBuff_Test_Int_Req mov     ebx, [owner]                ; EBX = Handle of port owner
IFDEF DBUG
    Trace_Out "COMBuff_Test_Int_Req VM Handle=#EBX"
ENDIF
        Assert_VM_Handle ebx
        mov     cl, [VCD_Virr]              ; Interrupts pending
        and     cl, [VCD_Vier]              ; and enabled?
        jz      SHORT CB_IR_Exit            ;   N: Clear int request
        test    [VCD_Vlcr], LCR_DLAB        ; Q: Access is to divisor
```

```
        latch
        jnz     short CB_IR_Exit                ;       yes, can't send it!
        test    [VCD_Vmcr], MCR_INTEN           ; and enabled?
        jz      short CB_IR_Exit                ;       no, can't send it!
        mov     eax, com_int_handle             ; pjb - Reflect interrupt to
DOS VM
        or      eax, eax
        jz      short CB_IR_Exit IFDEF DBUG
    Trace_Out "COMBuff_Test_Int_Req VPICD_Get_Status #EBX"
ENDIF VxDcall VPICD_Get_Status
        test    ecx, VPICD_Stat_IRET_Pending    ; Q: Waiting for IRET?
        jnz     SHORT CB_IR_Exit                ;    Y: Wait a little longer IFDEF DBUG
    Trace_Out "COMBuff_Test_Int_Req VPICD_Set_Int_Request #EBX"
ENDIF VxDcall VPICD_Set_Int_Request
CB_IR_Exit:

IFDEF DBUG
    Trace_Out "CB_IR_Exit"
ENDIF ret

EndProc COMBuff_Test_Int_Req
;*****************************************************************************
*
;
;   COMBuff_Poll_Status
;
;   DESCRIPTION:
;       Read the Line Status Register.  Put Transmit status in
;       vitual register, receive status in queue or virtual
;       register as appropriate.
;
;   ENTRY:  ESI -> VCD_COM_STRUC
;           EDI -> VCD_COMDEB
;           AL = LSR data
;
;   EXIT:
;
;   USES:
;       EAX, EBX, EDX
;
;=============================================================================
=

BeginProc COMBuff_Poll_Status push    eax                             ; save callers regs
        push    ebx                             ;
        push    ecx                             ;
        mov     ah, al                          ;
        test    ah, LSR_DR                      ; data ready?
        jz      SHORT CB_NoRxChar               ;   N: don't bother
reading
        push    eax                             ;   Y: save line status
        movzx   edx, [CH_COM_PORT]              ;   Y: EDX -> UART_RBR
        VxDCall VIPD1_REG_READ                  ; get receive char
        pop     ebx                             ; retrieve line status
        mov     ah, bh                          ; combine with data ;;;;;;;;;;;;;; DEBUGGING CODE WILL INSERT @ IF HARDWARE OVERFLOW ;;;;;;;;;;
IFDEF DBUG
    test    ah, LSR_OE
    jz      SHORT OkieDokie
```

```
            mov     al, '@'
            and     ah, NOT LSR_OE
OkieDokie:
ENDIF
;;;;;;;;;;;;;;;;;;;;;;;;;;;;;;;;;;;;;;;;;;;;;;;;;;;;;;;;;;;;;;;;;;;;;;;;;;

IFDEF DEBUG_XOFF
            push    eax
            and     al, 7Fh
            cmp     al, XOFF_Char
            jne     short D00_not_xoff
            mov     al, [VCD_Number]
            Trace_Out 'Received XOFF on COM#al'
D00_not_xoff:
            pop     eax
ENDIF CB_NoRxChar:
            mov     bl, [VCD_Vlsr]                          ; Set virtual regs
            test    bl, LSR_DR                              ; Should we queue it?
            jnz     SHORT CB_PS_Insert_Queue        ;   yes, put in queue
            cmp     [VCD_XOFF_Flag], True                   ; XOFF sent?
            je      SHORT CB_PS_Insert_Queue        ;   yes, put in queue
            or      bl, ah                                  ;
            mov     [VCD_Vlsr], bl                          ;
            test    ah, LSR_DR                              ; Data to put there?
            jz      SHORT CB_Poll_Status_Ret        ;   no, don't bother
            mov     [VCD_Vrxb], al                          ; (should usually have
DR on)
            or      [VCD_Virr], IER_DR                      ; Set DR interrupt
request
            test    bl, LSR_ERRBITS                         ; Error bits on?
            jnz     SHORT CB_Poll_Set_Int_Status    ;   yes, go set
interrupt
            jmp     short CB_Poll_Status_Ret        ;

CB_PS_Insert_Queue:
            call    COMBuff_Insert_Queue            ;

CB_Poll_Status_Ret:
            pop     ecx                             ;
            pop     ebx                             ;
            pop     eax                             ;
            ret CB_Poll_Set_Int_Status:
            or      [VCD_Virr], IER_LS              ; Set LS interrupt request
            pop     ecx                             ;
            pop     ebx                             ;
            pop     eax                             ;
            ret EndProc COMBuff_Poll_Status ;****************************************************************************
*
;                       Q U E U E   P R O C E D U R E S
;****************************************************************************
*

;****************************************************************************
*
;
;    COMBuff_Insert_Queue
;
;    DESCRIPTION:
;
;    ENTRY:
;         AH = Status byte, AL = Data byte
;
;    EXIT:
```

```
;       USES:
;               EBX, EAX
;
;================================================================================
=

BeginProc COMBuff_Insert_Queue

IFDEF DBUG
    Trace_Out "COMBuff_Insert_Queue"
ENDIF mov     bx, [VCD_RxQlen]                        ;
        cmp     [VCD_RxQcount], bx                      ; queue full?
        je      SHORT CB_IQ_Full                        ;
        movzx   ebx, [VCD_RxQin]                        ;
        mov     [VCD_RxQ+ebx*2], ax                     ; into the queue
        inc     [VCD_RxQcount]                          ;
        inc     ebx                                     ;
        cmp     bx, [VCD_RxQlen]                        ;
        jb      SHORT CB_IQ_Set_New_Len                 ;
        xor     ebx, ebx                                ;
                                                        ;
CB_IQ_Set_New_Len:                                      ;
        mov     [VCD_RxQin], bx                         ; put index back
                                                        ;
IFDEF DBUG
        mov     bx, [VCD_RxQcount]
        cmp     bx, [VCD_Max_Queued]
        jbe     short CB_not_max
        mov     [VCD_Max_Queued], bx
CB_not_max:
ENDIF ret                                             ;
                                                        ;
CB_IQ_Full:                                             ;
        movzx   ebx, [VCD_RxQin]                        ;
        or      ah, LSR_OE                              ; simulate overrun
error
        mov     [VCD_RxQ+ebx*2], ax                     ; into the queue
        ret EndProc COMBuff_Insert_Queue ;********************************************************************************
*
;
;       COMBuff_Extract_Queue
;
;       DESCRIPTION:
;
;       ENTRY:  ESI -> VCD_COM_STRUC
;               EDI -> VCD_COMDEB
;
;       EXIT:
;
;       USES:   EBX, EDX
;
;================================================================================
=

BeginProc COMBuff_Extract_Queue, High_Freq

IFDEF DBUG
    Trace_Out "COMBuff_Extract_Queue"
ENDIF
        cmp     [VCD_RxQcount], 0               ; Anything in queue?
```

```
        je      CB_EQ_Exit              ;       no, nothing to extract
IFDEF DBUG
    Trace_Out "Data in Q!"
ENDIF
        cmp     [VCD_XOFF_Flag], True   ; Q: XOFF?
        je      CB_EQ_Exit              ;    Y: Don't fill buffer
CB_EQ_Loop:
        test    [VCD_Vlsr], LSR_DR
        jnz     SHORT CB_EQ_Exit
        dec     [VCD_RxQcount]
        movzx   ebx, [VCD_RxQout]
        mov     dx, [VCD_RxQ+ebx*2]     ; get character from the queue
IFDEF DBUG
    Trace_Out ">RX #EDX"
ENDIF
        inc     ebx
        cmp     bx, [VCD_RxQlen]
        jb      SHORT CB_EQ_Set_Out_Ptr
        xor     ebx, ebx
CB_EQ_Set_Out_Ptr:
        mov     [VCD_RxQout], bx        ; put index back
        or      dh, [VCD_Vlsr]          ; add in old status
        mov     [VCD_Vlsr], dh          ; and set virtual LSR
        test    dh, LSR_DR              ; Was there data too?
        jz      short CB_EQ_NoData
        mov     [VCD_Vrxb], dl          ;    yes, put in virtual reg
        or      [VCD_Virr], IER_DR      ; and set interrupt request
        test    dh, LSR_ERRBITS         ; Line status interrupt?
        jz      SHORT CB_EQ_Exit        ;    no, just return
        or      [VCD_Virr], IER_LS      ;    yes, set interrupt request
        jmp     SHORT CB_EQ_Exit
CB_EQ_NoData:
        cmp     [VCD_RxQcount], 0       ; queue empty?
        jne     short CB_EQ_Loop        ;    no, continue until queue
                                        ;    empty, or LSR_DR is set
        test    dh, LSR_ERRBITS         ; Line status interrupt?
        jz      SHORT CB_EQ_Exit        ;    no, just return
        or      [VCD_Virr], IER_LS      ;    yes, set interrupt request
CB_EQ_Exit:                             ;
IFDEF DBUG
    Trace_Out "Extract done"
ENDIF
        ret EndProc COMBuff_Extract_Queue ;*****************************************************************************
*
;
;   COMBuff_Clear_Queue
;
;   DESCRIPTION:
;
;   ENTRY:
;
;   EXIT:
;
;   USES:
;
;============================================================================
=

BeginProc COMBuff_Clear_Queue
IFDEF DBUG
    Trace_Out "COMBuff_Clear_Queue"
ENDIF
        mov     [VCD_RxQcount], 0       ; Clear receive Q
        mov     [VCD_RxQin], 0
        mov     [VCD_RxQout], 0
        and     [VCD_Vlsr], NOT LSR_DR  ; preserve error bits, reset DR
```

```
                and     [VCD_Virr], NOT IER_DR    ; clear DR virtual interrupt
                mov     [VCD_XOFF_Flag], False
                ret EndProc COMBuff_Clear_Queue
;****************************************************************************
*
;
;   COMBuff_Int
;
;   DESCRIPTION:
;
;   ENTRY:  ESI -> VCD_COM_STRUC
;           EDI -> VCD_COMDEB
;
;   EXIT:
;
;   USES:
;
;============================================================================
=

VxD_DATA_SEG

CB_Int_Jmp_Table LABEL DWORD
        dd      OFFSET32 CB_Modem_Int
        dd      OFFSET32 CB_THRE_Int
        dd      OFFSET32 CB_Rx_Int
        dd      OFFSET32 CB_Rx_Int VxD_DATA_ENDS BeginProc COMBuff_Int, High_Freq IFDEF DBUG
    Trace_Out "COMBuff_Int"
ENDIF movzx   edx, [CH_COM_PORT]          ; Get start of ports
        add     dx, UART_IIR                ; EDX -> UART_IIR
        VxDCall VIPD1_REG_READ              ; get iir status IFDEF DBUG
    Trace_Out "COMBuff_Int, IIR=#AL"
ENDIF test    al, IIR_NONE                ; Came from this device?
        jz      SHORT CB_Int_Jump           ;   Yep, jump to handler
                                            ;   Nope - Reflect it
        stc                                 ;   to next guy in chain
        ret                                 ;
;
; VCHD DOS int loop
;
CB_Int_Loop:
        movzx   edx, [CH_COM_PORT]          ; Get start of ports
        add     dx, UART_IIR                ; EDX -> UART_IIR
        VxDCall VIPD1_REG_READ              ; get iir status IFDEF DBUG
    Trace_Out "COMBuff_Int (loop), IIR=#AL"
ENDIF test    al, IIR_NONE                ; Came from this device?
        jnz     CB_Int_Done                 ;   N: just return!

CB_Int_Jump:

IFDEF DBUG
        test    al, NOT 07h
```

```
                jz      short CB_IIR_Okay
                Debug_Out "VCHD: IIR (#DX) has too many bits set: #AL"
CB_IIR_Okay:
ENDIF and     eax, 07h                        ; mask interrupt bits
                jmp     CB_Int_Jmp_Table[eax*2]         ; Go deal with it
;
; Modem Status Interrupt
;
CB_Modem_Int:                                           ;

IFDEF DBUG
        Trace_Out "CB_Modem_Int"
ENDIF movzx   edx, [CH_COM_PORT]              ; Get base IO address
                add     edx, UART_MSR                   ; get the IIR contents (UART
Interrupt ID reg)
                VxDCall VIPD1_REG_READ
                and     al, MSR_DELTA                   ; only want Delta bits
                mov     [VCD_Vmsr], al                  ; save in virtual MSR
                or      [VCD_Virr], IER_MS              ; set modem interrupt request
                jmp     CB_Int_Loop                     ;
;
; Transmit Holding Register Empty
;
CB_THRE_Int:                                            ;

IFDEF DBUG
        Trace_Out "CB_THRE_Int"
ENDIF or      [VCD_Virr], IER_THRE            ; set THRE interrupt request
                jmp     CB_Int_Loop                     ;
;
; Receive Data Interrupt
;
CB_Rx_Int:                                              ;

IFDEF DBUG
        Trace_Out "CB_Rx_Int"
ENDIF movzx   edx, [CH_COM_PORT]              ; Get base IO address
                add     edx, UART_LSR                   ; EDX -> UART_LSR
                VxDCall VIPD1_REG_READ
                and     al, (LSR_DR + LSR_ERRBITS)      ; junk transmit status
                jz      CB_Int_Loop                     ; Hmmm!
                call    COMBuff_Poll_Status             ;
                jmp     CB_Int_Loop                     ;
;
; Interrupt Done
;
CB_Int_Done:
;               mov     eax,[com_int_handle]            ; get data pump handle IFDEF DBUG
        Trace_Out "COMBUF_INT EOI #eax"
ENDIF ;               VxDcall VPICD_Phys_EOI                  ; clear physical interrupt
                call    COMBuff_Extract_Queue           ;
                call    COMBuff_Test_Int_Req            ; Will "return" for us
                clc
                ret EndProc COMBuff_Int

;*********************************************************************
*
;
```

```
;	COMBuff_EOI
;
;	DESCRIPTION:
;		Here we mindlessly clear the interrupt request for the COM port
;		since it dosen't matter if the buffer was serviced yet or not.
;		If it was not, then the IRET procedure will set the int request
;		again and everyon will still be happy.
;
;	ENTRY:
;		EAX = IRQ handle
;		EBX = Current VM handle
;		ESI -> COM structure
;
;	EXIT:
;
;	USES:
;
;===========================================================================
=

BeginProc COMBuff_EOI, High_Freq push	eax
	push	ebx
	push	ecx
	mov	ebx, [owner]			; EBX = Handle of port owner
	Assert_VM_Handle ebx			; Paranoia...
	mov	cl, [VCD_Virr]			; Interrupts pending
	and	cl, [VCD_Vier]			; and enabled?
	jz	SHORT @F			;    N: Clear int request
	test	[VCD_Vlcr], LCR_DLAB		; Q: Access is to divisor latch
	jnz	short @F			;       yes, can't send it!
	test	[VCD_Vmcr], MCR_INTEN		; and enabled?
	jz	short @F			;       no, can't send it!
	pop	ecx
	pop	ebx
	pop	eax
	ret @@:
	pop	ecx
	pop	ebx
	pop	eax
	VxDjmp	VPICD_Clear_Int_Request
	ret
;@@:
;	ret EndProc COMBuff_EOI ;---------------------------------------------------------------------------
-
;  VIPD interface code starts here
;---------------------------------------------------------------------------
-

;===========================================================================
;
;	Set_CH_Port
;
;	ENTRY:		AX = base port
;
;	EXIT:		<unchanged>
;
;===========================================================================

BeginProc SET_CH_PORT

Trace_Out "CPQFMDB: Set_CH_Port"
		push	eax				;
		push	edx
```

```
                mov     [VIPD_Port], ax                         ; save base port
                    mov         dx,ax
        ;
        ;   Get Data Pump interrupt to correct active state and clear any pending
        ;
                add     dx, 6                                   ;
                mov     al, 00h                                 ;
                out     dx, al                                  ; Port+6 = 00h
                inc     dx                                      ;
                mov     al, 0DFh                                ;
                out     dx, al                                  ; Port+7 = 0DFh
                inc     dx                                      ;
                mov     al, 018h                                ;
                out     dx, al                                  ; Port+8 = 018h
                inc     dx                                      ;
                mov     al, 03h                                 ;
                out     dx, al                                  ; Port+9 = 03h
                add     dx, 25h                                 ;
                mov     al, 0ffh                                ;
                out     dx, al                                  ; Port+2eh = 0ffh
                                                                ;
                pop     edx                                     ;
                pop     eax                                     ;
                ret                                             ;
        EndProc SET_CH_PORT ;==============================================================================
        ;
        ;   Set_CH_IRQ
        ;
        ;   ENTRY:      AX = PCMCIA irq
        ;
        ;   EXIT:       EAX=0 (success) or 1 (failed)
        ;
        ;==============================================================================

BeginProc SET_CH_IRQ

Trace_Out "CPQFMDB: Set_CH_IRQ"

push    esi
                push    edi                                     ;
                push    ecx                                     ;
                push    edx                                     ;
                push    eax                                     ;
        ;
        ; Let VIPD know he where hardware is
        ;
                movzx   eax, [VIPD_Port]                        ;
                Trace_Out "CPQFMDB: Turning on VIPD Port=#EAX"
                VxDCall VIPD1_HW_Avail                          ;
                mov     [VIPD_Init], 1                          ; indicate we have
        initialized the VIPD
        ;
        ;   Set up IRQ for Data Pump
        ;
                pop     eax                                     ; get IRQ back
                push    eax
                Trace_Out "CPQFMDB: IRQ #EAX for Crazyhorse"
                                                                ;
                sub     esp, SIZE VPICD_IRQ_Descriptor          ; stack space for
        struct
                mov     edi, esp                                ; edi ->
        VPICD_IRQ_Descriptor
                mov     [edi.VID_IRQ_Number], ax                ;
                mov     [edi.VID_Options], VPICD_Opt_Can_Share  ; no read hw iir
                mov     [edi.VID_Hw_Int_Proc], OFFSET32 CH_HW_INT   ; Interrupt Proc
                xor     eax,eax
                mov     [edi.VID_Virt_Int_Proc], eax            ; NULL for others
                mov     [edi.VID_EOI_Proc], eax                 ;
                mov     [edi.VID_Mask_Change_Proc], eax         ;
```

```
                mov     [edi.VID_IRET_Proc], eax            ;
                mov     [edi.VID_IRET_Time_Out], 500        ; timeout
                VxDCall VPICD_Virtualize_IRQ                ; Virtualize
                jnc     short @F                            ; failed?
                add     esp, SIZE VPICD_IRQ_Descriptor      ; fix stack
                jmp     CH_Port_failed
@@:                                                         ;
                add     esp, SIZE VPICD_IRQ_Descriptor      ; fix stack
                Trace_Out "CPQFMDB: IRQ virtualized for Crazyhorse"
                                                            ;
                mov     [data_pump_int_handle],eax          ; save the int handle
                VxDCall VPICD_Get_Complete_Status           ; Check status of int.
                test    ecx, VPICD_Stat_Phys_In_Serv        ; Q: Is it phys. in
Service?
                jz      SHORT @F                            ;   N:
                                                            ;
                Trace_Out "CPQFMDB: IRQ in service"
                                                            ;
                VxDCall VPICD_Set_Int_Request               ;   Y: pass int to
new owner
@@:                                                         ;
                VXDCall VPICD_Physically_Unmask             ;
                VxDCall VPICD_Phys_EOI                      ;
;
;       Set timer tik to 5 msec and time slice interrupt of 10 msec
;
                mov     eax, 5                              ; 5 msec min int
period
                VXDcall VTD_Begin_Min_Int_Period            ; tell virtual timer
driver
                jc      short CH_Port_failed                ; bummer...didn't get
it
                                                            ;
                Trace_Out "CPQFMDB: Min int period set to 5 msec"
                                                            ;
                mov     eax, 10                             ; set up to get time
slice int every 10 msec
                xor     edx, edx                            ; null ref data
pointer - no ref data required
                mov     esi, OFFSET32 VCHD_Time_Slice_Proc  ; addr of time slice
routine
                VMMcall Set_Global_Time_Out                 ; tell system VM
                cmp     esi, 0                              ; did we get time
sliceout scheduled ??
                jz      short CH_Port_failed                ; N
                mov     [Time_Slice], esi                   ; save time slice
handle
                Trace_Out "CPQFMDB: Time Slice Int Set to 10 msec"

pop     eax
                xor     eax,eax                             ; 0=success
                jmp     short VCHD_Port_exit                ;
                                                            ;
CH_Port_failed:                                             ;
                mov     [VIPD_Init], 0                      ; clear VIPD
initialized
                mov     eax, [data_pump_int_handle]         ;
                cmp     eax, 0                              ; Q: did we get data
pump int
                je      short @F                            ;   N: then just
return failure
                VxDCall VPICD_Phys_EOI                      ;   Y: make sure it's
cleared
                VxDCall VPICD_Force_Default_Behavior        ;       reset behavior
                mov     [data_pump_int_handle], 0           ; show we don't have
data pump IRQ
@@:                                                         ;
                pop     eax
                mov     eax,1                               ; return non success
                                                            ;
```

29

```
VCHD_Port_exit:                                             ;
        pop     edx                                         ;
        pop     ecx                                         ;
        pop     edi                                         ;
        pop     esi
        ret                                                 ;

EndProc SET_CH_IRQ

;===========================================================================
;
;   SET_CH_COMPORT
;
;   ENTRY:  AX = Comm Port Addr   (0 for CH removed)
;           CX = Comm Port #
;
;   EXIT:   AX = 0 <success> or 1 <failed>
;
;===========================================================================

BeginProc SET_CH_COMPORT

Trace_Out "CPQFMDB: In SET_CH_COMPORT"

push    edi                                         ;
        push    edx                                         ;
        push    ecx                                         ;
        push    esi                                         ;
                                                            ;
        cmp     ax,0                                        ; Q: Port = 0?
        jne     short VCHD_COMPORT_setup                    ;   N: valid
port...set up IRQ ; port=0, shut it
down!
        mov     [VIPD_Init], 0                              ;   Y: show VIPD not
initialized
        mov     [CH_Com_Port],0                             ; Show Port removed
        mov     eax,[data_pump_int_handle]
        cmp     eax,0       ;
        jz      VCHD_COMPORT_exit                           ;   N: out of here...
        VxDCall VPICD_Phys_EOI                              ;   Y: make sure it's
cleared
        VxDCall VPICD_Force_Default_Behavior                ;     reset behavior
        mov     [data_pump_int_handle], 0                   ; clear handle mov     eax,[com_int_handle]
        cmp     eax,0       ;
        jz      VCHD_COMPORT_exit                           ;   N: out of here...
        VxDCall VPICD_Phys_EOI                              ;   Y: make sure it's
cleared
        VxDCall VPICD_Force_Default_Behavior                ;     reset behavior
        mov     [com_int_handle], 0                         ; clear handle jmp     VCHD_COMPORT_exit VCHD_COMPORT_setup:
        Trace_Out "CPQFMDB: attempting to virtualize IRQ #EBX"
        mov     [CH_Com_Port],ax                            ; Save it
        mov     [CH_Com_IRQ], bx                            ;
        sub     esp, SIZE VPICD_IRQ_Descriptor              ; stack space for
struct
        mov     edi, esp                                    ; edi ->
VPICD_IRQ_Descriptor
        mov     [edi.VID_IRQ_Number],bx                     ;
        mov     ax, VPICD_Opt_Can_Share                     ;
        mov     [edi.VID_Options],ax                        ;
        xor     eax, eax                                    ;
        mov     [edi.VID_Virt_Int_Proc],eax                 ;
        mov     [edi.VID_Mask_Change_Proc],eax              ;
        mov     [edi.VID_IRET_Proc],eax                     ;
        mov     eax,OFFSET32 VCHD_HW_INT_IGNORE             ; Interrupt Proc
```

```
            mov     [edi.VID_Hw_Int_Proc],eax       ;
            mov     eax,500                          ; timeout
            mov     [edi.VID_IRET_Time_Out],eax     ;
            mov     eax,OFFSET32 COMBuff_EOI        ;
            mov     [edi.VID_EOI_Proc],eax          ;
            VxDCall VPICD_Virtualize_IRQ            ; Virtualize
            jc      @F                               ; failed?
            mov     [com_int_handle], eax           ; save the int handle
            add     esp, SIZE VPICD_IRQ_Descriptor  ; fix stack
            xor     eax,eax                          ; success
            jmp     short VCHD_COMPORT_exit         ;

@@:                                                  ;
            add     esp, SIZE VPICD_IRQ_Descriptor  ; fix stack
VCHD_COMPORT_failed:
            movzx   ebx,[CH_Com_IRQ]
            Trace_Out "CPQFMDB: Failed to virtualize IRQ #EBX"
;           mov     eax,[data_pump_int_handle]
;           cmp     eax,0                            ; Q: did we get data
pump interrupt
;           jz      short @F                         ;   N: then just exit
;           VxDCall VPICD_Phys_EOI                   ;   Y: make sure it's
cleared
;           VxDCall VPICD_Force_Default_Behavior     ;       reset
behavior
;           mov     [data_pump_int_handle], 0
            mov             [com_int_handle],0
            ; didn't get the int
;@@:                                                 ;
            mov     eax, 1                           ; return non success VCHD_COMPORT_exit:                                   ;
            pop     esi                              ;
            pop     ecx                              ;
            pop     edx                              ;
            pop     edi                              ;
            ret                                      ;
EndProc SET_CH_COMPORT BeginProc VCHD_HW_INT_IGNORE, High_Freq IFDEF DBUG
        Trace_Out "VCHD: VCHD_HW_INT_IGNORE"
ENDIF
            stc
            ret EndProc VCHD_HW_INT_IGNORE ;------------------------------------------------------------------------
;
;   CH_HW_INT
;
;   ENTRY:
;
;   EXIT:
;
;   Description:
;
;------------------------------------------------------------------------

BeginProc CH_HW_INT, High_Freq

;   Trace_Out "CPQFMDB: CH_HW_INT"

cmp     [VIPD_Init], 0                   ; Q: has VIPD been
initialized?
            jne     short @F                         ;   Y: my
interrupt...so handle it
            stc                                      ;   N: set carry to
```

31

```
            indicate I didn't handle it
                    jmp     short VCHD_HW_INT_exit              ;    and get out of
            here
            @@:                                                 ;
                    push    ebx                                 ;
                    push    esi                                 ;
                    push    edi                                 ;
                    push    edx                                 ;
                    push    eax                                 ;
                    VxDCall VIPD1_HW_INT                        ;
                    mov     eax, [data_pump_int_handle]         ;
                    VxDCall VPICD_Phys_EOI                      ;
                    pop     eax                                 ;
                    pop     edx                                 ;
                    pop     edi                                 ;
                    pop     esi                                 ;
                    pop     ebx                                 ;
                    clc                                         ;
            VCHD_HW_INT_exit:                                   ;
                    ret                                         ;
            EndProc CH_HW_INT
            ;--------------------------------------------------------------------
            ; Dummy1 - place holder service
            ;--------------------------------------------------------------------

BeginProc Dummy1, ASYNC_SERVICE, High_Freq
                Trace_Out "Dummy1: No one should be calling this!"
                ret
            EndProc Dummy1

;--------------------------------------------------------------------
            ; Dummy2 - place holder service
            ;--------------------------------------------------------------------

BeginProc Dummy2, ASYNC_SERVICE, High_Freq
                Trace_Out "Dummy2: No one should be calling this!"
                ret
            EndProc Dummy2

;--------------------------------------------------------------------
            ;
            ;   VCHD_IP_INT
            ;
            ;   ENTRY:
            ;
            ;   EXIT:
            ;
            ;   Description:
            ;
            ;--------------------------------------------------------------------

BeginProc VCHD_IP_INT, ASYNC_SERVICE, High_Freq

Trace_Out "CPQFMDB: VCHD_IP_INT"
                        cmp         [owner],0
                        ; anyone here?
                        jne         @F
                            ; yup, the int is for us
                        cmp         [cpqfmw95loaded],0
                        ; not ours, tell our friend?
                        je          ipintexit
                        ; nope, ignore it (shouldn't happen)
                        VxDJMP      CH_IP_INT
                        ; over to the port driver @@:
                    cmp     [VCHD_Int_Busy], 0                  ; Q: already in
            interrupt routine?
                    je      short @F                            ;    N: Service
```

```
Interrpt
        inc     [VCHD_Int_Busy]                             ;   Y: we'll get it after this one
        ret                                                 ;
@@:                                                         ;
        inc     VCHD_Int_Busy                               ; indicate we are in interrupt routine
doitagain:
        push    ebx                                         ; save callers registers
        push    esi                                         ;
        push    edi                                         ;
        push    edx                                         ;

call    COMBuff_Int pop     edx                                         ; restore callers edx
        pop     edi                                         ; restore callers edi
        pop     esi                                         ; restore callers esi
        pop     ebx                                         ; restore callers ebx
        dec     [VCHD_Int_Busy]                             ;
        jnz     doitagain
ipintexit:
        ret                                                 ;
                                                            ;
EndProc VCHD_IP_INT ;------------------------------------------------------------------------------
;
;   VCHD_Time_Slice_Proc
;
;   Description: Our time slice allocation so we can time events and get
;                   stuff done without hogging the whole machine
;
;   ENTRY:      EBX = VM handle
;               EDX = pointer to ref data
;               ECX = milliseconds from actual timeout
;               EBP = points to Client Data Structure
;
;   EXIT:   None
;
;------------------------------------------------------------------------------

BeginProc VCHD_Time_Slice_Proc, High_Freq

;       Trace_Out "CPQFMDB: tick"

push    eax                                         ; save callers regs
        push    esi                                         ;
        push    edx                                         ;
        cmp     [Time_Slice], 0                             ; were we able to get time slice?
        je      short @F                                    ;   N: we're done...get out of here
        cmp     [CH_Com_Port], 0                            ; Do we have a modem?
        je      short VCHD_TS_no_slice                      ;
        mov     eax, 10                                     ; set up to get time slice int every 10 msec
        xor     edx, edx                                    ; null ref data pointer - no ref data required
        mov     esi, OFFSET32 VCHD_Time_Slice_Proc          ; addr of time slice routine
        VMMcall Set_Global_Time_Out                         ; tell system VM
        cmp     esi,0                                       ; did we get time sliceout scheduled ??
        je      short @F                                    ; N
        mov     [Time_Slice], esi                           ; save time slice handle
```

```
        VxDCall VIPD1_Tick                          ; let VIPD have some time
VCHD_TS_no_slice:                                   ;
;       VxDCall VIPD1_Tick                          ; let VIPD have some time
@@:
        pop     edx
        pop     esi
        pop     eax
        clc
        ret EndProc VCHD_Time_Slice_Proc VxD_LOCKED_CODE_ENDS
END
;----------------------------------------------------------------------;
;   End of File: CPQFMDB.asm
;----------------------------------------------------------------------
```

APPENDIX C

U.S. EXPRESS MAIL NO. TB855044421US

```
/*
!
!  FILE:  SIM450.C
!
!  Copyright 1994, 1995  Compaq Computer Corporation.  All rights reserved.
!
!  FUNCTIONAL DESCRIPTION:
!     This module contains all of the routines for simulating a 16450.
!
!  REVISION HISTORY:
!        Last revised:  1995, February 1 10:49:34.74
!
!
*/
/* System include files */ include <assume.h>
include <intr.h>
#include <timer.h>
#include <taskmgr.h>

/* Program module include files */ include "sim450.h"
include "parity.h"
#include "acu.edf"

/* Module definitions */

/*lint -e750 Turn off message about unused local definition */ define   SIM450_SCR    7
define   SIM450_MSR    6
#define   SIM450_LSR    5
#define   SIM450_MCR    4
#define   SIM450_LCR    3
#define   SIM450_IIR    2
#define   SIM450_IEN    1
#define   SIM450_DAT    0
#define   SIM450_DLH    1
define   SIM450_DLL    0 define   SIM450_UDCD   0x80
define   SIM450_URNG   0x40
#define   SIM450_UDSR   0x20
#define   SIM450_UCTS   0x10
#define   SIM450_DDCD   0x08
#define   SIM450_DRNG   0x04
#define   SIM450_DDSR   0x02
define   SIM450_DCTS   0x01 define   SIM450_TSRE   0x40
define   SIM450_THRE   0x20
#define   SIM450_BRKI   0x10
#define   SIM450_FRMR   0x08
#define   SIM450_PARE   0x04
#define   SIM450_OVRE   0x02
define   SIM450_RDRI   0x01 define   SIM450_LOOP   0x10
define   SIM450_OUT2   0x08
#define   SIM450_OUT1   0x04
#define   SIM450_URTS   0x02
define   SIM450_UDTR   0x01 define   SIM450_DLAB   0x80
define   SIM450_SBRK   0x40
#define   SIM450_PBTS   0x30
#define   SIM450_EPAR   0x08
#define   SIM450_SBTS   0x04
```

1

```
define   SIM450_DBTS        0x03 define   SIM450_IRLS        0x06
define   SIM450_ITHR        0x02
#define   SIM450_IRDA        0x04
#define   SIM450_IMSR        0x00
define   SIM450_INOI        0x01 define   SIM450_EMSR        0x08
define   SIM450_ERLS        0x04
#define   SIM450_ETHR        0x02
define   SIM450_ERDA        0x01 define   SIM450_TX_SIZE     8191
define   SIM450_TX_FLOW_OFF      8192 define   SIM450_RX_SIZE     2048
define   SIM450_RX_FLOW_ON       1900
define   SIM450_RX_FLOW_OFF      2000 ifdef    PRODUCTION
define   STATIC   static
#else
#define   STATIC
#endif

/* Module data */ struct    sim450_tag
     {
     unsigned char ien;
     unsigned char iir;
     unsigned char lcr;
     unsigned char mcr;
     unsigned char lsr;
     unsigned char msr;
     unsigned char scratch;
     unsigned char dlh;
     unsigned char dll;
     unsigned char int_active;
     unsigned char iir_tx;
     unsigned char dlab;
     unsigned short tx_rpos;
     unsigned short tx_wpos;
     unsigned short tx_count;
          unsigned short tx_timer;
     unsigned short rx_rpos;
     unsigned short rx_wpos;
     unsigned short rx_count;
     unsigned char old_lsr;
     unsigned char tx_flowed_off;
     unsigned char rx_flow;
     unsigned char rx_flowed_off;
     unsigned char tx_flowctrl_mode;
     unsigned char rx_flowctrl_mode;
     } sim450_data;

void (*sim450_interrupt)(void);

/* defined in cio.c */
extern unsigned char acu_installed; /* 1=command mode */

STATIC unsigned char sim450_tx_array[SIM450_TX_SIZE];
STATIC unsigned char sim450_rx_array[SIM450_RX_SIZE];

#ifndef NDEBUG
static const char * this_file=__FILE__;
static const char * this_file_revision="$Revision:   1.16  $";
#endif
```

```
/* Module code */
/**********************************************************/
void Sim450_init(void)
   {
   sim450_interrupt = 0;
   sim450_data.msr = 0;
   sim450_data.mcr = 0;
   sim450_data.lcr = 0;
   sim450_data.lsr = 0x60;
   sim450_data.iir = 1;
   sim450_data.iir_tx = 1;
   sim450_data.int_active = 0;
   sim450_data.ien = 0;
   sim450_data.dlab = 0;
   sim450_data.dlh = 0;
   sim450_data.dll = 1;
   sim450_data.rx_count = 0;
   sim450_data.rx_rpos = 0;
   sim450_data.rx_wpos = 0;
   sim450_data.tx_count = 0;
   sim450_data.tx_rpos = 0;
   sim450_data.tx_wpos = 0;
   sim450_data.old_lsr = 0x60;
   sim450_data.tx_flowed_off = 0;
   sim450_data.rx_flow = 0;
   sim450_data.rx_flowed_off= 0;
   sim450_data.tx_flowctrl_mode = SIM450_FLOWCTRL_NONE;
   sim450_data.rx_flowctrl_mode = SIM450_FLOWCTRL_NONE;

/* initialize parity table to 8 bit No Parity */
   Parity_tbl_reset();
   }

/**********************************************************/

STATIC void Sim450_evaluate_interrupt(void)
   {
   if((sim450_data.old_lsr & SIM450_THRE) == 0 &&
      (sim450_data.lsr & SIM450_THRE) != 0)
      {
      sim450_data.iir_tx = 1;
      } sim450_data.old_lsr = sim450_data.lsr;
   if((sim450_data.ien & SIM450_ERLS) &&
      (sim450_data.lsr & (SIM450_BRKI |
                          SIM450_FRMR |
                          SIM450_PARE |
                          SIM450_OVRE)))
      sim450_data.iir = SIM450_IRLS;
   else if(sim450_data.iir_tx && (sim450_data.ien & SIM450_ETHR))
      sim450_data.iir = SIM450_ITHR;
   else if((sim450_data.lsr & SIM450_RDRI) &&
           (sim450_data.ien & SIM450_ERDA))
      sim450_data.iir = SIM450_IRDA;
   else if((sim450_data.ien & SIM450_EMSR) &&
           (sim450_data.msr & (SIM450_DDCD |
                               SIM450_DRNG |
                               SIM450_DDSR |
                               SIM450_DCTS)))
      sim450_data.iir = SIM450_IMSR;
   else
      {
      sim450_data.iir = SIM450_INOI;
      sim450_data.int_active = 0;
      } if(sim450_data.iir != SIM450_INOI &&
      !sim450_data.int_active &&
      sim450_data.mcr & SIM450_OUT2)
      {
```

```c
            sim450_data.int_active = 1;
            if(sim450_interrupt)
                sim450_interrupt();
            }
    }

/***********************************************************/ void Sim450_rx_flow_off(void)
    {
        if(sim450_data.rx_flowctrl_mode == SIM450_FLOWCTRL_HW)
            {
            sim450_data.rx_flowed_off = 1;
            Sim450_set_cts(0);
            Sim450_evaluate_interrupt();
            }
        else if(sim450_data.rx_flowctrl_mode == SIM450_FLOWCTRL_SW)
            {
            sim450_data.rx_flowed_off = 1;
            sim450_data.rx_flow = XOFF_CHAR;
            sim450_data.lsr |= SIM450_RDRI;
            Sim450_evaluate_interrupt();
            }
    }

/***********************************************************/ void Sim450_rx_flow_on(void)
    {
        if(sim450_data.rx_flowctrl_mode == SIM450_FLOWCTRL_HW)
            {
            sim450_data.rx_flowed_off = 0;
            Sim450_set_cts(1);
            Sim450_evaluate_interrupt();
            }
        else if(sim450_data.rx_flowctrl_mode == SIM450_FLOWCTRL_SW)
            {
            sim450_data.rx_flowed_off = 0;
            sim450_data.rx_flow = XON_CHAR;
            sim450_data.lsr |= SIM450_RDRI;
            Sim450_evaluate_interrupt();
            }
        sim450_data.iir_tx = 1;
        sim450_data.lsr |= SIM450_THRE | SIM450_TSRE;
        Sim450_evaluate_interrupt();
    }

/***********************************************************/ void Sim450_update_flowctrl(void)
    {
        if(sim450_data.tx_flowctrl_mode == SIM450_FLOWCTRL_HW)
            {
            if((sim450_data.mcr & SIM450_URTS) == 0)
                {
                sim450_data.tx_flowed_off = 1;
                }
            else
                {
                if(sim450_data.tx_flowed_off)
                    {
                    sim450_data.tx_flowed_off = 0;
                    if(sim450_data.tx_count != 0)
                        {
                        sim450_data.lsr |= SIM450_RDRI;
                        Sim450_evaluate_interrupt();
                        }
                    }
                }
            }
    }
```

```c
/**********************************************************/
unsigned char Sim450_flowctrl_process_char(unsigned char ch)
    {
    unsigned char ret_val;

ret_val = 0;
    if(ch == XOFF_CHAR)
        {
        sim450_data.tx_flowed_off = 1;
        if(!pass_flowctrl)
            {
            ret_val = 1;
            }
        }
    else if(ch == XON_CHAR)
        {
        sim450_data.tx_flowed_off = 0;
        if(sim450_data.tx_count != 0)
            {
            sim450_data.lsr |= SIM450_RDRI;
            Sim450_evaluate_interrupt();
            }
        if(!pass_flowctrl)
            {
            ret_val = 1;
            }
        }
    return ret_val;
    }
/**********************************************************/ void Sim450_write(unsigned char address, unsigned char value)
    {
    switch(address)
        {
        case  SIM450_SCR:
            sim450_data.scratch = value;
            break;
        case  SIM450_MCR:
            sim450_data.mcr = value;
            /* Update the hardware flowctrl (if any) */
            Sim450_update_flowctrl();
            Sim450_evaluate_interrupt();
            break;
        case  SIM450_LCR:
            sim450_data.lcr = value;
            /* update parity table based on changes to lcr */
            Parity_tbl_update(Sim450_get_parity_ena(), Sim450_get_parity(),
Sim450_get_data());
            if(value & SIM450_DLAB)
                {
                sim450_data.dlab = 1;
                }
            else
                {
                sim450_data.dlab = 0;
                if(sim450_data.mcr & SIM450_LOOP)
                    {
                    sim450_data.lsr |= (value & SIM450_SBRK) ? SIM450_BRKI : 0;
                    }
                }
            Sim450_evaluate_interrupt();
            break;

case  SIM450_IEN:
            if(!sim450_data.dlab)
                {
                if((sim450_data.ien & SIM450_ETHR) == 0 &&
                    (value & SIM450_ETHR) != 0)
                    {
```

```
                /* On enabling edge of ETHR, turn on iir_tx */
                /* If the LSR shows THRE */
                if(sim450_data.lsr & SIM450_THRE)
                    sim450_data.iir_tx = 1;
                }
            sim450_data.ien = value;
            Sim450_evaluate_interrupt();
            }
        else
            {
            /* DLH if DLAB is set */
            sim450_data.dlh = value;
            }
        break;

case  SIM450_DAT:
        if(!sim450_data.dlab)
            {
            if(sim450_data.mcr & SIM450_LOOP)
                {
                Sim450_put_tx_byte(value);
                }
            else
                {
                sim450_data.lsr &= ~(SIM450_THRE | SIM450_TSRE);
                Sim450_evaluate_interrupt();
                /* check flow control */
                if (acu_installed ||
                    !((sim450_data.tx_flowctrl_mode == SIM450_FLOWCTRL_SW) &&
                    Sim450_flowctrl_process_char(value)))
                    {
                    /* enqueue a character... */
                    if(sim450_data.rx_count < SIM450_RX_SIZE-1)
                        {
                        /* parity convert character */
                        sim450_rx_array[sim450_data.rx_wpos++] =
Parity_conv_char(value);
                        if(sim450_data.rx_wpos >= SIM450_RX_SIZE)
                            sim450_data.rx_wpos = 0;
                        sim450_data.rx_count++;
                        }
                    }
                if(sim450_data.rx_count < SIM450_RX_FLOW_OFF)
                    {
                    sim450_data.iir_tx = 1;
                    sim450_data.lsr |= SIM450_THRE | SIM450_TSRE;
                    Sim450_evaluate_interrupt();
                    }
                else if(!sim450_data.rx_flowed_off &&
sim450_data.rx_flowctrl_mode)
                    {
                    Sim450_rx_flow_off();
                    }
                }
            }
        else
            {
            sim450_data.dll = value;
            }
        break;
    default:
        break;
    }
}

/***********************************************************/ unsigned char  Sim450_read(unsigned char address)
    {
    unsigned char b;
```

```
b = 0;
switch(address)
   {
   case SIM450_SCR:
      b = sim450_data.scratch;
      break;
   case SIM450_MSR:
      b = sim450_data.msr;
      sim450_data.msr &= 0xf0;   /* Clear delta bits */
      if(sim450_data.mcr & SIM450_LOOP)
         {
         b = (b & 0x0f) | ((sim450_data.mcr & 0x0f) << 4);
         }
      break;
   case SIM450_LSR:
      b = sim450_data.lsr;
      sim450_data.lsr &= 0xe1;
      Sim450_evaluate_interrupt();
      break;

case SIM450_MCR:
      b = sim450_data.mcr;
      break;

case SIM450_LCR:
      b = sim450_data.lcr;
      break;

case SIM450_IIR:
      b = sim450_data.iir;
      if(b==SIM450_ITHR) /* Source of the "interrupt"? */
         sim450_data.iir_tx = 0; /* Then clear the indicator */
      Sim450_evaluate_interrupt();
      break;

case SIM450_IEN:
      if(!sim450_data.dlab)
         {
         b = sim450_data.ien;
         }
      else
         {
         /* DLH if DLAB is set */
         b = sim450_data.dlh;
         }
      break;

case SIM450_DAT:
      if(!sim450_data.dlab)
         {
         /* Clear the RDA interrupt */
         sim450_data.lsr &= ~SIM450_RDRI;
         Sim450_evaluate_interrupt();
         if(!sim450_data.rx_flow)
            {
            /* dequeue a character... */
            if(sim450_data.tx_count)
               {
               b = sim450_tx_array[sim450_data.tx_rpos++];
               b = Parity_strip(b);
               if(sim450_data.tx_rpos >= SIM450_TX_SIZE)
                  sim450_data.tx_rpos = 0;
               sim450_data.tx_count--;
               }
            else
               b = 0;
            }
         else
            {
            b = sim450_data.rx_flow;
            sim450_data.rx_flow = 0;
            }
```

```
               /* if more characters, set RDA bit in lsr and interrupt */
               if((sim450_data.tx_count != 0) && (!sim450_data.tx_flowed_off))
                  {
                  sim450_data.lsr |= SIM450_RDRI;
                  Sim450_evaluate_interrupt();
                  }
               }
            else
               {
               b = sim450_data.dll;
               }
            break;
         default:
            break;
         } return b;
   }
/*********************************************************/ unsigned char Sim450_get_parity_ena(void)
   {
   return (sim450_data.lcr & SIM450_EPAR) >> 3;
   }

/*********************************************************/ unsigned char Sim450_get_parity(void)
   {
   return (sim450_data.lcr & SIM450_PBTS) >> 4;
   }

/*********************************************************/ unsigned char Sim450_get_stop(void)
   {
   return (sim450_data.lcr & SIM450_SBTS) >> 2;
   }

/*********************************************************/ unsigned char Sim450_get_data(void)
   {
   return sim450_data.lcr & SIM450_DBTS;
   }

/*********************************************************/ unsigned long Sim450_get_baudrate(void)
   {
   unsigned long retval;
   unsigned short sr;
   unsigned long tmp_dl_value;

sr = Interrupt_disable(0);
   if (!(tmp_dl_value = ((unsigned long) sim450_data.dlh * 256 + (unsigned
long) sim450_data.dll)))
      {
      sim450_data.dll = 1;
      tmp_dl_value = 1L;
      }
   retval = 115200L /  tmp_dl_value;
   Interrupt_enable(sr);
   return retval;
   }

/*********************************************************/ unsigned short Sim450_get_rts(void)
   {
   return (sim450_data.mcr & SIM450_URTS) >> 1;
```

```c
        }
/**********************************************************/
unsigned short Sim450_get_dtr(void)
    {
    return (sim450_data.mcr & SIM450_UDTR);
    }
/**********************************************************/
unsigned short Sim450_get_rx_count(void)
    {
        if (sim450_data.rx_count == 0)
            {
            Task_manager();
            }
    return sim450_data.rx_count;
    }
/**********************************************************/
void Sim450_rid_tx_count(void)
    {
        if (Timer_expired(sim450_data.tx_timer))
            {
            while(sim450_data.tx_count > 1)
                {
                sim450_data.tx_rpos++;
                if(sim450_data.tx_rpos >= SIM450_TX_SIZE)
                    {
                    sim450_data.tx_rpos = 0;
                    }
                sim450_data.tx_count--;
                }
            sim450_data.lsr |= SIM450_OVRE;
            }
        else
            {
            Task_manager();
            }
    }
/**********************************************************/
unsigned short Sim450_get_tx_count(void)
    {
        if (sim450_data.tx_count > 1)
            {
        if (acu_installed)
            {
            Sim450_rid_tx_count();
            }
            return sim450_data.tx_count;
            }
        else
            {
            sim450_data.tx_timer = 0;
            return 0;
            }
    }
/**********************************************************/
unsigned short Sim450_get_tx_free(void)
    {
    unsigned short free_count;

if(sim450_data.tx_flowed_off)
        free_count = 0;
    else
        free_count = SIM450_TX_FLOW_OFF - sim450_data.tx_count;
```

```
    return free_count;
    }

/***********************************************************/ unsigned char Sim450_get_rx_byte(void)
    {
    unsigned char b;
    unsigned short sr;

sr = Interrupt_disable(0);

ASSUME(sim450_data.rx_count != 0);

b = sim450_rx_array[sim450_data.rx_rpos++];
    if(sim450_data.rx_rpos >= SIM450_RX_SIZE)
        sim450_data.rx_rpos = 0;
    sim450_data.rx_count--;

Interrupt_enable(sr);

/* check if rx flow */
    if(sim450_data.rx_count < SIM450_RX_FLOW_ON)
        {
        if(sim450_data.rx_flowed_off)
            {
            Sim450_rx_flow_on();
            }
        else if(!(sim450_data.lsr & SIM450_THRE))
            {
            sim450_data.iir_tx = 1;
            sim450_data.lsr |= SIM450_THRE | SIM450_TSRE;
            Sim450_evaluate_interrupt();
            }
        }
    Sim450_evaluate_interrupt();
    return b;
    }

/***********************************************************/

STATIC void Sim450_update_msr(unsigned char and_mask, unsigned char or_mask)
    {
    unsigned char temp;
    unsigned char delta;
    unsigned short sr;

sr = Interrupt_disable(0);
    temp = sim450_data.msr;
    temp &= and_mask;
    temp |= or_mask;
    delta = (temp & 0xf0) ^ (sim450_data.msr & 0xf0);
    sim450_data.msr = temp | (delta >> 4);
    Interrupt_enable(sr);
    Sim450_evaluate_interrupt();
    }

/***********************************************************/ void Sim450_set_cts(unsigned char on)
    {
    if(on)
        Sim450_update_msr(~SIM450_UCTS, SIM450_UCTS);
    else
        Sim450_update_msr(~SIM450_UCTS, 0);
    }

/***********************************************************/ void Sim450_set_ri(unsigned char on)
    {
    if(on)
```

```c
      Sim450_update_msr(~SIM450_URNG, SIM450_URNG);
   else
      Sim450_update_msr(~SIM450_URNG, 0);
   }

/************************************************************/ void Sim450_set_dcd(unsigned char on)
   {
   if(on)
      Sim450_update_msr(~SIM450_UDCD, SIM450_UDCD);
   else
      Sim450_update_msr(~SIM450_UDCD, 0);
   }

/************************************************************/ void Sim450_set_dsr(unsigned char on)
   {
   if(on)
      Sim450_update_msr(~SIM450_UDSR, SIM450_UDSR);
   else
      Sim450_update_msr(~SIM450_UDSR, 0);
   }

/************************************************************/ void Sim450_set_break(unsigned char on)
   {
   if(on)
      sim450_data.lsr |= SIM450_BRKI;
   else
      sim450_data.lsr &= ~SIM450_BRKI;
   }

/************************************************************/ void Sim450_put_tx_byte(unsigned char b)
   {
   unsigned short sr;
   sr = Interrupt_disable(0);
   ASSUME(sim450_data.tx_count <= SIM450_TX_FLOW_OFF);

sim450_tx_array[sim450_data.tx_wpos++] = b;
   if(sim450_data.tx_wpos >= SIM450_TX_SIZE)
      sim450_data.tx_wpos = 0;
   sim450_data.tx_count++;
      sim450_data.tx_timer = Timer_start(sim450_data.tx_timer + 10);
   /* if more characters, set RDA bit in lsr and interrupt */
   if(sim450_data.tx_count != 0 && !sim450_data.tx_flowed_off)
      sim450_data.lsr |= SIM450_RDRI;
   Interrupt_enable(sr);
   Sim450_evaluate_interrupt();
   }

/************************************************************/ void Sim450_set_interrupt(void (*interrupt_function)(void))
   {
   sim450_interrupt = interrupt_function;
   }

/************************************************************/ void Sim450_set_flowctrl_mode(unsigned char rx_flowctrl_mode, unsigned char tx_flowctrl_mode)
   {
   sim450_data.rx_flowctrl_mode = rx_flowctrl_mode;
   if(sim450_data.tx_flowctrl_mode = tx_flowctrl_mode)
      {
      Sim450_update_flowctrl();
      }
```

```
/*
!
!  FILE:  SIM450.H
!
!  Copyright 1994, 1995  Compaq Computer Corporation.  All right reserved.
!
!  FUNCTIONAL DESCRIPTION:
!       This is the header file for SIM450.C
!
!
!  REVISION HISTORY:
!       Last revised:  1995, January 26 19:37:00.01
!
!*/

/* Module definitions */ ifndef  SIM450_H
define  SIM450_H define  SIM450_FLOWCTRL_NONE  0
define  SIM450_FLOWCTRL_SW    1
define  SIM450_FLOWCTRL_HW    2 extern void Sim450_init(void);

extern void Sim450_write(unsigned char address, unsigned char value);

extern unsigned char  Sim450_read(unsigned char address);

extern unsigned char Sim450_get_parity_ena(void);

extern unsigned char Sim450_get_parity(void);

extern unsigned char Sim450_get_stop(void);

extern unsigned char Sim450_get_data(void);

extern unsigned long Sim450_get_baudrate(void);

extern unsigned short Sim450_get_rts(void);

extern unsigned short Sim450_get_dtr(void);

extern unsigned short Sim450_get_rx_count(void);

extern unsigned short Sim450_get_tx_count(void);

extern unsigned short Sim450_get_tx_free(void);

extern unsigned char Sim450_get_rx_byte(void);

extern void Sim450_set_cts(unsigned char on);

extern void Sim450_set_ri(unsigned char on);

extern void Sim450_set_dcd(unsigned char on);

extern void Sim450_set_dsr(unsigned char on);

extern void Sim450_set_break(unsigned char on);

extern void Sim450_put_tx_byte(unsigned char b);

extern void Sim450_set_interrupt(void (*interrupt_function)(void));

extern void Sim450_set_flowctrl_mode(unsigned char rx_flowctrl_mode, unsigned
char tx_flowctrl_mode);

#endif
```

```
;       FILE:   VIPD1D.ASM
;
;       Copyright 1995  Compaq Computer Corporation.  All rights reserved.
;
;       FUNCTIONAL DESCRIPTION:
;               This module contains for VIPD1's DDB
;
;       REVISION HISTORY:
;               Last revised:  1995, January 17 10:34:11.99
;

.386p

.xLIST
          INCLUDE VMM.Inc
          INCLUDE Debug.Inc
          .LIST

;
; Create the service table for this VIPD
;
        Create_VIPD1_Service_Table = 1

INCLUDE    VIPD1P.INC

VxD_LOCKED_CODE_SEG

BeginProc   VIPD1_Control
        Control_Dispatch Sys_Critical_Init, VIPD1_Sys_Critical_init
        Control_Dispatch Device_Init,       VIPD1_Device_init
        clc
        ret
EndProc         VIPD1_Control

VXD_LOCKED_CODE_ENDS

VxD_ICODE_SEG
BeginProc   VIPD1_Sys_Critical_init
        Trace_Out "VIPD1 Sys_Critical_init"
        EXTRN dphil_reg_2e:BYTE mov   dphil_reg_2e,0ffh ; indicate no camil ints allowed
        clc
        ret
EndProc     VIPD1_Sys_Critical_init BeginProc   VIPD1_Device_init
        Trace_Out "VIPD1 Device_init"
        clc
        ret
EndProc     VIPD1_Device_init VxD_ICODE_ENDS Declare_Virtual_Device VIPD1, 3, 0Ah, VIPD1_Control, VIPD1_Device_ID, \
                Undefined_Init_Order

END
```

```
;       FILE:  VIPD1E.ASM
;
;       Copyright 1995  Compaq Computer Corporation.  All rights reserved.
;
;       FUNCTIONAL DESCRIPTION:
;           This module contains the routines generating calls to other
;           VIPD VxDs.
;
;       REVISION HISTORY:
;           Last revised:  1995, March 6 15:35:52.91
;

.386p

.LIST
        INCLUDE VMM.Inc
   INCLUDE VIPD2P.INC
        .LIST

; Create Linkages for VIPD1 to VIPD2 calls

VxD_LOCKED_CODE_SEG

IF    1

PUBLIC v42_init
    PUBLIC v42_outgoing_empty
    PUBLIC line_type
    PUBLIC V42det_start
    PUBLIC v42_reset
    PUBLIC v42_bg
    PUBLIC v42_tbrk
    PUBLIC mnp_rx
    PUBLIC v42_test
    PUBLIC v42_reason
    PUBLIC mnp_tx
    PUBLIC Crc_init
    PUBLIC Mnprxasy_init
    PUBLIC v42_dte_break_time
    PUBLIC v42_test_status
    PUBLIC Mnprxasy_start
    PUBLIC Mnptxasy_start
    PUBLIC v42_mnp10_force_rate
    PUBLIC v42_got_dte_break
    PUBLIC Mnprxasy_stop
    PUBLIC Mnptxasy_stop
    PUBLIC lapm_rx
    PUBLIC v42_reconfigure
    PUBLIC lapm_tx
    PUBLIC V42det_stop
    PUBLIC v42_start
    PUBLIC v42_idle
    PUBLIC v42_halt
    PUBLIC v42_info
    PUBLIC v42_increment_ticks
    PUBLIC v42_falling_back_to_speed
    PUBLIC Trace_say
    PUBLIC Trace_put_event
    PUBLIC Romdecom_decompress IFDEF DEBUG
%error Cannot use debug with external linkage file
ENDIF v42_init:    VxDJmp          VIPD2_v42_init
v42_outgoing_empty:    VxDJmp          VIPD2_v42_outgoing_empty
line_type:   VxDJmp          VIPD2_line_type
V42det_start:          VxDJmp          VIPD2_V42det_start
v42_reset:   VxDJmp          VIPD2_v42_reset
```

```
v42_bg:         VxDJmp              VIPD2_v42_bg
v42_tbrk:       VxDJmp              VIPD2_v42_tbrk
mnp_rx:         VxDJmp              VIPD2_mnp_rx
v42_test:       VxDJmp              VIPD2_v42_test
v42_reason:     VxDJmp          VIPD2_v42_reason
mnp_tx:         VxDJmp              VIPD2_mnp_tx
Crc_init:       VxDJmp              VIPD2_Crc_init
Mnprxasy_init:      VxDJmp          VIPD2_Mnprxasy_init
v42_dte_break_time:     VxDJmp          VIPD2_v42_dte_break_time
v42_test_status:    VxDJmp          VIPD2_v42_test_status
Mnprxasy_start:     VxDJmp          VIPD2_Mnprxasy_start
Mnptxasy_start:     VxDJmp          VIPD2_Mnptxasy_start
v42_mnp10_force_rate:   VxDJmp          VIPD2_v42_mnp10_force_rate
v42_got_dte_break:      VxDJmp          VIPD2_v42_got_dte_break
Mnprxasy_stop:      VxDJmp          VIPD2_Mnprxasy_stop
Mnptxasy_stop:      VxDJmp          VIPD2_Mnptxasy_stop
lapm_rx:        VxDJmp              VIPD2_lapm_rx
v42_reconfigure:    VxDJmp          VIPD2_v42_reconfigure
lapm_tx:        VxDJmp              VIPD2_lapm_tx
V42det_stop:        VxDJmp          VIPD2_V42det_stop
v42_start:      VxDJmp              VIPD2_v42_start
v42_idle:       VxDJmp              VIPD2_v42_idle
v42_halt:       VxDJmp              VIPD2_v42_halt
v42_info:       VxDJmp              VIPD2_v42_info
v42_increment_ticks:    VxDJmp          VIPD2_v42_increment_ticks
v42_falling_back_to_speed:  VxDJmp      VIPD2_v42_falling_back_to_speed
Trace_say:  VxDJmp      VIPD2_Trace_say
Trace_put_event:    VxDJmp      VIPD2_Trace_put_event
Romdecom_decompress:    VxDJmp      VIPD2_Romdecom_decompress

ENDIF

VxD_LOCKED_CODE_ENDS

END
```

```
;       FILE:   VIPD1P.ASM
;
;       Copyright 1995  Compaq Computer Corporation.  All rights reserved.
;
;       FUNCTIONAL DESCRIPTION:
;            This module contains the routines for Creating VIPD1's Service
;            Table, linkages to other VIPDs, and the DDB.
;
;       REVISION HISTORY:
;            Last revised:  1995, August 8 17:45:34.70
;
        .386p ;================================================================================
;                        I N C L U D E S   &   E Q U A T E S
;================================================================================

.LIST
        INCLUDE VMM.Inc
    INCLUDE VCHD.INC
        INCLUDE Debug.Inc
    INCLUDE     VIPD2P.INC
        .LIST

DEBUG = 1

INCLUDE     VIPD1P.INC

EXTRN line_to_char:NEAR
EXTRN Modem_adjust_power_level:NEAR
EXTRN line_to_clear:NEAR
EXTRN Dptone_set_frequency:NEAR
EXTRN line_to_break:NEAR
EXTRN Available_option:NEAR
EXTRN Dpcar_get_mse:NEAR
EXTRN Dpcar_end_now:NEAR
EXTRN line_disable_interrupts:NEAR
EXTRN Task_tcb_init:NEAR
EXTRN Dptone_detect_off:NEAR
EXTRN Timer_expired:NEAR
EXTRN Dpcar_set_mute:NEAR
EXTRN Dpcar_get_current:NEAR
EXTRN line_from_clear:NEAR
EXTRN dte_to_char:NEAR
EXTRN dte_to_clear:NEAR
EXTRN Task_insert:NEAR
EXTRN dte_to_break:NEAR
EXTRN Assume_fail:NEAR
EXTRN line_to_free:NEAR
EXTRN Dpcar_begin:NEAR
EXTRN Dpcar_is_v32:NEAR
EXTRN Dpcar_clear:NEAR
EXTRN Signal_test:NEAR
EXTRN Dptone_on:NEAR
EXTRN line_reset:NEAR
EXTRN Dpconv_get_snr_table:NEAR
EXTRN Dptone_detect_on:NEAR
EXTRN Confreg_read:NEAR
EXTRN Timer_start:NEAR
EXTRN line_detection:NEAR
EXTRN line_from_num:NEAR
EXTRN line_rx_block:NEAR
EXTRN Level_transmit_query:NEAR
EXTRN dte_from_num:NEAR
EXTRN line_tx_block:NEAR
EXTRN Signal_notify_insert:NEAR
EXTRN dte_from_clear:NEAR
EXTRN Daa_set_alternate_compensation:NEAR
EXTRN Dpcar_set_transmit_level:NEAR
```

```
EXTRN Dptone_set_duration:NEAR
EXTRN Dpconv_get_mse:NEAR
EXTRN Task_remove:NEAR
EXTRN Dptone_set_detect_threshold:NEAR
EXTRN line_init:NEAR
EXTRN Dpcar_set:NEAR
EXTRN Dpcar_renegotiate:NEAR
EXTRN line_from_char:NEAR
EXTRN dte_from_char:NEAR
EXTRN line_autoreliable_fallback:NEAR
EXTRN Dptone_set_power:NEAR
EXTRN Notify_init_ncb:NEAR
EXTRN line_setup_speed:NEAR
EXTRN Dptone_off:NEAR
EXTRN Dpcar_retrain:NEAR
EXTRN dte_to_free:NEAR
EXTRN line_enable_interrupts:NEAR
EXTRN Dptone_set_detect_frequency:NEAR
EXTRN Dp10_mute_transmitter:NEAR
EXTRN Dp10_get_handshake_status:NEAR
EXTRN Dp10_get_eqm10_value:NEAR
EXTRN Dp10_get_retrain_status:NEAR
EXTRN Dp10_get_eqm_status:NEAR
EXTRN Dp10_get_line_speed:NEAR
EXTRN Dp10_rate_renegotiate:NEAR
EXTRN Dp10_detect_answer_tone:NEAR
EXTRN Dp10_reset_connection:NEAR
EXTRN Dp10_start_handshake:NEAR
EXTRN Dp10_detect_retrain:NEAR
EXTRN Dp10_set_line_speed:NEAR
EXTRN Dp10_detect_rate_renegotiate:NEAR
EXTRN Dp10_get_cd_status:NEAR
EXTRN Dp10_init:NEAR
EXTRN Dp10_get_agc10_value:NEAR
EXTRN Dp10_send_answer_tone:NEAR
EXTRN Dp10_retrain:NEAR
EXTRN Dp10_init_answ_tone_detc:NEAR
EXTRN Interrupt_enable:NEAR
EXTRN Interrupt_disable:NEAR VxD_LOCKED_DATA_SEG
        db      16384 DUP (?)

ipintstack  dd    ?
        PUBLIC    notipintsp
notipintsp  dd    ?

db      16384 DUP (?)
ipstack     dd    ?
PUBLIC      ipsp
ipsp  dd    ?
notipsp     dd    ?
        PUBLIC    vipd1_uart_ints
vipd1_uart_ints  dd    ?
        PUBLIC    vipd1_dp_ints
vipd1_dp_ints    dd    ?
        PUBLIC    vipd1_run_count
vipd1_run_count  dd    ?
        PUBLIC    vipd1_clock
vipd1_clock dd    ?
        PUBLIC    vipd1_ok_to_call
vipd1_ok_to_call db    ?
        PUBLIC    vipd1_in_isr
vipd1_in_isr     db    ?
        PUBLIC    vipd1_in_tmr
vipd1_in_tmr     db    ?
        PUBLIC    ipisr_error
ipisr_error db    ?
        PUBLIC    vipd1_sleeping
vipd1_sleeping   db    ?
VxD_LOCKED_DATA_ENDS
```

```
_PREBSS          SEGMENT    BYTE PUBLIC USE32 'CODE'
     PUBLIC      _data_beg
_data_beg   db   ?
_PREBSS          ENDS

_BSS        SEGMENT    BYTE PUBLIC USE32 'CODE'
_BSS        ENDS

_POSTBSS         SEGMENT    BYTE PUBLIC USE32 'CODE'
     PUBLIC      _data_end
_data_end   db   ?
_POSTBSS         ENDS

_LGROUP     GROUP _LTEXT, _LDATA, _PREBSS, _BSS, _POSTBSS

VxD_LOCKED_CODE_SEG

PUBLIC @VIPD1_HW_Avail
PUBLIC @VIPD1_Reg_Write
PUBLIC @VIPD1_Reg_Read
PUBLIC @VIPD1_HW_Int
PUBLIC @VIPD1_Tick PUBLIC @VIPD1_line_to_char
PUBLIC @VIPD1_Modem_adjust_power_level
PUBLIC @VIPD1_line_to_clear
PUBLIC @VIPD1_Dptone_set_frequency
PUBLIC @VIPD1_line_to_break
PUBLIC @VIPD1_Available_option
PUBLIC @VIPD1_Dpcar_get_mse
PUBLIC @VIPD1_Dpcar_end_now
PUBLIC @VIPD1_line_disable_interrupts
PUBLIC @VIPD1_Task_tcb_init
PUBLIC @VIPD1_Dptone_detect_off
PUBLIC @VIPD1_Timer_expired
PUBLIC @VIPD1_Dpcar_set_mute
PUBLIC @VIPD1_Dpcar_get_current
PUBLIC @VIPD1_line_from_clear
PUBLIC @VIPD1_dte_to_char
PUBLIC @VIPD1_dte_to_clear
PUBLIC @VIPD1_Task_insert
PUBLIC @VIPD1_dte_to_break
PUBLIC @VIPD1_Assume_fail
PUBLIC @VIPD1_line_to_free
PUBLIC @VIPD1_Dpcar_begin
PUBLIC @VIPD1_Dpcar_is_v32
PUBLIC @VIPD1_Dpcar_clear
PUBLIC @VIPD1_Signal_test
PUBLIC @VIPD1_Dptone_on
PUBLIC @VIPD1_line_reset
PUBLIC @VIPD1_Dpconv_get_snr_table
PUBLIC @VIPD1_Dptone_detect_on
PUBLIC @VIPD1_Confreg_read
PUBLIC @VIPD1_Timer_start
PUBLIC @VIPD1_line_detection
PUBLIC @VIPD1_line_from_num
PUBLIC @VIPD1_line_rx_block
PUBLIC @VIPD1_Level_transmit_query
PUBLIC @VIPD1_dte_from_num
PUBLIC @VIPD1_line_tx_block
PUBLIC @VIPD1_Signal_notify_insert
PUBLIC @VIPD1_dte_from_clear
PUBLIC @VIPD1_Daa_set_alternate_compensation
PUBLIC @VIPD1_Dpcar_set_transmit_level
PUBLIC @VIPD1_Dptone_set_duration
PUBLIC @VIPD1_Dpconv_get_mse
PUBLIC @VIPD1_Task_remove
PUBLIC @VIPD1_Dptone_set_detect_threshold
PUBLIC @VIPD1_line_init
PUBLIC @VIPD1_Dpcar_set
```

```
PUBLIC  @VIPD1_Dpcar_renegotiate
PUBLIC  @VIPD1_line_from_char
PUBLIC  @VIPD1_dte_from_char
PUBLIC  @VIPD1_line_autoreliable_fallback
PUBLIC  @VIPD1_Dptone_set_power
PUBLIC  @VIPD1_Notify_init_ncb
PUBLIC  @VIPD1_line_setup_speed
PUBLIC  @VIPD1_Dptone_off
PUBLIC  @VIPD1_Dpcar_retrain
PUBLIC  @VIPD1_dte_to_free
PUBLIC  @VIPD1_line_enable_interrupts
PUBLIC  @VIPD1_Dptone_set_detect_frequency
PUBLIC  @VIPD1_Dp10_mute_transmitter
PUBLIC  @VIPD1_Dp10_get_handshake_status
PUBLIC  @VIPD1_Dp10_get_eqm10_value
PUBLIC  @VIPD1_Dp10_get_retrain_status
PUBLIC  @VIPD1_Dp10_get_eqm_status
PUBLIC  @VIPD1_Dp10_get_line_speed
PUBLIC  @VIPD1_Dp10_rate_renegotiate
PUBLIC  @VIPD1_Dp10_detect_answer_tone
PUBLIC  @VIPD1_Dp10_reset_connection
PUBLIC  @VIPD1_Dp10_start_handshake
PUBLIC  @VIPD1_Dp10_detect_retrain
PUBLIC  @VIPD1_Dp10_set_line_speed
PUBLIC  @VIPD1_Dp10_detect_rate_renegotiate
PUBLIC  @VIPD1_Dp10_get_cd_status
PUBLIC  @VIPD1_Dp10_init
PUBLIC  @VIPD1_Dp10_get_agc10_value
PUBLIC  @VIPD1_Dp10_send_answer_tone
PUBLIC  @VIPD1_Dp10_retrain
PUBLIC  @VIPD1_Dp10_init_answ_tone_detc
PUBLIC  @VIPD1_Interrupt_enable
PUBLIC  @VIPD1_Interrupt_disable @VIPD1_HW_Avail:         jmp    HW_Avail
@VIPD1_Reg_Write:  jmp   Reg_Write
@VIPD1_Reg_Read:   jmp   Reg_Read
@VIPD1_HW_Int:           jmp    HW_Int
@VIPD1_Tick:             jmp    VIPD_tmr @VIPD1_line_to_char:            jmp        line_to_char
@VIPD1_Modem_adjust_power_level:    jmp        Modem_adjust_power_level
@VIPD1_line_to_clear:           jmp        line_to_clear
@VIPD1_Dptone_set_frequency:    jmp        Dptone_set_frequency
@VIPD1_line_to_break:           jmp        line_to_break
@VIPD1_Available_option:            jmp        Available_option
@VIPD1_Dpcar_get_mse:           jmp        Dpcar_get_mse
@VIPD1_Dpcar_end_now:           jmp        Dpcar_end_now
@VIPD1_line_disable_interrupts:     jmp        line_disable_interrupts
@VIPD1_Task_tcb_init:           jmp        Task_tcb_init
@VIPD1_Dptone_detect_off:       jmp        Dptone_detect_off
@VIPD1_Timer_expired:           jmp        Timer_expired
@VIPD1_Dpcar_set_mute:          jmp        Dpcar_set_mute
@VIPD1_Dpcar_get_current:       jmp        Dpcar_get_current
@VIPD1_line_from_clear:         jmp        line_from_clear
@VIPD1_dte_to_char:             jmp        dte_to_char
@VIPD1_dte_to_clear:            jmp        dte_to_clear
@VIPD1_Task_insert:             jmp        Task_insert
@VIPD1_dte_to_break:            jmp        dte_to_break
@VIPD1_Assume_fail:             jmp        Assume_fail
@VIPD1_line_to_free:            jmp        line_to_free
@VIPD1_Dpcar_begin:             jmp        Dpcar_begin
@VIPD1_Dpcar_is_v32:            jmp        Dpcar_is_v32
@VIPD1_Dpcar_clear:             jmp        Dpcar_clear
@VIPD1_Signal_test:             jmp        Signal_test
@VIPD1_Dptone_on:   jmp         Dptone_on
@VIPD1_line_reset:              jmp        line_reset
@VIPD1_Dpconv_get_snr_table:    jmp        Dpconv_get_snr_table
@VIPD1_Dptone_detect_on:            jmp        Dptone_detect_on
@VIPD1_Confreg_read:            jmp        Confreg_read
@VIPD1_Timer_start:             jmp        Timer_start
@VIPD1_line_detection:          jmp        line_detection
```

```
@VIPD1_line_from_num:          jmp       line_from_num
@VIPD1_line_rx_block:          jmp       line_rx_block
@VIPD1_Level_transmit_query:   jmp       Level_transmit_query
@VIPD1_dte_from_num:           jmp       dte_from_num
@VIPD1_line_tx_block:          jmp       line_tx_block
@VIPD1_Signal_notify_insert:   jmp       Signal_notify_insert
@VIPD1_dte_from_clear:         jmp       dte_from_clear
@VIPD1_Daa_set_alternate_compensation:jmp   Daa_set_alternate_compensation
@VIPD1_Dpcar_set_transmit_level:   jmp   Dpcar_set_transmit_level
@VIPD1_Dptone_set_duration:    jmp       Dptone_set_duration
@VIPD1_Dpconv_get_mse:         jmp       Dpconv_get_mse
@VIPD1_Task_remove:            jmp       Task_remove
@VIPD1_Dptone_set_detect_threshold: jmp   Dptone_set_detect_threshold
@VIPD1_line_init:       jmp       line_init
@VIPD1_Dpcar_set:       jmp       Dpcar_set
@VIPD1_Dpcar_renegotiate:      jmp       Dpcar_renegotiate
@VIPD1_line_from_char:         jmp       line_from_char
@VIPD1_dte_from_char:          jmp       dte_from_char
@VIPD1_line_autoreliable_fallback:  jmp       line_autoreliable_fallback
@VIPD1_Dptone_set_power:                 jmp       Dptone_set_power
@VIPD1_Notify_init_ncb:        jmp       Notify_init_ncb
@VIPD1_line_setup_speed:                 jmp       line_setup_speed
@VIPD1_Dptone_off:             jmp       Dptone_off
@VIPD1_Dpcar_retrain:          jmp       Dpcar_retrain
@VIPD1_dte_to_free:            jmp       dte_to_free
@VIPD1_line_enable_interrupts:    jmp       line_enable_interrupts
@VIPD1_Dptone_set_detect_frequency: jmp       Dptone_set_detect_frequency
@VIPD1_Dp10_mute_transmitter:  jmp   Dp10_mute_transmitter
@VIPD1_Dp10_get_handshake_status:   jmp   Dp10_get_handshake_status
@VIPD1_Dp10_get_eqm10_value:   jmp   Dp10_get_eqm10_value
@VIPD1_Dp10_get_retrain_status:     jmp   Dp10_get_retrain_status
@VIPD1_Dp10_get_eqm_status:    jmp   Dp10_get_eqm_status
@VIPD1_Dp10_get_line_speed:    jmp   Dp10_get_line_speed
@VIPD1_Dp10_rate_renegotiate:  jmp   Dp10_rate_renegotiate
@VIPD1_Dp10_detect_answer_tone:     jmp   Dp10_detect_answer_tone
@VIPD1_Dp10_reset_connection:  jmp   Dp10_reset_connection
@VIPD1_Dp10_start_handshake:   jmp   Dp10_start_handshake
@VIPD1_Dp10_detect_retrain:    jmp   Dp10_detect_retrain
@VIPD1_Dp10_set_line_speed:    jmp   Dp10_set_line_speed
@VIPD1_Dp10_detect_rate_renegotiate:       jmp Dp10_detect_rate_renegotiate
@VIPD1_Dp10_get_cd_status:     jmp   Dp10_get_cd_status
@VIPD1_Dp10_init: jmp       Dp10_init
@VIPD1_Dp10_get_agc10_value:   jmp   Dp10_get_agc10_value
@VIPD1_Dp10_send_answer_tone:  jmp   Dp10_send_answer_tone
@VIPD1_Dp10_retrain:    jmp       Dp10_retrain
@VIPD1_Dp10_init_answ_tone_detc:    jmp   Dp10_init_answ_tone_detc
@VIPD1_Interrupt_enable:       jmp   Interrupt_enable
@VIPD1_Interrupt_disable:      jmp   Interrupt_disable EXTRN    Sim450_write:NEAR
EXTRN    Sim450_read:NEAR
EXTRN    Dphil_isr:NEAR Reg_Write          PROC      NEAR push    eax
         and     edx,7     ; Strip off physical address
         push    edx
       mov   vipd1_sleeping,0    ; indicate wakeup/no sleep
         call    Sim450_write
         add     esp,8
         ret Reg_Write          ENDP Reg_Read           PROC      NEAR and     edx,7     ; Strip off physical address
         push    edx                 ;Push address
         call    Sim450_read
```

```
                add     esp,4
                ret

Reg_Read        ENDP

HW_Int  PROC    NEAR pushfd
        pushad
        push    fs
        push    gs ; These lines are commented out because the pig GPFs (IRQ5) if the interrupt
; is not consumed by the modem code, however dead the code should be
;
;       cmp     vipd1_ok_to_call,0
;       jz      short isr_exit          ; Not ok to call, skip the isr mov     vipd1_sleeping,0  ; indicate wakeup/no sleep
        inc     vipd1_dp_ints
        mov     vipd1_in_isr,1

; Switch to local stack
        mov     notipintsp,esp
        mov     esp,offset32 ipintstack
        call    Dphil_isr
        ; Switch back to caller's stack isr_exit:

mov     esp,notipintsp
        mov     vipd1_in_isr,0
        pop     gs
        pop     fs
        popad
        popfd
        ret HW_Int  ENDP ;-------------------------------------------------------------------------------
;
;    VOID PASCAL vmmVxDCAll_VCHD_IP_Int( VOID )
;
;    DESCRIPTION:
;       "C" wrapper to VCHD_IP_Int call.
;
;    PARAMETERS:
;       Nothing.
;
;    RETURN VALUE:
;       Nothing
;
;-------------------------------------------------------------------------------

BeginProc VIPDASM_VCHD_IP_INT, PUBLIC
intr_to_vchd:
        inc     vipd1_uart_ints
        VxDJmp      VCHD_IP_Int EndProc VIPDASM_VCHD_IP_INT EXTRN   main : NEAR
        PUBLIC      _cstart_
        EXTRN   Sim450_init:NEAR
        EXTRN   Sim450_set_interrupt:NEAR
        EXTRN dphil_base:WORD
        EXTRN dphil_reg_2e:BYTE
```

```
BeginProc VIPD_restart, PUBLIC
HW_Avail:
_cstart_:

pushfd            ; save flags
        push   edi        ; save edi for caller
        push   eax        ; save the camil address
        ;
        ; Zero BSS segment for modem code
        ;
        mov    ecx,offset32 _data_end  ; end of _BSS segment
            mov    edi,offset32 _data_beg  ; start of _BSS segment
        cld
            sub    ecx,edi         ; calc # of bytes in _BSS segment
            mov    dl,cl           ; save bottom 2 bits of count in edx
            shr    ecx,2           ; calc # of dwords
            sub    eax,eax         ; zero the _BSS segment
            rep    stosd           ; ...
            mov    cl,dl           ; get bottom 2 bits of count
            and    cl,3            ; ...
            rep    stosb           ; ...

VxDCall    VIPD2_init_ram        ; Initialize the other VxD's ram pop    eax
        pop    edi                 ; restore caller's edi
        mov    word ptr dphil_base,ax  ; save the I/O base for CAMIL
        mov    vipd1_run_count,0
        mov    vipd1_dp_ints,0
        mov    vipd1_uart_ints,0
        mov    vipd1_in_isr,0      ; not in the isr
        mov    vipd1_in_tmr,0      ; not in the tmr call
        mov    vipd1_sleeping,0    ; not sleeping
        mov    dphil_reg_2e,0ffh   ; indicate no camil ints allowed ; Init the simulated 16450

Call   Sim450_init         ; Init 16450 code
            mov    eax,offset32 intr_to_vchd
            push   eax
            call   Sim450_set_interrupt   ; Set the interrupt function
            add    esp,4

; Completed initialization of the 16450 simulator

; Create startup sequence for timer entry
        mov    eax,offset32 ipstack
        mov    ecx,esp             ; save stack pointer
        mov    esp,eax             ; load new stack pointer value ...
        mov    eax,offset32 main
        push   eax                 ; push return address of main
        pushfd                     ; save the direction flag
        pushad                     ; save all registers
        push   fs
        push   gs                  ; save important segment registers
        mov    ipsp,esp            ; save stack pointer for IP
        mov    esp,ecx             ; restore original stack
        mov    vipd1_ok_to_call,1  ; Turn on code
        popfd                      ; Restore flags (direction)
        ret                        ; Done restarting...

db     'Copyright 1995   Compaq Computer Corporation. '
        db     'All Rights reserved.'

; Startup sequence created, awaiting timer call.

EndProc VIPD_restart

BeginProc VIPD_tmr, PUBLIC
        cmp    vipd1_ok_to_call,0  ; Is the modem alive?
        jz     short tmr_skip      ; No, the don't call
        cmp    vipd1_in_isr,0      ; are we in the isr? (somehow)
```

```
      jnz     short tmr_skip_isr
      cmp     vipd1_sleeping,0   ; Are we asleep?
      jnz     short tmr_skip        ; if so, skip timer wakeup
      cmp     vipd1_in_tmr,0
      jnz     short tmr_skip
      mov     vipd1_in_tmr,1
      pushfd                     ;save the direction flag
      pushad                     ;save all registers
      push    fs
      push    gs                 ;save important segment registers
      mov     notipsp,esp        ;save stack pointer for not IP
      mov     esp,ipsp           ;load ip stack pointer
      pop     gs
      pop     fs
      popad                      ;got all the registers back
      popfd                      ;got the flags back
tmr_skip:
      ret                        ;return to IP
tmr_skip_isr:
      inc     ipisr_error
      ret EndProc VIPD_tmr BeginProc VIPD_slice, PUBLIC
      pushfd                     ;save the direction flag (and others)
      pushad                     ;save all registers
      push    fs
      push    gs                 ;save important segment registers
      inc     vipd1_run_count
      mov     vipd1_in_tmr,0 goback:
      mov     ipsp,esp           ; save stack pointer for IP
      mov     esp,notipsp        ; load not ip stack pointer
      pop     gs
      pop     fs
      popad                      ; got all the registers back
      popfd                      ; got the flags back
      ret                        ; return to whomever
EndProc VIPD_slice BeginProc exit, PUBLIC
      Debug_out   "Exit called by IP"
      Trace_out   "Turning off modem code"
      mov     vipd1_ok_to_call,0
      cmp     vipd1_in_isr,0     ; Dying from within an interrupt?
      jz      goback             ; no, exit through time slice
      Trace_out   "Killed in isr"
      jmp     isr_exit           ; yes, exit through ISR exit
EndProc exit PUBLIC       Timer_get_time
Timer_get_time   PROC  NEAR
      VMMJmp       Get_System_Time
Timer_get_time   ENDP PUBLIC       sleep_now
sleep_now   PROC  NEAR mov     vipd1_sleeping,1   ; set sleep indication
      jmp     vipd_slice         ; slice out...

sleep_now   ENDP

VXD_LOCKED_CODE_ENDS
```

END

```
;       FILE:   VIPD2D.ASM
;
;       Copyright 1995 Compaq Computer Corporation.  All rights reserved.
;
;       FUNCTIONAL DESCRIPTION:
;           This module contains the DDB for VIPD2
;
;       REVISION HISTORY:
;           Last revised:  1995, January 13 13:45:26.04
;

.386p

.xLIST
          INCLUDE VMM.Inc
          INCLUDE Debug.Inc
          .LIST

;
; Create the service table for this VIPD
;
        Create_VIPD2_Service_Table equ 1
        INCLUDE    VIPD2P.INC VxD_LOCKED_CODE_SEG BeginProc   VIPD2_Control
        clc
        ret
EndProc            VIPD2_Control

VXD_LOCKED_CODE_ENDS

Declare_Virtual_Device VIPD2, 3, 0Ah, VIPD2_Control, VIPD2_Device_ID, \
                  Undefined_Init_Order,,

END
```

```
;       FILE:   VIPD2E.ASM
;
;       Copyright 1995  Compaq Computer Corporation.  All rights reserved.
;
;       FUNCTIONAL DESCRIPTION:
;           This module contains the routines generating calls to other
;           VIPD VxDs.
;
;       REVISION HISTORY:
;           Last revised:   1995, January 28 21:01:05.63
;

.386p

.LIST
        INCLUDE VMM.Inc
    INCLUDE VIPD1P.INC
        .LIST

; Create Linkages for VIPD2 to VIPD1 calls

VxD_LOCKED_CODE_SEG

IF    1

PUBLIC      __iob

PUBLIC line_to_char
PUBLIC Modem_adjust_power_level
PUBLIC line_to_clear
PUBLIC Dptone_set_frequency
PUBLIC line_to_break
PUBLIC Available_option
PUBLIC Dpcar_get_mse
PUBLIC Dpcar_end_now
PUBLIC line_disable_interrupts
PUBLIC Task_tcb_init
PUBLIC Dptone_detect_off
PUBLIC Timer_expired
PUBLIC Dpcar_set_mute
PUBLIC Dpcar_get_current
PUBLIC line_from_clear
PUBLIC dte_to_char
PUBLIC dte_to_clear
PUBLIC Task_insert
PUBLIC dte_to_break
PUBLIC Assume_fail
PUBLIC line_to_free
PUBLIC Dpcar_begin
PUBLIC Dpcar_is_v32
PUBLIC Dpcar_clear
PUBLIC Signal_test
PUBLIC Dptone_on
PUBLIC line_reset
PUBLIC Dpconv_get_snr_table
PUBLIC Dptone_detect_on
PUBLIC Confreg_read
PUBLIC Timer_start
PUBLIC line_detection
PUBLIC line_from_num
PUBLIC line_rx_block
PUBLIC Level_transmit_query
PUBLIC dte_from_num
PUBLIC line_tx_block
PUBLIC Signal_notify_insert
PUBLIC dte_from_clear
PUBLIC Daa_set_alternate_compensation
PUBLIC Dpcar_set_transmit_level
PUBLIC Dptone_set_duration
```

```
PUBLIC Dpconv_get_mse
PUBLIC Task_remove
PUBLIC Dptone_set_detect_threshold
PUBLIC line_init
PUBLIC Dpcar_set
PUBLIC Dpcar_renegotiate
PUBLIC line_from_char
PUBLIC dte_from_char
PUBLIC line_autoreliable_fallback
PUBLIC Dptone_set_power
PUBLIC Notify_init_ncb
PUBLIC line_setup_speed
PUBLIC Dptone_off
PUBLIC Dpcar_retrain
PUBLIC dte_to_free
PUBLIC line_enable_interrupts
PUBLIC Dptone_set_detect_frequency
PUBLIC Dp10_mute_transmitter
PUBLIC Dp10_get_handshake_status
PUBLIC Dp10_get_eqm10_value
PUBLIC Dp10_get_retrain_status
PUBLIC Dp10_get_eqm_status
PUBLIC Dp10_get_line_speed
PUBLIC Dp10_rate_renegotiate
PUBLIC Dp10_detect_answer_tone
PUBLIC Dp10_reset_connection
PUBLIC Dp10_start_handshake
PUBLIC Dp10_detect_retrain
PUBLIC Dp10_set_line_speed
PUBLIC Dp10_detect_rate_renegotiate
PUBLIC Dp10_get_cd_status
PUBLIC Dp10_init
PUBLIC Dp10_get_agc10_value
PUBLIC Dp10_send_answer_tone
PUBLIC Dp10_retrain
PUBLIC Dp10_init_answ_tone_detc
PUBLIC Interrupt_enable
PUBLIC Interrupt_disable IFDEF DEBUG
%error Cannot use DEBUG with this file
ENDIF line_to_char:           VxDJmp                  VIPD1_line_to_char Modem_adjust_power_level:       VxDJmp          VIPD1_Modem_adjust_power_level
line_to_clear:          VxDJmp                  VIPD1_line_to_clear
Dptone_set_frequency:   VxDJmp                  VIPD1_Dptone_set_frequency
line_to_break:          VxDJmp                  VIPD1_line_to_break
Available_option:       VxDJmp          VIPD1_Available_option
Dpcar_get_mse:          VxDJmp                  VIPD1_Dpcar_get_mse
Dpcar_end_now:          VxDJmp                  VIPD1_Dpcar_end_now
line_disable_interrupts:        VxDJmp
VIPD1_line_disable_interrupts
Task_tcb_init:          VxDJmp                  VIPD1_Task_tcb_init
Dptone_detect_off:      VxDJmp                  VIPD1_Dptone_detect_off
Timer_expired:          VxDJmp                  VIPD1_Timer_expired
Dpcar_set_mute:         VxDJmp                  VIPD1_Dpcar_set_mute
Dpcar_get_current:      VxDJmp                  VIPD1_Dpcar_get_current
line_from_clear:        VxDJmp                  VIPD1_line_from_clear
dte_to_char:            VxDJmp                  VIPD1_dte_to_char
dte_to_clear:           VxDJmp                  VIPD1_dte_to_clear
Task_insert:            VxDJmp                  VIPD1_Task_insert
dte_to_break:           VxDJmp                  VIPD1_dte_to_break
Assume_fail:            VxDJmp                  VIPD1_Assume_fail
line_to_free:           VxDJmp                  VIPD1_line_to_free
Dpcar_begin:            VxDJmp                  VIPD1_Dpcar_begin
Dpcar_is_v32:           VxDJmp                  VIPD1_Dpcar_is_v32
Dpcar_clear:            VxDJmp                  VIPD1_Dpcar_clear
Signal_test:            VxDJmp                  VIPD1_Signal_test
Dptone_on:      VxDJmp                  VIPD1_Dptone_on
```

2

```
line_reset: VxDJmp                              VIPD1_line_reset
Dpconv_get_snr_table:      VxDJmp                   VIPD1_Dpconv_get_snr_table
Dptone_detect_on: VxDJmp                        VIPD1_Dptone_detect_on
Confreg_read:       VxDJmp                          VIPD1_Confreg_read
Timer_start:        VxDJmp                          VIPD1_Timer_start
line_detection:     VxDJmp                          VIPD1_line_detection
line_from_num:      VxDJmp                          VIPD1_line_from_num
line_rx_block:      VxDJmp                          VIPD1_line_rx_block
Level_transmit_query:      VxDJmp                   VIPD1_Level_transmit_query
dte_from_num:       VxDJmp                          VIPD1_dte_from_num
line_tx_block:      VxDJmp                          VIPD1_line_tx_block
Signal_notify_insert:      VxDJmp                   VIPD1_Signal_notify_insert
dte_from_clear:     VxDJmp                          VIPD1_dte_from_clear
Daa_set_alternate_compensation:      VxDJmp
VIPD1_Daa_set_alternate_compensation
Dpcar_set_transmit_level:      VxDJmp                VIPD1_Dpcar_set_transmit_level
Dptone_set_duration:       VxDJmp                    VIPD1_Dptone_set_duration
Dpconv_get_mse:     VxDJmp                           VIPD1_Dpconv_get_mse
Task_remove:        VxDJmp                           VIPD1_Task_remove
Dptone_set_detect_threshold:  VxDJmp                 VIPD1_Dptone_set_detect_threshold
line_init:   VxDJmp                              VIPD1_line_init
Dpcar_set:   VxDJmp                              VIPD1_Dpcar_set
Dpcar_renegotiate:         VxDJmp                    VIPD1_Dpcar_renegotiate
line_from_char:     VxDJmp                           VIPD1_line_from_char
dte_from_char:      VxDJmp                           VIPD1_dte_from_char
line_autoreliable_fallback:       VxDJmp             VIPD1_line_autoreliable_fallback
Dptone_set_power: VxDJmp                         VIPD1_Dptone_set_power
Notify_init_ncb:    VxDJmp                           VIPD1_Notify_init_ncb
line_setup_speed: VxDJmp                         VIPD1_line_setup_speed
Dptone_off: VxDJmp                               VIPD1_Dptone_off
Dpcar_retrain:      VxDJmp                           VIPD1_Dpcar_retrain
dte_to_free:        VxDJmp                           VIPD1_dte_to_free
line_enable_interrupts: VxDJmp                   VIPD1_line_enable_interrupts
Dptone_set_detect_frequency:  VxDJmp                 VIPD1_Dptone_set_detect_frequency Dp10_mute_transmitter: VxDJmp            VIPD1_Dp10_mute_transmitter
Dp10_get_handshake_status:    VxDJmp         VIPD1_Dp10_get_handshake_status
Dp10_get_eqm10_value:   VxDJmp           VIPD1_Dp10_get_eqm10_value
Dp10_get_retrain_status:      VxDJmp         VIPD1_Dp10_get_retrain_status
Dp10_get_eqm_status:    VxDJmp           VIPD1_Dp10_get_eqm_status
Dp10_get_line_speed:    VxDJmp           VIPD1_Dp10_get_line_speed
Dp10_rate_renegotiate:  VxDJmp           VIPD1_Dp10_rate_renegotiate
Dp10_detect_answer_tone:      VxDJmp         VIPD1_Dp10_detect_answer_tone
Dp10_reset_connection:  VxDJmp           VIPD1_Dp10_reset_connection
Dp10_start_handshake:   VxDJmp           VIPD1_Dp10_start_handshake
Dp10_detect_retrain:    VxDJmp           VIPD1_Dp10_detect_retrain
Dp10_set_line_speed:    VxDJmp           VIPD1_Dp10_set_line_speed
Dp10_detect_rate_renegotiate: VxDJmp         VIPD1_Dp10_detect_rate_renegotiate
Dp10_get_cd_status:     VxDJmp           VIPD1_Dp10_get_cd_status
Dp10_init:  VxDJmp             VIPD1_Dp10_init
Dp10_get_agc10_value:   VxDJmp           VIPD1_Dp10_get_agc10_value
Dp10_send_answer_tone:  VxDJmp           VIPD1_Dp10_send_answer_tone
Dp10_retrain:       VxDJmp      VIPD1_Dp10_retrain
Dp10_init_answ_tone_detc:     VxDJmp         VIPD1_Dp10_init_answ_tone_detc
Interrupt_enable: VxDJmp        VIPD1_Interrupt_enable
Interrupt_disable:      VxDJmp           VIPD1_Interrupt_disable

ENDIF

VxD_LOCKED_CODE_ENDS

VxD_LOCKED_DATA_SEG
__iob dd    ?
VxD_LOCKED_DATA_ENDS

END
```

```
;       FILE: VIPD2P.ASM
;
;       Copyright 1995  Compaq Computer Corporation.  All rights reserved.
;
;       FUNCTIONAL DESCRIPTION:
;               This module contains the routines for Creating VIPD2's Service
;               Table, linkages to other VIPDs, and the DDB.
;
;       REVISION HISTORY:
;               Last revised:  1995, August 11 17:01:17.95
;

.386p

;================================================================================
;                       I N C L U D E S   &   E Q U A T E S
;================================================================================

.xLIST
        INCLUDE VMM.Inc
    INCLUDE VCHD.INC
      INCLUDE Debug.Inc
      .LIST

INCLUDE    VIPD2P.INC

_PREBSS         SEGMENT     BYTE PUBLIC USE32 'CODE'
        PUBLIC      _data_beg
_data_beg   db    ?
_PREBSS         ENDS _BSS            SEGMENT     BYTE PUBLIC USE32 'CODE'
PUBLIC      idle_flag
idle_flag   db    ?
_BSS            ENDS _POSTBSS        SEGMENT     BYTE PUBLIC USE32 'CODE'
        PUBLIC      _data_end
 _data_end   db    ?
_POSTBSS        ENDS

_LGROUP     GROUP _LTEXT, _LDATA, _PREBSS, _BSS, _POSTBSS

VxD_LOCKED_CODE_SEG

EXTRN v42_init:NEAR
EXTRN v42_outgoing_empty:NEAR
EXTRN line_type:NEAR
EXTRN V42det_start:NEAR
EXTRN v42_reset:NEAR
EXTRN v42_bg:NEAR
EXTRN v42_tbrk:NEAR
EXTRN mnp_rx:NEAR
EXTRN v42_test:NEAR
EXTRN v42_reason:NEAR
EXTRN mnp_tx:NEAR
EXTRN Crc_init:NEAR
EXTRN Mnprxasy_init:NEAR
EXTRN v42_dte_break_time:NEAR
EXTRN v42_test_status:NEAR
EXTRN Mnprxasy_start:NEAR
EXTRN Mnptxasy_start:NEAR
EXTRN v42_mnp10_force_rate:NEAR
EXTRN v42_got_dte_break:NEAR
EXTRN Mnprxasy_stop:NEAR
EXTRN Mnptxasy_stop:NEAR
EXTRN lapm_rx:NEAR
EXTRN v42_reconfigure:NEAR
EXTRN lapm_tx:NEAR
```

```
        EXTRN   V42det_stop:NEAR
        EXTRN   v42_start:NEAR
        EXTRN   v42_idle:NEAR
        EXTRN   v42_halt:NEAR
        EXTRN   v42_info:NEAR
        EXTRN   v42_increment_ticks:NEAR
        EXTRN   v42_falling_back_to_speed:NEAR
        EXTRN   Trace_say:NEAR
        EXTRN   Trace_put_event:NEAR
        EXTRN   Romdecom_decompress:NEAR PUBLIC  @VIPD2_v42_init
        PUBLIC  @VIPD2_v42_outgoing_empty
        PUBLIC  @VIPD2_line_type
        PUBLIC  @VIPD2_V42det_start
        PUBLIC  @VIPD2_v42_reset
        PUBLIC  @VIPD2_v42_bg
        PUBLIC  @VIPD2_v42_tbrk
        PUBLIC  @VIPD2_mnp_rx
        PUBLIC  @VIPD2_v42_test
        PUBLIC  @VIPD2_v42_reason
        PUBLIC  @VIPD2_mnp_tx
        PUBLIC  @VIPD2_Crc_init
        PUBLIC  @VIPD2_Mnprxasy_init
        PUBLIC  @VIPD2_v42_dte_break_time
        PUBLIC  @VIPD2_v42_test_status
        PUBLIC  @VIPD2_Mnprxasy_start
        PUBLIC  @VIPD2_Mnptxasy_start
        PUBLIC  @VIPD2_v42_mnp10_force_rate
        PUBLIC  @VIPD2_v42_got_dte_break
        PUBLIC  @VIPD2_Mnprxasy_stop
        PUBLIC  @VIPD2_Mnptxasy_stop
        PUBLIC  @VIPD2_lapm_rx
        PUBLIC  @VIPD2_v42_reconfigure
        PUBLIC  @VIPD2_lapm_tx
        PUBLIC  @VIPD2_V42det_stop
        PUBLIC  @VIPD2_v42_start
        PUBLIC  @VIPD2_v42_idle
        PUBLIC  @VIPD2_v42_halt
        PUBLIC  @VIPD2_v42_info
        PUBLIC  @VIPD2_init_ram
        PUBLIC  @VIPD2_v42_increment_ticks
        PUBLIC  @VIPD2_v42_falling_back_to_speed
        PUBLIC  @VIPD2_Trace_say
        PUBLIC  @VIPD2_Trace_put_event
        PUBLIC  @VIPD2_Romdecom_decompress @VIPD2_v42_init:            jmp     v42_init
@VIPD2_v42_outgoing_empty:  jmp     v42_outgoing_empty
@VIPD2_line_type:           jmp     line_type
@VIPD2_V42det_start:        jmp     V42det_start
@VIPD2_v42_reset:           jmp     v42_reset
@VIPD2_v42_bg:              jmp     v42_bg
@VIPD2_v42_tbrk:            jmp     v42_tbrk
@VIPD2_mnp_rx:              jmp     mnp_rx
@VIPD2_v42_test:            jmp     v42_test
@VIPD2_v42_reason:          jmp     v42_reason
@VIPD2_mnp_tx:              jmp     mnp_tx
@VIPD2_Crc_init:            jmp     Crc_init
@VIPD2_Mnprxasy_init:       jmp     Mnprxasy_init
@VIPD2_v42_dte_break_time:  jmp     v42_dte_break_time
@VIPD2_v42_test_status:     jmp     v42_test_status
@VIPD2_Mnprxasy_start:      jmp     Mnprxasy_start
@VIPD2_Mnptxasy_start:      jmp     Mnptxasy_start
@VIPD2_v42_mnp10_force_rate: jmp    v42_mnp10_force_rate
@VIPD2_v42_got_dte_break:   jmp     v42_got_dte_break
@VIPD2_Mnprxasy_stop:       jmp     Mnprxasy_stop
@VIPD2_Mnptxasy_stop:       jmp     Mnptxasy_stop
@VIPD2_lapm_rx:             jmp     lapm_rx
```

```
@VIPD2_v42_reconfigure:         jmp     v42_reconfigure
@VIPD2_lapm_tx:             jmp     lapm_tx
@VIPD2_V42det_stop:             jmp     V42det_stop
@VIPD2_v42_start:           jmp     v42_start
@VIPD2_v42_idle:            jmp     v42_idle
@VIPD2_v42_halt:            jmp     v42_halt
@VIPD2_v42_info:            jmp     v42_info
@VIPD2_init_ram:            jmp     short _vipd2_init_ram
@VIPD2_v42_increment_ticks:         jmp     v42_increment_ticks
@VIPD2_v42_falling_back_to_speed:       jmp     v42_falling_back_to_speed
@VIPD2_Trace_say:           jmp     Trace_say
@VIPD2_Trace_put_event:         jmp     Trace_put_event
@VIPD2_Romdecom_decompress:     jmp     Romdecom_decompress BeginProc _vipd2_init_ram, PUBLIC EXTRN Trace_init:NEAR mov     ecx,offset32 _data_end       ; end of _BSS segment
            mov     edi,offset32 _data_beg   ; start of _BSS segment
        cld
            sub     ecx,edi         ; calc # of bytes in _BSS segment
            mov     dl,cl           ; save bottom 2 bits of count in edx
            shr     ecx,2           ; calc # of dwords
            sub     eax,eax         ; zero the _BSS segment
            rep     stosd           ; ...
            mov     cl,dl           ; get bottom 2 bits of count
            and     cl,3            ; ...
            rep     stosb           ; ...

call    Trace_init      ; Initialize the trace buffer system ret
        db      'Copyright 1995  Compaq Computer Corporation. '
        db      'All rights reserved.'
EndProc _vipd2_init_ram

VXD_LOCKED_CODE_ENDS

END
```

APPENDIX D

U.S. EXPRESS MAIL NO. TB855044421US

```
        page    60, 132
;*******************************************************************************
*
        title   VCHD - Crazy Horse virtual device driver
;*******************************************************************************
*
;
;    (C) Copyright Compaq Computer Corp, 1994
;
;    Title:    VCHD.386 - Crazy Horse virtual device driver
;
;    Module:   VCHD.ASM - Core code
;
;$Revision:   1.2  $
;
;    Date:     September 21, 1994
;
;    Authors:  Peter J. Brown
;                        Andrew Love
;$Header:   M:/software/crazyhrs/cpqfmw31.312/vchd.asv   1.2   21 Jun 1995
13:28:40   AndrewL  $
;*******************************************************************************
*
;
;    Change log:
;
;    DATE        REVISION   DESCRIPTION                                 AUTHOR
;    --------    --------   ------------------------------------------  ------
------------
;    09/21/94    1.00       Initial revision                            PJB
;    11/15/94    1.01       Added buffering for DOS, and support for winapps
;    12/30/94    1.02                Added API calls for windows config program
;$Log:   M:/software/crazyhrs/cpqfmw31.312/vchd.asv  $
;
;     Rev 1.2   21 Jun 1995 13:28:40   AndrewL
;  Fixed COMBuf_Int EOI to com_int_handle from data_pump_int_handle.
;
;     Rev 1.1   21 Mar 1995 16:25:58   AndrewL
;  Fixed VMMCall Disable_Global_Trapping port # in VCHD_ComPort.
;
;     Rev 1.0   03 Mar 1995 15:01:06   AndrewL
;  Initial revision.
;
;     Rev 1.12  13 Feb 1995 15:59:20   AndrewL
;  Added lock out of interrupts to VIPD until it has been initialized.
;
;     Rev 1.11  10 Feb 1995 15:10:00   AndrewL
;  Moved data pump int flip to VCHD_Port from VCHD_IRQ.
;  Added all int mask to flip of data pump int.
;  Added data pump/Com Port same int support. Does not work for IRQ 3 ???.
;
;     Rev 1.10  03 Feb 1995 13:40:56   AndrewL
;  Added register preservation around VIPD accesses.
;
;     Rev 1.9   28 Jan 1995 19:28:08   AndrewL
;  Fixed stack setup in Fake Xmit Empty for jump to Xmit Empty.
;
;     Rev 1.8   28 Jan 1995 12:57:14   AndrewL
;  Register cleanup in Windows TX/RX routines.
;
;     Rev 1.7   27 Jan 1995 09:41:38   AndrewL
;  Fixed two short jump warnings.
;
;     Rev 1.6   25 Jan 1995 19:37:38   AndrewL
;  Added error recovery paths. (check for IRQ assignments before
;  returning to default behavior.)
;
;     Rev 1.5   24 Jan 1995 12:29:50   AndrewL
;  Removed PCIC interrupt programming
;  Added inversion of Data Pump Interrupt level
;  Added return values for all PM API routines
```

```
;
;       Rev 1.4   18 Jan 1995 08:39:12   unknown
;    Phys EOI and release IRQs when PC Card removed
;    corrected si. ref in Xmit_Empty ( now edi. )
;    Turn off time slice when PC Card removed
;
;       Rev 1.2   13 Jan 1995 13:46:48   AndrewL
;    Changed virtualized irq from default irq 3 to ipony passed by cfg
;
;       Rev 1.1   11 Jan 1995 15:05:14   Peter
;    Several changes to match Don's code, and get ready to run for real.
;
;       Rev 1.0   10 Jan 1995 16:27:20   Peter
;    Initial revision.
;
;**************************************************************************
*
;
;    Functional Description:
;
;
;**************************************************************************
*

.386p

;==========================================================================
=
;                    I N C L U D E S   &   E Q U A T E S
;==========================================================================
=

.XLIST
        INCLUDE VMM.Inc
            INCLUDE SSVCD.Inc
            INCLUDE VPICD.Inc
            INCLUDE VTD.Inc
        INCLUDE Debug.Inc
            INCLUDE COMDEV.Inc
            INCLUDE IBMCOM.Inc
            Create_VCHD_Service_Table equ 1
            INCLUDE VCHD.INC
            INCLUDE VIPD1P.INC
        .LIST VCHD_Major_Ver      equ     01h
VCHD_Minor_Ver      equ     00h
XOFF_Char           EQU     13h
CB_XOFF_PROTO               EQU     1
Flag_Queue_Addr_Set equ     01h
UART_INT_MASK               EQU             00000111b

;=========================================================

IFDEF DEBUG
        Public Disable_Local_Trapping_Proc
        Public CH_Com_Port
        Public CH_Com_IRQ
        Public data_pump_int_handle
        Public VIPD_Port
        Public VIPD_Init
        Public com_int_handle
        Public Com_Int_BDA_Offset
        Public owner
        Public VCHD_QIn
        Public VCHD_QOut
        Public VCHD_Flags
        Public VCHD_Int_Busy
        Public Time_Slice
        Public Com_Struc
        Public VCD_table
        Public PORT_PRESENT
```

```
                Public virt_ier_store
                Public VCD_Vier
                Public VCD_Vlcr
                Public VCD_Vmcr
                Public VCD_Viir
                Public VCD_Vlsr
                Public VCD_Vrxb
                Public VCD_Vmsr
                Public VCD_Virr
                Public VCD_XOFF_Flag
                Public VCD_Protocol
                Public VCD_RxQin
                Public VCD_RxQout
                Public VCD_RxQcount
                Public VCD_RxQlen
                Public VCD_RxQ
ENDIF ;================================================================================
;                       L O C A L   D A T A
;================================================================================
VxD_DATA_SEG
Disable_Local_Trapping_Proc             dd  ?           ;address of
Disable_Local_Trapping
CH_Com_Port                             dw  0           ; crazy horse com port
CH_Com_IRQ                                          dw  0
                ; crazyhorse com irq
data_pump_int_handle                    dd  0           ; interrupt handle
VIPD_Port                               dw  0           ; Data Pump Hardware IO Port
VIPD_Init                                           dw  0
                ; VIPD initialized indicator
com_int_handle                          dd  0           ; interrupt handle
Com_Int_BDA_Offset                      dw  ?
owner                                   dd  0           ; VM handle of owner
VCHD_QIn                                dd  ?           ; Linear QInAddr
VCHD_QOut                               dd  ?           ; Linear QOutAddr
VCHD_Flags                              dd  0           ; Misc Status Flags
VCHD_Int_Busy                           db  0
Time_Slice                              dd  0           ; time slice handle
Com_Struc                               dd  0           ; pointer to our Com_Struc
VCD_table                                           dd  ?           ;
Pointer to array of pointers to VCD_COM_Struc
PORT_PRESENT                                        EQU  00000010b
virt_ier_store                          db  0           ; virt write storage for IER
VCD_Vier                                    db  ?               ; Virtual Interrupt Enable register
VCD_Vlcr                                    db  ?               ; Virtual Line Control register
VCD_Vmcr                                    db  ?               ; Virtual Modem Control register
VCD_Viir                                    db  ?               ; Virtual Interrupt Identity register
VCD_Vlsr                                    db  ?               ; Virtual Line status register
VCD_Vrxb                                    db  ?               ; Virtual Rx Buffer
VCD_Vmsr                                    db  0               ; Virtual Modem status register
VCD_Virr                                    db  0               ; Virtual Interrupt Request register VCD_XOFF_Flag                               db  0
VCD_Protocol                                db  ?

IFDEF DEBUG
```

3

```
VCD_Max_Queued                              dw    ?              ; max # of
chars ever queued
ENDIF VCD_RxQin                                   dw    0              ; First
In...
VCD_RxQout                                  dw    0              ; ...First
Out
VCD_RxQcount                                dw    0              ; How many
in queue
VCD_RxQlen                                  dw    10240          ; Total size
of queue in
VCD_RxQ                                     dw    10240 DUP(0);  QUEUE STARTS
HERE -- Continues past here VCHD_PM_Call_Table LABEL DWORD
       dd   OFFSET32 VCHD_Get_Version
       dd   OFFSET32 VCHD_PORT
       dd   OFFSET32 VCHD_IRQ
       dd   OFFSET32 VCHD_COMPORT Max_VCHD_PM_Service    equ      ($ - VCHD_PM_Call_Table) / 4

VCHD_V86_Call_Table LABEL DWORD
       dd   OFFSET32 VCHD_Get_Version

Max_VCHD_V86_Service   equ      ($ - VCHD_V86_Call_Table) / 4

VxD_DATA_ENDS

;================================================================================
;           V I R T U A L    D E V I C E    D E C L A R A T I O N
;================================================================================

Declare_Virtual_Device  VCHD, VCHD_Major_Ver, VCHD_Minor_Ver,\
                VCHD_Control_Proc, VCHD_Device_ID,\
                Undefined_Init_Order,VCHD_V86_API_PROC,VCHD_PM_API_Proc ;================================================================================
;                           I C O D E
;================================================================================

VxD_ICODE_SEG

;--------------------------------------------------------------------------------
;
;    VCHD_Sys_Critical_Init
;
;    Description:
;       On entry, interrupts are disabled.  Critical initialization
;       for this VxD should occur here.
;
;       This procedure is called when the VCHD_Control_Proc
;       dispatches the Sys_Critical_Init notification from VMM.
;
;       We can notify VMM of failure by returning with carry set
;       or carry clear will suggest success.
;
;--------------------------------------------------------------------------------

BeginProc VCHD_Sys_Critical_Init

IFDEF DEBUG
       Trace_Out "VCHD: Sys_Critical_Init"
ENDIF
```

```
        clc
        ret

EndProc VCHD_Sys_Critical_Init

;------------------------------------------------------------------------
;
;   VCHD_Device_Init
;
;   Description:
;       This is a non-system critical initialization procedure.
;       IRQ virtualization, I/O port trapping and VM control
;       block allocation can occur here.
;
;       Again, the same return value applies...
;       CLC for success, STC for error notification.
;
;------------------------------------------------------------------------

BeginProc VCHD_Device_Init

IFDEF DEBUG
        Trace_Out "VCHD: Device_Init"
ENDIF
IFDEF DEBUG
            Trace_Out "Init Trapping"
ENDIF
            mov     eax,Disable_Local_Trapping
            mov     esi,OFFSET32 Catch_Disable_Local_Trapping
            VMMcall Hook_Device_Service
            jc           short @F
            mov     [Disable_Local_Trapping_Proc],esi
IFDEF DEBUG
            Trace_Out "Hooked Disable_Local_Trapping"
ENDIF
            clc
            ret
@@:
IFDEF DEBUG
            Trace_Out "Unable to hook Disable_Local_Trapping"
ENDIF
            stc
            ret EndProc VCHD_Device_Init VxD_ICODE_ENDS VxD_LOCKED_CODE_SEG ;=========================================================================
;                       N O N P A G E A B L E     C O D E
;=========================================================================

;------------------------------------------------------------------------
;
;   VCHD_Control_Proc
;
;   DESCRIPTION:
;       Dispatches VMM control messages to the appropriate handlers.
;
;   ENTRY:
;       EAX = Message
;       EBX = VM associated with message
;
;   EXIT:
```

```
;       Carry clear if no error (or if not handled by the VxD)
;       or set to indicate failure if the message can be failed.
;
;   USES:
;       All registers.
;
;------------------------------------------------------------------
-

BeginProc VCHD_Control_Proc

Control_Dispatch Sys_Critical_Init, VCHD_Sys_Critical_Init
        Control_Dispatch Device_Init, VCHD_Device_Init clc
        ret EndProc VCHD_Control_Proc
;*************************************************************************
;                          E X P O R T E D   A P I
;*************************************************************************

;==========================================================================
;
;   VCHD_PM_API_Proc
;
;==========================================================================

BeginProc VCHD_PM_API_Proc, PUBLIC

IFDEF DEBUG
        Trace_Out "In VCHD_PM_API_Proc"
ENDIF

VMMCall Test_Sys_VM_Handle
        movzx   eax, [ebp.Client_DX]                    ; function in DX
        cmp     eax, Max_VCHD_PM_Service
        jae     SHORT VCHD_PM_Call_Bad
        and     [ebp.Client_EFLAGS], NOT CF_Mask        ; clear carry
        call    VCHD_PM_Call_Table[ eax * 4 ]           ; call service
        ret VCHD_PM_Call_Bad:
IFDEF DEBUG
        Debug_Out "VCHD ERROR: Invalid function #EAX on VCHD_PM_API_Proc"
ENDIF
        mov     [ebp.Client_EAX], 0FFFFFFFFh VCHD_PM_API_Failed:
        or      [ebp.Client_EFLAGS], CF_Mask            ; set carry
        ret EndProc VCHD_PM_API_Proc ;==========================================================================
;
;   VCHD_V86_API_Proc
;
;==========================================================================

BeginProc VCHD_V86_API_Proc, PUBLIC

IFDEF DEBUG
        Trace_Out "In VCHD_V86_API_Proc"
ENDIF

Assert_VM_Handle ebx
        movzx   eax, [ebp.Client_DX]                    ; function in DX
        cmp     eax, Max_VCHD_V86_Service
        jae     SHORT VCHD_V86_Call_Bad
        and     [ebp.Client_EFLAGS], NOT CF_Mask        ; clear carry
        call    VCHD_V86_Call_Table[ eax * 4 ]          ; call service
```

```
                ret
        VCHD_V86_Call_Bad:
        IFDEF DEBUG
                Debug_Out "VCHD ERROR: Invalid function #EAX on VCHD_V86_API_Proc"
        ENDIF
                mov     [ebp.Client_EAX], 0FFFFFFFFh VCHDR_V86_API_Failed:
                or      [ebp.Client_EFLAGS], CF_Mask        ; set carry
                ret EndProc VCHD_V86_API_Proc ;===========================================================================
        ;
        ;   VCHD_Get_Version
        ;
        ;       Version call for PM API entry point
        ;
        ;   ENTRY:      Client_DX = 0
        ;
        ;   EXIT:       Client_AX = Version
        ;
        ;   USES:       FLAGS, EAX
        ;
        ;===========================================================================

BeginProc VCHD_Get_Version

IFDEF DEBUG
                Trace_Out "In VCHD_Get_Version"
        ENDIF mov     eax, VCHD_Major_Ver SHL 8 or VCHD_Minor_Ver
                mov     [ebp.Client_AX], ax
                ret EndProc VCHD_Get_Version ;===========================================================================
        ;
        ;   VCHD_Port
        ;
        ;       Version call for PM API entry point
        ;
        ;   ENTRY:      Client_DX = 1
        ;               Client_AX = base port
        ;
        ;   EXIT:       Client_AX = 0
        ;
        ;   USES:       FLAGS, EAX
        ;
        ;===========================================================================

BeginProc VCHD_Port

IFDEF DEBUG
                Trace_Out "In VCHD_Port"
        ENDIF push    eax
                ;
                push    edx
                ;
                mov         dx,[ebp.Client_AX]
                ; get passed IO Port for Data Pump
                mov         [VIPD_Port], dx
                ; save it
        ;
        ;       Get Data Pump interrupt to correct active state and clear any pending
        ;
```

```
                add         dx, 6
        ;
                mov         al, 00h
                ;
                out         dx, al
                ; Port+6 = 00h
                inc         dx
                        ;
                mov         al, 0DFh
        ;
                out         dx, al
                ; Port+7 = 0DFh
                inc         dx
                        ;
                mov         al, 018h
        ;
                out         dx, al
                ; Port+8 = 018h
                inc         dx
                        ;
                mov         al, 03h
                ;
                out         dx, al
                ; Port+9 = 03h
                add         dx, 25h
                ;
                mov         al, 0ffh
        ;
                out         dx, al
                ; Port+2eh = 0ffh ;
                mov         [ebp.Client_AX], 0
        ;
                pop         edx
                        ;
                pop         eax
                        ;
                ret
                        ;

EndProc VCHD_Port

;================================================================================
;
;   VCHD_IRQ
;
;       Version call for PM API entry point
;
;   ENTRY:      Client_DX = 2
;               Client_AX = PCMCIA irq
;
;   EXIT:       Client_AX = 0
;
;   USES:       FLAGS, EAX, EDI
;
;================================================================================

BeginProc VCHD_IRQ

IFDEF DEBUG
        Trace_Out "In VCHD_IRQ"
ENDIF push        eax
        ;
                push        edi
        ;
                push    ecx
                ;
                push    edx
                ;
```

```
;
; Let VIPD know he where hardware is
;
            movzx   eax, [VIPD_Port]                            ;

IFDEF DEBUG
       Trace_Out "Turning on VIPD"
ENDIF
                    ;
            VxDCall VIPD1_HW_Avail                              ;
            mov        [VIPD_Init], 1
       ; indicate we have initialized the VIPD
;
;      Set up IRQ for Data Pump
;
            movzx eax, [ebp.Client_AX]                          ; get IRQ #
            cmp        ax, [CH_Com_IRQ]                         ; Q:
is hdw int same as com int?
            jnz        short @F
       ;    N: go ahead and get int
            mov        eax, [com_int_handle]
;      Y: get com int
            cmp        eax, 0
            ; Q: did we get com int yet?
            jz         short @F
       ;    N: then just continue
            VxDCall VPICD_Phys_EOI
;      Y: make sure it's cleared
            VxDCall VPICD_Force_Default_Behavior                ;
       reset behavior
@@:
                    ;

;
IFDEF DEBUG
            Trace_Out "IRQ #EAX for Crazyhorse"
ENDIF

;
            movzx eax, [ebp.Client_AX]                          ; get IRQ #
            sub     esp, SIZE VPICD_IRQ_Descriptor              ; stack space for
struct
            mov     edi, esp                                    ; edi ->
VPICD_IRQ_Descriptor
            mov     [edi.VID_IRQ_Number], ax                    ;
            mov     eax, VPICD_Opt_Can_Share                    ; no read hw iir
            mov     [edi.VID_Options], ax                       ;
            mov     [edi.VID_Virt_Int_Proc], eax                ;
            mov     [edi.VID_EOI_Proc], eax                     ;
            mov     [edi.VID_Mask_Change_Proc], eax             ;
            mov     [edi.VID_IRET_Proc], eax                    ;
            mov     eax, OFFSET32 VCHD_HW_INT                   ; Interrupt Proc
            mov     [edi.VID_Hw_Int_Proc], eax                  ;
            mov     eax, 500                                    ; timeout
            mov     [edi.VID_IRET_Time_Out], eax                ;
            VxDCall VPICD_Virtualize_IRQ                        ; Virtualize
            jc      short VCHD_Port_failed                      ; failed?

;
IFDEF DEBUG
            Trace_Out "IRQ virtualized for Crazyhorse"
ENDIF

;
            mov     [data_pump_int_handle],eax                  ; save the int
handle
            VxDCall VPICD_Get_Complete_Status                   ; Check status of
int.
            test    ecx, VPICD_Stat_Phys_In_Serv                ; Q: Is it phys.
in Service?
```

```
                jz      SHORT @F                                        ;   N:

IFDEF DEBUG
                Trace_Out "IRQ in service"
ENDIF

;
                VxDCall VPICD_Set_Int_Request                           ;   Y: pass int
to new owner
@@:                                                     ;
                VXDCall VPICD_Physically_Unmask                         ;
                VxDCall VPICD_Phys_EOI                                                  ;
                add     esp, SIZE VPICD_IRQ_Descriptor          ; fix stack
                movzx eax, [ebp.Client_AX]                                      ; get irq #
                cmp             ax, [CH_Com_IRQ]                                        ; Q:
is hardware same as com int
                jnz             short @F
        ;       N: just continue
                mov             eax, [data_pump_int_handle]
;       Y: copy data pump int handle to com int handle
                mov             [com_int_handle], eax                           ;
@@:
                        ;

;
;
;       Set timer tik to 5 msec and time slice interrupt of 10 msec
;
                mov     eax, 5                                          ; 5 msec min int
period
                VXDcall VTD_Begin_Min_Int_Period                ; tell virtual
timer driver
                jc      short VCHD_Port_failed                  ; bummer...didn't
get it ;
IFDEF DEBUG
                Trace_Out "Min Int Period Set to 5 msec"
ENDIF ;
                mov     eax, 10                                         ; set up to get
time slice int every 10 msec
                xor     edx, edx                                        ; null ref data
pointer - no ref data required
                mov     esi, OFFSET32 VCHD_Time_Slice_Proc       ; addr of time
slice routine
                VMMcall Set_Global_Time_Out                             ; tell system VM
                cmp     esi, 0                                          ; did we get time
sliceout scheduled ??
                jz      short VCHD_Port_failed                  ; N
                mov     [Time_Slice], esi                               ; save time slice
handle IFDEF DEBUG                                                     ;
                Trace_Out "Time Slice Int Set to 10 msec"       ;
ENDIF                                                           ;

mov     [ebp.Client_AX], 0                              ;
                jmp             short VCHD_Port_exit                    ;

;
VCHD_Port_failed:                                                       ;
                add     esp, SIZE VPICD_IRQ_Descriptor          ; fix stack
                mov     [VIPD_Init], 0
        ; clear VIPD initialized
                mov             eax, [com_int_handle]                   ;
                cmp             eax, 0
                ; Q: did we get com interrupt
                je              short @F
        ;       N: then just exit
```

```
            VxDCall VPICD_Phys_EOI
;       Y: make sure it's cleared
            VxDCall VPICD_Force_Default_Behavior                      ;
        reset behavior
            mov         [com_int_handle], 0
        ; clear handle
@@:
                        ;
            mov         eax, [data_pump_int_handle]                    ;
            cmp         eax, 0
            ; Q: did we get data pump int
            je          short @F
;           N: then just return failure
            VxDCall VPICD_Phys_EOI
;       Y: make sure it's cleared
            VxDCall VPICD_Force_Default_Behavior                      ;
        reset behavior
            mov         [data_pump_int_handle], 0                     ; show
we don't have data pump IRQ
@@:
                        ;
            mov         [ebp.Client_AX], 1
        ; return non success ;
VCHD_Port_exit:
            ;
            pop         edx
                        ;
            pop         ecx
                        ;
            pop     edi                                                ;
            pop     eax                                                ;
            ret                                                        ;

EndProc VCHD_IRQ

;===========================================================================
;
;       VCHD_COMPORT
;
;       Version call for PM API entry point
;
;       ENTRY:  Client_DX = 2
;               Client_AX = Comm Port Addr
;               Client_BX = IRQ
;               Client_CX = Comm Port #
;
;       EXIT:       Client_AX = 0
;
;       USES:       FLAGS, EAX, EDI
;
;===========================================================================

BeginProc VCHD_COMPORT

IFDEF DEBUG
        Trace_Out "In VCHD_COMPORT"
ENDIF push    eax                                                ;
            push    edi                                                ;
            push    edx
            ;
            push    ecx
            ;
            push    esi
            ;

;
            cmp         [ebp.Client_AX],0                              ; Q:
Port = 0?
```

```
                jne     short VCHD_COMPORT_setup              ;       N:
valid port...set up IRQ
                mov     [VIPD_Init], 0
        ;       Y: show VIPD not initialized
                mov     esi, [Com_Struc]                      ;
                and     [esi.VCD_SS_Flags], NOT PORT_PRESENT  ; Show Port
removed
                mov     ecx, UART_PORTS
        ; Disable all ports for this Comm
                movzx edx, [CH_Com_Port]                      ;
@@:
                ;
                VMMCall Disable_Global_Trapping               ;
                inc     edx
                ;
                loop    @B
                ;
                mov     [CH_Com_Port],0
                ; Show Port removed
                mov     eax, [data_pump_int_handle]           ;
                cmp     eax, 0
                ; Q: did we get data pump int?
                jz      short VCHD_COMPORT_chk_com
        ;       N: check com port int
                VxDCall VPICD_Phys_EOI
        ;       Y: make sure it's cleared
                VxDCall VPICD_Force_Default_Behavior          ;
        reset behavior
                mov     [data_pump_int_handle], 0             ;
clear handle
VCHD_COMPORT_chk_com:                                         ;
                mov     eax, [com_int_handle]                 ;
                cmp     eax, 0
                ; Q: did we get comport int?
                jz      VCHD_COMPORT_exit
        ;       N: get out of here
                VxDCall VPICD_Force_Default_Behavior          ;       Y:
reset behavior
                mov     [com_int_handle], 0
        ; clear handle
                jmp     VCHD_COMPORT_BDA
        ;       clear BDA
VCHD_COMPORT_setup:
                                ;
                mov     ax,[ebp.Client_AX]                    ; Get
Comm Port Addr
                mov     [CH_Com_Port],ax                      ; Save
it
                movzx eax, [ebp.Client_CX]                    ; Get Comm
Port #
                sub     eax, 1
                ; Get to 0 Base
                mov     ebx, [VCD_Table]                      ;
                mov     esi, dword ptr [ebx][4*eax]           ; Get
VCD_Com_Struc pointer
                mov     [Com_Struc], esi                      ; save
our Com_Struc pointer
                or      [esi.VCD_SS_Flags], PORT_PRESENT      ; indicate
we're there
                mov     ecx, UART_PORTS
        ; Enable all ports for this Comm
                movzx edx, [ebp.Client_AX]                    ;
@@:
                ;
                VMMCall Enable_Global_Trapping                ;
                inc     edx
                ;
                loop    @B
                ;
                mov     ax,[ebp.Client_BX]                    ;
                mov     [CH_Com_IRQ], ax                      ;
                sub     esp, SIZE VPICD_IRQ_Descriptor        ; stack space for
```

```
              mov       edi, esp                                  ; edi ->
struct                                                              VPICD_IRQ_Descriptor
              mov       [edi.VID_IRQ_Number],ax                   ;
              mov       ax, VPICD_Opt_Can_Share                   ;
              mov       [edi.VID_Options],ax                      ;
              mov       eax, 0                                    ;
              mov       [edi.VID_Virt_Int_Proc],eax               ;
              mov       [edi.VID_Mask_Change_Proc],eax            ;
              mov       [edi.VID_IRET_Proc],eax                   ;
              mov       eax,OFFSET32 VCHD_HW_INT_IGNORE           ; Interrupt Proc
              mov       [edi.VID_Hw_Int_Proc],eax                 ;
              mov       eax,500                                   ; timeout
              mov       [edi.VID_IRET_Time_Out],eax               ;
              mov              eax,OFFSET32 COMBuff_EOI           ;
              mov       [edi.VID_EOI_Proc],eax                    ;
              VxDCall   VPICD_Virtualize_IRQ                      ; Virtualize
              jc        SHORT VCHD_COMPORT_failed                 ; failed?
              mov       [com_int_handle], eax                     ; save the int
handle
@@:                                                ;
              add       esp, SIZE VPICD_IRQ_Descriptor            ; fix stack
VCHD_COMPORT_BDA:                                                 ;
;
; BDA update in all VMs
;
              movzx     edx, [ebp.Client_AX]                      ; Get the data to
write
              mov       ax, [ebp.Client_CX]                                   ; Get
Comm Port #
              shl       ax, 1
       ; times 2
              sub       ax, 2
       ; Sub 2     (1->0 2->2 3->4 4->6)
              mov       Com_Int_BDA_Offset, ax                    ;
              VMMcall   Get_Cur_VM_Handle                         ;
next_vm:
                                                    ;
              movzx     edi, Com_Int_BDA_Offset                   ; Get the
offset in the BDA
              add       edi, 400h                                 ; Convert to flat
address 40:x
              add       edi, [ebx + CB_High_Linear]               ;
              mov       word ptr [edi], dx                        ;
skip_it:
                                                    ;
              VMMcall   Get_Next_VM_Handle                        ;
              VMMcall   Test_Cur_VM_Handle                        ;
              jne       short next_vm                             ;

;
       mov     [ebp.Client_AX], 0                                 ;
              jmp           short VCHD_COMPORT_exit               ;
;
; end BDA update
;
VCHD_COMPORT_failed:
              mov             eax, [data_pump_int_handle]         ;
check data pump interrupt
              cmp       eax, 0
              ; Q: did we get data pump interrupt
              jz            short @F
       ;  N: then just exit
              VxDCall   VPICD_Phys_EOI
       ;  Y: make sure it's cleared
              VxDCall   VPICD_Force_Default_Behavior              ;
       reset behavior
              mov             [data_pump_int_handle], 0
@@:
                          ;
              mov             [com_int_handle], 0
       ; show we failed
```

```
                mov         [ebp.Client_AX], 1
        ; return non success
VCHD_COMPORT_exit:
                ;
                pop         esi
                        ;
                pop         ecx
                        ;
                pop         edx
                        ;
                pop     edi                                     ;
                pop     eax                                     ;
                ret                                             ;
EndProc VCHD_COMPORT ;**********end exported api*********

;-------------------------------------------------------------------------------
;
;   VCHD_Dispatch_IO
;
;   Description:
;
;       ENTRY:  ESI -> VCD_COM_Struc
;                       EBX= VM handle
;                       DX = port #
;                       AL = data to output, if output request
;                       ECX = I/O type
;
;   EXIT:       IF Crazyhorse
;                               CLR Carry
;                       ELSE
;                               SET Set
;
;-------------------------------------------------------------------------------

BeginProc VCHD_Dispatch_IO, SERVICE, High_Freq push    eax                                     ; save callers eax
            mov     eax, [esi.VCD_IObase]                   ; get port base
addr
            cmp     ax, [CH_Com_Port]                           ; Q:
Crazyhorse Port?
            je      short VCHD_Dispatch_IO_continue         ;   Y: clear
carry and return
            pop     eax
        ;
            stc                                             ;   N: set carry
and return
            ret                                             ;

;
VCHD_Dispatch_IO_continue:                                  ;
            pop     eax
        ;
            clc                                             ; clear carry and
return
            ret                                             ;

EndProc VCHD_Dispatch_IO

;-------------------------------------------------------------------------------
;
;   VCHD_PORT_IO
;
;   Description:
;
;       ENTRY:  ESI -> VCD_COM_Struc
;                   EBX= VM handle
```

```
;                    DX = port #
;                    AL = data to output, if output request
;                    ECX = I/O type
;
;   EXIT:            AL = data from input, if input request
;
;-----------------------------------------------------------------------
-

BeginProc VCHD_PORT_IO, SERVICE, High_Freq

IFDEF DEBUG
      Trace_Out "VCHD: VCHD_PORT_IO"
ENDIF

@@:
            mov     [owner],ebx
      ;
            test    [esi.VCD_Flags], VCD_Windows_Port      ; Q; Windows Port?
            jz      SHORT @F                               ; N: Handle DOS ;
            or            ecx,ecx                          ; IO type
            jz            SHORT IO_read
IFDEF DEBUG
      Trace_Out "Port Write #EDX  #EAX"
ENDIF
            VxDJmp  VIPD1_REG_WRITE
IO_read:
IFDEF DEBUG
      Trace_Out "Port Read #EDX"
ENDIF
            VxDCall VIPD1_REG_READ
IFDEF DEBUG
      Trace_Out "Data #EAX"
ENDIF
            ret @@:
            push edi
      ;
            mov     edi, edx                                          ;
            and     edi, UART_REG_MASK             ; Get register
offset
            mov     edi, cs:VCHD_Trap_Tab[edi*8][ecx]   ; EDI -> I/O
routine
            xchg    edi, DWORD PTR ss:[esp]        ; Restore EDI, put
addr on stack
            ret                                    ; "Jump" to
routine VCHD_Trap_Tab   LABEL DWORD
        dd      OFFSET32 VCHD_Virt_In_RxTx                    ;
Receive/Transmit buffer etc.
        dd      OFFSET32 VCHD_Virt_Out_RxTx                   ;
Receive/Transmit buffer etc.
        dd      OFFSET32 VCHD_Virt_In_IER             ; Interrupt
Enable etc.
        dd      OFFSET32 VCHD_Virt_Out_IER            ; Interrupt
Enable etc.
        dd      OFFSET32 VCHD_Virt_In_IIR             ; Interrupt
Identity
        dd      OFFSET32 VCHD_Virt_Out_IIR            ; Interrupt
Identity
        dd      OFFSET32 VCHD_Virt_In_LCR             ; Line
Control
        dd      OFFSET32 VCHD_Virt_Out_LCR            ; Line
Control
        dd      OFFSET32 VCHD_Virt_In_MCR             ; Modem
Control
        dd      OFFSET32 VCHD_Virt_Out_MCR            ; Modem
Control
```

```
        dd      OFFSET32 VCHD_Virt_In_LSR                  ; Line
Status
        dd      OFFSET32 VCHD_Virt_Out_LSR                 ; Line
Status
        dd      OFFSET32 VCHD_Virt_In_MSR                  ; Modem
Status
        dd      OFFSET32 VCHD_Virt_Out_MSR                 ; Modem
Status
EndProc VCHD_PORT_IO ;------------------------------------------------------------------------------
;
;   VCHD_Virt_In_RxTx
;
;   Description:
;
;       ENTRY:  ESI -> VCD_COM_Struc
;                      EBX= VM handle
;                      DX = port #
;                      ECX = I/O type
;
;   EXIT:       AL = data from input
;
;------------------------------------------------------------------------------

BeginProc VCHD_Virt_In_RxTx, High_Freq

IFDEF DEBUG
        Trace_Out "VCHD: VCHD_Virt_In_Rx"
ENDIF cli
        test    [VCD_Vlcr], LCR_DLAB    ; Q: Access is to Divisor latch?
        jnz     SHORT CB_In_Divisor_Latch    ;    Y: Yes, go do it
;
;   Input from data buffer
;
        mov     al, [VCD_Vrxb]          ; Get current character
        and     [VCD_Vlsr], NOT LSR_DR  ; Preserve error bits, reset DR
        and     [VCD_Virr], NOT IER_DR  ; Clear DR virtual interrupt
        call    COMBuff_Extract_Queue            ; Suck out new status/char IFDEF DEBUG_XOFF
        push    eax
        and     al, 7Fh
        cmp     al, XOFF_char
        jne     short D01_not_xoff
        mov     al, [VCD_Number]
        Trace_Out 'XOFF read on COM#al'
D01_not_xoff:
        pop     eax
ENDIF sti
        ret ;
;   Input from divisor latch LSB -- No virtualization
;
CB_In_Divisor_Latch:
        VxDCall VIPD1_REG_READ
        sti
        ret EndProc VCHD_Virt_In_RxTx ;------------------------------------------------------------------------------
;
;   VCHD_Virt_Out_RxTx
;
```

```
;       Description:
;
;               ENTRY:
;                               ESI -> VCD_COM_Struc
;                               EBX= VM handle
;                       DX = port #
;                       AL = data to output
;                       ECX = I/O type
;
;               EXIT:
;
;-------------------------------------------------------------------------

BeginProc VCHD_Virt_Out_RxTx, High_Freq

IFDEF DEBUG
        Trace_Out "VCHD: VCHD_Virt_Out_RxTx"
ENDIF
        cli
        test    [VCD_Vlcr], LCR_DLAB    ; Q: Access is to Divisor latch?
        jnz     SHORT CB_Out_Divisor_Latch      ;    Y: Yes, go do it and     [VCD_Virr], NOT IER_THRE        ; Write to THR clears interrupt
        cmp     al, XOFF_Char                   ; Q: Is this a Ctrl-S
        je      SHORT CB_THR_Sent_XOFF          ;    Y: Force delay
        cmp     [VCD_XOFF_Flag], True   ;  N: Q: Delaying now?
        je      SHORT CB_THR_Restart            ;          Y: Stop delay now
                                        ;          N: Just send char
CB_Out_Divisor_Latch:
        VxDCall VIPD1_REG_WRITE
        sti
        ret ;
;    Some other character was
;
CB_THR_Restart:
        mov     [VCD_XOFF_Flag], False
        push    eax
        push    edx
        call    COMBuff_Extract_Queue
        call    COMBuff_Test_Int_Req
        pop     edx
        pop     eax
        VxDCall VIPD1_REG_WRITE
        sti
        ret CB_THR_Sent_XOFF:
        cmp     [VCD_Protocol], CB_XOFF_Proto
        jne     SHORT CB_THR_Output_Byte
        mov     [VCD_XOFF_Flag], True
CB_THR_Output_Byte:
        VxDCall VIPD1_REG_WRITE
        sti
        ret EndProc VCHD_Virt_Out_RxTx ;-------------------------------------------------------------------------
;
;    VCHD_Virt_In_IER
;
;    Description:
;
;            ENTRY:
;                            ESI -> VCD_COM_Struc
;                            EBX= VM handle
;                    DX = port #
;                    ECX = I/O type
```

```
;
;   EXIT:       AL = data from input
;
;-----------------------------------------------------------------------------

BeginProc VCHD_Virt_In_IER, High_Freq

IFDEF DEBUG
          Trace_Out "VCHD: VCHD_Virt_In_IER"
ENDIF
        cli
        test    [VCD_Vlcr], LCR_DLAB    ; Q: Access is to divisor latch
        jnz     CB_In_Divisor_Latch     ;    Y: Do input from port mov     al, [VCD_Vier]          ; return virtual reg
        sti
        ret
EndProc VCHD_Virt_In_IER ;-----------------------------------------------------------------------------
;
;   VCHD_Virt_Out_IER
;
;   Description:
;
;       ENTRY:
;                       ESI -> VCD_COM_Struc
;                       EBX= VM handle
;                   DX = port #
;                   AL = data to output
;                   ECX = I/O type
;
;   EXIT:
;
;-----------------------------------------------------------------------------

BeginProc VCHD_Virt_Out_IER

IFDEF DEBUG
          Trace_Out "VCHD: VCHD_Virt_Out_IER"
ENDIF
        cli
        test    [VCD_Vlcr], LCR_DLAB    ; Q: Access is to divisor latch
        jnz     CB_Out_Divisor_Latch    ;    Y: Do output to port xchg    al, [VCD_Vier]          ; What the VM thought it was
        push    edx
                ;
        VxDCall VIPD1_REG_WRITE                                                 ;
        pop     edx
                ;
        IO_Delay                        ; Give hardware lots of time
        mov     al, [VCD_Vier]          ; Recover what the VM wants
        or      al, IER_DR              ; Make sure we get Rx ints!
        VxDCall VIPD1_REG_WRITE
        sti
        ret
EndProc VCHD_Virt_Out_IER ;-----------------------------------------------------------------------------
;
;   VCHD_Virt_In_IIR
;
;   Description:
;
;       ENTRY:
;                       ESI -> VCD_COM_Struc
;                       EBX= VM handle
;                   DX = port #
;                   ECX = I/O type
```

```
;
;   EXIT:      AL = data from input
;
;------------------------------------------------------------------------
VxD_DATA_SEG
;
; Table to translate enabled active interrupts to IIR value
;        ( see VCD_Trap_IIR )
;
COMBuff_IIR_Table LABEL BYTE
            db        IIR_NONE         ;    0    0    0    0
            db        IIR_DR           ;    0    0    0    1
            db        IIR_THRE         ;    0    0    1    0
            db        IIR_DR           ;    0    0    1    1
            db        IIR_LS           ;    0    1    0    0
            db        IIR_LS           ;    0    1    0    1
            db        IIR_LS           ;    0    1    1    0
            db        IIR_LS           ;    0    1    1    1
            db        IIR_MS           ;    1    0    0    0
            db        IIR_DR           ;    1    0    0    1
            db        IIR_THRE         ;    1    0    1    0
            db        IIR_DR           ;    1    0    1    1
            db        IIR_LS           ;    1    1    0    0
            db        IIR_LS           ;    1    1    0    1
            db        IIR_LS           ;    1    1    1    0
            db        IIR_LS           ;    1    1    1    1

VxD_DATA_ENDS

BeginProc VCHD_Virt_In_IIR

IFDEF DEBUG
            Trace_Out "VCHD: VCHD_Virt_In_IIR"
ENDIF
        cli
        movzx   eax, [VCD_Virr]              ; Interrupts requested
        and     al, [VCD_Vier]               ; Interrupts enabled
        and     al, 1111b                    ; Make sure only low nibble
        mov     al, COMBuff_IIR_Table[eax]   ; Pick up value from table
        cmp     al, IIR_THRE                 ; Q: Strange one?
        je      SHORT CB_In_IIR_Reset_THRE   ;    Y: Must reset THRE
        sti
        ret CB_In_IIR_Reset_THRE:
        and     [VCD_Virr], NOT IER_THRE     ; not pending any more
        sti
        ret
EndProc VCHD_Virt_In_IIR ;------------------------------------------------------------------------
;
;   VCHD_Virt_Out_IIR
;
;   Description:
;            This routine should not normally be called
;
;        ENTRY:
;                        AL = DATA to WRITE
;                        ESI -> VCD_COM_Struc
;                        EBX= VM handle
;                   DX = port #
;                   ECX = I/O type
;
;   EXIT:
;
;------------------------------------------------------------------------
```

```
BeginProc VCHD_Virt_Out_IIR
        mov     [VCD_Viir], al
        ret
EndProc VCHD_Virt_Out_IIR ;-------------------------------------------------------------------------------
;
;   VCHD_Virt_In_LCR
;
;   Description:
;
;       ENTRY:
;                           ESI -> VCD_COM_Struc
;                           EBX= VM handle
;                       DX = port #
;                       ECX = I/O type
;
;   EXIT:      AL = data from input
;
;-------------------------------------------------------------------------------

BeginProc VCHD_Virt_In_LCR

IFDEF DEBUG
        Trace_Out "VCHD: VCHD_Virt_In_LCR"
ENDIF
        cli
        mov     al, [VCD_Vlcr]          ; no point worrying device
        sti
        ret EndProc VCHD_Virt_In_LCR ;-------------------------------------------------------------------------------
;
;   VCHD_Virt_Out_LCR
;
;   Description:
;
;       ENTRY:
;                           ESI -> VCD_COM_Struc
;                           EBX= VM handle
;                       DX = port #
;                       AL = data to output
;                       ECX = I/O type
;
;   EXIT:
;
;-------------------------------------------------------------------------------

BeginProc VCHD_Virt_Out_LCR

IFDEF DEBUG
        Trace_Out "VCHD: VCHD_Virt_Out_LCR"
ENDIF
        cli
        mov     [VCD_Vlcr], al          ; Output: save it for DLAB
        sti
        VxDCall VIPD1_REG_WRITE
        ret
EndProc VCHD_Virt_Out_LCR ;-------------------------------------------------------------------------------
;
;   VCHD_Virt_In_MCR
;
;   Description:
;
;       ENTRY:
```

```
;                           ESI -> VCD_COM_Struc
;                           EBX= VM handle
;                       DX = port #
;                       ECX = I/O type
;
;   EXIT:       AL = data from input
;
;---------------------------------------------------------------------------

BeginProc VCHD_Virt_In_MCR

IFDEF DEBUG
          Trace_Out "VCHD: VCHD_Virt_In_MCR"
ENDIF
      cli
      mov     al, [VCD_Vmcr]          ; no point worrying device
      sti
      ret
EndProc VCHD_Virt_In_MCR ;---------------------------------------------------------------------------
;
;   VCHD_Virt_Out_MCR
;
;   Description:
;
;       ENTRY:
;                           ESI -> VCD_COM_Struc
;                           EBX= VM handle
;                       DX = port #
;                       AL = data to output
;                       ECX = I/O type
;
;   EXIT:
;
;---------------------------------------------------------------------------

BeginProc VCHD_Virt_Out_MCR

IFDEF DEBUG
          Trace_Out "VCHD: VCHD_Virt_Out_MCR"
ENDIF
      cli
      xchg    al, [VCD_Vmcr]          ; Get what the VM thought it was
      push  edx
                ;
      VxDCall VIPD1_REG_WRITE                                             ;
      pop         edx
                ;
      IO_Delay                              ; Give hardware lots of time
      mov     al, [VCD_Vmcr]          ; Get what the VM wants
      or      al, MCR_INTEN           ; Assume we want to enable ints
      push  eax
                ;
      VxDCall VIPD1_REG_WRITE                                             ;
      pop         eax
                ;
      test    al, MCR_DTR             ; Q: Is DTR is on?
      jz      COMBuff_Clear_Queue     ;    N: Clear queue & return
      sti
      ret                             ;    Y: Done!
EndProc VCHD_Virt_Out_MCR ;---------------------------------------------------------------------------
;
;   VCHD_Virt_In_LSR
;
;   Description:
;
;       ENTRY:
```

```
;                           ESI -> VCD_COM_Struc
;                           EBX= VM handle
;                       DX = port #
;                       ECX = I/O type
;
;   EXIT:       AL = data from input
;
;------------------------------------------------------------------------------
BeginProc VCHD_Virt_In_LSR IFDEF DEBUG
            Trace_Out "VCHD: VCHD_Virt_In_LSR"
ENDIF
        cli
        VxDCall VIPD1_REG_READ
        test    al, (LSR_DR + LSR_ERRBITS)      ; any Rx status?
        jz      short VCD_Trap_LSR_Got_Status   ;     no, nothing to do
        push    eax
        and     al, (LSR_DR + LSR_ERRBITS)      ; junk transmit status
        call    COMBuff_Poll_Status             ; Deal with Rx status
        pop     eax                             ; (ax got splattered!)
        and     al, LSR_TXBITS                  ; Real Tx status
VCD_Trap_LSR_Got_Status:
        mov     bl, [VCD_Vlsr]         ; get virtual Rx status
        or      al, bl                           ; plus real Tx status
        and     bl, LSR_DR                       ; preserve DR bit, clear error
        mov     [VCD_Vlsr], bl         ; bits when reading LSR
        and     [VCD_Virr], NOT IER_LS ; clear interrupt request
        sti
        ret
EndProc VCHD_Virt_In_LSR ;------------------------------------------------------------------------------
;
;   VCHD_Virt_Out_LSR
;
;   Description:
;
;       ENTRY:
;                           AL = DATA to WRITE
;                           ESI -> VCD_COM_Struc
;                           EBX= VM handle
;                       DX = port #
;                       ECX = I/O type
;
;   EXIT:
;
;------------------------------------------------------------------------------
BeginProc VCHD_Virt_Out_LSR
        cli
        and     al, (LSR_DR + LSR_ERRBITS)      ; what the chip does!
        mov     [VCD_Vlsr], al         ; weird!
                                        ; Emulate the H/W....
        and     [VCD_Virr], NOT (IER_LS + IER_DR)
        test    al, LSR_DR
        jz      SHORT CB_LSR_NoDR
        or      [VCD_Virr], IER_DR
CB_LSR_NoDr:
        test    al, LSR_ERRBITS
        jz      SHORT CB_LSR_Exit
        or      [VCD_Virr], IER_LS
CB_LSR_Exit:
        sti
        ret
EndProc VCHD_Virt_Out_LSR ;------------------------------------------------------------------------------
;
;
```

```
;   VCHD_Virt_In_MSR
;
;   Description:
;
;       ENTRY:
;                       ESI -> VCD_COM_Struc
;                       EBX= VM handle
;                   DX = port #
;                   ECX = I/O type
;
;   EXIT:       AL = data from input
;
;------------------------------------------------------------------------------

BeginProc VCHD_Virt_In_MSR

IFDEF DEBUG
        Trace_Out "VCHD: VCHD_Virt_In_MSR"
ENDIF
        cli
        VxDCall VIPD1_REG_READ
        or      al, [VCD_Vmsr]          ; and any saved delta bits
        mov     [VCD_Vmsr], 0
        and     [VCD_Virr], NOT IER_MS  ; clear modem interrupt request
        sti
        ret
EndProc VCHD_Virt_In_MSR

;------------------------------------------------------------------------------

;
;   VCHD_Virt_Out_MSR
;
;   Description:
;
;       ENTRY:
;                       ESI -> VCD_COM_Struc
;                       EBX= VM handle
;                   DX = port #
;                   ECX = I/O type
;
;   EXIT:
;
;------------------------------------------------------------------------------

BeginProc VCHD_Virt_Out_MSR
        cli
        VxDCall VIPD1_REG_WRITE
        mov     [VCD_Vmsr], 0           ; No saved delta bits now!
        sti
        ret
EndProc VCHD_Virt_Out_MSR

;------------------------------------------------------------------------------

;
;   VCHD_Ignore_IO
;
;   Description:
;
;       ENTRY:
;                       ESI -> VCD_COM_Struc
;                       EBX= VM handle
;                   DX = port #
;                   AL = data to output, if output request
;                   ECX = I/O type
;
;   EXIT:       AL = data from input, if input request
;
;------------------------------------------------------------------------------

BeginProc VCHD_Ignore_IO
```

23

```
        IFDEF DEBUG
                Trace_Out "VCHD: VCHD_Ignore_IO"
        ENDIF clc
                ret
        EndProc VCHD_Ignore_IO ;******************************************************************************
*
;
;       Catch_Disable_Local_Trapping
;
;       DESCRIPTION:
;
;       ENTRY:
;
;       EXIT:
;
;       USES:
;
;==============================================================================
=
        BeginProc Catch_Disable_Local_Trapping
                push    eax
                push    edx and     dx,0fff8h                               ; get base address
                cmp     dx,[CH_Com_Port]                        ; Q: CH
        port?
                je      SHORT disallow_disable                  ;       Y:
        yup...skip disable ;       N: allow disable
        allow_disable:
                        ;
                pop     edx
                        ;
                pop     eax
                        ;
                jmp     [Disable_Local_Trapping_Proc]           ;

;
        disallow_disable:                                       ;

IFDEF DEBUG

Trace_Out "Caught a Disable_Local_Trapping for #EDX"
        ENDIF

;
                pop     edx
                        ;
                pop     eax
                        ;
                clc
                        ;
                ret
                        ;

EndProc Catch_Disable_Local_Trapping

;------------------------------------------------------------------------------
-
;
;       VCHD_HW_INT
;
;       ENTRY:
;
;       EXIT:
```

```
;
;   Description:
;
;-----------------------------------------------------------------------
BeginProc VCHD_HW_INT, High_Freq IFDEF DEBUG
      Trace_Out "VCHD: VCHD_HW_INT"
ENDIF cmp         [VIPD_Init], 0
      ; Q: has VIPD been initialized?
            jne         short @F
      ;     Y: my interrupt...so handle it
            stc
                    ;   N: set carry to indicate I didn't handle it
            jmp         short VCHD_HW_INT_exit                          ;
and get out of here
@@:
                    ;
            push    ebx                                     ;
            push    esi                                     ;
            push    edi                                     ;
            push    edx                                     ;
            push    eax                                     ;
            VXDCall VIPD1_HW_INT                            ;
            mov     eax, [data_pump_int_handle]             ;
            VxDCall VPICD_Phys_EOI                          ;
            pop     eax                                     ;
            pop     edx                                     ;
            pop     edi                                     ;
            pop     esi                                     ;
            pop     ebx                                     ;
            clc
                    ;
VCHD_HW_INT_exit:                                                       ;
            ret
                    ;
EndProc VCHD_HW_INT ;-----------------------------------------------------------------------
;
;   VCHD_test_port
;
;   ENTRY:      ESI -> VCD_Com_Struc
;                      AX port to test
;
;   EXIT:
;
;   Description:
;
;-----------------------------------------------------------------------
BeginProc VCHD_test_port, SERVICE, High_Freq IFDEF DEBUG
      Trace_Out "VCHD: VCHD_test_port"
ENDIF
            ret
EndProc VCHD_test_port ;-----------------------------------------------------------------------
;
;   VCHD_PM_Free_Port
;
;   ENTRY:      ESI -> VCD_Com_Struc
;
;   EXIT:

25
```

```
;
;   Description:
;
;-------------------------------------------------------------------------------
BeginProc VCHD_PM_Free_Port, SERVICE, High_Freq IFDEF DEBUG
     Trace_Out "VCHD: VCHD_PM_Free_Port"
ENDIF
          ret
EndProc VCHD_PM_Free_Port ;-------------------------------------------------------------------------------
;
;   VCHD_PM_Acquire_Port
;
;   ENTRY:      ESI -> VCD_Com_Struc
;
;   EXIT:
;
;   Description:
;
;-------------------------------------------------------------------------------
BeginProc VCHD_PM_Acquire_Port, SERVICE, High_Freq IFDEF DEBUG
     Trace_Out "VCHD: VCHD_PM_Acquire_Port"
ENDIF
          push    esi
     ;
          push    edi
     ;
          push    eax
     ;
          push    ebx
     ;
          push    edx
     ;
          movzx   eax, [CH_Com_Port]
     ;
          cmp     [esi.VCD_IObase], eax                          ;
          jne     short @F
     ;
          mov     ebx, [esi.VCD_Owner]                           ;
          mov     [Com_Struc], esi                               ;                ;
          mov     edi, [esi.VCD_COMDEB]                          ;
          movzx   eax, word ptr [edi.QOutAddr + 2]    ;
          VMMcall _SelectorMapFlat, <ebx, eax, 0>                ;
          movzx   edx, word ptr [edi.QOutAddr]                   ;
          add     eax, edx                                       ;
          mov     [VCHD_QOut], eax                               ;

IFDEF DEBUG
     Trace_Out "VCHD: QOut = #EAX"
ENDIF movzx   eax, word ptr [edi.QInAddr + 2]     ;
          VMMcall _SelectorMapFlat, <ebx, eax, 0>                ;
          movzx   edx, word ptr [edi.QInAddr]                    ;
          add     eax, edx                                       ;
          mov     [VCHD_QIn], eax                                ;
          mov     eax, [VCHD_Flags]                              ;
          or      eax, Flag_Queue_Addr_Set                       ;
          mov     [VCHD_Flags], eax                              ;
@@:                                                              ;
          pop     edx                                            ;
          pop     ebx                                            ;
          pop     eax                                            ;
          pop     edi                                            ;
```

```
            pop     esi                                             ;
            ret
EndProc VCHD_PM_Acquire_Port ;------------------------------------------------------------------------
;
;   VCHD_VCD_Table
;
;   ENTRY:      EDI -> VCD_Table
;
;   EXIT:
;
;   Description:
;
;------------------------------------------------------------------------

BeginProc VCHD_VCD_Table, SERVICE

IFDEF DEBUG
        Trace_Out "VCHD: VCHD_VCD_Table"
ENDIF
            mov     [VCD_Table], edi
            ret
EndProc VCHD_VCD_Table ;------------------------------------------------------------------------
;
;   VCHD_IP_INT
;
;   ENTRY:
;
;   EXIT:
;
;   Description:
;
;------------------------------------------------------------------------

BeginProc VCHD_IP_INT, ASYNC_SERVICE, High_Freq

IFDEF DEBUG
        Trace_Out "VCHD: VCHD_IP_INT"
ENDIF cmp     VCHD_Int_Busy, 0                ; Q: already in interrupt routine?
            je      short @F                        ;    N: Service Interrpt
            ret                                     ;    Y: we will pick it up through the int loop
@@:                                                 ;
            inc     VCHD_Int_Busy                   ; indicate we are in interrupt routine
            push    ebx                             ; save callers registers
            push    esi                             ;
            push    edi                             ;
            push    edx                             ;
            mov     ebx, [owner]                    ;
            mov     esi, [Com_Struc]                ;
            mov     edi, [esi.VCD_COMDEB]           ;
            test    [esi.VCD_Flags], VCD_Windows_Port   ; Q; Windows Port?
            jz      short vchd_ip_int_DOS           ;    N: reflect int to DOS VM IFDEF DEBUG
            Trace_Out "VCHD: Windows Port Interrupt"
ENDIF vchd_ip_int_win_continue:                           ;
            mov     edx, [esi.VCD_IObase]           ; Get base IO
```

```
address
            add      edx, UART_IIR                      ; get the IIR
contents (UART Interrupt ID reg)
            VXDCall VIPD1_REG_READ                      ; eax = [UART_IIR]

IFDEF DEBUG
            Trace_Out "Int = #AL"
ENDIF test     al, 1                              ; Q: interrupt
pending
            jnz      short vchd_ip_int_win_exit         ;    N: then get
out of here
            jmp      short vchd_ip_int_win              ;    Y: check
what int
                    ;
VCHD_ip_int_win_loop_TxChk:                             ;
            cmp      [edi.QOutCount], 0                 ; Q: Tx Queue
Empty?
            je       short vchd_ip_int_win_loop         ;    Y: then just
check for pending interrupts
            mov      edx, [esi.VCD_IObase]
;    N:
            add      edx, UART_IER
        ; EDX -> UART_IER
            push     edx
            ; save for writes
            VXDCall VIPD1_REG_READ                      ; Get Int Ena Reg
            and      al, NOT IER_THRE                   ; turn off THRE
int
            pop      edx                                ;
EDX -> UART_IER
            push     edx
        ; save for write
            push     eax
        ; save IER data for write
            VXDCall VIPD1_REG_WRITE                     ; send it to
hardware
            pop      eax                                ;
get IER data
            pop      edx                                ;
EDX -> UART_IER
            or       al, IER_THRE                       ; turn on THRE int
            VXDCall VIPD1_REG_WRITE                     ; send it to
hardware
                    ;
vchd_ip_int_win_loop:                                   ;
            mov      edx, [esi.VCD_IObase]                              ;
            add      edx, UART_IIR
        ; EDX -> UART_IIR
            VXDCall VIPD1_REG_READ                      ; eax = [UART_IIR]

IFDEF DEBUG
            Trace_Out "Int = #AL"
ENDIF test     al, 1                              ; Q: interrupt
pending
            jnz      short vchd_ip_int_win_exit         ; N: all done
vchd_ip_int_win:                                        ;
            push     eax                                ; save UART_IIR
            and      eax, UART_INT_MASK                 ; we're interested
in just the interrupts
            mov      eax, cs:VCHD_Interrupt_Table[eax*2] ; EAX -> Int
routine
            xchg     eax, DWORD PTR ss:[esp]            ; Restore EAX, put
addr on stack
            ret                                         ; "Jump" to
routine
vchd_ip_int_win_exit:                                   ;
```

```
                and     eax, 1                          ;
                dec     eax                             ; 1 -> 0 , 0 -> -1
                pop     edx                             ; restore callers edx
                pop     edi                             ; restore callers edi
                pop     esi                             ; restore callers esi
                pop     ebx                             ; restore callers ebx
                dec     VCHD_Int_Busy                   ;
                ret                                     ;
                        ;
vchd_ip_int_DOS:                                        ;

IFDEF DEBUG
                Trace_Out "VCHD: DOS Port Interrupt"
ENDIF
                call    COMBuff_Int
        ;
                dec     VCHD_Int_Busy                   ;
                pop     edx                             ;
                pop     edi                             ;
                pop     esi                             ;
                pop     ebx                             ;
                ret                                     ;
                        ;
VCHD_Interrupt_Table LABEL DWORD                        ;
                dd      OFFSET32 VCHD_Modem_Status      ; [0] Modem Status Interrupt
                dd      OFFSET32 VCHD_Xmit_Empty        ; [2] Transmit Buffer Empty Interrupt
                dd      OFFSET32 VCHD_Rx_Data           ; [4] Receive Data Available Interrupt
                dd      OFFSET32 VCHD_Line_Status       ; [6] Line Status Interrupt
                        ;
EndProc VCHD_IP_INT ;-------------------------------------------------------------------------
;
;   VCHD_Line_Status
;
;   ENTRY:  ESI -> VCD_COM_Struc
;           EDI -> VCD_COMDEB
;
;   EXIT:   Jumps to Interrupt Loop (vchd_ip_int_win_loop)
;
;   Description: Windows 3.1 Line Status Interrupt Handler
;
;-------------------------------------------------------------------------

BeginProc VCHD_Line_Status, High_Freq push    edx
                ; save callers regs
                push    eax
                ;
IFDEF DEBUG
                Trace_Out "VCHD: VCHD_Line_Status"
ENDIF
                or      byte ptr [edi.EvtWord], EV_Err  ; flag line status error
                mov     edx, [esi.VCD_IObase]           ;
```

```
                add     edx, UART_LSR                       ; EDX -> UART_LSR
                VXDCall VIPD1_REG_READ                      ; Get Line Status Reg
                test    al, LSR_PE + LSR_FE + LSR_OE        ; Q: Parity, Framing, Overrun error?
                jz      short @F                            ;    N: check for break detect
                mov     [edi.LSRShadow], al                 ;    Y: save shadow status
@@:                                                         ;
                test    al, LSR_BI                          ; Q: Braek Detect
                jz      short @F                            ;    N: check Tx interrupt
                or      byte ptr [edi.EvtWord], EV_Break    ;    Y: flag Break Int
@@:
                                ;
                pop     eax
                                ; restore callers regs
                pop     edx
                                ;
                jmp     VCHD_ip_int_win_loop_TxChk          ; check Tx interrupt EndProc VCHD_Line_Status ;-------------------------------------------------------------------------------
;
;   VCHD_Modem_Status
;
;   ENTRY:  ESI -> VCD_COM_Struc
;           EDI -> VCD_COMDEB
;
;   EXIT:   Jumps to Interrupt Loop (vchd_ip_int_win_loop)
;
;   Description: Windows 3.1 Modem Status Interrupt Handler
;
;-------------------------------------------------------------------------------

BeginProc VCHD_Modem_Status, High_Freq

IFDEF DEBUG
                Trace_Out "VCHD: VCHD_Modem_Status"
ENDIF
                push    edx                                 ;
                push    eax                                 ;
                push    ecx                                 ;
                mov     edx, [esi.VCD_IObase]               ;
                add     edx, UART_MSR                       ; EDX -> UART_MSR
                VXDCall VIPD1_REG_READ                      ; Get Modem Status Reg
                mov     [edi.MSRShadow], al                 ; save it for others
                mov     ch, al                              ; save it locally
                                ;
; Create event mask for delta signals
                                ;
                mov     ah, al                              ;
                shr     ax, 1                               ;
                shr     ax, 1                               ;
                shr     ah, 1                               ;
                mov     cl, 3                               ;
                shr     ax, cl                              ;
                and     ax, EV_CTS + EV_DSR + EV_RLSD + EV_Ring ;
                or      [edi.EvtWord], ax                   ;
                mov     ah, ch                              ;
                shr     ah, 1                               ;
```

```
                shr     ah, 1                                   ;
                and     ax, EV_CTSS + EV_DSRS                   ;
                or      [edi.EvtWord], ax                       ;
                mov     ah, ch                                  ;
                mov     cl, 3                                   ;
                shr     ah, cl                                  ;
                and     ax, EV_RLSD                             ;
                or      [edi.EvtWord], ax                       ;
                mov     ah, ch                                  ;
                mov     cl, 3                                   ;
                shl     ah, cl                                  ;
                and     ax, EV_RingTe                           ;
                or      [edi.EvtWord], ax                       ;
                                ;
VCHD_Modem_Status10:                                    ;
                mov     al, [edi.OutHHSLines]                   ; Get output
hardware handshake lines
                or      al, al                                  ; Q: Any lines
that must be set?
                jz      short VCHD_Modem_Status40               ;    N: check Tx
Int
                and     ch, al                                  ;    Y: Mask bits
of interest
                cmp     ch, al                                  ; Q: Lines set for
Xmit?
                je      short VCHD_Modem_Status20               ;    Y: Show lines
are up for Xmit
                or      [edi.HSFlag], HHSDown                   ;    N: Show
hardware lines have dropped
                                ;
VCHD_Modem_Status30:                                            ;
                pop     ecx                                     ;
                pop     eax                                     ;
                pop             edx                             ;
                        ;
                jmp     VCHD_ip_int_win_loop                    ; check for
pending interrupts ;
VCHD_Modem_Status40:                                    ;
                pop     ecx                                     ;
                pop     eax                                     ;
                pop             edx                             ;
                        ;
                jmp     VCHD_ip_int_win_loop_TxChk              ; check for Tx
characters ;
; Lines are set for xmit.  Kick an xmit interrupt if needed
                                ;
VCHD_Modem_Status20:                                            ;
                and     [edi.HSFlag], NOT HHSDown + HHSAlwaysDown ; Show hardware
lines back up
                mov     cx,     [edi.QOutCount]                 ; Q: Output queue
empty?
                jcxz    short VCHD_Modem_Status30               ;    Y: check for
pending interrupts
                pop     ecx                                     ;
                pop     eax                                     ;
                pop             edx                             ;
                        ;
                jmp     short VCHD_Fake_Xmit_Empty              ;  N: Restart
transmit EndProc VCHD_Modem_Status ;------------------------------------------------------------------------
                _
;
```

```
;    VCHD_Fake_Xmit_Empty
;
;    ENTRY:  ESI -> VCD_COM_Struc
;            EDI -> VCD_COMDEB
;
;    EXIT:   Jumps to Interrupt Loop (if THR not empty)
;                    else jmps into Xmit_Empty routine
;
;    Description: Windows 3.1 Transmit Data Interrupt Kicker
;
;-----------------------------------------------------------------------
-

BeginProc VCHD_Fake_Xmit_Empty, High_Freq push    edx
            ; save callers regs
            push    eax
            ;

IFDEF DEBUG
            Trace_Out "Fake Tx"
ENDIF
            mov         edx, [esi.VCD_IObase]                   ;
            add         edx, UART_IER
     ; EDX -> UART_IER
            push    edx
            ; save for writes
            VXDCall VIPD1_REG_READ                              ; Get Int Enable
Reg
            pop     edx                                         ;
            test    al, IER_THRE                                ; Q: THRE already
enabled
            jnz     short @F                                    ;     Y: check if
THR is empty
            or      eax, IER_THRE                               ;   N: enable THRE
int
            VXDCall VIPD1_REG_WRITE                             ;
@@:                                                     ;
            mov     edx, [esi.VCD_IObase]                       ;
            add     edx, UART_LSR                               ; EDX ->
UART_LSR
            VXDCall VIPD1_REG_READ                              ;
            test    eax, LSR_THRE                               ; Q: Is xmit
really empty?
            jnz         short @F
    ;       Y: check to see if anything to send
            pop         eax
                ;
            pop         edx
                ;
            jmp     VCHD_ip_int_win_loop                        ;   N: check for
more activity
@@:
                ;
            pop         eax
                ;
            pop         edx
                ;
            push    edx
            ; set up for return from Xmit_Empty routine
            push    eax
            ;
            push    ebx
            ;
            push    ecx
            ;
            jmp     short VCHD_Xmit_Empty10                     ; check if
anything to send EndProc VCHD_Fake_Xmit_Empty
```

```
;------------------------------------------------------------------------
;
;   VCHD_Xmit_Empty
;
;   ENTRY:  ESI -> VCD_COM_Struc
;           EDI -> VCD_COMDEB
;
;   EXIT:   Jumps to Interrupt Loop (vchd_ip_int_win_loop)
;
;   Description: Windows 3.1 Transmit Data Interrupt Handler
;
;------------------------------------------------------------------------

BeginProc VCHD_Xmit_Empty, High_Freq push    edx
            ; save callers regs
            push    eax
            ;
            push    ebx
            ;
            push    ecx
            ;

IFDEF DEBUG
            Trace_Out "VCHD: Transmit Empty"
ENDIF mov     edx, [esi.VCD_IObase]           ;
            add     edx, UART_LSR                   ; EDX -> UART_LSR
            VXDCall VIPD1_REG_READ                  ;
            test    eax, LSR_THRE                   ; Q: Is xmit
really empty?
            jnz     short VCHD_Xmit_Empty10         ;   Y: check to
see if anything to send
            jmp     VCHD_Xmit_Empty_event_exit      ;   N: get out til
it is empty ;
VCHD_Xmit_Empty10:                                  ;

; If the hardware handshake lines are down, then XOff/XOn cannot
; be sent. If they are up and XOff/XOn has been received, still
; allow us to transmit an XOff/XOn character. It will make
; a dead lock situation less possible (even though there are
; some which could happen that cannot be handled).

mov     al, [edi.HSFlag]                ; Get handshaking
flag
            test    al, HHSDown + BreakSet          ; Q: Hardware
lines down or break set?
            jnz     VCHD_Xmit_Empty_exit            ;   Y: disable
XmitEmpty int and exit

;   N:

; Give priority to any handshake character waiting to be
; sent. If there are none, then check to see if there is
; an "immediate" character to be sent. If not, try the queue.

test    [edi.DCB_Flags], fEnqAck + fEtxAck  ; Q: Software
Handshaking (Enq or Etx Ack)?
            jnz     short VCHD_Xmit_Empty20         ;   Y: check to
see if it can be xmitted ;   N:
            test    al, HSPending                   ; Q: Handshake
Pending (XOff or XOn)?
            jz      short VCHD_Xmit_Empty20         ;   N: check for
immediate characters
```

```
                ;   Y:
        and     al, NOT XOnPending + XOffSent           ; update handshake
flags
        mov     [edi.HSFlag], al                        ; Save updated
handshake flag IFDEF DEBUG
        Trace_Out "XOn"
ENDIF mov     al, [edi.DCB_XonChar]                   ; Get XOn
character
        mov     edx, [esi.VCD_IObase]                   ; EDX
-> UART_THR
        jmp     VCHD_Xmit_Empty110                      ; Go output the
character ;
VCHD_Xmit_Empty20:                                      ;

; If any of the lines which were specified for a timeout
; are low, then don't send any characters.  Note that by
; putting the check here, XOff and Xon can still be sent
; even though the lines might be low.

; Also test to see if a software handshake was received.
; If so, then transmission cannot continue.  By delaying
; the software check to here, XOn/XOff can still be issued
; even though the host told us to stop transmission.

test    al, CannotXmit                          ; Q: Anything
preventing transmission?
        jz      short VCHD_Xmit_Empty30                 ;    N: check
immediate char
        jmp     VCHD_Xmit_Empty_exit                    ;    Y: disable
XmitEmpty int and exit ;
VCHD_Xmit_Empty30:                                      ;

;
; If a character has been placed in the single character
; "transmit immediately" buffer, clear that flag and pick
; up that character without affecting the transmitt queue.

;
        test    [edi.EFlags], fTxImmed                  ; Q: Character to
xmit immediately?
        jz      short VCHD_Xmit_Empty40                 ;    N: check the
queue
        and     [edi.EFlags], NOT fTxImmed              ;    Y: update
flags
        mov     al, [edi.ImmedChar]                     ; Get char to xmit
        mov     edx, [esi.VCD_IObase]                   ; EDX
-> UART_THR
        jmp     VCHD_Xmit_Empty110                      ; Transmit the
character ;
VCHD_Xmit_Empty40:                                      ; check for characters
in the queue
        movzx   ecx, [edi.QOutCount]                    ; Q: Output queue
empty?
        jcxz    VCHD_Xmit_Empty45                       ;    Y: set
event, turn off interrupt ;   N:
        test    [edi.DCB_Flags], fEtxAck                ; Q: Etx Ack?
        jz      short VCHD_Xmit_Empty60                 ;    N: check ENQ
        movzx   ecx, [edi.QOutMod]                      ;    Y: Get number
bytes sent since last ETX
```

```
                cmp     cx, [edi.DCB_XonLim]            ; Q: At Etx limit yet?
                jne     short VCHD_Xmit_Empty50         ;   N: inc byte counter
                mov     [edi.QOutMod], 0                ;   Y: zero byte counter (show at front again)
                or      [edi.HSFlag], EtxSent           ; Show ETX sent
                jmp     short VCHD_Xmit_Empty_sendXOFF  ; Send ETX
                ;
VCHD_Xmit_Empty45:
                jmp     VCHD_Xmit_Empty_event_exit      ; set event and turn off interrupt
                ;
VCHD_Xmit_Empty50:                                      ;
                inc     ecx                             ; Increment byte counter
                mov     [edi.QOutMod], cx               ; Save new count
                jmp     short VCHD_Xmit_Empty_Tx_Char   ; Get character from queue
                ;
VCHD_Xmit_Empty60:                                      ;
                test    [edi.DCB_Flags], fEnqAck        ; Q: Enq Ack?
                jz      short VCHD_Xmit_Empty_Tx_Char   ;   N: Get character from queue
                movzx   ecx, [edi.QOutMod]              ;   Y: Get number bytes sent since last ENQ
                or      ecx, ecx                        ; Q: At the front again?
                jnz     short VCHD_Xmit_Empty70         ;   N: inc byte counter
                mov     [edi.QOutMod], 1                ;   Y: reset byte count
                or      [edi.HSFlag], EnqSent           ; Show ENQ sent
                ; Send ENQ
VCHD_Xmit_Empty_sendXOFF:                               ;
                mov     al, [edi.DCB_XoffChar]          ; Get XOff character
                mov     edx, [esi.VCD_IObase]           ;       ; EDX -> UART_THR
                jmp     short VCHD_Xmit_Empty110        ; Send character
                ;
VCHD_Xmit_Empty70:                                      ;
                inc     ecx                             ; Inc byte count
                cmp     cx, [edi.DCB_XonLim]            ; Q: At end of our out buffer len?
                jne     short VCHD_Xmit_Empty80         ;   N: Save new count
                xor     ecx, ecx                        ;   Y: zero byte counter (show at front again)
                ;
VCHD_Xmit_Empty80:                                      ;
                mov     [edi.QOutMod], cx               ; Save new count
                ;
VCHD_Xmit_Empty_Tx_Char:                                ;
                mov     ebx, [VCHD_QOut]                ; Get queue out base pointer
                movzx   ecx, [edi.QOutGet]              ; Get index into queue
                movzx   eax, byte ptr [ebx][ecx]        ; Get charater from queue IFDEF DEBUG
                Trace_Out "TX = #AL"
ENDIF
```

```
                inc     ecx                                     ; update queue index
                cmp     cx, [edi.QOutSize]                      ; Q: Time for queue wrap-around
                jb      short @F                                ;   N: save queue index
                xor     ecx, ecx                                ;   Y: wrap-around by zeroing index
@@:                                                             ;
                mov     [edi.QOutGet], cx                       ; Save queue index
                movzx   ecx, [edi.QOutCount]                    ; Get queue count
                dec     ecx                                     ; Decrement number of bytes in queue
                mov     [edi.QOutCount], cx                     ; Save new out queue char count
                mov     edx, [esi.VCD_IObase]                   ;
                VXDCall VIPD1_REG_WRITE                         ; Send Character
    (edx -> UART_THR, eax = char)
                cmp     cx, [edi.SendTrigger]                   ; Q: time to call owner's callback?
                jae     short VCHD_Xmit_Empty90                 ;   N: turn off notify flag ;   Y:
                test    [edi.NotifyFlagsHI], CN_TRANSMIT        ; Q: Is notify flag already set?
                jnz     short VCHD_Xmit_Empty100                ;   Y: all done...check for more interrupts
                mov     eax, OFFSET32 VCHD_Xmit_Empty100        ;   N: set up to notify owner
                push    eax                                     ; put jmp to int loop chk address on stack
                mov     eax, CN_TRANSMIT                        ; load notify flag
                jmp     VCHD_notify_owner                       ; jmp to notify routine ;
VCHD_Xmit_Empty90:                                              ;
                and     [edi.NotifyFlagsHI], NOT CN_TRANSMIT    ; turn off notify flag ;
VCHD_Xmit_Empty100:                                             ;
;%OUT check fNoFIFO in EFlags[si] to determine if we can queue more output
                pop     ecx
                        ; restore callers regs
                pop     ebx
                        ;
                pop     eax
                        ;
                pop     edx
                        ;
                jmp     vchd_ip_int_win_loop                    ; check for more activity ;
VCHD_Xmit_Empty_event_exit:                                     ;
; No more characters to transmit.  Flag this as an event.
                or      byte ptr [edi.EvtWord], EV_TxEmpty      ;

; Cannot continue transmitting (for any of a number of
; reasons). Disable the transmit interrupt. When it's
; time resume, the transmit interrupt will be reenabled,
; which will generate an interrupt.

VCHD_Xmit_Empty_exit:                                           ;
                mov     edx, [VCD_IObase]                       ;
                add     edx, UART_IER
    ; EDX -> UART_IER
                push    edx
                ; save for write
                VXDCall VIPD1_REG_READ                          ; Get UART_IER
```

36

```
              contents
                      pop     edx                                    ; EDX -> UART_IER
                      and     eax, NOT IER_THRE                      ; turn off Xmit
     Empty Int
                              ;
     VCHD_Xmit_Empty110:                                              ; EDX -> UART reg  EAX
     = char
                      VXDCall VIPD1_REG_WRITE                         ; Send character
                      pop         ecx
                              ; restore callers regs
                      pop         ebx
                                ;
                      pop         eax
                                ;
                      pop         edx
                                ;
                      jmp     vchd_ip_int_win_loop                    ; check for more
     activity
                              ;
     EndProc VCHD_Xmit_Empty ;-------------------------------------------------------------------------
     _
     ;
     ;    VCHD_Rx_Data
     ;
     ;    ENTRY:  ESI -> VCD_COM_Struc
     ;            EDI -> VCD_COMDEB
     ;
     ;    EXIT:   Jumps to Interrupt Loop (vchd_ip_int_win_loop)
     ;
     ;    Description: Windows 3.1 Receive Data Interrupt Handler
     ;
     ;-------------------------------------------------------------------------
     _

BeginProc VCHD_Rx_Data, High_Freq push    edx
                      ; save callers regs
                      push    eax
                              ;
                      push    ebx
                              ;
                      push    ecx
                              ;
     IFDEF DEBUG
                      Trace_Out "Rx"
     ENDIF mov         edx, [esi.VCD_IObase]                   ; EDX
     -> UART_RBR
                      VXDCall VIPD1_REG_READ                        ; Get character
     from Receive Buffer Reg
                      and     [edi.NotifyFlagsHI], NOT CN_Idle        ; flag as not idle
                      mov     ah, [edi.LSRShadow]                     ; Q: Any errors?
     (Line Status Intr)
                      mov     bh, ah                                  ;
                      or      ah, ah                                  ;
                      jz      short @f                                ;  N: flag event
     and update queue pointers
                      and     ah, [edi.ErrorMask]                     ;   Y: record it
                      or      byte ptr [edi.ComErr], ah               ;
                      mov     [edi.LSRShadow], 0                      ; clear line
     status storage ; Regardless of the character received, flag the event
     ; in case the user wants to see it.
```

37

```
@@:
                ;
        or      byte ptr [edi.EvtWord], EV_RxChar       ; Flag a character received ; Check the input queue, and see if there is room for
; another character.  If not, or if the end of file
; character has already been received, then go declare
; overflow.

VCHD_Rx_Data00:                                         ;
        movzx   ecx, [edi.QInCount]                     ; Get queue count
        cmp     cx, [edi.QInSize]                       ; Q: Is queue full?
        jge     short VCHD_Rx_Data20                    ;    Y: comm overrun ;   N:
        test    [edi.EFlags], fEOF                      ; Q: Has end of file been received?
        jnz     short VCHD_Rx_Data20                    ;    Y: treat as overflow ; Test to see if there was a parity error, and replace
; the character with the parity character if so test    bh, LSR_PE                              ; Q: Parity error?
        jz      short VCHD_Rx_Data25                    ;   N: remove parity bits ;   Y: check for Parity error replacement char
        test    [edi.DCB_Flags2], fPErrChar             ; Q: Parity error replacement character?
        jz      short VCHD_Rx_Data25                    ;   N: remove parity bits
        mov     al, [edi.DCB_PEChar]                    ;   Y: get parity replacement char
        jmp     short VCHD_Rx_Data80                    ;      Skip all but event check and queueing of character ;
VCHD_Rx_Data20:                                         ;
        or      byte ptr [edi.ComErr], CE_RXOVER        ; Show queue overrun
        jmp     short VCHD_Rx_Data50                    ; skip queueing process ;
VCHD_Rx_Data25:                                         ;

; See if we need to strip null characters, and skip
; queueing if this is one.  Also remove any parity bits.

and     al, [edi.RxMask]                        ; Remove any parity bits

; Q: Is character a null?
        jnz     short VCHD_Rx_Data30                    ;   N: check for binary stuff ;   Y:
        test    [edi.DCB_Flags2], fNullStrip            ; Q: Are we stripping received nulls?
        jnz     short VCHD_Rx_Data50                    ;   Y: put char in the bit bucket ;   N: check for binary stuff
; Check to see if we need to check for EOF characters,
; and if so see if this character is it.

VCHD_RX_Data30:                                         ;
        test    [edi.DCB_Flags], fBinary                ; Q: Is this
```

38

```
                binary stuff?
                        jnz     short VCHD_Rx_Data60            ;   Y: skip EOF
        check ;   N: check for EOF
                        cmp     al, [edi.DCB_EOFChar]           ; Q: Is this the
        EOF character?
                        jnz     short VCHD_Rx_Data60            ;   N: see about
        queueing the charcter
                        or      [edi.EFlags], fEOF              ;   Y: Set end of
        file flag ;
        VCHD_Rx_Data50:                                         ;
                        jmp     VCHD_Rx_Data140                 ; Skip queueing
        process ; If output XOn/XOff is enabled, see if the character
        ; just received is either an XOn or XOff character.  If
        ; it is, then set or clear the XOffReceived flag as
        ; appropriate.

VCHD_Rx_Data60:                                         ;
                        test    [edi.DCB_Flags2], fOutX         ; Q: Output
        handshaking?
                        jz      short VCHD_Rx_Data80            ;   N: check for
        event flagging ;   Y: check X-Off character
                        cmp     al, [edi.DCB_XoffChar]          ; Q: Is this an
        X-Off character?
                        jnz     short VCHD_Rx_Data70            ;   N: see about
        XOn or Ack
                        or      [edi.HSFlag], XOffReceived      ;   Y: Show XOff
        received
                        test    [edi.DCB_Flags], fEnqAck+fEtxAck ; Q: Enq or Etx
        Ack?
                        jz      VCHD_Rx_Data50                  ;   N: Skip
        queueing process ;   Y: check XOn limit
                        cmp     cx, [edi.DCB_XonLim]            ; Q: At XOn limit?
                        ja      VCHD_Rx_Data50                  ;   N: Skip
        queueing process
                        and     [edi.HSFlag], NOT XOffReceived  ;   Y: Show ENQ
        or ETX not received
                        and     [edi.HSFlag], NOT XOnPending + XOffSent ;
                        mov     al, [edi.DCB_XonChar]           ;     Get XOn
        char
                        call    VCHD_Out_Handshaking_Char       ;     output
        handshaking character
                        jmp     VCHD_Rx_Data50                  ;     Skip
        queueing process ;
        VCHD_Rx_Data70:                                         ;
                        cmp     al, [edi.DCB_XonChar]           ; Q: Is this an
        XOn character?
                        jnz     short VCHD_Rx_Data80            ;   N: check for
        event flagging
                        and     [edi.HSFlag], NOT XOffReceived  ;   Y: turn off
        XOff received flag
                        test    [edi.DCB_Flags], fEnqAck+fEtxAck ; Q: Enq or Etx
        Ack?
                        jz      short VCHD_Rx_Data75            ;   N: enable Xmit
        Data
                        and     [edi.HSFlag], NOT EnqSent       ;     turn off
        Enq sent flag ;
        VCHD_Rx_Data75:                                         ;
                        pop     ecx
```

```
                ; restore callers regs
        pop     ebx
                ;
        pop     eax
                ;
        pop     edx
                ;
        jmp     VCHD_Fake_Xmit_Empty            ; Enable Xmit Data
                ;

; Now see if this is a character for which we need to
; set an event as having occured. If it is, then set the
; appropriate event flag.

VCHD_Rx_Data80:                                 ;
        cmp     al, [edi.DCB_EVTChar]           ; Q: Is it the event generating character?
        jne     short VCHD_Rx_Data90            ;   N: put char in queue unless discarding
        or      byte ptr [edi.EvtWord], EV_RxFlag ;   Y: Show received specific character ; Finally, a valid character that we want to keep, and
; we have room in the queue. Place the character in the
; queue. If the discard flag is set, then discard the
; character.

VCHD_Rx_Data90:                                 ;
        test    [edi.MiscFlags], Discard        ; Q: Discarding characters ?
        jnz     VCHD_Rx_Data50                  ;   Y: skip queueing process
        mov     ebx, [VCHD_QIn]                 ;   N: Get queue in base pointer
        movzx   ecx, [edi.QInPut]               ;      Get index into queue
        mov     byte ptr [ebx][ecx], al         ;      Put charater in queue
        inc     ecx                             ;      update queue index
        cmp     cx, [edi.QInSize]               ; Q: Time for queue wrap-around
        jb      short @F                        ;   N: save queue index
        xor     ecx, ecx                        ;   Y: wrap-around by zeroing index
@@:                                             ;
        mov     [edi.QInPut], cx                ; Save queue index
        movzx   ecx, [edi.QInCount]             ; Increment number of bytes in queue
        inc     ecx                             ;
        mov     [edi.QInCount], cx              ;

; If flow control has been enabled, see if we are within
; the limit that requires us to halt the host's
; transmissions.

cmp     cx, [edi.XOffPoint]             ; Q: XOff time?
        jc      short VCHD_Rx_Data120           ;   N: check notify ;   Y:
;       test    [edi.HSFlag], HSSent            ; Q: Handshake already sent?
;       jnz     short VCHD_Rx_Data120           ;   Y: don't send it again
        mov     bl, [edi.HHSLines]              ;   N: check hardware handshaking
        or      bl, bl                          ; Q: do we have HW HS enabled?
        jz      short VCHD_Rx_Data110           ;   N: handle
```

40

```
        software handshaking
                mov     edx, [esi.VCD_IObase]                   ;   Y:
get modem control reg
                add     edx, UART_MCR                           ; EDX -> UART_MCR
                push    edx
        ; save edx for write
                push    ebx                                     ; save ebx with HS
data
                VXDCall VIPD1_REG_READ                          ;
                pop     ebx                                     ;
                pop     edx
                        ;
                not     bl                                      ; clear
necessary lines
                and     al, bl                                  ;
                or      [edi.HSFlag], HHSDropped                ; Show lines have
been dropped
                VXDCall VIPD1_REG_WRITE                         ; drop the lines ;
VCHD_Rx_Data110:                                                ;
                test    [edi.DCB_Flags2], fInX                  ; Q: software
handshaking?
                jz      short VCHD_Rx_Data120                   ;   N: check
notify
                or      [edi.HSFlag], XOffSent                  ;   Y: set XOff
sent flag
                mov     al, [edi.DCB_XoffChar]                  ;       get the
XOff character IFDEF DEBUG
                Trace_Out "XOff"
ENDIF call    VCHD_Out_Handshaking_Char               ; go send XOff ;
VCHD_Rx_Data120:                                                ;
                cmp     cx, [edi.RecvTrigger]                   ; Q: time to call
owner's callback?
                jb      short VCHD_Rx_Data130                   ;   N: turn off
notify flag ;   Y:
                test    [edi.NotifyFlagsHI], CN_RECEIVE         ; Q: notify
already sent?
                jnz     short VCHD_Rx_Data140                   ;   Y: check for
more data
                mov     eax, OFFSET32 VCHD_Rx_Data140           ;   N: set up for
return from notify
                push    eax                                     ;       push return
address on stack
                mov     eax, CN_RECEIVE                         ;       EAX =
message
;%OUT probably should just set a flag and notify after EOI
                jmp     short VCHD_notify_owner                 ; notify owner ;
VCHD_Rx_Data130:                                                ;
                and     [edi.NotifyFlagsHI], NOT CN_RECEIVE     ; turn off notify
flag ;
VCHD_Rx_Data140:                                                ;
                mov     edx, [esi.VCD_IObase]                           ;
                add     edx, UART_LSR                           ; EDX ->
UART_LSR
                push    edx                                     ;
                VXDCall VIPD1_REG_READ                          ; Get UART LSR
                pop     edx                                     ;
                test    al, LSR_DR                              ; Q: more data
available?
```

```
            jz      short @F                    ;   N: check interrupt loop
            sub     edx, UART_LSR               ;   Y: setup to read char (EDX -> UART_RBR)
            mov     bh, al
            ; save LSR status
            push    ebx
            ;
            VXDCall VIPD1_REG_READ              ; get received data
            pop     ebx
            ; get line status back into bh
            jmp     VCHD_Rx_Data00              ; repeat until we have all the characters
@@:                                             ;
            pop     ecx
            ; restore callers regs
            pop     ebx
            ;
            pop     eax
            ;
            pop     edx
            ;
            jmp     vchd_ip_int_win_loop        ; check interrupt loop EndProc VCHD_Rx_Data ;-------------------------------------------------------------------------
;
;   VCHD_VIRT_INT
;
;   ENTRY:
;
;   EXIT:
;
;   Description:
;
;-------------------------------------------------------------------------

BeginProc VCHD_HW_INT_IGNORE, High_Freq

IFDEF DEBUG
            Trace_Out "VCHD: VCHD_HW_INT_IGNORE"
ENDIF
            stc
            ret EndProc VCHD_HW_INT_IGNORE ;-------------------------------------------------------------------------
;
;   VCHD_Out_Handshaking_Char
;
;   ENTRY:  ESI -> VCD_COM_Struc
;
;   EXIT:
;
;   Description:
;
;-------------------------------------------------------------------------

BeginProc VCHD_Out_Handshaking_Char

IFDEF DEBUG
            Trace_Out "HS"
ENDIF
            push    edx
```

```
        ; save callers regs
            push    eax
    ;
            push    ebx
    ;
            mov     edx, [esi.VCD_IObase]           ;
            add     edx, UART_LSR                   ; EDX -> UART_LSR
            mov     bl, al                          ; put handshaking
char in upper AX temporarily
@@:
            push    edx                             ;
    ;
            VXDCall VIPD1_REG_READ                  ; Get Line Status
Reg
            pop     edx
    ;
            test    al, LSR_THRE                    ; Q: Xmit Holding
Reg Empty?
            jz      @B                              ;   N: keep
checking until it is
            sub     edx, UART_LSR                   ; EDX -> UART_THR
            mov     al, bl                          ; get handshaking
char back into AL
            VXDCall VIPD1_REG_WRITE                 ; send out
handshaking char
            pop     ebx
    ;
            pop     eax
    ;
            pop     edx
    ;
            ret                                     ;

EndProc VCHD_Out_Handshaking_Char

;------------------------------------------------------------------------
;
;   VCHD_notify_owner
;
;   ENTRY:
;
;   EXIT:
;
;   Description:
;
;------------------------------------------------------------------------

BeginProc VCHD_notify_owner

IFDEF DEBUG
            Trace_Out "VCHD: VCHD_notify_owner"
ENDIF
            ret EndProc VCHD_notify_owner ;------------------------------------------------------------------------
;
;   VCHD_Time_Slice_Proc
;
;   Description: Our time slice allocation so we can time events and get
;                stuff done without hogging the whole machine
;
;   ENTRY:      EBX = VM handle
;               EDX = pointer to ref data
;               ECX = milliseconds from actual timeout
;               EBP = points to Client Data Structure
;
;   EXIT:       None
```

```
;
;----------------------------------------------------------------------
;

BeginProc VCHD_Time_Slice_Proc, High_Freq

IFDEF DEBUG
        Trace_Out "tick"
ENDIF push    eax
; save callers regs
        push    esi
;
        push    edx
;
        cmp     [Time_Slice], 0
; were we able to get time slice?
        je      short @F
;       N: we're done...get out of here
        cmp     [CH_Com_Port], 0
; Do we have a modem?
        je      short VCHD_TS_no_slice                          ;
        mov     eax, 10                                 ; set up to get
time slice int every 10 msec
        xor     edx, edx                                ; null ref data
pointer - no ref data required
        mov     esi, OFFSET32 VCHD_Time_Slice_Proc      ; addr of time
slice routine
        VMMcall Set_Global_Time_Out                     ; tell system VM
        cmp     esi,0                                   ; did we get time
sliceout scheduled ??
        je      short @F                                ; N
        mov     [Time_Slice], esi                       ; save time slice
handle
VCHD_TS_no_slice:                                       ;
        VxDCall VIPD1_Tick                              ; let VIPD have
some time
@@:
        pop     edx
        pop     esi
        pop     eax
        clc
        ret EndProc VCHD_Time_Slice_Proc ;**************************************************************************
*
;
;       COMBuff_Test_Int_Req
;
;       DESCRIPTION:
;
;       ENTRY:
;               ESI -> VCD_COM_STRUC
;               EDI -> VCD_COMDEB
;
;       EXIT:
;
;       USES:
;               Flags
;
;==========================================================================
=

BeginProc COMBuff_Test_Int_Req

IFDEF DEBUG
      Trace_Out "COMBuff_Test_Int_Req"
ENDIF
```

```
                mov     ebx, [owner]                            ; EBX =
Handle of port owner IFDEF DEBUG
        Trace_Out "COMBuff_Test_Int_Req VM Handle=#EBX"
ENDIF Assert_VM_Handle ebx                    ; Paranoia...
                mov     cl, [VCD_Virr]          ; Interrupts pending
                and     cl, [VCD_Vier]          ; and enabled?
                jz      SHORT CB_IR_Exit        ;    N: Clear int request
                test    [VCD_Vlcr], LCR_DLAB    ; Q: Access is to divisor latch
                jnz     short CB_IR_Exit        ;          yes, can't send
it!
                test    [VCD_Vmcr], MCR_INTEN   ; and enabled?
                jz      short CB_IR_Exit        ;          no, can't send it!
                mov     eax, com_int_handle     ; pjb - Reflect interrupt to DOS
VM
                or      eax, eax
                jz      short CB_IR_Exit IFDEF DEBUG
        Trace_Out "COMBuff_Test_Int_Req VPICD_Get_Status #EBX"
ENDIF VxDcall VPICD_Get_Status
                test    ecx, VPICD_Stat_IRET_Pending   ; Q: Waiting for IRET?
                jnz     SHORT CB_IR_Exit        ;    Y: Wait a little
longer IFDEF DEBUG
        Trace_Out "COMBuff_Test_Int_Req VPICD_Set_Int_Request #EBX"
ENDIF VxDcall VPICD_Set_Int_Request
CB_IR_Exit:

IFDEF DEBUG
        Trace_Out "CB_IR_Exit"
ENDIF ret

EndProc COMBuff_Test_Int_Req
;****************************************************************************
*
;
;   COMBuff_Poll_Status
;
;   DESCRIPTION:
;       Read the Line Status Register.  Put Transmit status in
;       vitual register, receive status in queue or virtual
;       register as appropriate.
;
;   ENTRY:  ESI -> VCD_COM_STRUC
;           EDI -> VCD_COMDEB
;           AL = LSR data
;
;   EXIT:
;
;   USES:
;       EAX, EBX, EDX
;
;===========================================================================
=

BeginProc COMBuff_Poll_Status push    eax
                ; save callers regs
                push    ebx
                ;
```

```
                push    ecx
                ;
                mov     ah, al
                ;
                test    ah, LSR_DR                      ; data ready?
                jz      SHORT CB_NoRxChar               ;     N: don't
bother reading
                push    eax
                ;       Y: save line status
                mov     edx, [esi.VCD_IObase]
;       Y: EDX -> UART_RBR
                VxDCall VIPD1_REG_READ                                  ; get
receive char
                pop     ebx
                        ; retrieve line status
                mov     ah, bh
        ; combine with data ;;;;;;;;;;;;;;; DEBUGGING CODE WILL INSERT @ IF HARDWARE OVERFLOW ;;;;;;;;;;;
IFDEF DEBUG
        test    ah, LSR_OE
        jz      SHORT OkieDokie
        mov     al, '@'
        and     ah, NOT LSR_OE
OkieDokie:
ENDIF
;;;;;;;;;;;;;;;;;;;;;;;;;;;;;;;;;;;;;;;;;;;;;;;;;;;;;;;;;;;;;;;;;;;;;;;;;;;;

IFDEF DEBUG_XOFF
        push    eax
        and     al, 7Fh
        cmp     al, XOFF_Char
        jne     short D00_not_xoff
        mov     al, [VCD_Number]
        Trace_Out 'Received XOFF on COM#al'
D00_not_xoff:
        pop     eax
ENDIF CB_NoRxChar:
                mov     bl, [VCD_Vlsr]                  ; Set
virtual regs
                test    bl, LSR_DR                      ; Should we queue
it?
                jnz     SHORT CB_PS_Insert_Queue        ;     yes, put in
queue
                cmp     [VCD_XOFF_Flag], True           ; XOFF sent?
                je      SHORT CB_PS_Insert_Queue        ;     yes, put in
queue
                or      bl, ah
        ;
                mov     [VCD_Vlsr], bl                                  ;
                test    ah, LSR_DR                      ; Data to put
there?
                jz      SHORT CB_Poll_Status_Ret        ;     no, don't
bother
                mov     [VCD_Vrxb], al                  ; (should
usually have DR on)
                or      [VCD_Virr], IER_DR              ; Set DR interrupt
request
                test    bl, LSR_ERRBITS                 ; Error bits on?
                jnz     SHORT CB_Poll_Set_Int_Status    ;     yes, go set
interrupt
                jmp     short CB_Poll_Status_Ret        ;

CB_PS_Insert_Queue:
                call    COMBuff_Insert_Queue            ;

CB_Poll_Status_Ret:
                pop     ecx
                        ;
                pop     ebx
```

46

```
                    ;
            pop     eax
                    ;
            ret CB_Poll_Set_Int_Status:
            or      [VCD_Virr], IER_LS           ; Set LS interrupt request
            pop     ecx
                    ;
            pop     ebx
                    ;
            pop     eax
                    ;
            ret EndProc COMBuff_Poll_Status ;*****************************************************************************
*
;                    Q U E U E    P R O C E D U R E S
;*****************************************************************************
*

;*****************************************************************************
*
;
;    COMBuff_Insert_Queue
;
;    DESCRIPTION:
;
;    ENTRY:
;        AH = Status byte, AL = Data byte
;
;    EXIT:
;
;    USES:
;        EBX, EAX
;
;=============================================================================
=

BeginProc COMBuff_Insert_Queue

IFDEF DEBUG
        Trace_Out "COMBuff_Insert_Queue"
ENDIF mov     bx, [VCD_RxQlen]              ;
            cmp     [VCD_RxQcount], bx            ; queue full?
            je      SHORT CB_IQ_Full              ;
            movzx   ebx, [VCD_RxQin]              ;
            mov     [VCD_RxQ+ebx*2], ax           ; into the queue
            inc     [VCD_RxQcount]                ;
            inc     ebx
        ;
            cmp     bx, [VCD_RxQlen]              ;
            jb      SHORT CB_IQ_Set_New_Len       ;
            xor     ebx, ebx                      ;

;
CB_IQ_Set_New_Len:
                    ;
            mov     [VCD_RxQin], bx               ; put
index back ;
IFDEF DEBUG
            mov     bx, [VCD_RxQcount]
            cmp     bx, [VCD_Max_Queued]
            jbe     short CB_not_max
            mov     [VCD_Max_Queued], bx
```

```
        CB_not_max:
        ENDIF ret
                        ;

;
CB_IQ_Full:
                ;
                movzx   ebx, [VCD_RxQin]                        ;
                or      ah, LSR_OE                      ; simulate overrun
error
                mov     [VCD_RxQ+ebx*2], ax             ; into the queue
                ret
EndProc COMBuff_Insert_Queue ;*****************************************************************************
*
;
;       COMBuff_Extract_Queue
;
;       DESCRIPTION:
;
;       ENTRY:  ESI -> VCD_COM_STRUC
;                       EDI -> VCD_COMDEB
;
;       EXIT:
;
;       USES:   EBX, EDX
;
;=============================================================================
=

BeginProc COMBuff_Extract_Queue, High_Freq

IFDEF DEBUG
        Trace_Out "COMBuff_Extract_Queue"
ENDIF
                cmp     [VCD_RxQcount], 0       ; Anything in queue?
                je      SHORT CB_EQ_Exit        ;       no, nothing to
extract
                cmp     [VCD_XOFF_Flag], True   ; Q: XOFF?
                je      SHORT CB_EQ_Exit        ;    Y: Don't fill buffer
CB_EQ_Loop:
                test    [VCD_Vlsr], LSR_DR
                jnz     SHORT CB_EQ_Exit
                dec     [VCD_RxQcount]
                movzx   ebx, [VCD_RxQout]
                mov     dx, [VCD_RxQ+ebx*2]     ; get character from the
queue
                inc     ebx
                cmp     bx, [VCD_RxQlen]
                jb      SHORT CB_EQ_Set_Out_Ptr
                xor     ebx, ebx
CB_EQ_Set_Out_Ptr:
                mov     [VCD_RxQout], bx        ; put index back
                or      dh, [VCD_Vlsr]          ; add in old status
                mov     [VCD_Vlsr], dh          ; and set virtual LSR
                test    dh, LSR_DR              ; Was there data too?
                jz      short CB_EQ_NoData
                mov     [VCD_Vrxb], dl          ;    yes, put in virtual reg
                or      [VCD_Virr], IER_DR      ;    and set interrupt
request
                test    dh, LSR_ERRBITS         ; Line status interrupt?
                jz      SHORT CB_EQ_Exit        ;    no, just return
                or      [VCD_Virr], IER_LS      ;    yes, set interrupt
request
                jmp     SHORT CB_EQ_Exit
```

```
CB_EQ_NoData:
            cmp     [VCD_RxQcount], 0           ; queue empty?
            jne     short CB_EQ_Loop            ;    no, continue until
queue
                                        ; empty, or LSR_DR is set
            test    dh, LSR_ERRBITS             ; Line status interrupt?
            jz      SHORT CB_EQ_Exit            ;      no, just
return
            or      [VCD_Virr], IER_LS          ;    yes, set interrupt
request
CB_EQ_Exit:
            ;
            ret EndProc COMBuff_Extract_Queue ;*****************************************************************************
*
;
;   COMBuff_Clear_Queue
;
;   DESCRIPTION:
;
;   ENTRY:
;
;   EXIT:
;
;   USES:
;
;=============================================================================
=

BeginProc COMBuff_Clear_Queue
IFDEF DEBUG
       Trace_Out "COMBuff_Clear_Queue"
ENDIF
            mov     [VCD_RxQcount], 0           ; Clear receive Q
            mov     [VCD_RxQin], 0
            mov     [VCD_RxQout], 0
            and     [VCD_Vlsr], NOT LSR_DR      ; preserve error bits, reset DR
            and     [VCD_Virr], NOT IER_DR      ; clear DR virtual interrupt
            mov     [VCD_XOFF_Flag], False
            ret
EndProc COMBuff_Clear_Queue
;*****************************************************************************
*
;
;   COMBuff_Int
;
;   DESCRIPTION:
;
;   ENTRY:  ESI -> VCD_COM_STRUC
;           EDI -> VCD_COMDEB
;
;   EXIT:
;
;   USES:
;
;=============================================================================
=

VxD_DATA_SEG

CB_Int_Jmp_Table LABEL DWORD
            dd      OFFSET32 CB_Modem_Int
            dd      OFFSET32 CB_THRE_Int
            dd      OFFSET32 CB_Rx_Int
            dd      OFFSET32 CB_Rx_Int
```

```
                VxD_DATA_ENDS

BeginProc COMBuff_Int, High_Freq

IFDEF DEBUG
                    Trace_Out "COMBuff_Int"
                ENDIF mov     edx, [esi.VCD_IObase]           ; Get start of
                ports
                        add     dx, UART_IIR                                    ; EDX
                -> UART_IIR
                        VxDCall VIPD1_REG_READ                                  ; get
                iir status IFDEF DEBUG
                    Trace_Out "COMBuff_Int, IIR=#AL"
                ENDIF test    al, IIR_NONE                    ; Came from this
                device?
                        jz      SHORT CB_Int_Jump               ;       Yep, jump to
                handler ;       Nope - Reflect it
                        stc                                     ;       to next guy
                in chain
                        ret
                                ;
                ;
                ; VCHD DOS int loop
                ;
                CB_Int_Loop:
                        mov     edx, [esi.VCD_IObase]           ; Get start of
                ports
                        add     dx, UART_IIR                                    ; EDX
                -> UART_IIR
                        VxDCall VIPD1_REG_READ                                  ; get
                iir status IFDEF DEBUG
                    Trace_Out "COMBuff_Int (loop), IIR=#AL"
                ENDIF test    al, IIR_NONE                    ; Came from this
                device?
                        jnz     SHORT CB_Int_Done               ;       N: just
                return!

CB_Int_Jump:

IFDEF DEBUG
                        test    al, NOT 07h
                        jz      short CB_IIR_Okay
                        Debug_Out "VCHD: IIR (#DX) has too many bits set: #AL"
                CB_IIR_Okay:
                ENDIF and     eax, 07h                                        ; mask
                interrupt bits
                        jmp     CB_Int_Jmp_Table[eax*2]         ; Go deal with it
                ;
                ; Modem Status Interrupt
                ;
                CB_Modem_Int:
                                ;

IFDEF DEBUG
                    Trace_Out "CB_Modem_Int"
                ENDIF
```

```
                mov     edx, [esi.VCD_IObase]           ; Get base IO
address
                add     edx, UART_MSR                   ; get the IIR
contents (UART Interrupt ID reg)
                VxDCall VIPD1_REG_READ
                and     al, MSR_DELTA                   ; only want Delta
bits
                mov     [VCD_Vmsr], al                  ; save in
virtual MSR
                or      [VCD_Virr], IER_MS              ; set modem
interrupt request
                jmp     CB_Int_Loop
        ;
;
; Transmit Holding Register Empty
;
CB_THRE_Int:
        ;

IFDEF DEBUG
        Trace_Out "CB_THRE_Int"
ENDIF or      [VCD_Virr], IER_THRE            ; set THRE
interrupt request
                jmp     CB_Int_Loop
        ;
;
; Receive Data Interrupt
;
CB_Rx_Int:
        ;

IFDEF DEBUG
        Trace_Out "CB_Rx_Int"
ENDIF mov     edx, [esi.VCD_IObase]           ; Get base IO
address
                add     edx, UART_LSR                   ; EDX -> UART_LSR
                VxDCall VIPD1_REG_READ
                and     al, (LSR_DR + LSR_ERRBITS)      ; junk transmit
status
                jz      CB_Int_Loop                     ; Hmmm!
                call    COMBuff_Poll_Status                     ;
                jmp     CB_Int_Loop
        ;
;
; Interrupt Done
;
CB_Int_Done:
                mov     eax,[com_int_handle]            ; get data
pump handle IFDEF DEBUG
        Trace_Out "COMBUF_INT EOI #eax"
ENDIF VxDcall VPICD_Phys_EOI                          ;
clear physical interrupt
                call    COMBuff_Extract_Queue           ;
                call    COMBuff_Test_Int_Req            ; Will "return"
for us
                clc
                ret EndProc COMBuff_Int ;****************************************************************************
*
;
;       COMBuff_EOI
```

```
;
;       DESCRIPTION:
;           Here we mindlessly clear the interrupt request for the COM port
;           since it dosen't matter if the buffer was serviced yet or not.
;           If it was not, then the IRET procedure will set the int request
;           again and everyon will still be happy.
;
;       ENTRY:
;           EAX = IRQ handle
;           EBX = Current VM handle
;           ESI -> COM structure
;
;       EXIT:
;
;       USES:
;
;==============================================================================
=

BeginProc COMBuff_EOI, High_Freq push    eax
        push    ebx
        push    ecx
        mov     ebx, [owner]            ; EBX = Handle of port owner
        Assert_VM_Handle ebx            ; Paranoia...
        mov     cl, [VCD_Virr]          ; Interrupts pending
        and     cl, [VCD_Vier]          ; and enabled?
        jz      SHORT @F                ;    N: Clear int request
        test    [VCD_Vlcr], LCR_DLAB    ; Q: Access is to divisor latch
        jnz     short @F                ;       yes, can't send it!
        test    [VCD_Vmcr], MCR_INTEN   ; and enabled?
        jz      short @F                ;       no, can't send it!
        pop     ecx
        pop     ebx
        pop     eax
        ret @@:
        pop     ecx
        pop     ebx
        pop     eax
        VxDjmp  VPICD_Clear_Int_Request
        ret
;@@:
;       ret EndProc COMBuff_EOI VxD_LOCKED_CODE_ENDS END
;------------------------------------------------------------------------------
; End of File: VCHD.asm
;------------------------------------------------------------------------------
```

APPENDIX E

U.S. EXPRESS MAIL NO. TB855044421US

```
/*
!
!  FILE:   DPHILA.C
!
!  Copyright 1993, 1995  Compaq Computer Corporation.  All rights reserved.
!
!  FUNCTIONAL DESCRIPTION:
!      This module contains all of the routines for implementing the ADVICE
!      hardware interface layer.  This file is for use only on the PC based
!      platform.
!
!  REVISION HISTORY:
!        Last revised:  1995, May 17 15:37:35.67
!
!*/
/* System include files */ include <stdio.h> include <stdlib.h>
include <conio.h> pragma  intrinsic(inp)
pragma  intrinsic(outp)

#include <assume.h>

/* Program module include files */ include "dphil.h"

/* Module definitions */ define  BOARD_BASE   (0x140)

ifndef  VXD
#define  VXD    1
endif if !VXD
include <dos.h>
#define  DPHIL_IRQ    5
endif ifdef   PRODUCTION
define  STATIC    static
#else
#define  STATIC
#endif

/* Module data */ unsigned short dphil_base;

STATIC   unsigned char dphil_reg_2c;
STATIC   unsigned char dphil_reg_2e;
unsigned char dphil_reg_1f;
STATIC   int (*dphila_reset_function)(void);

#if !VXD
STATIC   void (interrupt _far *dphil_oldirqvect) (void);
STATIC   unsigned char dphil_irqintnum;
endif ifndef NDEBUG
static const char * this_file=__FILE__;
static const char * this_file_revision="$Revision:   1.3  $";
endif extern void Dpll_interrupt(void);
```

```
/* Module code */
#if VXD
void Dphil_isr(void)
#else
void interrupt far Dphil_isr(void)
#endif
    {
    unsigned char old_intmask;

old_intmask = dphil_reg_2e;

#if !VXD
    /* Signal non-specific EOI */
    outp(0x20, 0x20);
    #endif

/* If the source can be camil, call up to Dpll */
    if(old_intmask != 0xff)
        {
        /* Call up the interrupt */
        Dpll_interrupt();
        }
    } void Dphil_write(unsigned short address, unsigned char value)
    {
    ASSUME(dphil_base != 0);
    ASSUME(address < 49);
    outp(dphil_base+address, value);
    if(address == 0x2c)
        dphil_reg_2c = value;
    else if(address == 0x1f)
        dphil_reg_1f = value;
    else if(address == 0x2e)
        {
        ASSUME(value != 0);
        dphil_reg_2e = value;
        }
    } unsigned char Dphil_read(unsigned short address)
    {
    unsigned char value;

ASSUME(dphil_base != 0);
    ASSUME(address < 49);
    if(address == 0x2c)
        {
        value = dphil_reg_2c;
        }
    else
        {
        value = (unsigned char) (unsigned int) inp(dphil_base+address);
        }
    return value;
    } void Dphil_remove(void)
    {
    if(dphil_base)
        {
        Dphil_uninit();
        }
    } int Dphil_init(int (*reset_function)(void))
    {
    if(dphil_base == 0)
        dphil_base = BOARD_BASE;
    dphila_reset_function = reset_function;
```

```c
    dphil_reg_2c = 0x00;
    dphil_reg_2e = 0xff;
    /* Turn off ALL CAMIL interrupts */
    Dphil_write(DPHIL_INTR_MASK_CNTRL_STATUS, 0xff);

#if !VXD
    dphil_irqintnum = DPHIL_IRQ + 8;
    dphil_oldirqvect = _dos_getvect(dphil_irqintnum);
    _dos_setvect(dphil_irqintnum, Dphil_isr);
    outp(0x21, inp(0x21) & (unsigned char) (~ (1<<DPHIL_IRQ) ));
    atexit(Dphil_remove);
endif return 0;
} int Dphil_uninit(void)
{
#if !VXD
    outp(0x21, inp(0x21) | (1<<DPHIL_IRQ));
    _dos_setvect(dphil_irqintnum, dphil_oldirqvect);
#endif
    dphil_base = 0;
    return 0;
} int Dphil_reset(void)
{
    if(dphila_reset_function)
        dphila_reset_function();
    dphil_reg_2c = 0x00;
    return 0;
}

/*
!
! Interface description:
!     This function is used to modify the contents of a host register.  The
!     function will perform a bitwise AND operation on the value of the host
!     register and the and value.  The result of that operation will be
!     bitwise ORed with the or value.  The result will then be written back to
!     the host register.
!
!
! CALLING METHOD:
!        Dphil_modify(addr, and, or)
!
! INPUT PARAMETERS:
!    addr - address of the host register to modify
!    and  - value to and with the contents of the host register
!    or   - value to OR with the result of the AND operation
!
!*/ void Dphil_modify(unsigned short address, unsigned char and_value,
                  unsigned char or_value)
{
    unsigned char value;

value = Dphil_read(address);
    value &= and_value;
    value |= or_value;
    Dphil_write(address, value);
} void Dpllexpn_handler(void)
{
    exit(0);
}
```

```
/*lint -e728 Complaint about dpll_semaphore not initialized */
/*
!
! FILE: dpllint.c
! Copyright 1993, 1995 Compaq Computer Corporation. All rights reserved.
!
! FUNCTIONAL DESCRIPTION:
!     Interrupt driven Low level routines for the data pump driver.
!
! REVISION HISTORY:
!     9410191521 Created
!
!*/

/* System include files */ include <timer.h>
include <dpll.h>
#include <dphil.h>
#include <dpllexpn.h>
#include <notify.h>
#include <dpsstat.h>
#include <assume.h>
include <intr.h> include <trace.h>

/* Module definitions */ if 1
define    FLOWCHARTWAY
#else
#define    CODEWAY
endif ifdef   PRODUCTION
define   STATIC    static
#else
#define   STATIC
#endif

/* Host Commands to the Data Pump */
#define   DPLL_WRITE_DSP_RAM            0x01
#define   DPLL_V32BIS_RATE_RENEG        0x02
#define   DPLL_MODIFY_RESERVED_REG      0x03
#define   DPLL_READ_DSP_RAM             0x04
#define   DPLL_READ_STATUS_WORD         0x05
#define   DPLL_RESERVED_0X06            0x06
#define   DPLL_GENERATE_TONES           0x07
#define   DPLL_DETECT_TONES             0x08
#define   DPLL_DETECT_DTMF_TONES        0x09
#define   DPLL_DTMF_DIALING             0x0A
#define   DPLL_PULSE_DIALING            0x0B
#define   DPLL_LOCAL_LOOP_3_TEST        0x0C
#define   DPLL_READ_CLEAR_DSP_RAM       0x0D
#define   DPLL_STARTUP                  0x0E
#define   DPLL_INIT_RETRAIN_SEQ         0x0F
#define   DPLL_REP_FIRMWARE_VERS        0x10
#define   DPLL_CONNECT_TO_LINE          0x11
#define   DPLL_DISCONNECT_FROM_LINE     0x12
#define   DPLL_RETURN_TO_IDLE           0x13
#define   DPLL_CHECK_DSP_PRO_MEMORY     0x14
define   DPLL_DB_43                    43 define   DPLL_WAIT_FOREVER             0 define   DPLL_CORE_WAIT_TIME           100
define   DPLL_CORE_WAIT_TIME_SLEEP     150
#define   DPLL_MAX_ATTEMPTS             3

1
```

```c
#define  DPLL_INTS_WANTED   0x9a

/* Host Command DPLL_INIT_RENOGT_SEQ parameters */
#define  DPLL_ANSWER                0
define  DPLL_ORIGINATE             1 define  DPLL_DATA_FROM_SIZE  1024
define  DPLL_DATA_TO_SIZE    1024

/* Module data */

NCBHANDLE dpll_ncbptr[DPLL_NULL_EVENT+1];

volatile unsigned short dpll_write_location;
volatile unsigned short dpll_write_value;
volatile unsigned short dpll_read_location;
volatile unsigned short dpll_read_value;
volatile unsigned char  dpll_cmd;
volatile unsigned char  dpll_cmd_p1;
volatile unsigned short dpll_max_attempts;
volatile unsigned char  dpll_core_has_read;
volatile unsigned char  dpll_core_has_written;
volatile unsigned short dpll_response_value;
volatile unsigned char  dpll_response_code;
volatile unsigned char  dpll_expected_code;
volatile unsigned char  dpll_tx_active;
volatile unsigned char  dpll_tdbr;

volatile unsigned char  dpll_previous_cmd;
volatile unsigned char  dpll_previous_p1;

volatile unsigned char dpll_cmd_active;
volatile unsigned char dpll_uart_active;

STATIC unsigned short dpll_semaphore;

volatile unsigned short dpll_tx_count;
volatile unsigned short dpll_rx_count;

volatile unsigned short dpll_tx_flags;
volatile unsigned short dpll_rx_flags;

volatile unsigned char *dpll_tx_ptr;
volatile unsigned char *dpll_rx_ptr;
volatile unsigned char *dpll_rx_spt;
volatile unsigned char dpll_rx_open;

STATIC unsigned char dpll_line_syncmode;
STATIC unsigned short dpll_rx_maxsize;

#ifndef  NDEBUG
static const char this_file[]=__FILE__;
static const char this_file_revision[]="$Revision:   1.6  $";
endif extern unsigned short interrupt_state;

extern unsigned char * (*line_complete_rx)(unsigned short length);
extern unsigned char * (*line_complete_tx)(unsigned short *next_length);
extern unsigned char * line_rx_error;

unsigned short dpll_max_count;
unsigned short dpll_underrun;
unsigned char dpll_fax_mode;
volatile unsigned char dpll_isr_active;
volatile unsigned char dpll_error;
volatile unsigned char dpll_in_underrun;

/* Module code */
```

```c
unsigned short Dpll_get_transmit_count(void)
    {
    return 1 - dpll_in_underrun;
    } void Dpll_configure_line(unsigned char syncmode)
    {
    dpll_fax_mode = 0;
    if(syncmode == 3) /* Fax mode HDLC */
        {
        dpll_fax_mode = 1;
        dpll_line_syncmode = 1;
        dpll_tx_flags = DPHIL_BIT_FRAME_START;
        Dpll_modify_ram(DPLL_RAM_HDLC_OPTION_CNTRL,0xfe00, 0x146);
        }
    else if(syncmode == 2)   /* Fax Sync mode */
        {
        dpll_fax_mode = 1;
        dpll_line_syncmode = 0; /* no SOF or EOFs */
        Dpll_modify_ram(DPLL_RAM_HDLC_OPTION_CNTRL,0xfe00, 0x100);
        }
    else if(syncmode == 1)    /* Data HDLC mode */
        {
        dpll_line_syncmode = 1;
        dpll_tx_flags = DPHIL_BIT_FRAME_START;
        Dpll_modify_ram(DPLL_RAM_HDLC_OPTION_CNTRL,0xfe00, 0x146);
        }
    else
        {
        dpll_line_syncmode = 0;
        dpll_tx_flags = 0;
        Dpll_modify_ram(DPLL_RAM_HDLC_OPTION_CNTRL,0xfe00, 0x187);
        }
    } void Dpll_transmit_data(void)
    {
    unsigned short i;
    unsigned char reg8;
    unsigned long xmit_loop;
    unsigned short sr;
    unsigned short txc;

ASSUME(dpll_tx_count > 0);

sr = Interrupt_disable(0);

if(dpll_tx_active)
        {
        Interrupt_enable(sr);
        return;
        } dpll_tx_active = 1;

if(dpll_cmd_active)
        {
        dpll_error |= 2;
        Interrupt_enable(sr);
        return;
        } if(dpll_isr_active)
        {
        dpll_error |= 4;
        } if 0
    Trace_put_event(4, dpll_tx_count, (unsigned char *) dpll_tx_ptr);
    #endif
```

```
reg8 = 0;
if(dpll_tx_flags & DPHIL_BIT_FRAME_START)
    {
    dpll_tx_flags &= ~DPHIL_BIT_FRAME_START;
    reg8 = DPHIL_BIT_FRAME_START;
    } for(i=0;dpll_tx_count && i < 6; i++, dpll_tx_count--)
    {
    Dphil_write(DPHIL_COMMAND_PARAM_7_MAILBOX + i,
        *dpll_tx_ptr++);
    } if(dpll_tx_count == 0)  /* End of buffer */
    {
    if(dpll_line_syncmode)
        {
        #if 0
        Trace_say("EOF");
        #endif
        reg8 |= DPHIL_BIT_FRAME_END;
        dpll_tx_flags |= DPHIL_BIT_FRAME_START;
        }
    }

Dphil_write(DPHIL_COMMAND_PARAM_1_MAILBOX, reg8);
Dphil_write(DPHIL_COMMAND_MAILBOX,
    (unsigned char) (0x80 | i));
dpll_in_underrun = 0;

if(dpll_tx_count == 0)
    {
    if(!dpll_fax_mode)
        {
        dpll_tx_ptr = line_complete_tx(&txc);
        #if 0
        Trace_put_event(4, txc, (unsigned char *) dpll_tx_ptr);
        #endif
        dpll_tx_count = txc;
        }
    else
        {
        /* Fax mode */
        if(!dpll_line_syncmode)
            {
            /* SYNC fax */
            dpll_tx_ptr = line_complete_tx(&txc);
            dpll_tx_count = txc;
            }
        else
            {
            /* Call completion of fax hdlc tx upon underrun. */
            }
        }
    } ifdef   FLOWCHARTWAY xmit_loop = 0;
/* Wait for Core read interrupt */
while(((Dphil_read(DPHIL_UNMASKED_INTR_STATUS) &
        DPHIL_BIT_CRBNKI) == 0))
    {
    if(xmit_loop++ > 5000L)
        {
        dpll_error |= 16;
        break;
        }
    } dpll_tdbr = 0;
/* Clear TDBR and enable TDBR interrupts again */
```

```c
    /* Clear underrun as well */
    #ifdef JUST_TDBR
    Dphil_modify(DPHIL_PARALLEL_DATA_MODE_STATUS, 0x77, 0x10);
    #else
    Dphil_write(DPHIL_PARALLEL_DATA_MODE_STATUS, 0x10);
    #endif /* Clear core read bank interrupt */
    Dphil_write(DPHIL_INTR_RESET_STATUS_DETAIL, DPHIL_BIT_CRBNKI);

endif ifdef JUST_TDBR
    #else
    /* Enable UART interrupts */
    Dphil_write(DPHIL_INTR_MASK_CNTRL_STATUS,
        (unsigned char) ~(DPLL_INTS_WANTED));
    #endif Interrupt_enable(sr);
    } void Dpll_start_transmit(unsigned char *buffer, unsigned short length)
    {
    unsigned short mask;

ASSUME(dpll_tx_ptr == 0);
    ASSUME(dpll_tx_count == 0);

mask = Interrupt_disable(0);

dpll_tx_ptr = buffer;
    dpll_tx_count = length;
    if(dpll_line_syncmode)
        {
        dpll_tx_flags = DPHIL_BIT_FRAME_START;
        }

Dpll_transmit_data();
    Interrupt_enable(mask);
    } void Dpll_start_receive(unsigned char *buffer, unsigned short length)
    {
    unsigned short mask;

mask = Interrupt_disable(0);
    dpll_rx_maxsize = length;
    dpll_rx_ptr = buffer;
    dpll_rx_spt = dpll_rx_ptr;
    dpll_rx_count = 0;
    Interrupt_enable(mask);
    } void Dpll_reset_data(void)
    {
    unsigned short mask;

mask = Interrupt_disable(0);
    dpll_rx_maxsize = 0;
    dpll_rx_ptr = 0;
    dpll_rx_count = 0;
    dpll_tx_ptr = 0;
    dpll_tx_count = 0;
    dpll_tx_active = 0;
    Interrupt_enable(mask);
    } unsigned long dpll_death = 0;
unsigned char dpll_last_int;

void Dpll_interrupt(void)
```

```c
{
unsigned char intbits;
unsigned char clrintbits;
unsigned char rcvdat;
unsigned short txc;

dpll_death = 0;
dpll_isr_active = 1;
clrintbits = 0;
intbits = Dphil_read(DPHIL_UNMASKED_INTR_STATUS);

/* Turn off all interrupts from CAMIL */
Dphil_write(DPHIL_INTR_MASK_CNTRL_STATUS, 0xff);

do
    {
    dpll_last_int = intbits;
    if(dpll_death++ > 5000L)
        {
        dpll_error |= 1;
        break;
        } if(intbits & DPHIL_BIT_CWBNKI)
        {
        rcvdat = Dphil_read(DPHIL_RECV_DATA_STATUS);
        if((rcvdat & DPHIL_BIT_FA_DATA) == 0)
            {
            dpll_response_value =
                (((unsigned short) Dphil_read(DPHIL_RESP_PARAM_1_MAILBOX)) << 8)
                | (unsigned short) Dphil_read(DPHIL_RESP_PARAM_2_MAILBOX);
            dpll_response_code = Dphil_read(DPHIL_RESP_CODE_MAILBOX);
            dpll_core_has_written = 1;
            }
        else
            {
            unsigned short length;
            length = rcvdat & 7;

ASSUME(length != 0);

if(Dphil_read(DPHIL_PARALLEL_DATA_MODE_STATUS) & 0x01)
                {
                /* Receive overflow */
                dpll_rx_flags |= DPHIL_BIT_HDLC_ABORT;
                dpll_error |= 0x80;
                } dpll_rx_flags |= rcvdat;

if(dpll_line_syncmode)
                {
                if(rcvdat & DPHIL_BIT_HDLC_START)
                    {
                    if(dpll_rx_count == 0)
                        {
                        dpll_rx_open = 1;
                        }
                    else
                        {
                        dpll_rx_count = 0;
                        dpll_rx_ptr = dpll_rx_spt;
                        dpll_rx_open = 1;
                        }
                    }
                }
            else
                {
                dpll_rx_open = 1;
                }
```

```
              if(dpll_rx_ptr && dpll_rx_open)
                 {
                 dpll_rx_count += length;
                 if(dpll_rx_count <= dpll_rx_maxsize)
                    {
                    while(length--)
                        {
                        *dpll_rx_ptr++ = Dphil_read(DPHIL_RESP_CODE_MAILBOX -
length);
                        }
                    }
                 else
                    {
                    while(length--)
                        {
                        Dphil_read(DPHIL_RESP_CODE_MAILBOX - length);
                        }
                    } if(dpll_line_syncmode)
                    {
                    if((dpll_rx_count > dpll_rx_maxsize) ||
                       (dpll_rx_flags &
                           (DPHIL_BIT_HDLC_ABORT | DPHIL_BIT_HDLC_CRC |
                           DPHIL_BIT_HDLC_END) ))
                       {
                       dpll_rx_open = 0;
                       if((dpll_rx_flags &
                              (DPHIL_BIT_HDLC_ABORT | DPHIL_BIT_HDLC_CRC)) ||
                             (dpll_rx_count > dpll_rx_maxsize))
                          {
                          *line_rx_error = 1;
                          }
                       else
                          {
                          *line_rx_error = 0;
                          }
                       dpll_rx_ptr = line_complete_rx(dpll_rx_count);
                       dpll_rx_spt = dpll_rx_ptr;
                       dpll_rx_count = 0;
                       dpll_rx_flags = 0;
                       }
                    else
                       {
                       dpll_rx_ptr = line_complete_rx(dpll_rx_count);
                       dpll_rx_count = 0;
                       dpll_rx_flags = 0;
                       }
                    }
                 }
              else
                 {
                 /* Trash can the characters */
                 while(length--)
                    {
                    Dphil_read(DPHIL_RESP_CODE_MAILBOX - length);
                    }
                 }
              }
           } if(intbits & DPHIL_BIT_RIEDGI)
           {
           clrintbits = DPHIL_BIT_RST_RIHL | DPHIL_BIT_RILH;
           Dphil_write(DPHIL_INTR_RESET_STATUS_DETAIL, clrintbits);
           } if(intbits & DPHIL_BIT_CRBNKI)
           {
           dpll_core_has_read = 1;
           dpll_cmd_active = 0;
           clrintbits = DPHIL_BIT_CRBNKI;
```

```c
    /* Clear the bits that have been read */
    Dphil_write(DPHIL_INTR_RESET_STATUS_DETAIL, clrintbits);
    } if(intbits & DPHIL_BIT_UARTI || dpll_tdbr)
    {
    unsigned char temp_st;
    temp_st = Dphil_read(DPHIL_PARALLEL_DATA_MODE_STATUS);
    if(temp_st & 0x08)    /* Underrun */
        {
        dpll_in_underrun = 1;
        if(dpll_fax_mode && dpll_line_syncmode)
            {
            /* FAX HDLC mode */
            if(dpll_tx_count == 0 && dpll_tx_ptr)   /* Frame ended yet? */
                {
                dpll_tx_ptr = line_complete_tx(&txc);
                dpll_tx_count = txc;
                if(dpll_tx_count == 0)
                    dpll_tx_active = 0;   /* Transmitter no longer active */
                }
            else   /* premature underrun */
                ;
            }
        else if(dpll_line_syncmode)   /* hdlc data mode */
            {
            if(dpll_tx_active)
                {
                #if 0
                Trace_say("Data Under");
                #endif
                dpll_underrun++;
                }
            }
        }
    } ifdef CODEWAY
    /* Clear TDBR and enable TDBR interrupts again */
    Dphil_write(DPHIL_PARALLEL_DATA_MODE_STATUS, 0x10);
    #endif if(!dpll_cmd_active)
        {
        if(dpll_tx_count)
            {
            unsigned char reg8;
            unsigned long xmit_loop;
            unsigned char i;

#if 0
            Trace_say("TxInt");
            #endif reg8 = 0;
            if(dpll_tx_flags & DPHIL_BIT_FRAME_START)
                {
                dpll_tx_flags &= ~DPHIL_BIT_FRAME_START;
                reg8 = DPHIL_BIT_FRAME_START;
                #if 0
                Trace_say("SOF");
                #endif
                } for(i=0;dpll_tx_count && i < 6; i++, dpll_tx_count--)
                {
                Dphil_write(DPHIL_COMMAND_PARAM_7_MAILBOX + i,
                    *dpll_tx_ptr++);
                } if(dpll_tx_count == 0)   /* End of buffer */
                {
                if(dpll_line_syncmode)
```

```c
            {
            reg8 |= DPHIL_BIT_FRAME_END;
            dpll_tx_flags |= DPHIL_BIT_FRAME_START;
            #if 0
            Trace_say("EOF");
            #endif
            }
        Dphil_write(DPHIL_COMMAND_PARAM_1_MAILBOX, reg8);
        Dphil_write(DPHIL_COMMAND_MAILBOX,
            (unsigned char) (0x80 | i));
        dpll_in_underrun = 0;
        if(!dpll_fax_mode)
            {
            dpll_tx_ptr = line_complete_tx(&txc);
            #if 0
            Trace_put_event(4, txc, (unsigned char *) dpll_tx_ptr);
            #endif
            dpll_tx_count = txc;
            }
        else
            {
            /* Fax mode */
            if(!dpll_line_syncmode)
                {
                /* SYNC fax */
                dpll_tx_ptr = line_complete_tx(&txc);
                dpll_tx_count = txc;
                }
            else
                {
                /* Call completion of fax hdlc tx upon underrun. */
                }
            }
        }
    else
        {
        Dphil_write(DPHIL_COMMAND_PARAM_1_MAILBOX, reg8);
        Dphil_write(DPHIL_COMMAND_MAILBOX,
            (unsigned char) (0x80 | i));
        } ifdef FLOWCHARTWAY xmit_loop = 0;
    /* Wait for Core read interrupt */
    while(((Dphil_read(DPHIL_UNMASKED_INTR_STATUS) &
            DPHIL_BIT_CRBNKI) == 0))
        {
        if(xmit_loop++ > 5000L)
            {
            dpll_error |= 8;
            break;
            }
        } dpll_tdbr = 0;
    /* Clear TDBR and enable TDBR interrupts again */
    #ifdef JUST_TDBR
    Dphil_modify(DPHIL_PARALLEL_DATA_MODE_STATUS, 0x7f, 0x10);
    #else
    Dphil_write(DPHIL_PARALLEL_DATA_MODE_STATUS, 0x10);
    #endif /* Clear core read bank interrupt */
    Dphil_write(DPHIL_INTR_RESET_STATUS_DETAIL, DPHIL_BIT_CRBNKI);
    #endif
    }
else
    {
    if(intbits & DPHIL_BIT_UARTI)
        {
        #ifdef FLOWCHARTWAY
```

```
                    /* Turn off enable source */
                    /* Turn off TDBR enable */
                    #ifdef JUST_TDBR
                    Dphil_modify(DPHIL_PARALLEL_DATA_MODE_STATUS, 0xef, 0);
                    #endif
                    #endif
                    }
            if(!dpll_fax_mode)
                dpll_tx_active = 0;
            dpll_tdbr = 1;
            }
        }
        else  /* if in cmd mode */
        {
            if(intbits & DPHIL_BIT_UARTI)
            {
            #if 0
            Trace_say("TxIntBlocked");
            #endif
            dpll_tdbr = 1;
            /* Turn off enable source */
            #ifdef FLOWCHART
            /* Turn off TDBR enable */
            #ifdef JUST_TDBR
            Dphil_modify(DPHIL_PARALLEL_DATA_MODE_STATUS, 0xef, 0);
            #endif
            #endif
            }
        }
    }

/* Check for new events */
    intbits = Dphil_read(DPHIL_UNMASKED_INTR_STATUS);
    if(dpll_tdbr)
        {
        intbits &= ~DPHIL_BIT_UARTI;
        }
    clrintbits = 0;
    } while ((intbits & DPLL_INTS_WANTED) &&
             ((intbits & 0x7f) != 0x7f));

/* Now, reactivate the interrupts from CAMIL */
#ifdef   JUST_TDBR
Dphil_write(DPHIL_INTR_MASK_CNTRL_STATUS,
    (unsigned char) ~(DPLL_INTS_WANTED));
else if(!dpll_tdbr)
    {
    Dphil_write(DPHIL_INTR_MASK_CNTRL_STATUS,
        (unsigned char) ~(DPLL_INTS_WANTED));
    }
else
    {
    /* Do not enable uart interrupts */
    Dphil_write(DPHIL_INTR_MASK_CNTRL_STATUS,
        (unsigned char) ~(DPLL_INTS_WANTED) | DPHIL_BIT_UARTI);
    }
#endif
dpll_isr_active = 0;
}

/*
!
! FUNCTIONAL DESCRIPTION:
!     Initializes the data pump low level routines.
!
! CALLING METHOD:
!     Dpll_init();
!
```

```
!   OBJECT PARAMETERS:
!       dpll_ncbptr[]   Notification control blocks are initialized.
!
!*/
void Dpll_init(void)
    {
    int i;
    TIMER t;

ASSUME(dpll_semaphore == 0);
    dpll_semaphore++;

/* Clear interrupts from CAMIL (if any) */
    /* Code taken from AT&T implementation */
    /* The AT&T code cautioned against changing the order... */

Dphil_write(DPHIL_INTR_RESET_STATUS_DETAIL, 0xff);
    Dphil_write(DPHIL_INTR_MASK_CNTRL_STATUS, 0xff);

/* Invert the interrupt signal from Camil */

Dphil_write(DPHIL_COMMAND_PARAM_3_MAILBOX, 0);
    Dphil_write(DPHIL_COMMAND_PARAM_2_MAILBOX, 0xdf);
    Dphil_write(DPHIL_COMMAND_PARAM_1_MAILBOX, 0x18);
    Dphil_write(DPHIL_COMMAND_MAILBOX, 0x03);

/* Wait time for command to process */
    t = Timer_start(100 * TIMER_MILLISECONDS);

/* Meanwhile, initialize local data structures */
    for(i=DPLL_WRITE_RAM_EVENT;i<=DPLL_NULL_EVENT;i++)
        {
        Notify_init_handle(&dpll_ncbptr[i]);
        }

/* Init interrupt tracking stuff */ dpll_tdbr = 0;
    dpll_tx_active = 0;
    dpll_uart_active = 0;
    dpll_cmd_active = 0;
    dpll_core_has_read = 0;
    dpll_core_has_written = 0;
    dpll_in_underrun = 1;   /* No data "in" the data pump outbound */

/* Wait for command to have been processed */
    while(!Timer_expired(t))
        {
        }

/* Activate interesting ints from Camil */
    Dphil_write(DPHIL_INTR_MASK_CNTRL_STATUS,
        (unsigned char) ~(DPLL_INTS_WANTED));

/* Code taken from AT&T - no explanation for why this is done */
    /* Turn off secondary channel byte operation */
    Dpll_write_reserved_reg(0x26, 0, 0x20);

/* Put the pump in parallel async mode */
    Dpll_configure_line(0);

/* Turn on TDBR enable (bit 4 of reg 1f) */
    Dphil_write(DPHIL_PARALLEL_DATA_MODE_STATUS, 0x10);

#if 0
    /* Clear any interrupts stuck in Camil */
    Dpll_interrupt();
#endif
    }
```

```
/*
!
!  FUNCTIONAL DESCRIPTION:
!     Uninitializes the data pump low level routines.
!
!  CALLING METHOD:
!     Dpll_uninit();
!
!  OBJECT PARAMETERS:
!     dpll_ncbptr[]  Notification control blocks are uninitialized.
!
!*/
void Dpll_uninit(void)
    {
    int i;

dpll_semaphore--;
    ASSUME(dpll_semaphore == 0);

for(i=DPLL_WRITE_RAM_EVENT;i<=DPLL_NULL_EVENT;i++)
        {
        Notify_uninit_handle(&dpll_ncbptr[i]);
        }
    /* Disable Camil Interrupts */
    Dphil_write(DPHIL_INTR_MASK_CNTRL_STATUS, 0xff);
    }

STATIC int Dpll_clear_core_interrupt(unsigned short core_interrupt)
    {
    if(core_interrupt == DPHIL_BIT_CRBNKI)
        dpll_core_has_read = 0;
    else
        dpll_core_has_written = 0;
    return 0;
    }
/*
!
!  FUNCTIONAL DESCRIPTION:
!     Waits for DSP16 core read bit to become valid, or timeout.
!
!  CALLING METHOD:
!     error = Dpll_wait_for_core_interrupt(core_interrupt);
!
!  INPUT PARAMETERS:
!     core_interrupt
!
!  RETURN VALUES:
!     0   success
!     !0  failure
!
!*/
STATIC int Dpll_wait_for_core_interrupt(unsigned short core_interrupt)
    {
    int error;
    TIMER core_int_timeout;

error = 1;

if((core_interrupt==DPHIL_BIT_CRBNKI)||(core_interrupt==DPHIL_BIT_CWBNKI))
        {
        if(Dphil_read(DPHIL_USER_CLOCK_2) & 0x80) /* Sleeping? */
            {
            core_int_timeout = Timer_start((DURATION) DPLL_CORE_WAIT_TIME_SLEEP);
            }
        else
            {
            core_int_timeout = Timer_start((DURATION) DPLL_CORE_WAIT_TIME);
            } while(!Timer_expired(core_int_timeout) && error)
            {
```

```
              if(core_interrupt == DPHIL_BIT_CRBNKI)
                 {
                 if(dpll_core_has_read)
                    error = 0;
                 }
              else
                 {
                 if(dpll_core_has_written)
                    error = 0;
                 }
              }
           } return(error);
      }

/*
!
!  FUNCTIONAL DESCRIPTION:
!      When called, will attempt Dpll_command the specified number of times.
!
!  CALLING METHOD:
!      error = Dpll_retry_layer(command, p1, p2, p3, p4, p5, tries);
!
!  INPUT PARAMETERS:
!      command     Data pump command mailbox value.
!      p1          Data pump parameter mailbox value #1.
!      p2          Data pump parameter mailbox value #2.
!      p3          Data pump parameter mailbox value #3.
!      p4          Data pump parameter mailbox value #4.
!      p5          Data pump parameter mailbox value #5.
!      p5          Data pump parameter mailbox value #6.
!      p5          Data pump parameter mailbox value #7.
!      tries       The number times Dpll_command is to be attempted.
!
!  RETURN VALUES:
!      0   No errors.
!      1   Pump does not acknowledge after the specified tries.
!
!*/
int Dpll_retry_layer(unsigned char  command, unsigned char p1,
                     unsigned char  p2,      unsigned char p3,
                     unsigned char  p4,      unsigned char p5,
                     unsigned char  p6,      unsigned char p7,
                     unsigned short tries)
   {
   int error;
   unsigned short attempt;

error = 1;

for( attempt = 0; attempt < tries; attempt++ )
      {
      error = Dpll_command(command, p1, p2, p3, p4, p5, p6, p7);
      if(!error)
         {
         break;
         }
      else
         {
         }
      } if(attempt > dpll_max_attempts)         /* debug */
      {                                    /* debug */
      dpll_max_attempts = attempt;         /* debug */
      }                                    /* debug */ if(error)
      {
      Dpllexpn_handler();
```

```
        }
    dpll_previous_cmd = dpll_cmd;
    dpll_previous_p1 = dpll_cmd_p1;

return(error);
    }
/*
!
! FUNCTIONAL DESCRIPTION:
!    Initializes C/S Ram locations and registers in the data pump.
!
! CALLING METHOD:
!    error = Dpll_cold_start(hardware);
!
! INPUT PARAMETERS:
!    hardware - value specifying hardware selections based upon the sum taken
!    from the following table:
!
!       value
!         0 - 7525 CODEC, 40.5504 MHz clock
!         1 - 1027 CODEC
!         2 - 20.2752 MHz input clock
!
! RETURN VALUES:
!      0    if no errors reported during cold start
!     !0    if an error(s) was reported during cold start
!
!*/
int Dpll_cold_start(unsigned long hardware_selection)
{
    int error;

error = 0;

Dphil_write(DPHIL_INTR_RESET_STATUS_DETAIL, 0xff);

#if 0
    error |= Dpll_retry_layer(DPLL_CHECK_DSP_PRO_MEMORY,0,0,0,0,0,
                              DPLL_MAX_ATTEMPTS);

error |= Dpll_write_ram(DPLL_RAM_LOW_RATE, 0);

#endif

Dphil_write(DPHIL_UART_CNTRL_RI, 0);

Dphil_modify(DPHIL_SEND_DATA_UART_DSR_CNTRL, ~DPHIL_BIT_EURSTD  &
                 ~DPHIL_BIT_MSDCB_0 & ~DPHIL_BIT_MSDCB_1, 0);
    Dphil_modify(DPHIL_SEND_DATA_UART_DSR_CNTRL, 0xff,DPHIL_BIT_DSRCB_0 |
                 DPHIL_BIT_DSRCB_1);

Dphil_modify(DPHIL_RECV_DATA_CTS_RR_CNTRL, ~DPHIL_BIT_RXDCB_3,0);
    Dphil_modify(DPHIL_RECV_DATA_CTS_RR_CNTRL, ~DPHIL_BIT_CTSCB_0 &
                 ~DPHIL_BIT_CTSCB_1,0 );
    Dphil_modify(DPHIL_RECV_DATA_CTS_RR_CNTRL, 0xff,DPHIL_BIT_RRCB_0   |
                 DPHIL_BIT_RRCB_1);

Dphil_write(DPHIL_V24_TIMING_CNTRL, DPHIL_BIT_STCB1 |
                DPHIL_BIT_RTCB1   );

Dphil_write(DPHIL_V24_CNTRL_STATUS, 0);

Dphil_write(DPHIL_ASYNCHRONOUS_CNTRL, DPHIL_BIT_STAOSP |
                DPHIL_BIT_RSTAE | DPHIL_BIT_TATSE | DPHIL_BIT_RCHRL1);

Dphil_write(DPHIL_V54_V13_511_CNTRL, DPHIL_BIT_SEQ0);

error |= Dpll_write_ram(DPLL_RAM_CARRIER_THRESHOLD, DPLL_DB_43);

error |= Dpll_write_ram(DPLL_RAM_FAST_STATUS_ADDRESS,
```

14

```
                                DPLL_RAM_OPERATING_STATUS);
    error |= Dpll_write_ram(DPLL_RAM_ANSWER_SILENCE, 0);
#if 0
    error |= Dpll_write_ram(DPLL_RAM_DATA_OPTION_CNTRL, 0x300 |
DPLL_BIT_SLEEP_MODE);
#else
    error |= Dpll_write_ram(DPLL_RAM_DATA_OPTION_CNTRL, 0);
endif /* The following program the CAMIL to detect */
    /* Frequencies between 20 and 136Hz.  This is due */
    /* to the DAA doubling the apparent ring frequency */
    Dpll_write_ram(DPLL_RAM_RING_DET_LOW, 9);
    Dpll_write_ram(DPLL_RAM_RING_DET_HIGH, 60);

if(hardware_selection & 2)
        {
        Dpll_modify_ram(DPLL_RAM_DATA_OPTION_CNTRL,0xffff,
                        DPLL_BIT_IN_CLOCK_FREQ);
        } if(hardware_selection & 1)
        {
        Dpll_modify_ram(DPLL_RAM_FAX_OPTION_CNTRL, 0xffff,
                        DPLL_BIT_CODEC_SELECT);
        }
    return error;
    }

/*
!
! FUNCTIONAL DESCRIPTION:
!     Writes an unsigned short to the data pump's C/S ram.
!
! INTERFACE DESCRIPTION:
!     Neither parameters are qualifed prior to use.
!
! CALLING METHOD:
!     error = Dpll_write_ram( location, value )
!
! INPUT PARAMETERS:
!     location   DPS C/S ram location.
!     value      The value to be written.
!
! RETURN VALUES:
!     0   No errors.
!     1   Error in data pump.
!
!*/
int Dpll_write_ram(unsigned short location, unsigned short value)
    {
    int error;
    DPLL_MESSAGE message;

ASSUME(dpll_semaphore != 0);

dpll_write_location = location;
    dpll_write_value = value;

message.location = location;
    message.value = value;
    message.stage = DPLL_EVENT_BEGIN;
    message.skip = 0;
    Notify(&dpll_ncbptr[DPLL_WRITE_RAM_EVENT], (void *)&message);

if(!message.skip)
        {
        #if 0
```

```
            Trace_say("DPW");
        #endif
            error = Dpll_retry_layer(DPLL_WRITE_DSP_RAM,
                                    0,
                                    (unsigned char)(location >> 8),
                                    (unsigned char)(location & 0xFF),
                                    (unsigned char)(value >> 8),
                                    (unsigned char)(value & 0xFF),
                                    0,0,
                                    DPLL_MAX_ATTEMPTS);

message.stage = DPLL_EVENT_END;
            Notify(&dpll_ncbptr[DPLL_WRITE_RAM_EVENT], (void *)&message);
            }
        else
            {
            error = 0;
            } return(error);
        }

/*
!
!   FUNCTIONAL DESCRIPTION:
!       Reads a value from the dsp C/S ram.
!
!   IMPLEMENTATION DESCRIPTION:
!       1. A read_ram command is issued to the data pump.
!       2. When the data pump has accepted the command, the value is read from
!           a host register.
!
!   CALLING METHOD:
!       value = Dpll_read_ram(location);
!
!   INPUT PARAMETERS:
!       location      The C/S ram location
!
!   RETURN VALUES:
!       Returns the the value read.
!
!*/
unsigned short Dpll_read_ram(unsigned short location)
    {
    unsigned char  old_resp_code;
    unsigned short value;
    int            error;
    DPLL_MESSAGE   message;

ASSUME(dpll_semaphore != 0);

value = 0;
    error = 1;
    old_resp_code = dpll_response_code;
    dpll_expected_code = 1;
    dpll_read_location = location;

message.location = location;
    message.value = location;
    message.stage = DPLL_EVENT_BEGIN;
    message.skip = 0;
    Notify(&dpll_ncbptr[DPLL_READ_RAM_EVENT], (void*)&message);

if(!message.skip)
        {
        #if 0
        Trace_say("DPR");
        #endif
        error = Dpll_retry_layer(DPLL_READ_DSP_RAM,
                                0,
                                (unsigned char)(location >> 8),
```

```
                                    (unsigned char)(location & 0xFF),
                                    0,
                                    0,0,0,
                                    DPLL_MAX_ATTEMPTS);

if(!error)
            {
            error = Dpll_response(&value);
            } message.stage = DPLL_EVENT_END;
        Notify(&dpll_ncbptr[DPLL_READ_RAM_EVENT], (void*)&message);

dpll_read_value = value;
        }
    /* Shred garbage */
    dpll_expected_code = old_resp_code;
    return(value);
    }
/*
!
!  Interface description:
!      This function is used to modify the contents of a C/S ram location.  The
!      function will perform a bitwise AND operation on the value of the C/S
!      ram location and the and value.  The result of that operation will be
!      bitwise ORed with the or value.  The result will then be written back to
!      the C/S ram location.
!
!
!  CALLING METHOD:
!       Dpll_modify(addr, and, or)
!
!  INPUT PARAMETERS:
!     addr - address of the host register to modify
!     and  - value to and with the contents of the host register
!     or   - value to OR with the result of the AND operation
!
!*/ void Dpll_modify_ram(unsigned short address, unsigned short and_value,
                     unsigned short or_value)
    {
    unsigned short value;

value  = Dpll_read_ram(address );
    value &= and_value;
    value |= or_value;
    Dpll_write_ram(address, value );
    }

/*
!
!  FUNCTIONAL DESCRIPTION:
!      This function allows the contents of a DSP reserved register to be
!      modified.
!
!  CALLING METHOD:
!      error = Dpll_write_reserved_reg(location, and_value, or_value);
!
!  OBJECT PARAMETERS:
!
!  INPUT PARAMETERS:
!     location - reserved register location
!     and      - value to and with the contents of the reserved register
!     or       - value to OR with the result of the AND operation
!
!  RETURN VALUES:
!     0   No errors.
!     1   Pump does not acknowledge after the specified tries.
!
```

```
!*/
int Dpll_write_reserved_reg(unsigned short location,
                            unsigned short and_value, unsigned short or_value)
    {
    unsigned short attempt;
    int            error;

error = 1;
    attempt = 1;

while(error && (attempt++ <= DPLL_MAX_ATTEMPTS))
        {
        error = Dpll_command(DPLL_MODIFY_RESERVED_REG,
                             (unsigned char) (location & 0xFF),
                             (unsigned char) and_value,
                             (unsigned char) or_value,
                             0,0,0,
                             0);
        } return(error);
    }
/*
!
!  FUNCTIONAL DESCRIPTION:
!     Comands the data pump to renegotiate.
!
!  CALLING METHOD:
!     error = Dpll_renegotiate();
!
!  RETURN VALUES:
!     0   No errors.
!     1   Error in data pump.
!
!*/
int Dpll_renegotiate( void )
    {
    int error;
    DPLL_MESSAGE message;

ASSUME(dpll_semaphore != 0);

message.stage = DPLL_EVENT_BEGIN;
    message.skip = 0;
    Notify(&dpll_ncbptr[DPLL_RENEGOTIATE_EVENT], (void*)&message);

if(!message.skip)
        {
        error = Dpll_retry_layer( DPLL_V32BIS_RATE_RENEG,
                                  0, 0, 0, 0, 0, 0,0,DPLL_MAX_ATTEMPTS );

message.stage = DPLL_EVENT_END;
        Notify(&dpll_ncbptr[DPLL_RENEGOTIATE_EVENT], (void*)&message);
        }
    else
        {
        error = 0;
        } return(error);
    }

/*
!
!  FUNCTIONAL DESCRIPTION:
!     Reads the data pump operating status word and clears SD and RD activity.
!
!  CALLING METHOD:
!     status = Dpll_read_status();
!
```

```
!  RETURN VALUES:
!      Returns the operating status word.
!
!*/
unsigned short Dpll_read_status(void)
    {
    unsigned short value;
    unsigned short attempt;
    int            error;
    DPLL_MESSAGE   message;

ASSUME(dpll_semaphore != 0);

value = 0;
    attempt = 1;
    error = 1;

message.stage = DPLL_EVENT_BEGIN;
    message.skip = 0;
    Notify(&dpll_ncbptr[DPLL_READ_STATUS_EVENT], (void*)&message);

if(!message.skip)
       {
       while(error && (attempt++ <= DPLL_MAX_ATTEMPTS))
          {
          error = Dpll_command(DPLL_READ_STATUS_WORD, 0, 0, 0, 0, 0,0,0);
          if(!error)
             {
             error = Dpll_response(&value);
             }
          }
       message.stage = DPLL_EVENT_END;
       Notify(&dpll_ncbptr[DPLL_READ_STATUS_EVENT], (void*)&message);
       }
    return(value);
    }

/*
!
!  FUNCTIONAL DESCRIPTION:
!      Commands the data pump to generate previously defined tones.
!
!  INTERFACE DESCRIPTION:
!      The following must have been previously specified:
!           1. Tone power levels.
!           2. Tone frequencies.
!           3. Tone durations.
!
!  CALLING METHOD:
!      error = Dpll_generate_tones( num_tones )
!
!  INPUT PARAMETERS:
!      num_tones   Must be 1, 2 or 3.
!
!  RETURN VALUES:
!      0   No errors.
!      1   Error in data pump.
!          Invalid number of tones.
!
!*/
int Dpll_generate_tones( unsigned short num_tones )
    {
    int error;
    DPLL_MESSAGE message;

ASSUME(dpll_semaphore != 0);

if( (num_tones >= 1) && (num_tones <= 3) )
       {
       message.value = num_tones;
       message.skip = 0;
       message.stage = DPLL_EVENT_BEGIN;
```

```
        Notify(&dpll_ncbptr[DPLL_GENERATE_TONES_EVENT], (void*) &message);

if(!message.skip)
          {
          error = Dpll_retry_layer( DPLL_GENERATE_TONES,(unsigned
char)num_tones,
                                    0,0,0,  0,  0,  0, DPLL_MAX_ATTEMPTS );

message.stage = DPLL_EVENT_END;
          Notify(&dpll_ncbptr[DPLL_GENERATE_TONES_EVENT], (void*) &message);
          }
      else
          {
          error = 0;
          }
      }
   else
      {
      error = 1;
      } return(error);
   }

/*
!
!  FUNCTIONAL DESCRIPTION:
!      Commands the data pump to detect tones.
!
!  INTERFACE DESCRIPTION:
!      The following must have been previously specified:
!          1. Tone threshold values.
!          2. Tone frequencies.
!
!  CALLING METHOD:
!      error = Dpll_detect_tones( num_tones );
!
!  RETURN VALUES:
!      0   No errors.
!      1   Error in data pump.
.!          Invalid number of tones.
!
!*/
int Dpll_detect_tones( unsigned short num_tones )
   {
   int error;
   DPLL_MESSAGE message;

ASSUME(dpll_semaphore != 0);

if( (num_tones >= 1) && (num_tones <= 10) )
       {
       message.value = num_tones;
       message.stage = DPLL_EVENT_BEGIN;
       message.skip = 0;
       Notify(&dpll_ncbptr[DPLL_DETECT_TONES_EVENT], (void*) &message);

if(!message.skip)
           {
           error = Dpll_retry_layer( DPLL_DETECT_TONES, (unsigned
char)num_tones,
                                    0,0,0,  0,  0,  0, DPLL_MAX_ATTEMPTS );

message.stage = DPLL_EVENT_END;
           Notify(&dpll_ncbptr[DPLL_DETECT_TONES_EVENT], (void*) &message);
           }
       else
           {
           error = 0;
           }
       }
```

```
        else
            {
            error = 1;
            } return(error);
        }

/*
!
!   FUNCTIONAL DESCRIPTION:
!       Commands the data pump to detect DTMF tones.
!
!   CALLING METHOD:
!       error = Dpll_detect_dtmf( void );
!
!   RETURN VALUES:
!       0   No errors.
!       1   Error in data pump.
!
!*/
int Dpll_detect_dtmf( void )
    {
    int error;
    DPLL_MESSAGE message;

ASSUME(dpll_semaphore != 0);

message.stage = DPLL_EVENT_BEGIN;
    message.skip = 0;
    Notify(&dpll_ncbptr[DPLL_DETECT_DTMF_EVENT], (void*) &message);

if(!message.skip)
        {
        error = Dpll_retry_layer( DPLL_DETECT_DTMF_TONES,
                                  0,0,0, 0, 0, 0, 0, DPLL_MAX_ATTEMPTS );

message.stage = DPLL_EVENT_END;
        Notify(&dpll_ncbptr[DPLL_DETECT_DTMF_EVENT], (void*) &message);
        }
    else
        {
        error = 0;
        } return(error);
    }

/*
!
!   FUNCTIONAL DESCRIPTION:
!       Commands the data pump to generate a DTMF tone.
!
!   CALLING METHOD:
!       error = Dpll_dial_dtmf(par_value);
!
!   INPUT PARAMETERS:
!       Signal Element -> par_value    Signal Element -> par_value
!              0             0x00             8             0x08
!              1             0x01             9             0x09
!              2             0x02             *             0x0A
!              3             0x03             #             0x0B
!              4             0x04             A             0x0C
!              5             0x05             B             0x0D
!              6             0x06             C             0x0E
!              7             0x07             D             0x0F
!
!   RETURN VALUES:
!       0   No errors.
!       1   Error in data pump.
```

```
!
!*/
int Dpll_dial_dtmf( unsigned short par_value)
    {
    int         error;
    DPLL_MESSAGE message;

ASSUME(dpll_semaphore != 0);
    ASSUME(par_value <= 0xf);

message.value = par_value;
    message.stage = DPLL_EVENT_BEGIN;
    message.skip  = 0;

Notify(&dpll_ncbptr[DPLL_DIAL_DTMF_EVENT], (void*) &message);

if(!message.skip)
        {
        Signal_set(&dpsig_status, DPSSTATUS_DIALER);
        error = Dpll_command(DPLL_DTMF_DIALING,
                            (unsigned char)par_value, 0, 0, 0, 0,0,0);

message.stage = DPLL_EVENT_END;
        Notify(&dpll_ncbptr[DPLL_DIAL_DTMF_EVENT], (void*) &message);
        }
    else
        {
        error = 0;
        } return(error);
    }

/*
!
!   FUNCTIONAL DESCRIPTION:
!       Commands the data pump to send a number of pulses for pulse dialing.
!
!   CALLING METHOD:
!       error = Dpll_dial_pulse( num_pulses );
!
!   INPUT PARAMETERS:
!       num_pulses      Number of pulses. Must be in the range of 0-10
inclusive.
!
!   RETURN VALUES:
!       0   No errors.
!       1   Error in data pump.
!
!*/
int Dpll_dial_pulse( unsigned short num_pulses )
    {
    int         error;
    DPLL_MESSAGE message;

ASSUME(dpll_semaphore != 0);
    ASSUME(num_pulses <= 10);

message.value = num_pulses;
    message.stage = DPLL_EVENT_BEGIN;
    message.skip  = 0;

Notify(&dpll_ncbptr[DPLL_DIAL_PULSE_EVENT], (void*) &message);

if(!message.skip)
        {
        Signal_set(&dpsig_status, DPSSTATUS_DIALER);
        error = Dpll_command(DPLL_PULSE_DIALING,
                            (unsigned char)num_pulses, 0, 0, 0, 0,0,0);
        message.stage = DPLL_EVENT_END;
        Notify(&dpll_ncbptr[DPLL_DIAL_PULSE_EVENT], (void*) &message);
```

```
            }
         else
            {
            error = 0;
            } return(error);
         }
/*
!
!
!   FUNCTIONAL DESCRIPTION:
!       Commands the data pump to enter CCITT V.54 loop 3 mode.
!
!   CALLING METHOD:
!       error = Sp_startup_analog( direction );
!
!   INPUT PARAMETERS:
!       direction       1 = use answer carrier
!                       0 = use originate carrier
!
!   RETURN VALUES:
!       0    No errors.
!       1    Error in data pump.
!            Invalid direction argument.
!
!*/
int Dpll_startup_analog( unsigned short direction )
    {
    int error;
    DPLL_MESSAGE message;

ASSUME(dpll_semaphore != 0);

if(direction<2)
         {
         message.value = direction;
         message.stage = DPLL_EVENT_BEGIN;
         message.skip = 0;
         Notify(&dpll_ncbptr[DPLL_STARTUP_ANALOG_EVENT], (void*) &message);

if(!message.skip)
            {
            error = Dpll_retry_layer(DPLL_LOCAL_LOOP_3_TEST,
                                   (unsigned char)(1-direction),0,0,0,0,0,0,
                                   DPLL_MAX_ATTEMPTS );

message.stage = DPLL_EVENT_END;
            Notify(&dpll_ncbptr[DPLL_STARTUP_ANALOG_EVENT], (void*) &message);
            }
         else
            {
            error = 0;
            }
         }
    else
         {
         error = 1;
         } return(error);
    }
/*
!
!
!   FUNCTIONAL DESCRIPTION:
!       Command the data pump to read from a C/S ram location, and then clear
it.
!
!   IMPLEMENTATION DESCRIPTION:
!       1. A read and clear command is issued to the data pump.
!       2. When the data pump has accepted the command, the value is read from
```

```
!          a host register.
!
! CALLING METHOD:
!     value = Dpll_read_and_clear( location );
!
! INPUT PARAMETERS:
!     location    The C/S loaction to be read and cleared.
!
! RETURN VALUES:
!     Returns the the value read.
!
!*/
unsigned short Dpll_read_and_clear( unsigned short location )
   {
   unsigned char  old_resp_code;
   unsigned short value;
   unsigned short attempt;
   DPLL_MESSAGE   message;
   int            error;

ASSUME(dpll_semaphore != 0);

old_resp_code = dpll_response_code;
   dpll_expected_code = 1;
   value    = 0;
   attempt  = 1;
   error    = 1;

message.value = location;
   message.stage = DPLL_EVENT_BEGIN;
   message.skip = 0;
   Notify(&dpll_ncbptr[DPLL_READ_AND_CLEAR_EVENT], (void*) &message);

if(!message.skip)
      {
      while( error && ( attempt++ <= DPLL_MAX_ATTEMPTS ) )
         {
         error = Dpll_command( DPLL_READ_CLEAR_DSP_RAM,
                               0,
                               (unsigned char) (location >> 8),
                               (unsigned char) (location & 0xFF),
                               0,0,0,
                               0);
         if( !error )
            {
            error = Dpll_response( &value );
            }
         }
      message.stage = DPLL_EVENT_END;
      Notify(&dpll_ncbptr[DPLL_READ_AND_CLEAR_EVENT], (void*) &message);
      }
   else
      {
      error = 0;
      } dpll_expected_code = old_resp_code;
   return value;
   }

/*
!
! FUNCTIONAL DESCRIPTION:
!     Commands the data pump to startup a normal carrier.
!
! CALLING METHOD:
!     error = Dpll_startup( mode );
!
! INPUT PARAMETERS:
!     mode    1 = answer (in half duplex, receive)
!             0 = originate (in half duplex, transmit )
!
```

```
!   RETURN VALUES:
!       0   No errors.
!       1   Error in data pump.
!           Invalid mode argument.
!
!*/
int Dpll_startup(unsigned short mode)
    {
    int error;
    DPLL_MESSAGE message;

ASSUME(dpll_semaphore != 0);

if(mode<2)
        {
        message.value = mode;
        message.stage = DPLL_EVENT_BEGIN;
        message.skip = 0;
        Notify(&dpll_ncbptr[DPLL_STARTUP_EVENT], (void*) &message);

if(!message.skip)
            {
            #if 0
            Trace_say("Dpll_startup");
            #endif
            error = Dpll_retry_layer( DPLL_STARTUP, (unsigned char)(1-mode),
                                      0,0,0,0, 0, 0, DPLL_MAX_ATTEMPTS );

message.stage = DPLL_EVENT_END;
            Notify(&dpll_ncbptr[DPLL_STARTUP_EVENT], (void*) &message);
            }
        else
            {
            error = 0;
            }
        }
    else
        error = 1;

return(error);
    }

/*
!
!   FUNCTIONAL DESCRIPTION:
!       Commands the data pump to initiate a retrain sequence.
!
!   CALLING METHOD:
!       error = Dpll_retrain();
!
!   RETURN VALUES:
!       0   No errors.
!       1   Error in data pump.
!
!*/
int Dpll_retrain( void )
    {
    int error;
    DPLL_MESSAGE message;

ASSUME(dpll_semaphore != 0);

message.stage = DPLL_EVENT_BEGIN;
    message.skip = 0;
    Notify(&dpll_ncbptr[DPLL_RETRAIN_EVENT], (void*) &message);

if(!message.skip)
        {
        error = Dpll_retry_layer( DPLL_INIT_RETRAIN_SEQ, 0, 0, 0, 0, 0, 0,0,
                                  DPLL_MAX_ATTEMPTS );

message.stage = DPLL_EVENT_END;
```

```
        Notify(&dpll_ncbptr[DPLL_RETRAIN_EVENT], (void*) &message);
        }
    else
        {
        error = 0;
        } return(error);
    }

/*
!
!   FUNCTIONAL DESCRIPTION:
!       Returns the data pump's firmware revision number.
!
!   CALLING METHOD:
!       revision = Dpll_revision();
!
!   RETURN VALUES:
!       DP firmware revision.
!
!*/
unsigned short Dpll_revision( void )
    {
    unsigned char  old_resp_code;
    unsigned short revision;
    unsigned short attempt;
    int            error;
    DPLL_MESSAGE   message;

ASSUME(dpll_semaphore != 0);

revision = 0;
    attempt  = 1;
    error    = 1;
    old_resp_code = dpll_response_code;
    dpll_expected_code = 5;

message.stage = DPLL_EVENT_BEGIN;
    message.skip = 0;
    Notify(&dpll_ncbptr[DPLL_REVISION_EVENT], (void*) &message);

if(!message.skip)
        {
        while( error && ( attempt++ <= DPLL_MAX_ATTEMPTS ) )
            {
            error = Dpll_command( DPLL_REP_FIRMWARE_VERS, 0, 0, 0, 0, 0,0,0);

if( !error )
                {
                error = Dpll_response( &revision );
                }
            }
        message.stage = DPLL_EVENT_END;
        Notify(&dpll_ncbptr[DPLL_REVISION_EVENT], (void*) &message);
        }
    else
        {
        error = 0;
        } dpll_expected_code = old_resp_code;
    return(revision);
    }

/*
!
!   FUNCTIONAL DESCRIPTION:
!       Commands the data pump to go off-hook.
!
!   CALLING METHOD:
```

```
!      error = Dpll_connect();
!
! RETURN VALUES:
!     0   No errors.
!     1   Error in data pump.
!
!*/
int Dpll_connect(void)
   {
   int error;
   DPLL_MESSAGE message;

ASSUME(dpll_semaphore != 0);

message.stage = DPLL_EVENT_BEGIN;
   message.skip = 0;
   Notify(&dpll_ncbptr[DPLL_CONNECT_EVENT], (void*) &message);

if(!message.skip)
      {
      error = Dpll_retry_layer(DPLL_CONNECT_TO_LINE, 0, 0, 0, 0, 0,0,0,
                         DPLL_MAX_ATTEMPTS);

message.stage = DPLL_EVENT_END;
      Notify(&dpll_ncbptr[DPLL_CONNECT_EVENT], (void*) &message);
      }
   else
      {
      error = 0;
      } return(error);
   }

/*
!
! FUNCTIONAL DESCRIPTION:
!     Commands the data pump to go on-hook.
!
! CALLING METHOD:
!      error = Dpll_disconnect();
!
! RETURN VALUES:
!     0   No errors.
!     1   Error in data pump.
!
!*/
int Dpll_disconnect(void)
   {
   int error;
   DPLL_MESSAGE message;

ASSUME(dpll_semaphore != 0);

message.stage = DPLL_EVENT_BEGIN;
   message.skip = 0;
   Notify(&dpll_ncbptr[DPLL_DISCONNECT_EVENT], (void*) &message);

if(!message.skip)
      {
      error = Dpll_retry_layer( DPLL_DISCONNECT_FROM_LINE, 0, 0, 0, 0, 0,0,0,
                         DPLL_MAX_ATTEMPTS );

message.stage = DPLL_EVENT_END;
      Notify(&dpll_ncbptr[DPLL_DISCONNECT_EVENT], (void*) &message);
      }
   else
      {
      error = 0;
      } return(error);
```

```
    }
/*
!
!   FUNCTIONAL DESCRIPTION:
!       Commands the data pump to stop all operations and return to idle.
!
!   CALLING METHOD:
!       error = Dpll_idle();
!
!   RETURN VALUES:
!       0   No errors.
!       1   Error in data pump.
!
!*/
int Dpll_idle( void )
    {
    int error;
    DPLL_MESSAGE message;

ASSUME(dpll_semaphore != 0);

Signal_clear(&dpsig_status, DPSSTATUS_DIALER);

message.stage = DPLL_EVENT_BEGIN;
    message.skip = 0;
    Notify(&dpll_ncbptr[DPLL_IDLE_EVENT], (void*) &message);

if(!message.skip)
        {
        Trace_say("Dpll_idle");
        error = Dpll_retry_layer( DPLL_RETURN_TO_IDLE, 0, 0, 0, 0, 0,0,0,
                                  DPLL_MAX_ATTEMPTS );

message.stage = DPLL_EVENT_END;
        Notify(&dpll_ncbptr[DPLL_IDLE_EVENT], (void*) &message);
        }
    else
        {
        error = 0;
        } return(error);
    }

/*
!
!   FUNCTIONAL DESCRIPTION:
!       Issues a command to the data pump.
!
!   INTERFACE DESCRIPTION:
!       This function is unsupported and should not be used except for debugging
!       purposes and/or by members of dpll.
!
!   CALLING METHOD:
!       error = Dpll_command( command, p1, p2, p3, p4, p5 );
!
!   INPUT PARAMETERS:
!       command     Data pump command mailbox value.
!       p1          Data pump parameter mailbox value #1.
!       p2          Data pump parameter mailbox value #2.
!       p3          Data pump parameter mailbox value #3.
!       p4          Data pump parameter mailbox value #4.
!       p5          Data pump parameter mailbox value #5.
!       p6          Data pump parameter mailbox value #6.
!       p7          Data pump parameter mailbox value #7.
!
!   RETURN VALUES:
!       0   No errors.
!       1   Timeout waiting for read or write bank interrupt.
!
```

```c
!*/
int Dpll_command( unsigned char command, unsigned char p1, unsigned char p2,
                  unsigned char p3,      unsigned char p4, unsigned char p5,
                  unsigned char p6,      unsigned char p7)
{
   int error;
   unsigned short sr;

ASSUME(interrupt_state == 0);

error = 1;

dpll_cmd = command;
   dpll_cmd_p1 = p1;
   if(command != DPLL_READ_DSP_RAM && command != DPLL_WRITE_DSP_RAM)
      {
      dpll_cmd = command;
      dpll_cmd_p1 = p1;
      } if(!Dpll_clear_core_interrupt(DPHIL_BIT_CWBNKI))
      {
      if(!Dpll_clear_core_interrupt(DPHIL_BIT_CRBNKI))
         {
         sr = Interrupt_disable(0);
         dpll_cmd_active = 1;
         Dphil_write(DPHIL_COMMAND_PARAM_7_MAILBOX, p7);
         Dphil_write(DPHIL_COMMAND_PARAM_6_MAILBOX, p6);
         Dphil_write(DPHIL_COMMAND_PARAM_5_MAILBOX, p5);
         Dphil_write(DPHIL_COMMAND_PARAM_4_MAILBOX, p4);
         Dphil_write(DPHIL_COMMAND_PARAM_3_MAILBOX, p3);
         Dphil_write(DPHIL_COMMAND_PARAM_2_MAILBOX, p2);
         Dphil_write(DPHIL_COMMAND_PARAM_1_MAILBOX, p1);
         Dphil_write(DPHIL_COMMAND_MAILBOX, command);
         Interrupt_enable(sr);
         error = Dpll_wait_for_core_interrupt(DPHIL_BIT_CRBNKI);
         }
      } return error;
}

/*
!
! FUNCTIONAL DESCRIPTION:
!    Gets the values of the response parameter mailboxes.
!
! INTERFACE DESCRIPTION:
!    This function is unsupported and should not be used except for debugging
!    purposes and/or by members of dpll.
!
! CALLING METHOD:
!    error = Dpll_response( pt_value );
!
! OUTPUT PARAMETERS:
!    pt_value     a pointer to the unsigned short which will contain the
!                 response
!
! RETURN VALUES:
!    0  upon success
!    1  upon failure due to a core write interrupt not occuring
!
!*/
int Dpll_response( unsigned short *pt_value )
{
   int error;

ASSUME(interrupt_state == 0);
```

```
    error = 1;
if (!Dpll_wait_for_core_interrupt(DPHIL_BIT_CWBNKI))
    {
    if(dpll_response_code == 0xfe &&
        dpll_response_value == 0xDEAD)
        {
        Trace_say("Bogus Core Write!");
        dpll_error |= 0x40;
        }
    else if(dpll_response_code != dpll_expected_code)
        {
        dpll_error |= 0x20;
        Trace_say("Unexpected core write");
        }
    else
        {
        *pt_value = dpll_response_value;
        Dpll_clear_core_interrupt(DPHIL_BIT_CWBNKI);
        /* Let play shred the garbage! */
        dpll_response_value = 0xDEAD;
        dpll_response_code = 0xfe;
        error = 0;
        }
    }
return error;
}
```

We claim:

1. A general purpose computer system for use with a modem that lacks a microcontroller for executing a modem controller code, where the general purpose computer system executes the modem controller code, comprising;

a processor for executing instructions;

an operating system for execution by said processor;

a device driver for a hardware UART device, said device driver called by said operating system to perform serial operations with the hardware UART device;

a virtualized UART interface for execution by said processor, said virtualized UART interface communicating data to and from the modem controller code;

an input/output bus coupled to said processor, said input/output bus adapted to communicate with a controllerless hardware modem having a digital signal processor; and wherein said processor executes both general computer system code and the modem controller code and communicates data and commands between the executed modem controller code and the digital signal processor, wherein said virtualized UART interfere provides entry points corresponding to reads from and writes to the hardware UART, wherein said device driver is modified to call said entry points to perform reads from and writes to said virtualized UART interface instead of the hardware UART, the modification to said device driver involving replacement of "IN AL, DX" and "OUT DX, AL" instructions with calls to the entry points.

2. The computer system of claim 1, wherein said virtualized UART interface emulates a 16450 UART.

3. The computer system of claim 1, wherein said device driver is a Windows® 3.1 virtual device driver.

4. The computer system of claim 1, wherein said device driver is a Windows® 95 virtual device driver.

5. The computer system of claim 1, wherein said virtualized UART interface provides a compartmentalized interface to said device driver such that said operating system can be changed to a second operating system with a second device driver without significant modification to said virtualized UART interface.

6. The computer system of claim 1, wherein said virtualized UART interface provides a compartmentalized interface to said device driver such that said controllerless hardware modem can be changed to a second controllerless hardware modem without significant modification to said device driver.

7. A general purpose computer system for use with a modem that lacks a microcontroller for executing a modem controller code, where the general purpose computer system executes the modem controller code, the system comprising:

a processor for executing instructions;

a virtualized UART interface for execution by said processor, said virtualized UART interface communicating data to and from the modem controller code;

a disk drive coupled to said processor for storing the modem controller code;

main memory for storing the modem controller code;

an operating system for execution by said processor, said operating system stored on said disk drive and in said memory memory;

a device driver for a hardware UART device, said device driver called by said operating system to perform serial operations with the hardware UART device, said device driver stored on said disk drive and in said main memory;

an input/output bus coupled to said processor, said input/output bus adapted to communicate with a controllerless hardware modem with a digital signal processor; and wherein said processor executes both general computer system code and the modem controller code and communicates data and commands between said executed modem controller code and the digital signal processor, wherein sad virtualized UART interface provides entry points corresponding to reads from and writes to the hardware UART, said virtualized UART interface stored on said disk drive and in said main memory, wherein said device driver is modified to call said entry points to perform reads from and writes to said virtualized UART interface instead of the hardware UART, the modification to said device driver involving replacement of "IN AL,DX" and "OUT DX,AL" instructions with calls to the entry points.

* * * * *